United States Patent

[11] 3,585,601

[72] Inventors Allan E. Lahrson
Oakland;
Richard C. Zuchowski, San Francisco, both of, Calif.

[21] Appl. No. 851,242
[22] Filed Aug. 19, 1969
[45] Patented June 15, 1971
[73] Assignee Kaiser Aluminum & Chemical Corporation

[54] REMOTE INPUT MANAGEMENT SYSTEM
115 Claims, 35 Drawing Figs.

[52] U.S. Cl. .......... 340/172.5
[51] Int. Cl. .......... G06f 9/18
[50] Field of Search .......... 340/172.5

[56] References Cited

UNITED STATES PATENTS 3,411,139 11/1968 Lynch et al. .......... 340/172.5

*Primary Examiner*—Raulfe B. Zache
*Attorney*—Fulwider, Patton, Rieber, Lee & Utecht

ABSTRACT: This invention is a number of digital computer programs and a method of recording and indexing data for use with a centrally located computer and remote terminal equipment. Methods according to this invention enable a user of remote terminals, either teletype, computer or video, to have access to all computing and data handling functions of a central computer system via a connecting telephone line.

INVENTORS
ALLAN E. LAHRSON
RICHARD C. ZUCHOWSKI
BY Fulwider, Patton, Rieber, Lee, and Utecht
ATTORNEYS

LEVEL 1 INDEX

LEVEL 1 TAG

DATA BLOCK

DATA RECORD

PATENTED JUN 15 1971 3,585,601

SHEET 19 OF 27

REMOTE INPUT MANAGEMENT SYSTEM

INDEX TO THE SPECIFICATION

I. INTRODUCTION . . . . . . . . 2
II. REMOTE TERMINAL EQUIPMENT . . . . 21
III. FILE ORGANIZATION . . . . . . . 25
IV. THE RIMS SYSTEM . . . . . . . 31
1. Introduction 31
2. RIMS Work Area 32
3. File Security 33
4. RIMS Operational Procedures 36
5. RIMS Commands 39
6. Variable and Array Usage 60
V. HANDLER PROGRAM . . . . . . . 67
1. Function of the Program 67
2. Flowcharts of Handler Program 67
3. Handler Program Listing 77
VI. MAIN PROCESSING PROGRAM . . . . 95
1. Introduction 95
2. Dispatcher Module 95
3. First Module 102
4. Data Module 109
5. Log In Module 113
6. Log Out Module 120
7. Schedule Module 122
8. Resequence Module 126
9. Further Flowcharts 135
10. Main Processing Program Listing 135
VII. SCHEDULE PROGRAM . . . . . . . 222
1. Introduction 222
2. Outer Block Flowchart 224
3. The Kopy Statement 226
4. Readvistafile Procedure 229
5. Schedule Program Listing 239
VIII. TO RIMS PROGRAM . . . . . . . 261
IX. TO SEQUENTIAL PROGRAM . . . . . 273
X. CLEANUP PROGRAM . . . . . . . 281

I. INTRODUCTION

This invention relates to methods of programming and controlling a digital computer and a method of recording and indexing data for storage in the computer to enable a user of remote equipment to conversationally communicate with the computer via a connecting telephone line. This specification includes a narrative description of the functions of the system, the logical sequences of major portions of certain of the programs and source program listings and flow charts for each of the programs.

Programs set forth in this specification are written in Extended ALGOL for use with B–5500 computers manufactured by Burroughs Corporation, Detroit, Mich. Only a brief description of ALGOL and the B–5500 equipment will be given here. For a detailed treatment of ALGOL, reference is made to standard, readily available works concerning the language. For details concerning Burroughs hardware in connection with which the invention is to be used, reference is made to the pertinent publications of Burroughs Corporation. Such publications are a matter of public record and easily obtained.

As is known by those skilled in the art, Extended ALGOL, in which the programs of this invention are written, is a derivative of the common computer language, ALGOL 60. However, the program language herein will be referred to as ALGOL, for simplicity.

ALGOL, an acronym for ALGOrithmic Language, is a procedure-oriented language written in terms of letters, numbers and special symbols. An example of a special symbol, of which there are 27 in ALGOL, is (in the type format herein) the left-hand arrow sign. This symbol stands for the operation of assignment. It serves to assign the value of the expression on its right to the variable appearing on its left.

In addition, ALGOL makes use of 67 reserved words. A reserved word in ALGOL always has the same, narrowly defined meaning, and may not be changed. Therefore, it may not be given a different meaning by a programmer.

The format of an ALGOL program may be stated as:

BEGIN D; D; S; S; S END.

BEGIN and END are ALGOL reserved words having evident meanings. D represents a declaration which is not executed as an active portion of the program. Rather, a declaration provides the ALGOL compiler with information about identifiers in the program. For example, a declaration may specify that the identifier for a particular variable always represents an integer.

S in the general statement above represents an ALGOL statement. A statement is the active element of an ALGOL program and indicates an operation to be performed by the computer. Statements are normally executed sequentially, in the order they are written. The order may, however, be altered by a statement which indicates its successor to be other than the one immediately subsequent to it.

Programs of this invention are written to be used with a BUrroughs B–5500 computer. The B–5500 compiler accepts ALGOL programs in addition to FORTRAN and COBOL language programs. Therefore, the source programs set forth herein may be compiled in standard fashion by the B–5500 compiler to produce the object programs in machine language. Since the standard Burroughs compiler accepts the programs listed herein, no further explanation of the ALGOL compiling technique will be set forth herein.

B–5500 operation is coordinated and controlled by an operating system called the Master Control Program. In conjunction with user programs, the Master Control Program provides simultaneous Input-Output operations and multiprocessing, controls the sequence of processing, initiates all Input-Output operations and provides automatic handling procedures. Operating systems in general and the Burroughs Master Control Program in particular are well known and understood and will not be detailed herein.

Core memory in a B–5500 system is modular with a maximum of eight memory modules. Each module has the capacity of storing 4,096 words. Therefore, the maximum core capacity with eight modules is 32,768 words. In the B–5500, a word in core memory consists of storage locations for 48 bits plus one bit reserved for parity checking.

As with all general purpose computer systems, the B–5500 will access numbers of disc memory units. As will be explained herein, data is generally stored in a peripheral memory device, such as on disc, and not transferred to core memory until some operation is to be performed on or with the data. Core memory is largely reserved for the user's program and the operating system program.

In general, the preferred embodiment of this invention consists of a set of programs and a method of recording and indexing data which allow a remote user to communicate with a B–5500 and utilize virtually all functions of the computer from a remote terminal. The user's remote terminal may consist of either a standard Teletype, a peripheral computer such as a Burroughs TC–500 or a video device such as a keyboard-controlled cathode-ray tube. An example of the latter device, which has been successfully used, is a DIDS–400 Display Terminal Model 401–2A, manufactured by Raytheon.

When using a remote Teletype, the terminal is connected to the B–5500 through analog to digital and digital to analog converters over a telephone line. Digital codes generated by the Teletype are converted to audible analog signals for transmission and reconverted for input to the B–5500.

Burroughs TC–5500 is a desk-type digital computer especially designed to be used also as a remote terminal in a data communication network. It may be programmed to access and use the main computer, in turn programmed according to this invention. An example of such a use is where a remote user stores on B–5500 disc all data necessary to generate a payroll. A TC–500 accesses the data and in turn is programmed to print payroll checks from the centrally stored data provided it by the B–5500.

Keyboard-controlled video devices may also be utilized as remote terminals according to this invention. Data may be entered in storage in the central computer via the terminal keyboard. As such data is entered, it is displayed on the cathode-ray tube. After entry of the data, when the operator is satisfied with its accuracy,, a Transmit key is depressed, causing the transmission of the data to the central computer. Similarly, accessed data from the central computer is caused to be displayed on the cathode-ray tube, from which it may be read or copied.

Basically, this invention comprises a number of digital programs and a scheme for file organization which allow a remote user to have access to the large data storage capability which only a large computer gives. The user, however, invests in only the purchase or rental price of his terminal equipment plus charges from the owner of the central computer for storage of the user's data and actual time the central computer is used. By use of this invention, a user may have access to a large central computer, with all of the usual advantages which follow therefrom, but only make a relatively small investment in hardware.

As will be explained in detail below, an important part of this invention is the organization of filed data in disc storage. In the file organization, a two-level set of indices locates each data record. The data record is a 10-word section of data, each word consisting of eight characters or 48 bits. Each index refers to data by sequence number. The highest level index block, termed a Level 2 index, contains, in addition to identification data, up to 75 tags, each of which contains a sequence number and tag count. The sequence number and tag count refer to a referenced Level 1 index block, of which there are up to 75 for each Level 2 index block. The sequence number in the Level 2 index tag is the highest sequence number to be found in the Level 1 index block referenced by the associated Level 2 tag count. Each Level 1 index contains up to 150 tags, each of which contains a sequence number associated with a particular data record (80 characters maximum) and a relative record number which points to the position of the data record in the up to 120 data records which follow each Level 1 index block. Therefore, for every data record of 80 characters, 10 words, there is a single Level 1 index tag.

Accordingly, under the file index method herein, a single RIMS file may contain up to 9,000 records, or 90,000 words. Under the usual method of storing and retrieving data on disc, each data record must be sequentially read until the record sought is located. Using the data storing method of this invention, a data record may be located and read out in only three reads. Obviously, the time saved is substantial.

There are a total of six programs disclosed herein, all of which constitute, along with the file organization, the invention. The invention as a whole will be referred to herein as the Remote Input Management System or RIMS.

The main program of this invention is referred to as the Main Processing Program or MPP. The function of the Main Processing Program is to perform the data manipulation requested by the remote user. There are 24 commands which may be entered by a user for entering, manipulating, changing or reading out data located in the central computer disc storage. The Main Processing Program recognizes which command is being entered and transfers control to the proper program module for execution of the command.

A second program, named the I–O Handler, or Handler, serves as an interface between user remote terminals and the Main Processing Program. All commands and data entered at a remote terminal and sent to a remote terminal from the central computer are transferred under control of Handler. When entry of data is attempted at a remote terminal, Handler is the first program in RIMS to be brought into core by the MCP. Before data is accepted, Handler checks to see if the Main Processing Program is in a state to accept data or commands. If it is found to be in a ready state, Handler passes the entry to the Main Processing Program. If not, Handler causes the attempted entry to be ignored.

Two programs are provided to translate file data from either sequential format to the RIMS file organization described above, or, in reverse. Sequential format, also called data format, involves data arranged in the order in which it is presented to the data processor. No sequence numbers or other indexing numbers are used. As noted above, however, data arranged according to the RIMS file organization is stored with a sequence number referencing a data record of 10 words (80 characters).

The fifth program of this invention is referred to as RIMS Schedule, or Schedule. Its function, as will be explained in detail below, is to enable RIMS files to be effectively enlarged (resolving KOPY Statements), to move files within storage and to pass a RIMS file to the compiler when necessary.

One of the principal applications of RIMS is the storage of user programs on disc from where the user can cause the programs to be passed to the central computer for execution. For example, a program being written by a programmer may be entered from a remote terminal and stored on disc in a RIMS file. If the programmer wishes the stored program executed so that it may be debugged, the Schedule command controls execution of the Schedule program which in turn causes the stored program to be executed. The Schedule command is the only way execution can be initiated from a terminal.

Under control of Schedule, the RIMS indexed program is converted to a sequential file. All KOPY statements are resolved. Schedule then causes the converted program to enter the mix where it is executed under control of the Master Control Program. While Schedule is working, it is independent of RIMS MPP which is available to other terminal users.

When changes in data are made by one of the Main Processing Program commands, the old data is left untouched and the new data recorded at the first data storage location. The new data is located by writing a new corresponding Level 1 index tag with the appropriate sequence number and relative record number. After a number of such updates, a RIMS file contains a quantity of old data and Level 1 tags which must be removed. For this purpose, the sixth program is provided, called RIMS/Cleanup or Cleanup. The user determines when Cleanup is needed and causes the Cleanup program to be run. Under control of the program, a new file is created on a disc having the same name as the old file. The indices and scattered valid data are collected and the file recorded at a new location. The old file location is left intact but is available as open storage for further future entries of data. Alternatively, by providing the file with a new name, the old file is left intact under the old name and the Cleaned-Up version recorded elsewhere under the new name. Thereafter, both files are available to the appropriate remote user.

Comparison of the invention herein with well-known Time Share systems may aid in understanding its advantages. In Time Share, each of the sharing users is accorded a portion of a computer's core memory. In that portion, the user's object program is stored in addition to whatever space is required to hold data worked on by the program. Since the particular step of each user's program may require use of a different portion of the computer, numerous instructions from different programs may be performed simultaneously under control of an operating system such as the Master Control Program. Thus, the group of users shares the computer simultaneously.

An obvious limitation of Time Share is that a user cannot use a greater portion of core memory than that assigned to him. Accordingly, only relatively small programs can be Time Shared.

As a result of this limitation, Time Share is almost universally applied to scientific uses rather than business or commercial uses. This is because, in general, scientific programs are much shorter than business programs and occupy less core memory. Most business programs are simply too long to be effectively and efficiently Time Shared.

RIMS, on the other hand, is a remote sequential batch system. It is remote in the sense that is is useable from remote terminals. It is a sequential batch system in the sense that each remote user is serviced sequentially, that is, one at a time. Except for very long command, each user's work is completed before the next user is serviced. Occasionally, with a long command, RIMS will service the next user after interrupting service of the long command and later return to complete the unfinished long command.

One of the principal functions of RIMS is to allow business data to be rapidly updated by the user at his terminal. An example of such an update is the change of an employee's hourly rate in payroll data. In the usual computer installation, a change request must be made by submission on paper. The change is actually made by personnel located at the computer site. As a result, it often takes a matter of days to successfully complete an update. With RIMS, a terminal operator may enter updates in the time it takes to enter the data on the terminal keyboard.

A second major area in which RIMS may be used is program development. In the usual case of writing a program, a programmer must make changes in his stored program at the computer site. Then, he must wait for the console operator to schedule and execute the changed program so that it may be debugged. Often, the "turn-around time" in this procedure is a matter of days.

With RIMS, the programmer may load, change and schedule his program for execution from his remote terminal. Instead of a turn-around time of days, it is reduced to minutes.

Accordingly, it is therefore an object of this invention to provide the facility of virtually instantaneous updating of stored data.

It is another object of this invention to allow a user remote from a large computer full use of the computer through a terminal device.

It is still another object of this invention to provide a remote user with the capabilities of storing large amounts of data.

It is a further object of this invention to enable a user to obtain through a remote terminal device any quantity of his previously stored data.

It is a still further object of this invention to enable a user to add or delete portions of data to or from previously stored data.

It is yet a further object of this invention to enable a user to cause execution of a stored program from a remote terminal.

It is another object of this invention to enable a user to store, change and debug source programs on a virtually instantaneous basis.

It is still another object of this invention to provide a method of recording data which allows retrieval and manipulation of the data on a most efficient basis.

It is yet another object of this invention to enable a user to use any one of a plurality of commands to control manipulation of data.

It is a still further object of this invention to enable a user to translate data from one format to another.

It is a further object of this invention to enable a user to store large amounts of data which may be manipulated.

It is a still further object of this invention to cause data in one storage file to be copied into another file readout.

It is yet another object of this invention to enable a user to cause data in up to six stored files to be copied into a single file readout.

It is a still further object of this invention to enable a user to remove invalid or corrected data from previously stored files.

These and other objects and advantages of this invention will become readily apparent by reference to this specification and the accompanying drawings herein, wherein.

Figure 21A:
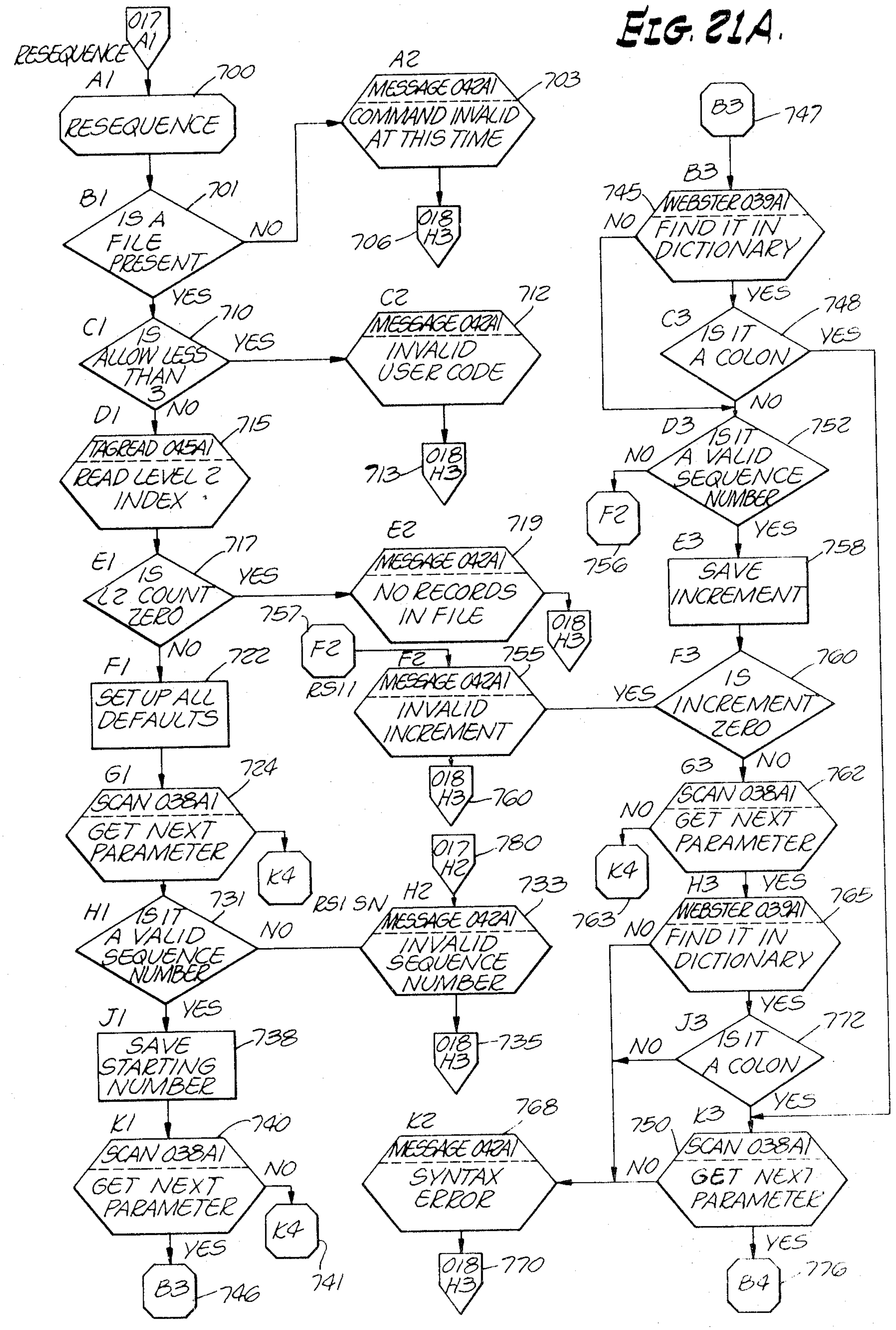
Figure 21B:
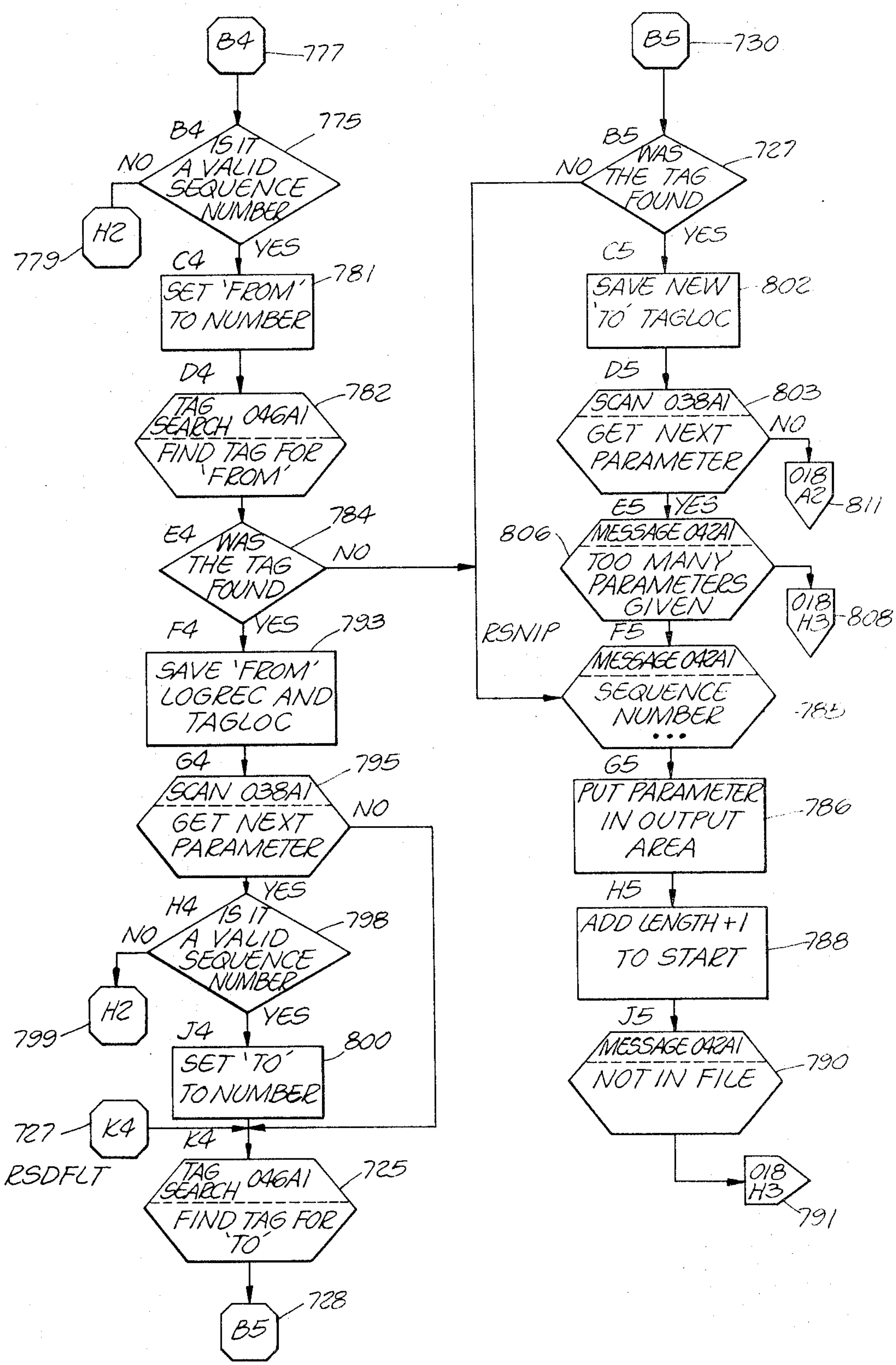
Figure 22:
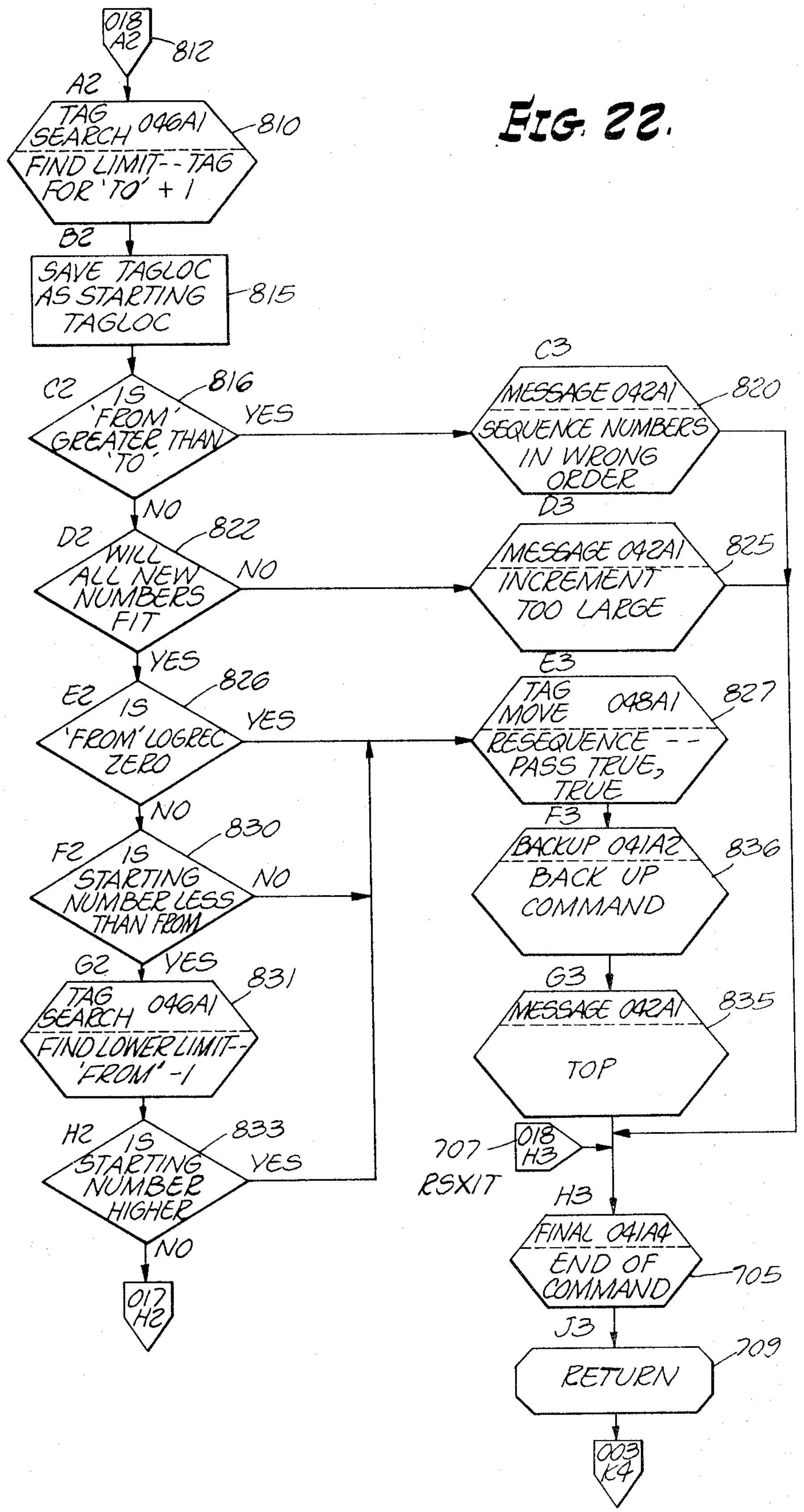
Figure 23:
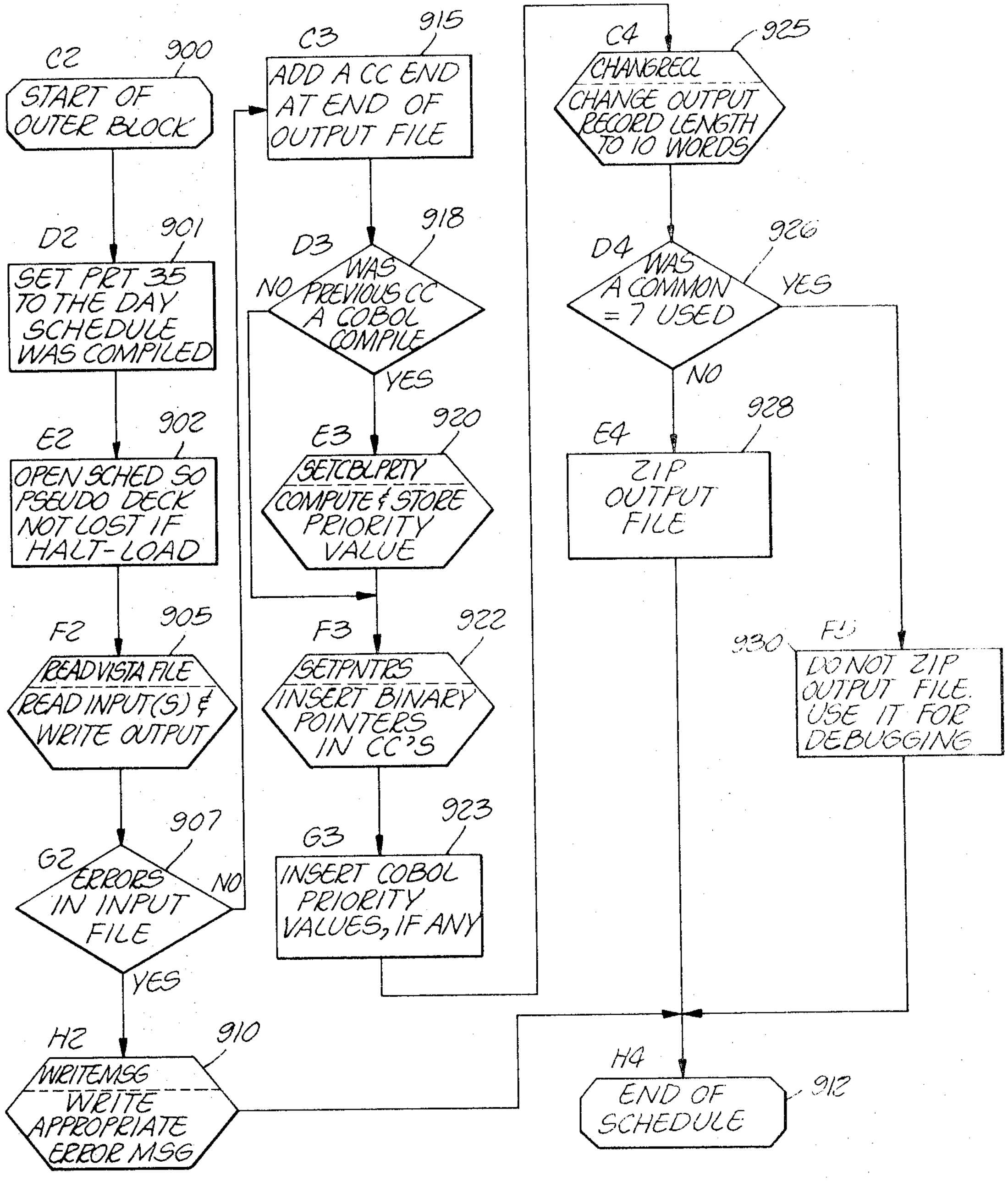
Figure 24A:
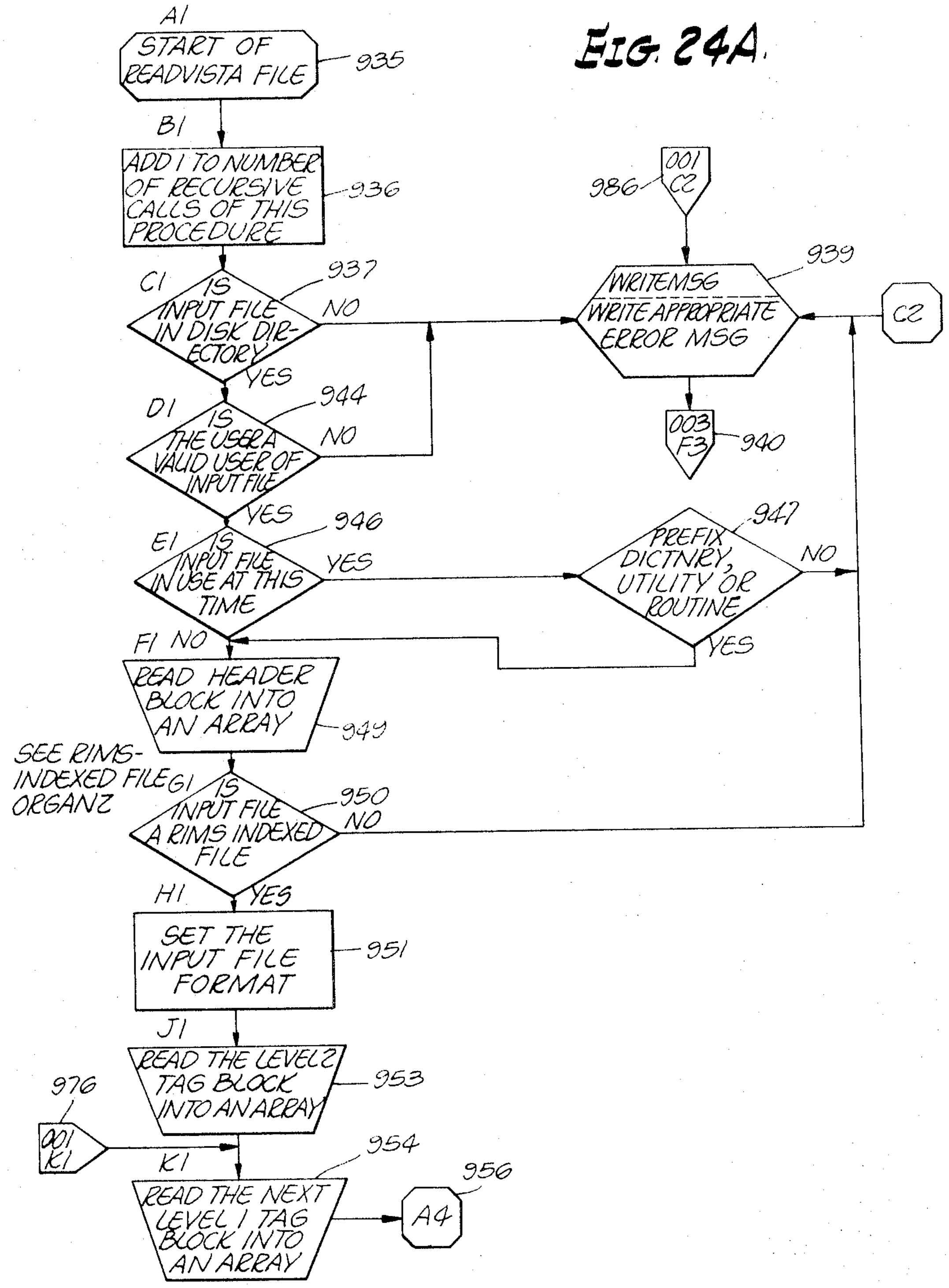
Figure 24B:
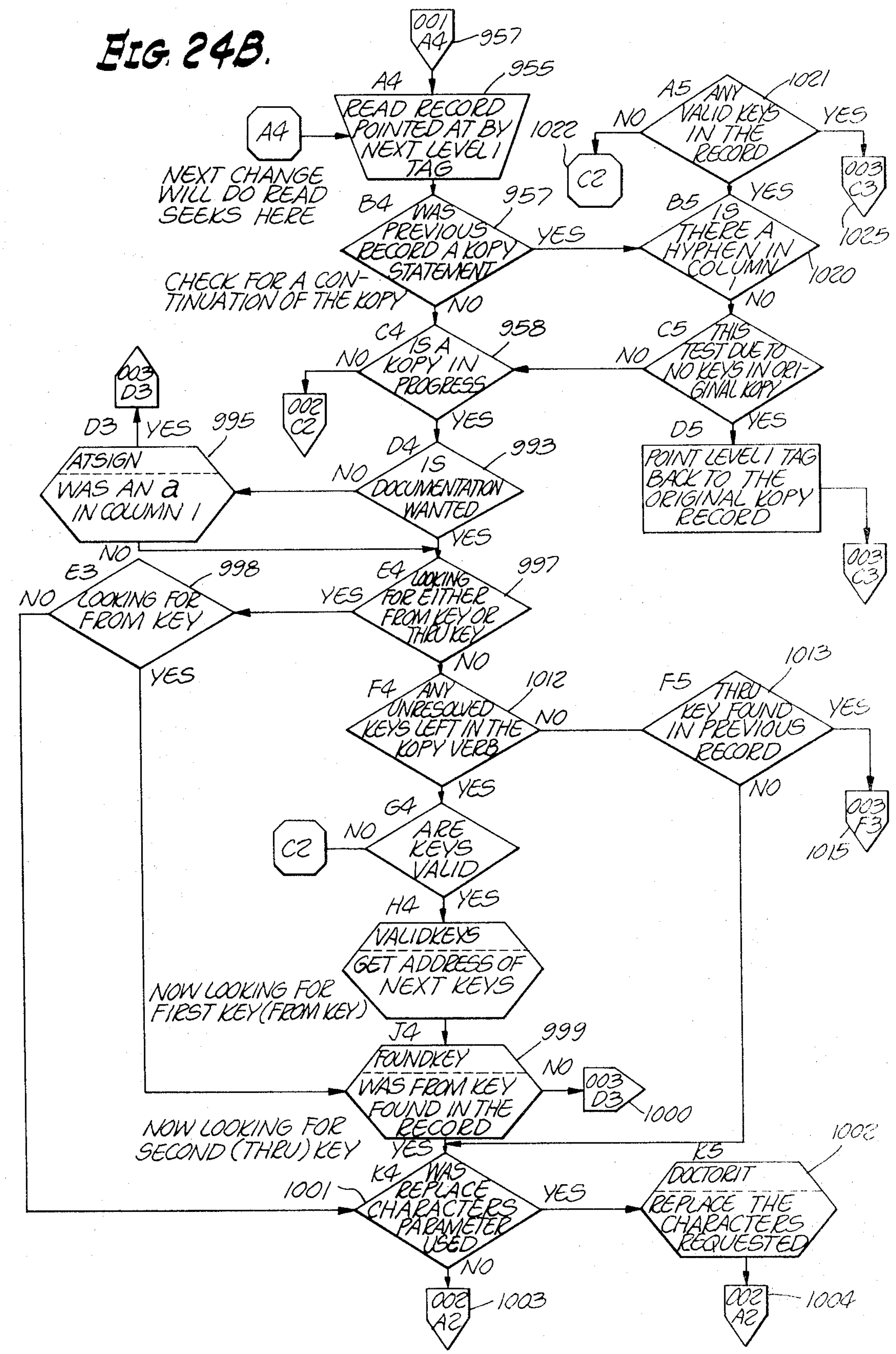
Figure 25A:
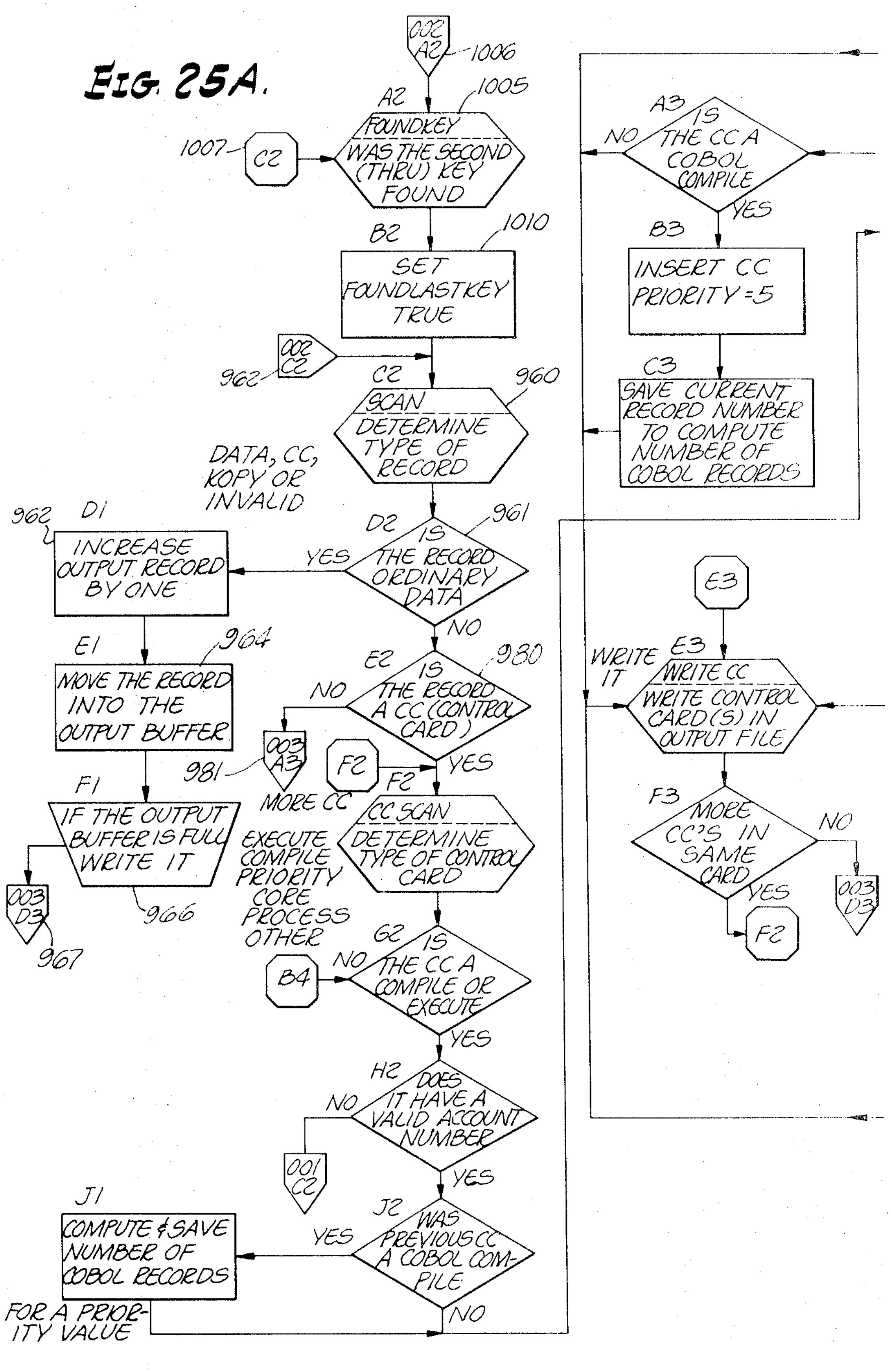
Figure 25B:
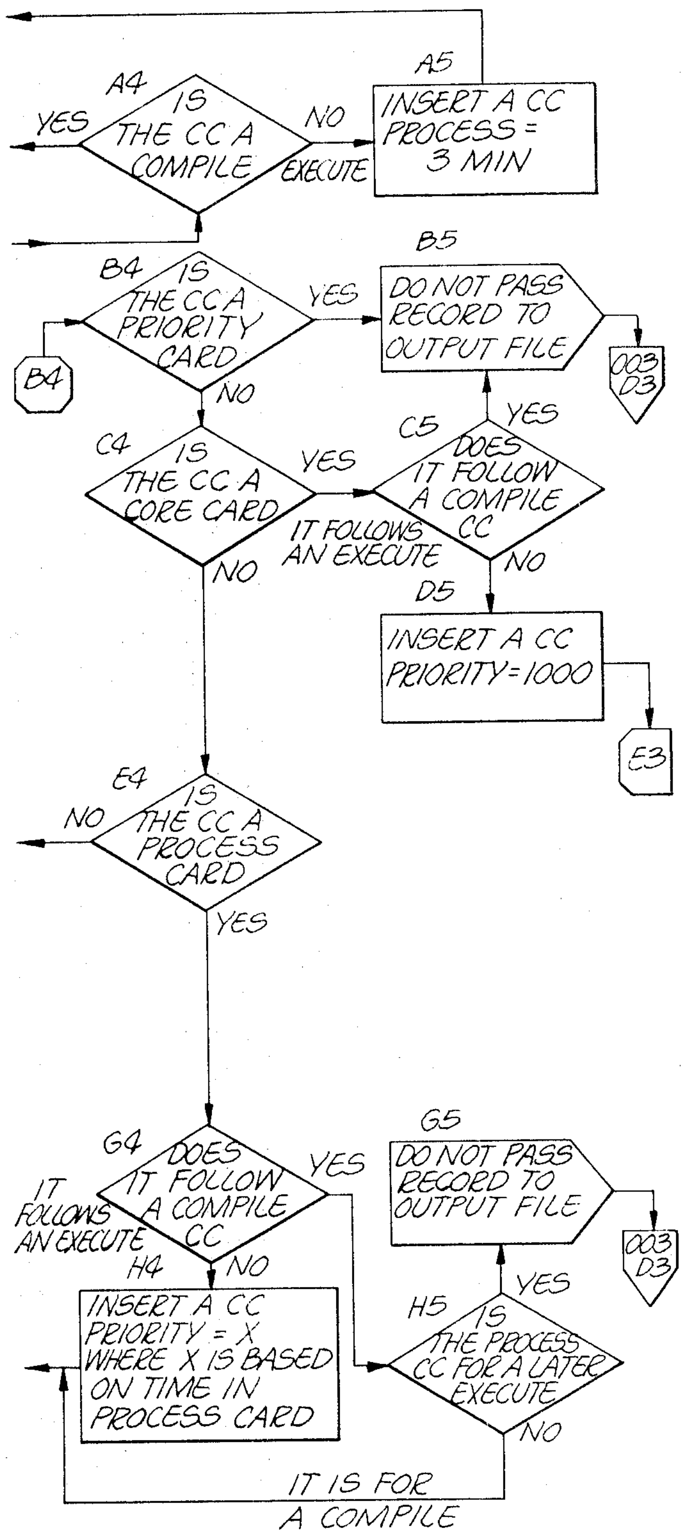
Figure 26:
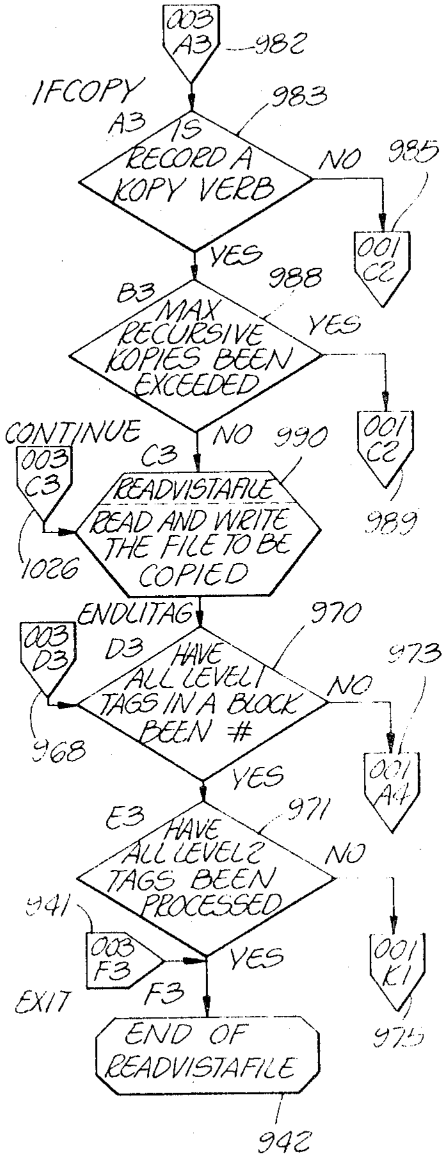

FIG. 21 a is the first portion of the initial segment of the flow chart for the Resequence command module of the MPP;

FIG. 21B is the second portion of the flow chart of FIG. 21A;

FIG. 22 is the final segment of the flow chart for the Resequence command module of the MPP;

FIG. 23 is the flow chart for the outer block of the Schedule program;

FIG. 24A is the first portion of the initial segment of the flow chart for the Readvistafile routine module of the Schedule program;

FIG. 24B is the second portion of the flow chart of FIG. 24A;

FIG. 25A is the first portion of the second segment of the Readvistafile routine module of the Schedule program;

FIG. 25B is the second portion of the flow chart of FIG. 25A;

FIG. 26 is the third and final segment of the flow chart of the Readvistafile routine of the Schedule program;

II. REMOTE TERMINAL EQUIPMENT

As above, the programs disclosed herein provide for RIMS to be used with three types of remote terminals: video, such as a keyboard-controlled cathode-ray tube; teletypewriters such as a Teletype; and, peripheral computers such as the Burroughs TC-500. Operation of the video terminal in connection with this invention will be explained in detail.

Since the operating characteristics of each type of video terminal may differ somewhat, the programs of this invention must be slightly changed to be compatible with the different types. The programs as disclosed herein may be used with a Raytheon DIDS-400 Display Terminal Model 401-2A. Each Raytheon Display Terminal is connected to a Raytheon Model 425 Control Unit. Up to 48 Display Terminals may be connected to a single Model 425 Control Unit. The Model 425 Control Unit interfaces with the telephone network through a Western Electric Model 201–BI dataset.

It has been found that for satisfactory operation with the programs according to this invention, there may be a maximum of 50 feet from the dataset to the Control Unit and a maximum of 600 feet from the Control Unit to each Display Terminal.

Raytheon's Display Terminal is a keyboard-controlled cathode-ray tube. It is capable of displaying 13 lines of information on the screen face. Each line consists of 80 characters, the length of a RIMS data record in data format. (The length of a data record is 72 words in a format, such as ALGOL, which includes a sequence number.) The cathode-ray tube may display a maximum of 1,040 characters. RIMS programs accept a maximum of 80 data characters in a single transmission, not including a sequence number. Therefore, a user may transmit no more than 80 data characters from any type of terminal at one time.

Any information on the tube of the Display Terminal which is in the proper RIMS format may be transmitted back to the central computer. The information may have originated on the Display Terminal or may have been transmitted to the cathode-ray tube from the central computer.

A special cursor symbol, generated by the Display Terminal, is used to mark the position on the tube face where the next character to be entered will be displayed. The symbol blinks alternately with the character being displayed at that position. The cursor automatically advances one position each time a character is entered. Also, the cursor may be moved about the screen without affecting the display data by using six cursor control keys located on the Display Terminal keyboard.

EDIT keys of the Display Terminal coupled with the cursor controls keys provide a capability of composing, editing and updating displayed messages on the face of the cathode-ray tube. Previously entered characters need not be erased in order to enter a new character since each new character keyed-in replaces the character previously existing at that location. Depression of the space bar on the Terminal keyboard erases any character previously occupying the current cursor location.

In using the Display Terminal, two methods are available to erase portions of the text. One method allows the erasure of a portion of all of a single displayed line by positioning the cursor with the cursor control keys at the point on the line after which erasure is desired and then depressing the ERASE LINE key. The second method allows erasure of a portion, or all, of the screen by placing the cursor as before at the point of the screen from which an erasure is desired and then depressing the ERASE MSG key. Single character erasures are accomplished by depressing of the space bar.

To initially operate the Display Terminal, the user presses the SHIFT key and the FRAME RESET key on the keyboard simultaneously to move the cursor to its initial position on the upper left margin of the screen. Then, by pressing the SHIFT key and the ERASE key MSG key simultaneously, the screen is cleared of previously entered data.

After the cursor has returned to the upper left margin of the screen, the desired information may be keyed in, using standard typing procedure. As each character or space is typed, the cursor automatically advances to the next character entry position. If the text is longer than one line, the cursor automatically advances to the left margin of the next line.

At the end of the typed text, an EOM (End-of-Message) symbol must be typed. Thereafter, the text can be transmitted by depressing the XMII or PRINT key. This causes the typed data to be transferred to the storage in the central computer.

Additional information concerning use of the Raytheon video Display Terminal equipment discussed herein may be obtained from the following publications: Raytheon "User Manual For DIDS–400," 0 OMD 71210–0; and, Raytheon "-Manual 425 Control Unit Volume I, Installation and Maintenance Manual," 0 IMC 712500.

Appropriate Burroughs and Teletype Corporation publications explain in detail the operating characteristics of the TC–500 and Teletype as remote terminal equipment. As these publications are readily available, operation details will not be included here.

III. FILE ORGANIZATION

A principal feature of the invention disclosed herein is the organization of the data stored on disc. All files used by RIMS programs which are part of this invention must be arranged in the format described herein. As is customary in data processing systems, RIMS files are located on disc storage. References to length herein refer to the section of a disc track required to contain the number of characters or bits mentioned.

A RIMS indexed file is a series of 667 blocks for recorded data, each block consisting of storage locations for 150 words. The first block of each RIMS file is a Level 2 index block, containing tags, each of which lead to single ones of 75 Level 1 index blocks located throughout the file. Each Level 1 index block is followed by eight data blocks containing 150 words or 15 data records each. A data record is 10 words—80 characters—in length and is the smallest unit of information retrievable by the RIMS programs.

Figure 3:
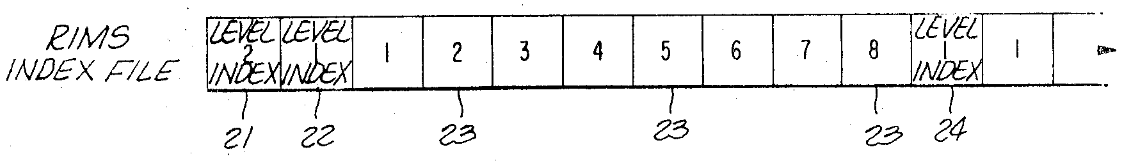
FIG. 3 is a diagram of the format of a RIMS indexed file.

Referring to FIG. 3, an initial portion of a RIMS indexed file is shown. The file is composed of a total of 676 blocks of locations for recorded data, each block 150 words in length. Each rectangle in FIG. 3 represents a block length of 150 words.

Initial block 21 of the RIMS file shown in FIG. 3 is a LEvel 2 index block, the highest level index of the RIMS file. It is followed by Level 1 index block 22. A Level 1 index block occurs every ninth block, following the first block 22, throughout the RIMS file. Each Level 1 index block is followed by eight data blocks 23. Following the last data block of the first group (numbered 8 in FIG. 3), is second Level 1 index block 24. This sequence repeats throughout the RIMS file for a total of 75 Level 1 index blocks followed by a total of 600 data blocks in groups of eight.

Figure 4:
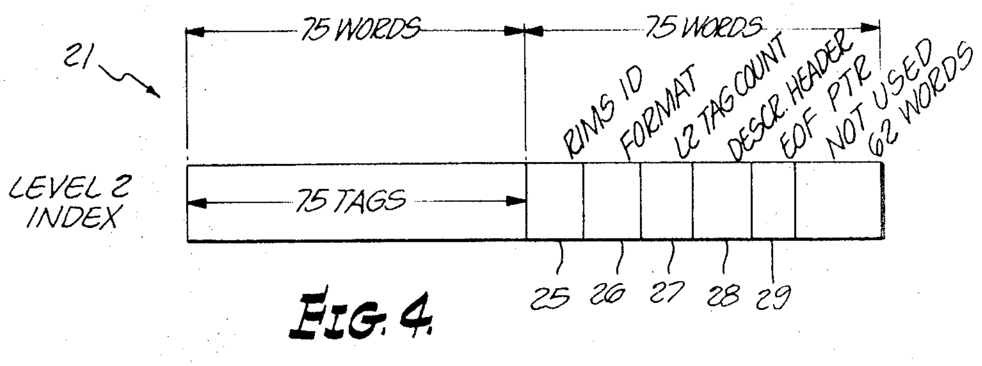
FIG. 4 is a diagram of the format of a Level 2 index block.

Level 2 index block 21 of FIG. 3 is shown in detail in FIG. 4. As with all blocks, the block shown in FIG. 4 is a total of 150 words in length. The first 75 words of the block contain 75 tags, each tag one word or 48 bits in length. There is one tag in the Level 2 index block corresponding to each of the 75 Level 1 index blocks located throughout the file. The format of each tag will be explained in connection with the discussion of FIG. 5.

Following the 75 tags in FIG. 4 is a one-word unit 25 labeled RIMS ID. Word 25 identifies the following file as a RIMS file. It is placed after the Level 2 tags rather than at the first word position so that it does not have to be loaded into core when the Level 2 tags are copied from disc.

Word 26 of FIG. 4 contains bits which indicate whether the data in the RIMS file is in FORTRAN, ALGOL, COBOL, DATA, GP–300 or BASIC format. The only difference in formats is the portion of the sequence number relating to each block of data relative to the data itself. For example, in one format, the sequence number may occupy the first portion of the 80 characters whereas in another its position may be the last portion of the 80 characters.

Word 27 is labeled L2 TAG COUNT in FIG. 4. It contains a count of the Level 2 tags and, therefore, the number of Level 1 index blocks.

Following the L2 TAG COUNT word is a nine-word Descriptive Header portion 28. The Descriptive Header contains a narrative description of what is in the following file. It does not contain the file name which is in the disc directory. The purpose of the file Descriptive Header is to inform a user as to exactly what the file contains. For example, if a RIMS file is given a nondescriptive name, such as A/B, the user may have to check the Descriptive Header to recall what the file contains. The contents of this portion may be checked by use of the view command, which will be explained below.

Word 29 in FIG. 4 is labeled EOF PTR. It is a word which points to the end of the RIMS file (End Of FILE). It is used to indicate the next location for data to be entered. The pointer is updated by the Data module.

Figure 5:
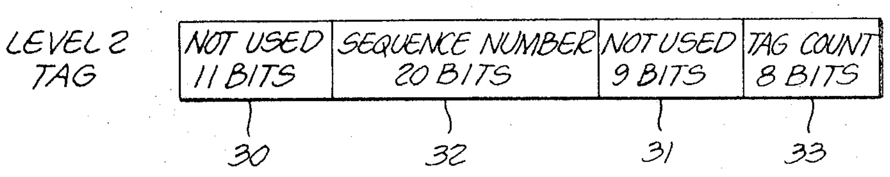
FIG. 5 is a diagram of the format of a Level 2 tag.

FIG. 5 shows the details of a single Level 2 index tag, of which there are up to 75. FIrst and third portions 30, 31, consisting of 11 and nine bit positions respectively, are not used. The number of empty bit positions in the Level 2 index tag is fixed but the location of the empty positions is arbitrary.

Second portion 32 of the Level 2 tag contains a sequence number. The number is the highest sequence number found in the Level 1 index block referred to by the tag. The sequence number portion is 20 bits in length. Therefore, it could represent a maximum sequence number of 1,048,575 (i.e. 2 ); the maximum sequence number which may be utilized in RIMS, however, is 999,999.

Following empty portion 31 in the Level 2 tag is an 8-bit portion 33 which contains the count of the number of tags found in the Level 1 index block referred to by the Level 2 tag. Normally, the count is 120 although, as explained below, the tag count in a Level 1 index block may reach 150.

Figure 6:
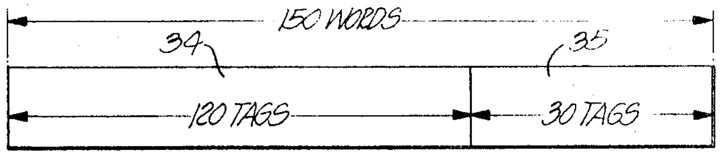
FIG. 6 is a diagram of the format of a Level 1 index block.

FIG. 6 illustrates a Level 1 index block. As explained above, there are up to 75 such blocks in a single RIMS file. The block, 150 words in length, is divided into two portions 34, 35.

Portion 34, 120 words in length, contains up to 120 tags, each referring to one of the up to 120 data records following the Level 1 index block. Portion 35, initially empty, is 30 words in length and contains sufficient space for 30 tags to be inserted. Portion 35 is used for insertion of additional tags after portion 34 is full. Therefore, a single Level 1 index block may contain up to 150 tags.

Figure 7:
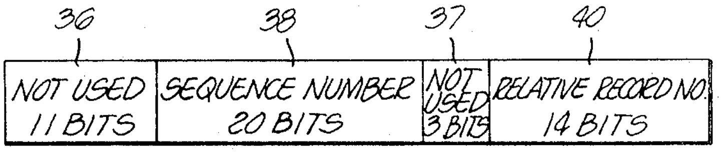
FIG. 7 is a diagram of the format of a Level 1 tag.

Each Level 1 index tag has the format shown in FIG. 7. As in the Level 2 tag format, initial 11-bit portion 36 and 3-bit portion 37 is empty and never used. As in the Level 2 index tag format, the total number of empty bit positions, 14, is fixed, but their location within the tag is arbitrary. The location, of course, does not change from index block to index block.

Second portion 38 of the Level 1 tag contains a sequence number in 20 bit positions. This sequence number is a number associated with a single data record of 10 words located somewhere within the eight data blocks following the Level 1 index block. Last portion 40 of the Level 1 tag contains a Relative Record Number in 14 bit positions. This is the sequential number location of the 10-word data record having the sequence number found in portion 38. The Relative Record Number begins counting the initial 10-word group in the first file block. Therefore, since the RIMS file is 101,400 words long, with a total of 10,140 10-word segments, the highest Relative Record Number of the 75th Level 1 index is 10,139.

Figure 8:
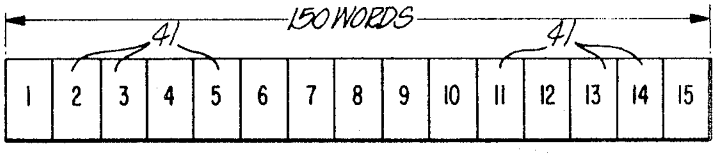
FIG. 8 is a diagram of a data block in a RIMS indexed file.

FIG. 8 illustrates a data block 150 words in length. Each data block contains 15 data records, such as shown at 41. The data record is the basic unit of stored data and is 10 words, or a maximum of 80 characters, in length. This corresponds, for example, to one complete line on a video terminal. However, since inputs in certain formats include a six-character sequence number, less than 80 characters will appear in a data record in those formats. In a data format where no sequence numbers are used, the full 80 characters may contain certain data.

Figure 9:
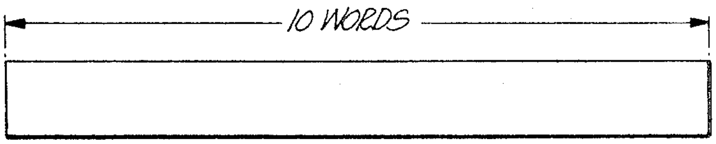
FIG. 9 is a diagram of a data record in a RIMS indexed file.

FIG. 9 illustrates the basic unit of storable data, the data record. As explained above, it is 10 words, or a maximum of 80 characters, in length.

IV. THE RIMS SYSTEM

1. Introduction

As has been explained in detail herein, this invention is a series of six digital programs and a method of arranging recorded data. Three programs, Handler, Main Processing Program and Schedule, may operate together while the three remaining programs, To RIMS, To Sequential, and Cleanup are executed separately.

Figure 1:
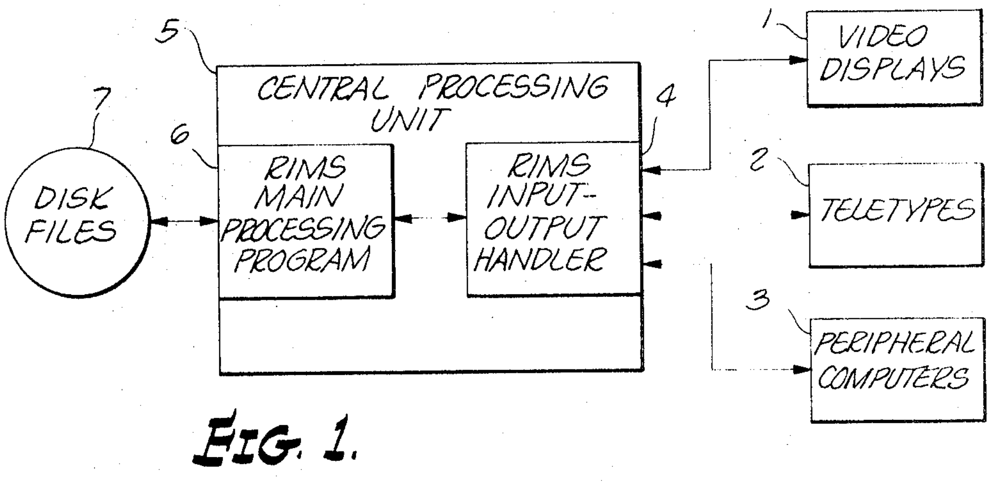
FIG. 1 is a block diagram illustrating the relationship of two of the RIMS program and general system.

Referring to FIG. 1, a broad diagram of the RIMS system is shown. Central processing unit 5 of a general purpose computer is connected to remote terminal devices via telephone lines. Terminals may take the form of video displays 1, Teletypes 2, or peripheral computers 3.

The Handler program, represented at 4 in FIG. 1, serves as an interface between Main Processing Program 6 and remote terminals 1, 2, 3. All information sent to and received from RIMS is controlled by Handler.

If information, either data or commands, is entered at a terminal, Handler passes control to the Main Processing Program if the latter is in a condition to accept it, that is, if it is not engaged in processing other commands.

Initial modules of the Main Processing Program transfer control to the proper command module, as will be explained in detail below. Data fed into RIMS is transferred to peripheral storage, such as disc files 7, by the proper module of the Main Processing Program.

The remaining four programs will be discussed herein in detail in Sections VII through X. This section will describe RIMS work area, file security, operational procedures, RIMS commands and the variable and array usage.

2. RIMS Work Area

RIMS is designed so that a plurality of users may load, read out or update data at virtually the same time. RIMS completes a single entered command for one user before executing the next command of the adjacent user. The time interval, however, is quite short so that each user has virtually instantaneous response to an entered command, even when other users are working with RIMS.

When a user creates a file, tags for the entered data are read into a work area located on disc. Similarly, when a file is updated, the user must enter a command which causes the tags for the proper file to be copied from disc into a work area. All updating is accomplished while tags for the updated file are in the user's work area.

The work file is an area on disc containing one more work area than there are terminals. In the programs set forth herein, provision is made for a maximum of 18 terminals. Therefore, there are 19 work areas in the RIMS work file. The programs could be easily changed to provide for a different maximum number of remote terminals. The additional area is used to copy tags when tags are reorganized by any of the commands.

Figure 2A:
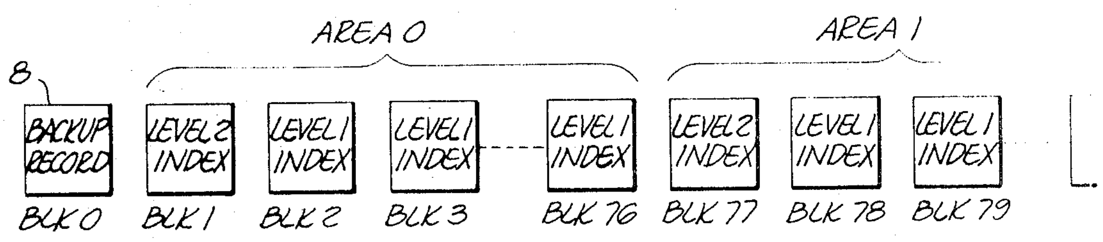
FIG. 2A is a diagram of the backup record and tag arrangement in a RIMS work file.

Referring to FIG. 2A, the format of a RIMS work file is shown. Each rectangular block in FIG. 2A represents an area on disc capable of holding 150 words. Initial block 8 is termed a Backup Record which has a format and function which will be described below. Following the Backup Record are a total of 19 work areas, each having an identical format. Each area has space for 76 blocks, the first for the Level 2 index block and the second and successive for Level 1 index blocks of a single file.

When a user Logs In and wishes to update a file, he is assigned one of the 18 working areas within the RIMS work file. During the time that he is using RIMS, no other user may access the area assigned to him. In subsequent Log-Ins, a user may be assigned a different work area.

Figure 2B:
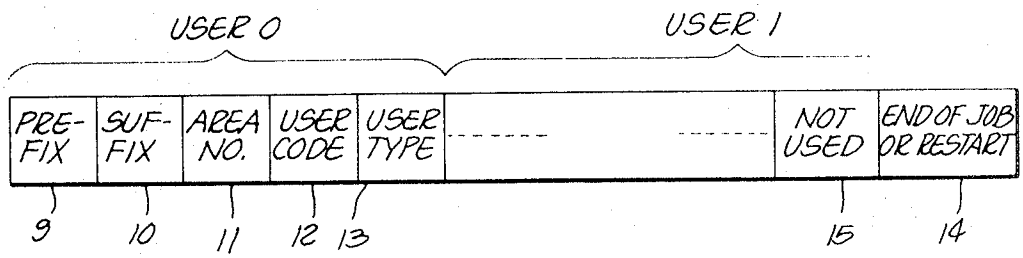
FIG. 2B is a diagram of the format of the backup record in the work file of FIG. 2A.

FIG. 2B illustrates the format of the Backup Record. As the case with the other blocks in FIG. 2A, the Backup Record is 150 words in length. Each user is accorded a five-word section of the Backup Record. Sections 9 and 10 each contain a one-word prefix and suffix relating to the file name being updated, for example, A/B. Section 11 contains a number indicating which of the work areas has been assigned to the user. Section 12 holds the user code of the particular user logged in. The user code will be explained in connection with the RIMS commands. Section 13 contains a word relating to file security.

There is a similar portion of the Backup Record for each of the 18 possible users of RIMS. The last word 14 in the Backup Record is either End Of Job or Restart. The significance of these two words will also be explained in connection with the discussion of the RIMS commands. Section 15 of the 150 word block is an unused area.

3. File Security

At various locations throughout this specification, reference is made to user type. This has to do with the authority which a given user has to access, change or cancel previously created files. For example, a terminal user may wish to load confidential data into a RIMS file which may not be accessed by any person other than himself. For this purpose, a file security concept is incorporated in RIMS which will be briefly discussed herein, Detailed information will not be set out inasmuch as the file security system is determined by the design of the Burroughs B-5500 rather than the RIMS programs.

For every disc file on the B-5500, there is an associated "-File Header" record in the B-5500 directory. Two of the entries in each File Header record are a security level entry and a user code entry. Because of these entries, each file on B-5500 disc always has a security level and a user code associated with it. The security level of a file can be changed by means of a parameter in a RIMS Save command or by a File Security control card which is executed against the file.

The user code and the File Header of each file is, with one exception, the user code of the person that created the file and cannot be changed. The exception is a free file which has a user code of all zeros and may be freely accessed by any person.

Whenever a person uses RIMS from a remote terminal, he must complete a Log-In command before he is allowed to continue. Following a successful Log In the Master Control Program always compares the user code he logged in with against the security level and user code in the File Header of each file that he attempts to access. If the comparison is not satisfactory, the Master Control Program will not allow a file to be accessed by that user.

A file with the highest level of security is known as a "sole user" file. With one exception, only the creator of a sole user file can access the file for any use whatever. Only the creator of a sole user file can perform maintenance on the file, such as change in a security level, removing the file from the disc, changing the name of the file, and so forth. The exception mentioned above is in the case of a "privileged user" which is discussed below.

If the creator of a sole user file wishes to allow certain other persons and/or programs to access his file, he must change his file form a sole user file to a "private" file. A private file is any file that has a second file associated with it containing a list of user codes and program names that are allowed to access the private file. The file containing the list of allowed users and programs is called a "security" file. Thus, whenever a user or a program attempts to access a private file, the Master Control Program searches the associated security file. Only if the user code or the program name is contained in the list will the Master Control Program allow the private file to be accessed.

The file security system includes three other types of files, "information"files, "public" files, and "free" files. An information file is a file which may be read by all users. However, only the creator of the file may write in it. Also, he is the only one who may perform maintenance on it. A public file is one which can be read or written in by all users. Again, only the creator may do maintenance on it. A free file is a file open to all users for everything except security maintenance.

The only person who can change the security level of a free file is the privileged user. The privileged user is normally the operator at the computer console. However, logging in from a remote terminal with the privileged user code also causes the terminal user to be recognized as the privileged user. The privileged user has access to all files in the system.

The creator of a sole user file (or his subsequent private file, security file, public file, or information file) is called the "primary user" of the file. Users listed in a security file or users of public and information files are called either "secondary users" or "tertiary users." A secondary user may access a file for either input or output. A tertiary user may access a file for input only. Except for the privileged user, only the primary user (creator) may establish and maintain a security file for his private file.

4. RIMS Operational Procedures

To utilize RIMS from a remote terminal, a user must enter the Log-In command. The Log-In command must be successfully completed before the user can continue. Details concerning the Log-In command will be set forth in the appropriate section concerning commands. Upon receipt of a valid Log-In command, RIMS will reply with either "*RIMS READY" or "*RIMS RESTARTED." The "*RIMS READY" message means RIMS is ready to accept a command from the user and there is no reference to any file belonging to the user in the RIMS work area. The "*RIMS RESTARTED" message also means that RIMS is ready to accept a command from the user, but RIMS already contains references to a file belonging to a user in its work area. The "*RIMS RESTARTED" message only appears when a previous use of RIMS was terminated for some reasons such as, for example a system failure in which the user was Logged In at the time of the termination. The "*RIMS RESTARTED" message, therefore, is used to denote that the user's previous updating has not been lost. When this message appears, the user should check the last change he made to note if it was affected by a possible failure.

Upon completion of a successful Log-In, the user may enter either a Load command to update an existing file or a Create command to create a new file or a List command or any of the directory commands as they do not require a file to be previously loaded or created.

A Load command causes RIMS to attach the user's file to the RIMS work area which allows the file to be updated. However, all the updates which the user makes to a file while it is being loaded are temporary. The update becomes permanent only upon the successful completion of a Save command.

RIMS allows each user to have only one file loaded at a time. Once a file has been successfully loaded, it remains loaded until one of the following commands is entered by the user:

a. A Save command which causes temporary changes to be made permanent and all references to the file to be removed from the RIMS work area;

b. Another Load command which loads another file and deletes all temporary changes to the previous files;

c. Create commands creates a new file and deletes all the temporary changes to the previous file;

d. A Log Out command or a Cancel command which deletes all temporary updates to a file; and e. A Log-In command which forces the above Log Out command.

The Create command causes RIMS to attach disc space for a new file to the RIMS work area. Once the Create command has successfully been completed, the updating of the new file proceeds exactly as in the above discussion for the Load command. The new file is temporary while it is being created and becomes a permanent file only upon a successful completion of a Save command.

The directory commands are a group of commands which reference or cause a change in a disc directory. The directory commands consist of the Print Directory, Change and Remove commands. This group of commands may be entered at any time following a Log-In command.

When records are permanently deleted following an update of a file, the records are marked as being deleted but physically remain in the file. As a result, a file which is updated frequently will occupy some extra disc space. This condition generally is of little concern, with one exception. The maximum disc space allocated for a RIMS indexed file is 9,000 records, including deleted records. Therefore, it may happen that RIMS will display the message "FILE FULL" on the terminal, indicating that the file has reached the maximum of 9,000 records. At this time, the user should execute the Cleanup program which will remove all deleted records. Cleanup should not be executed prior to this message because the deleted records do not cause inefficiencies in RIMS and, also, unnecessary executions of the Cleanup program use valuable machine time.

The last action a user should perform before leaving a terminal is to enter a Log Out command.

5. RIMS Commands

As stated elsewhere herein, RIMS is a method of arranging data and programming a computer to allow a user to communicate with the computer through a remote terminal, either hard copy or video. RIMS allows a user to have access to the data processing and storage capabilities of a large computer without investing the sums necessary to rent or buy such a system.

Through his remote terminal, a user may insert, remove, change or resequence information as though he had access to the central computer console. These functions are accomplished by entry by the user of one or more of 24 commands at the remote terminal. Also, numerical or alphabetical data may be entered via terminal keyboards and extracted via terminal printers or cathode-ray tube screens.

Each command will be discussed in terms of its function. An example of input and output, where significant, will be given. The actual commands are included in the discussion within quote marks. The quote marks should not be taken to comprise part of the RIMS command.

a. Log In

Log In is the first entry that may be made from a terminal. No other entries will be accepted by RIMS until a successful Log In has been completed. The basic purpose of the Log In is to validate the terminal user as an authentic user of RIMS.

The format of a Log-In command is "*LI: user/authentication." An example of the keyboard entry is: "*LI:JOHN/1234 X."

As in all commands, the asterisk denotes a command as opposed to data. LI is the code abbreviation of the Log-In command. The colon and slash mark signs are ALGOL delimiters which inform RIMS of the unit boundaries of the entry. The name, JOHN, and the number, 1234, are codes identifying the user as a proper user of the system. The user and authentication codes are permanent records within RIMS located in memory. They have been previously cleared by persons having control of file security. Finally, the X at the end of the command is an indication to RIMS that no more data is to be found on that line. No data may be sent from a cathode-ray tube terminal or a hard copy device without the data being ended by the special marker. The form taken by the marker varies from terminal to terminal. On a teletype, for example, the end of line marker is a left-hand arrow.

If the user codes are found acceptable by RIMS, the system replies in one of three ways. If the user had not been previously using the system during a machine turnoff, and no restart is therefore necessary, the system replies via the terminal output "*RIMS READY." If an error file was found to exist by the Log-In logical procedure, the message "AND FILE OF ERRORS EXIST" is added.

Had the machine been shut down during a prior update, and the present Log In is found acceptable by the RIMS Log-In procedure, the message sent to the terminal is "*RIMS RESTARTED."

b. Log Out

Log Out indicates to RIMS that the terminal user is finished. Log Out must be the last command entered by a user before leaving a terminal. The format and an example of the command is "*LO." No reply is made to the terminal by RIMS.

Log Out serves to close the user's work file, update the proper files and update the backup record.

c. Cancel

Cancel causes RIMS to revoke an update currently taking place in the RIMS work area. As explained in connection with the description of the work file, the tags for a file are copied into a work area in order to update the file. No update is made permanent unless the Save command is given. Cancel serves to cancel the changes which were previously made in the work area.

An example of its use is found in a user loading file A/B into a work area and beginning an update. During the updating, the need to make immediate changes in another file, C/D, arises. By entry of the Cancel command, the A/B updates are removed from the work area and revoked. The second file, C/D, may then be loaded and updated.

As a prerequisite to the Cancel command, a file must have been previously loaded or created or a List command entered immediately previously.

The format and an example of the Cancel command is "*CN." When the command is successfully executed, RIMS replies by sending an asterisk to the terminal.

d. Change

Change causes the name of an existing file to be changed to a new name. The name change is made in the disc directory. As stated in the discussion of the file organization, the file name does not appear in the file itself.

As currently used, the RIMS computer operator is supplied with a list of valid file names. Any file without a valid name is dumped at the end of each day's operation. The purpose of this is so that a terminal user will not store, and then forget, experimental files. Any file under an experimental name which a user wishes to save permanently on disc may be changed to a valid name.

The format of the Cancel command is "*CH (or CHANGE) old prefix/old suffix TO new prefix/new suffix," where the "old" refers to the name of an existing file and "new" to the name the file will have after the change. An example of a change command is "*CH A/B to RIMS/MPP." After the command is successfully executed, RIMS replies with an asterisk at the terminal.

e. Create

Create is used to begin a new file. It causes allocation of a work area in the RIMS work file, indicates the name the file is to have, and indicates the format of the file (for example, COBOL). The file is created one record at a time. The user, therefore, may transmit no more than 80 characters at a time. Also, the Create command removes any previous file in the RIMS work area.

The format of a Create command is "*C (or CREATE) prefix/ suffix [format]. " The prefix/suffix is the name by which the file will be cataloged in the disc directory when the update is complete. "Format" specifies the position of the sequence number, if any, and data in the file. Formats of COBOL, ALGOL, FORTRAN or DATA may be entered.

As prerequisites to the command, the file name (prefix/suffix) must not already exist and must be in a valid format.

An example of a Create command is "*C SUPPORT/DA123 CO" RIMS replies with an asterisk or an asterisk and sequence number if sequence is in effect.

f. Data

Execution of the Data command causes one record to be inserted into the file, or, if a record already exists, the command causes it to be replaced. This is a command which may be used to enter general data into a file.

The format of the Data command is "* sequence number data." The sequence number will permanently relate to the data inserted. A single blank must follow the sequence number as a delimeter. An example of a Data command is "*2000 Now is the time for all good men."

Prerequisites of the command is that the file into which entry is being made must have been previously loaded or created. The sequence number must be no more than six digits and the size of the file being entered may never exceed 9000 records.

Following the command, RIMS replies with either an asterisk or an asterisk and the next sequence number if sequence is in effect.

g. Delete

Delete effectively removes a record or group of consecutive records in a file. Execution of the command causes the tags referencing the data to be deleted but leaves the data. Deleted data remains in the RIMS file until Clean-Up program is executed.

The format of the command is "*D (or DELETE) from sequence number through sequence number." "From" is the sequence number of the first or only record to be deleted. "Through" is the sequence number of the last record to be deleted. If no "through sequence number" is given, all tags in the file having sequence numbers following the first are deleted.

Prerequisites to the command are that the file must have previously been loaded or created. The "from" sequence number must be less than the "through" sequence number. Both numbers, if two are used, must exist in the file.

An example of the command is "*D 2200 2900. " All tags referencing records having sequence numbers equal to and greater than 2200 and equal to and less than 2900 would be deleted. Following successful execution of the command, RIMS replies with an asterisk.

h. Duplicate

Duplicate causes copies of a group of records already in the file to be inserted elsewhere in the file at a specific location. The original group of records remain unchanged in the file.

The format of the Duplicate command is "*DUP toseq incr: fromseq thruseq." "Toseq" indicates the beginning sequence number of the new, duplicated, set of records. "Incr" is the increment which will be added to each new sequence number to obtain the following sequence number. If no increment is given in the command, RIMS provides an automatic sequence number increment of 10. Following the colon delimiter, "-fromseq" is the sequence number of the first record in the group of records to be duplicated. "Thruseq" is the sequence number of the last of the records to be duplicated. If the number is omitted from the command, only one record will be duplicated.

Prerequisites are that the file must have previously been loaded or created. The "toseq" number must not already be in use in the file and the increment must be sufficiently small so that unused sequence numbers are available which are less than the next sequence number already being used at the inserted location. Finally, the sequence numbers "fromseq" and "thruseq" must exist in the file with the former being smaller than the latter.

An example of the Duplicate command is "*DUP 200 10: 1000 3800." Execution will copy the records having sequence numbers from 1000 to 3800 and give them sequence numbers beginning with 200 and having increments of 10. Both sets of records remain in the file. RIMS indicates a successful execution of the command by sending an asterisk to the terminal.

i. Edit

Edit is used to change portions of an existing data record without having to retype the entire record. It is used primarily on hard copy terminals since line portion on a video terminal may be changed readily by using cursor controls. An example of the use is found in a teletype operator typing the following input while sequence is in effect: "Now is the time for all good man." To change "man" to "men," the Edit command could be used.

The format for the Edit command is "*E (EDIT) seqno chr old-string chr [new-string] com." "Seqno" is the sequence number of the record to be edited. "Chr" is the first nonblank character following seqno. It is an ALGOL delimiter which designates the beginning of the old string. RIMS scans the old string looking for the same delimiter character to occur again. The second occurrence of the delimiter character designates the end of the old string and the beginning of the new. "Old-string" is a group of characters between the delimiters which is to be replaced by the new string. The old string must contain at least one character which may be a blank. The new string is the group of characters between the second delimiter and "eom" which will replace the old string. The new string may be of a different length than the old. If the new string portion is ommitted, the character in the old string will simply be deleted. "Eom" is a group mark or end-of-message symbol that designates the end of the new string. Any blanks preceding the end-of-message symbol are part of the new string.

Prerequisites to use of the Edit command are that the file must have been previously loaded or created, the sequence number must already exist and the old string must exist in the record.

An example of the Edit command is "*E 1200 / Old*String*Here/New StringX," where X is the end-of-message symbol. Following successful execution of the command, RIMS replies to the terminal with an asterisk.

j. File Name

Entry of the File Name command causes the terminal to display the name of the file that was used in the last successful Create, Load or List command. It is used in case a terminal user forgets the name of the file he is working with.

The format and an example of the command is "*FN." Following a successful File Name command, RIMS replies with the file name.

k. Format

Entry of the Format command either displays or changes the format of the currently Loaded RIMS file If the optional portion of the command is not used, RIMS responds to the command by displaying the current format. If the optional portion is used, RIMS changes the format to whatever format is designated in the optional portion of the command.

Execution of the command changes only the format word (FIG. 4) in the level 2 index block. No changes in the data are made.

Formats involved are COBOL (command code CO), ALGOL (AL), FORTRAN (FO), DATA (DA) and GP 300 (GP). Prerequisites for the Format command are that the files must have previously been Loaded or Created.

Format for the command is "*FM (FORMAT) [format]." If the format is stated, a change is accomplished and RIMS replies with an asterisk. If only "*FM" is entered, RIMS replies with the format of the user's file.

l. Header

Entry of the Header inserts up to 72 characters in the level 2 index block which are descriptive of the data in the file following the level 2 index. It replaces whatever information was in the header previously.

Format of the command is "*H (HEADER) description." An example of the command is "*H THIS FILE CONTAINS PAYROLL NAMES."

Information in the Header may be viewed by use of the View command.

m. List

Entry of a List command causes records from a file that is not a RIMS Indexed file to be sent to a terminal for display. If the terminal is a cathode-ray tube, the first 10 words of each record are displayed on the first line and the remainder of the record on the following line or lines. If the terminal is a Burroughs TC500, the program currently running in the TC500 determines the format with which the record is printed.

The format of a List command is "*LS (LIST) prefix/suffix (F,B SKIPNO) (printno)." "Prefix/suffix" is the name of the file to be listed. This identification is not required if a previous List of the file has been completed. If a previous List has been completed, the reference point for the following "skipno" for the present List command is the first record which was previously listed. If the file name is used, the reference point for the "skipno" parameter is the first record of the file. "F" and "B" (represented by a plus sign and a minus sign in the command) causes RIMS to skip forward or backward a number of records specified in the "skipno." The "skipno" is the number of records RIMS is to skip to determine the starting point of a group of records to be printed. The reference point from which records are skipped is the last record printed or the beginning of the file if the prefix/suffix information is used. "-Printno" is the number of records printed. If this information is omitted, RIMS displays 13 lines on a cathode-ray tube or the entire file on the TC500.

Prerequisites for the use of the List command are that the file prefix/suffix must exist; the user must be a valid user of the file; the record length must not be more than 1280 characters; and the user must not have a file loaded or being created in the RIMS work area.

An example of a list command is "*LS PLNTSYS/IJ237TS 75 8." This command indicates that the file having the name PLNTSYS/IJ237TS is to have the eight records past the 75th record from the beginning displayed on the terminal. Upon completion of the command, RIMS replies to the terminal by listing the requested records.

n. Load

Entry of the Load command causes all sequence numbers to be read from the file named and copied into a RIMS work area. The work area then contains only the tags to the file and not a copy of the file itself. A Load command must have been successfully executed before any file updates can take place.

The format of a Load command is "*L(LOAD) prefix/suffix." "Prefix/suffix" is the name of the file to be loaded from disc into the work area. Prerequisites of the command are that the file must exist, the user must be a valid user, the file must not be in use by the user and the file must be in a RIMS indexed format.

An example of a Load command is "*L OPRSCH/1234." Following completion of a successful Load command, RIMS replies to the terminal with an asterisk.

o. Move

Entry of a Move command causes movement of one or more records from their original location in the RIMS file to another designated location in the same file. The records are moved into the locations specified by the "toseq" number from the location specified by the "fromseq" number. All the records between the "fromseq" number and the "thruseq" number are moved.

Format of the Move command is "*M (MOVE) toseq (inc) : fromseq (thruseq)." "Toseq" is the starting sequence number given to the first of the group of records in their new location. "Inc" is the value of the increment which will be added to the starting sequence number to determine each successive sequence number for the records in their new location. If this information is omitted, RIMS automatically supplies an increment value of 10. Following the colon, a required ALGOL delimiter, "fromseq" is the sequence number of the first record in a group of records that are to be moved. "Thruseq" is the sequence number of the last record in the group of records to be moved to the new location. If the "thruseq" information is omitted, only one record, that located by the "fromseq" sequence number, will be moved.

Prerequisites for entry of the Move command are that the file must have been previously loaded or created, the "toseq" number must not already be in use in the file, the increment must be sufficiently small that unused consecutive numbers are available at the new location and the "fromseq" and "thruseq" numbers must exist in the file with the latter being larger than the former.

An example of the Move command is "*M 3050 1: 300 500." This command would cause the records located by sequence numbers 300—500 to be moved to a location indicated by sequence number 3050 with subsequent records having sequence number incremented by one from 3050. Upon execution of the successful Move command, RIMS replies to the terminal with an asterisk.

The Move command is different than Duplicate in that the moved records are canceled in their original position. In duplicate, they exist in their original position as well as at their new position.

p. Print Directory

Entry of the Print Directory command causes information obtained from the disc directory entry for a file to be displayed. The information is made available from the Burroughs equipment used. The following information is displayed:

TU
: Type of User as explained in the File Security section herein.

RL
: Record length used to describe the file in the last program that accessed the file.

BL
: Block length used to describe the file in the last program that accessed the file.

EOF
: End of file pointer which points to the last record written on the file.

ITK
: Indicates that the file is presently interlocked for library maintenance if ITK equals Y. ITK equal to N indicates that the file is not interlocked.

LAC
: Date of last access. The date is given in the Julian manner.

OS
: Open count. A count of the number of programs presently accessing the file.

The format of the Print Directory command is "*PD prefix/suffix." The prefix/suffix is the name of the file. Prerequisites to entry of the command are that the user must be a valid user of the file and the prefix/suffix must name an existing file.

Upon successfully completing a Print Directory command, RIMS causes the information listed above to be displayed at the terminal.

q. Remove

Entry of a Remove command causes the file to be moved from the disc directory. This effectively serves to cancel the file as the disc directory then lists the space occupied by the file on disc as available for other use.

Format of the Remove command is "*RM (REMOVE) prefix/suffix." The prefix/suffix is the name of the file to be removed from the disc directory.

Prerequisites of the Remove command are that the file prefix/suffix must exist and no user may be accessing it and the user must be the primary user of the file to be removed.

Upon successfully completing the Remove command, RIMS replies to the terminal with an asterisk.

r. Resequence

Entry of the Resequence command causes data previously entered in a file to be assigned new sequence numbers. Either all or just a portion of a file may be Resequenced. The object of the command is to assign new numbers so that insertions may be made.

Format of the command is "*RS (RESEQ) base inc : fromseq thruseq." "Base" is the new sequence number to be assigned to the first record of the file after the file has been resequenced. If the base is not stated in the command, RIMS assumes a base of 100. "Inc" is the increment to be added to each new sequence number to obtain the next successive number. If the increment is not stated in the command, RIMS assumes an increment of 100. Following the colon, an ALGOL delimiter, "fromseq," is the sequence number of the first record to be resequenced. If "fromseq" is omitted from the command, the entire file will be resequenced. Finally, "thruseq" specifies the last record to be resequenced. If "thruseq" is omitted, the file will be resequenced to the end.

Prerequisites of the Resequence command are: the file must have been previously loaded or created; the base and increment may not exceed 999,999; and, the values of the base and increment must not cause the sequence number of any record to exceed 999,999.

An example of a Resequence command is "*RS 1000 100 : 1500 50000." Execution of this command would assign the data records having sequence numbers 1500 through 50,000 new sequence numbers starting with 1000 and incrementing by 100.

Upon completion of a successful Resequence command RIMS replies to the terminal with an asterisk.

s. Save

Entry of a Save command makes previous entries permanent. For example, if the text of the Gettysburg Address is entered at a terminal via a Create command, the data is recorded on disc and the corresponding tags in the assigned work area in the RIMS work file. The Save command sends the tags from the work area to the disc.

Also, the Save command designates the completion of updating a file and causes all references to the file to be removed from the work area. Finally, the Save command may be used to change the security level of a file.

Format of a Save command is "*SA (SAVE) (Sec)." "Sec" is the security level and may be either SOLE, INFO, PUBLIC or FREE. If the "sec" information is not given, the security level of a previously existing file is unchanged and the security level of a created file is made Public. Significance of the various classes may be found herein in Section IV–3, File Security.

Prerequisites of the Save command are: the file must previously have been loaded or created; only the creator of a file may change the security level; the security level of a free file may not be changed.

Upon successful completion of a Save command, RIMS replies to the terminal with an asterisk.

t. Schedule

Entry of the Schedule command causes the Schedule program to be run to execute the file named in the command. For a discussion concerning the Schedule program, see Section VII, herein, Schedule Program. This command is the only way executions can be initiated from a remote terminal in RIMS.

Format for the command is "*SC (SCHEDULE) prefix/suffix." "Prefix/suffix" is the name of the file to be scheduled.

Prerequisites of the command are: user must be a valid user of the file named; the named file must exist with no other user accessing it; and, the file must begin with a control card and end with a "CC END" card. The control cards are special cards used to communicate with the Master Control Program.

Upon completion of a successful Schedule command, RIMS replies to the terminal with an asterisk.

u. Sequence

Entry of the Sequence command causes RIMS to display a sequence number which previously did not exist in the file at the left end of a new line. The user may then complete the line and enter it in the same manner as the Data command. RIMS receives the line and inserts it as a record into the user's file. RIMS is aware that a Sequence command is in progress so it then computes the next sequence number by adding the increment to the previous sequence number. RIMS then searches for the new sequence number. If it determines that the new sequence number does not exist in the user's file and also that there were no intermediate sequence numbers between the previous sequence number and the new sequence number, RIMS will then repeat the cycle of inserting the record and displaying a new sequence number. The Sequence command is terminated when a different command is received by RIMS or when the Sequence command finds an existing sequence number (which may be intermediate). In the latter case, the command displays the sequence number and the record associated with it. The format of the displayed record is the same as the Data command; therefore, the user may choose to change and reenter the record, or just view it and then enter a different command. Therefore, the Sequence command provides a way to view an existing record before changing it.

Format of the Sequence command is "*S (SEQUENCE) segno inc." "Segno" is the first sequence number which RIMS is to provide for the insertion of records. "Inc" is the increment to be added to each sequence number to obtain the subsequent number. If no increment is stated in the command, RIMS assumes an increment of 10.

Prerequisites to the Sequence command are that the file must have previously been loaded or created.

v. To RIMS

Entry of the To RIMS command causes the program To RIMS to be scheduled for execution. For details concerning the To RIMS program, see Section VIII, herein. The purpose of the To RIMS program is to convert a sequential data file to a RIMS Indexed data file. If the To RIMS program finds an error in the file (a requirement below which is not satisfied), the conversion is terminated and an error message written in the error disc file.

Format of the command is "*TORIMS seqprfx/seqsufx TO rimsprfx/rimssufx format RESEQ." "Seqprfx/seqsufx" is the name of the file that is to be converted to a RIMS file. "Rimsprfx/rimssufx" is the name of the RIMS file to be created. "Format" specifies the format of the records in the created file. Either COBOL (CO in the command), ALGOL (AL) FORTRAN (FO), DATA (DA) or GP300 (GP) may be entered. "Reseq" causes the new file to be resequenced starting with 100 and incrementing by 100.

Prerequisites are: the old file names must exist and not be in use by any user; for formats other than DATA, the old sequence numbers must range ascendingly between zero and 999,999; the old file must have a record length of 10 words and not be more than 9000 records in length; the user must be a valid user of the old file; the new file name must not already exist.

Successful completion of the To RIMS command causes RIMS to reply to the terminal with an asterisk.

w. To Sequential

Entry of the To Sequential command causes the program To Sequential to be scheduled for execution. For details concerning the To Sequential program, see Section IX, herein, entitled To Sequential Program. The purpose of the To Sequential program is to convert a RIMS-indexed file to a sequential file. If the program To Sequential finds an error in the file, conversion in terminated and an error message written in the error disc file.

Format of the To Sequential command is "*TOSEQ rimsprfx/rimssufx TO seqprfx/seqsufx." Requirements for this command may be understood by reviewing the prior section entitled To RIMS.

Upon successfully completing this command, RIMS replies to the terminal with an asterisk.

x. View

Entry of a View command causes a variable number of records from a RIMS Indexed file to be displayed on a terminal. View exhibits portions of a RIMS file as a List command exhibits portions of a non-RIMS file. View may also be used to look at the header record of a RIMS Indexed file. If the file being viewed has a data format, the sequence number and the data record are displayed on separate lines. For other formats, the sequence number and the record are displayed on the same line.

Format for the View command is "*V (VIEW) seqno F,B skip NO : lines." "Seqno" is the sequence number of the first of a group of records which RIMS is to display on a terminal. If the sequence number given does not exist, the record with the next lower sequence number will be displayed. "F" and "B" causes RIMS to skip forward from a previously established starting sequence number to a new starting sequence number for a group of records to be displayed. If both "F" and "B" are omitted, RIMS will skip forward. "Skip" is the number of record which RIMS is to skip, either forward or backwards, to determine the starting sequence number of the next group of records which RIMS will display. If "skip" is omitted, RIMS will skip the number of records corresponding to one fill screen for cathode-ray tube terminals, 13 in the case of the Raytheon unit described herein, or six records for hard copy devices. "No" indicates that documentation records are not to be displayed. These are COBOL format records having an "0" character in the first nonsequence number column. "Lines" is the number of lines to be displayed on a terminal. The maximum number of lines that will be displayed on a cathode-ray tube terminal is one full screen.

The prerequisite to the command is that the file must previously have been loaded or created.

6. Variable and Array Usage

Throughout the programs listed herein and the flow charts in the drawings, reference is made to various variables and arrays. Following, in tabular form, is a listing of the variables and arrays and a discussion of their significance.

Variables

ACCEPT

There is one bit per user in the word. "On" indicates to the RIMS Handler program that the Main Processing Program will accept input for that user from his terminal.

BREAKEY

There is one bit per user in the word. "On" indicates to the MPP that the break key at the user's terminal has been depressed. It is set by the Handler program.

CLASS

Contains the class of the dictionary item found by WEBSTER.

CREATESW

There is one bit per user in the word. "On" indicates that the user is creating the "present" file.

FIRSTVIEW

There is one bit per user in the word. "On" indicates that since LOADing or giving the CREATE command, the user has not yet entered a VIEW command.

FOUND

"On" indicates that the requested tag was found by TAGSEARCH.

JUNK

Used for temporary integer storage and intergerizing other variables.

KEY

Contains the key of the dictionary item found by WEBSTER.

LASTAGBLK

Contains the last tag block number accessed by tag read for the last user requesting a level 1 tag block.

LASTXUSER

Contains the user number of the last user to access a level 1 tag block.

LASTOUSER

Contains the user number of the last user to access a level 2 tag block.

LENGTH

Contains the length of the word found by SCAN or EDITSCAN.

LISTING

There is one bit per user in the word. "On" indicates that the user's UFILE is being used for listing.

LOGREC

Contains the logical record number of the most recently searched for tag.

L1CHANGED

"On" signifies that the level 1 tag block in the array L1TAG has been changed and should be written back to disc.

L2CHANGED

"On" indicates that the level 2 tag block in the array L2TAG has been changed and should be written back to disc.

NUMR

Signifies that SCAN found a word containing all numeric digits.

OPREADY

There is one bit per user in the word. "On" signifies to the RIMS Handler that output is ready in array LINE.

PREFIX

Contains the prefix of the scanned file name or the user code in the case of LOGIN.

PRESENT

There is one bit per user in the word. "On" indicates that a file has been CREATED or LOADED and not SAVED.

PRT25

Contains the absolute address of Program Reference Table location 25 (octal) of the RIMS Handler, passed to this program in a common statement by the Handler.

QUOTES

Contains the number of quotes found during SCAN.

REEL

Temporary storage for noninteger variables.

RESTART

There is one bit per user. "On" indicates that the last time RIMS/MPP was terminated, there was a user logged in for this terminal and he had a file present. Turned off by LOGIN.

RUNNING

One bit (for user O) indicates that the system Handler and the Main P is to continue running.

SCW

There is one bit per user in the Sleep control word (SCW). Any bit "on" will awaken the Main Processing Program. Each bit indicates that there is something to do for the corresponding user.

SEQCOMD

There is one bit per user. "On" indicates that a Sequence command is in effect.

SPEC

"On" indicates that the last scanned word was one special character. In the case of DATA, "on" indicates that data has been received without the preceding asterisk and sequence number.

STARTMSG

"On" indicates to MESSAGE that it is first to blank the line and set start to zero before assembling the message.

SUFFIX

Contains the suffix of the scanned file name or the authentication code in the case of LOGIN.

TAG

Contains the tag that was being searched for by TAGSEARCH.

TAGLOC

Contains the relative tag number of the tag found, assuming 150 tags per block.

TIMER

Contains the time interval to delay before awakening. The interval varies from 0 to 30 seconds.

USER

Used primarily as an index into arrays. It is set only by the dispatcher when it finds the corresponding SCW bit "on."

USERS

Contains the number of users currently using the system.

VERSION

Contains the date of compilation.

VIEWFBOK

There is one bit per user. "On" indicates that it is allowable to view forward and backward without giving a sequence number reference.

Arrays

BKUP

Contains the backup record. This record is written into record zero of the work file whenever a change is made to the backup information.

CANDO

One word per user. Each word contains VPLR (previous logical record viewed), lines (default number of lines for view or list), kind (CRT or hard copy), type (device type), and allow (result of search).

DICT

Contains the key word dictionary including all commands, formats, etc.

DOCT1

Contains message pointers.

DOCT2

Contains message words, other than special characters.

DOCT3

Contains special characters for each device in separate rows.

ESARY

Contains the escape character tables for all devices.

GOTO

There is one word per user. Determines which procedure the dispatcher will call when that user's bit in the Sleep Control Word is "on."

LASTVIEWREC

One word per user. Contains VWND, the switch indicating no documentation is wanted; V2FMT, the format of the file being viewed; VNDX, the current index into VWARRAY; LCNT, the line count; and VREC, the logical record number of the first tag in view array.

LINE

Contains input from a terminal passed to MPP by the handler and subsequently contains output messages which will be passed to the handler.

LOG

Contains one block of log records (six log records).

LOG 1

Contains one log EOF pointer and the most recent date and time.

L1TAG

Contains one level 1 tag block at a time.

L2TAG

Contains one level 2 tag block at a time.

PREVBLOCK

There is one word per user. Contains the block number of the previous relative record read into or written from the user's file declaration (indicates which block is in buffer).

SEQLIMIT

There is one word per user. While listing, contains the list EOF pointer and the list limit. During a Sequence command, contains the limiting sequence number.

SEQSEQ

While listing, contains LSRL (record length), LSSECT (section number), and LSREC (record number). During a SEQUENCE command, contains the increment and the expected sequence number.

SRCH

Contains the result of a file search or a control card image to be passed to the MCP or written in a pseudodeck.

START

There is one word per user. Contains the index into line for either SCAN on input, or MESSAGE on output.

TAGROW

There is one word per user, plus one spare. Contains the pointers to the work areas within the work file (by user).

USERCODE

There is one word per user. Contains the user's code if he is logged in. Otherwise, it is zero.

VWARRAY

Thirteen words, containing up to 13 tags during a View command. All words following the last tag in a file will be made negative to indicate end of file.

WORD

Contains the isolated scanned word found by SCAN.

File Declarations

LOGFILE

Declared as 30-word records. Records are actually five words. The first 30-word block on disc contains the EOF pointer, the current date and the current time. Following the first disc segment, there are (EOF+1) log entries. Word zero of the log entry contains the user code, if any; Word 1 contains the current date; Word 2 contains the current time; Word 3 contains the user number and the device type; Word 4 contains the log entry type. Type 1 is log in, type 2 is log out, and type 3 is RESTART.

SRCHFILE

Used for searching the disc directory and creating pseudodecks.

TAGFILE

Work file. 150-word records. Contains one backup record and 76 records per user, plus one 76-record space area for use in reorganization. Each area in TAGFILE contains one level 2 index and up to 75 level 1 index blocks.

UFILE

One file per user. Used to access and change user's RIMS file, or to access file being listed.

V. HANDLER PROGRAM

1. Function of the Program

Handler is a program that serves as an interface between the remote terminals and the Main Processing Program. All information, whether data or commands, entered at a terminal is transferred from the terminal to the Main Processing Program under control of Handler. Similarly, all output from the Main Processing Program is sent to the terminal under control of Handler. Handler repetitively checks the various input terminals to determine whether input is ready for the Main Processing Program and, as well, repetitively checks the buffers to determine whether output from the Main Processing Program to the terminals is ready. Additionally, Handler keeps track of which terminals are online and which off-line.

In the preferred embodiment of this invention, Handler is maintained on disc. Whenever RIMS is to be available to users, the Handler program must be loaded by the computer console operator into core. The program is located in disc in machine language, having been previously compiled, and is loaded directly into core.

2. Flow Charts of Handler Programs a. Main Flow Chart

Figure 10:
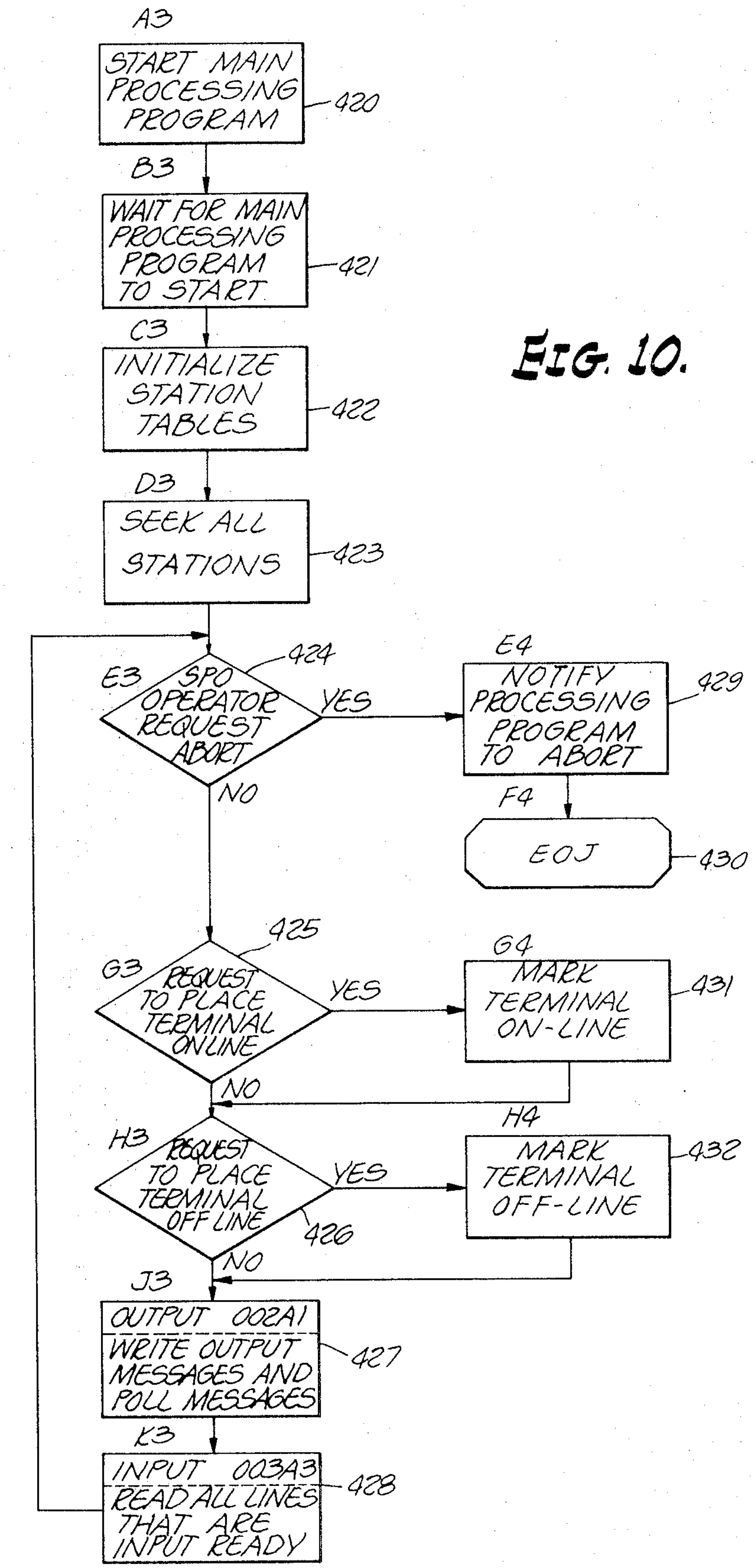
FIG. 10 is the outer block flow chart of the Handler program.

Referring to FIG. 10, the flow chart for the Handler program is shown. Prior to block 420, the program is initialized. During initialization, switches are set and directories are filled with initial values set forth in the program listing and so forth.

Terminal block 420 represents the beginning of the Handler program logical process.

Following initialization, block 421 signals the Master Control Program via a control card to locate the machine language of the Main Processing Program on disc and bring it into core. Since the Main Processing Program is stored on disc in machine language, having been previously compiled, no compilation step is necessary. During the time interval while the Main Processing Program is being loaded into core and initialized, step 421 controls a waiting period in the Handler Program.

After the wait for the Main Processing Program to be loaded into core and initialized, station tables of the Handler Program are initialized under control of step 422. Station tables are located in core and contain bits unique to each terminal. Information such as terminal address, whether on- or off-line, and so on is maintained in the tables. Thereafter, step 423 informs the Master Control Program that all data which is received by the B5500 on certain input telephone lines belongs to RIMS.

Figure 14A:
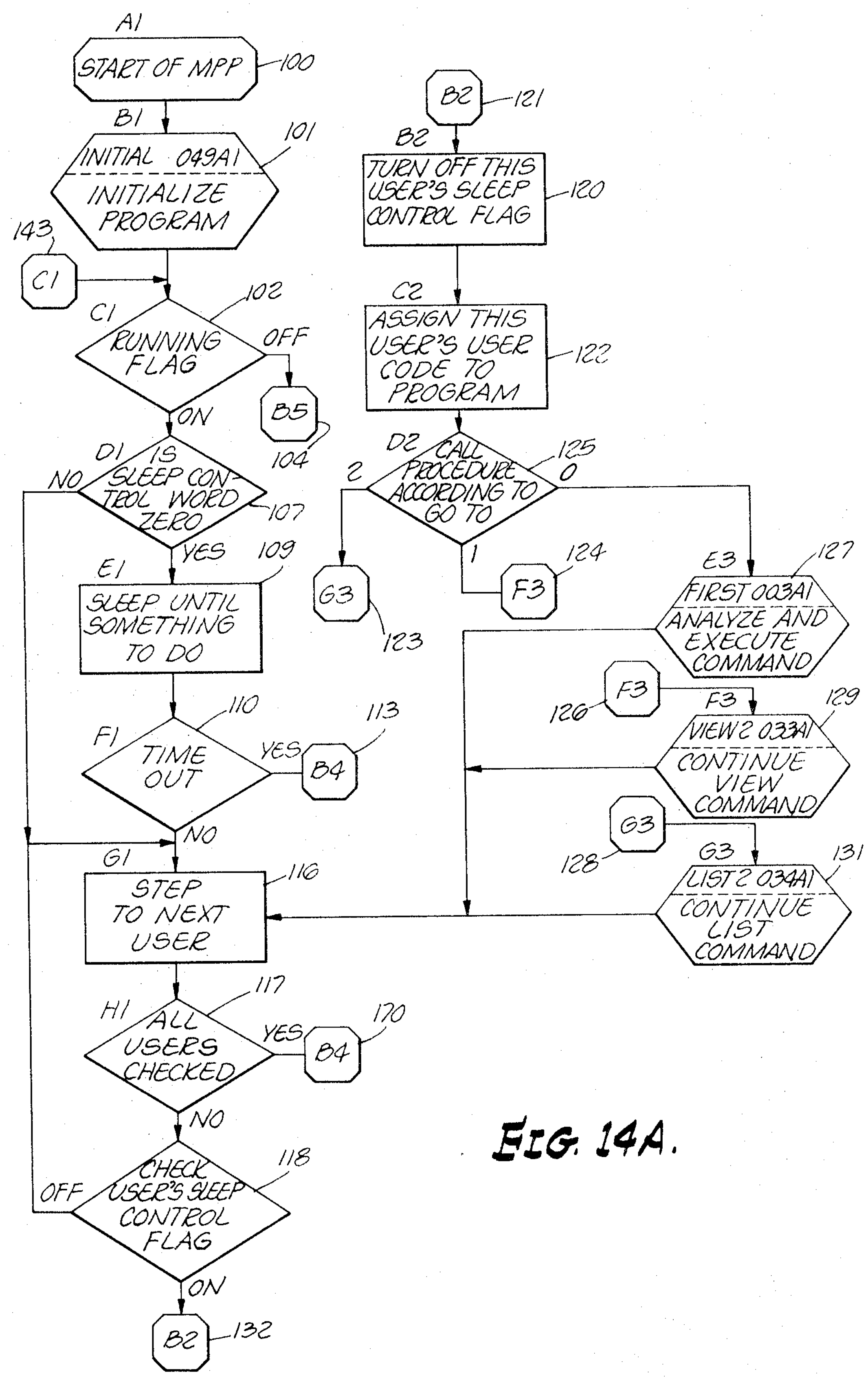
FIG. 14A is a first portion of the flow chart of the Dispatcher module of the Main Processing Program (MPP)

Step 424 determines whether the Supervisory Printer Console operator has requested that Handler be ended subsequent to its being loaded. For example, if RIMS is not to be used for a period of time, the console operator removes the Handler Program from core. In that case, step 424 would generate a YES answer and transfer control to step 429. Step 429 controls the ending of the Main Processing Program. As will be discussed in connection with the flow charts of that program, certain files have to be updated if the Main Processing Program is ended. Referring to FIG. 14A, as will be discussed below, step 102 controls the running of the Main Processing Program when the running flag is determined to be ON. Step 429 of the Handler Program (FIG. 10) turns one bit in the running flag OFF, causing the Main Processing Program to be terminated and various files updated. Following step 429, terminal block 430 represents the ending of the Handler Program.

It rarely happens that step 424 would generate a YES answer following transfer of control from step 423. As will be explained below, control is transferred to step 424 from step 428 on a repetitive basis as the Handler Program continually checks both output and input lines. The request for an ending of the Handler program from the Supervisory Printer Console operator would probably come after many loops through the step 428 to step 424 path.

Part of the information maintained in memory is a station table having bits identifying each terminal connected to the RIMS system by address and whether or not they are on- or off-line. All terminals which are not off-line are marked online during initialization of the Handler Program. For all off-line terminals, the program ignores the fact that they are still physically present. If, in the meantime, a previously off-line terminal is to be placed on, step 425 states a YES answer and step 431 controls the marking of the terminal online in the station table. Step 426 determines whether or not there has been an intervening request to place a terminal off-line. In those cases where there has been such a request, step 432 marks the terminal off-line in the station table. In most cases, both steps 425 and 426 will generate a NO answer and transfer control to step 427.

Figure 11A:
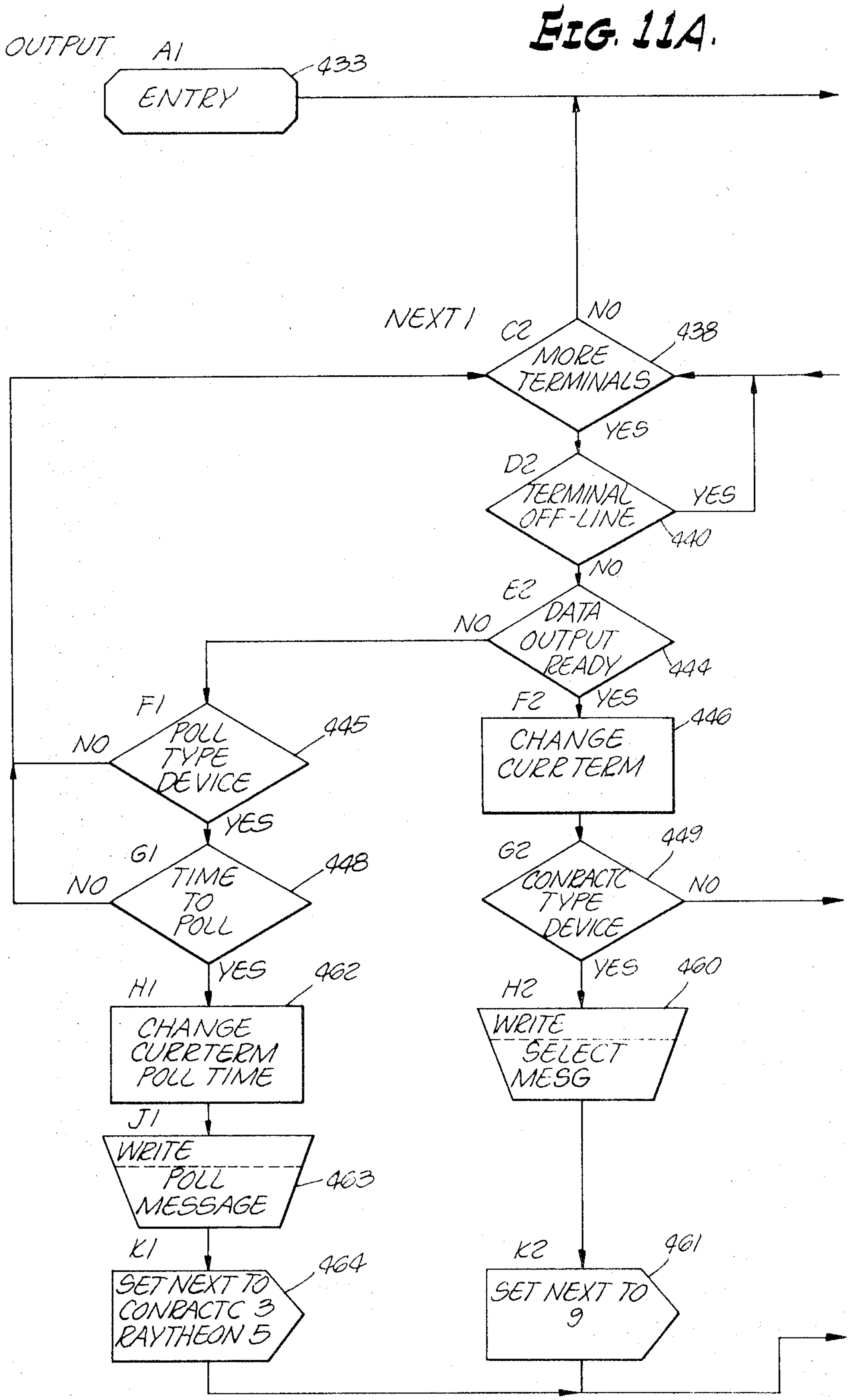
FIG. 11A is a first portion of a detailed flow chart of the Output block of FIG. 10.
Figure 11B:
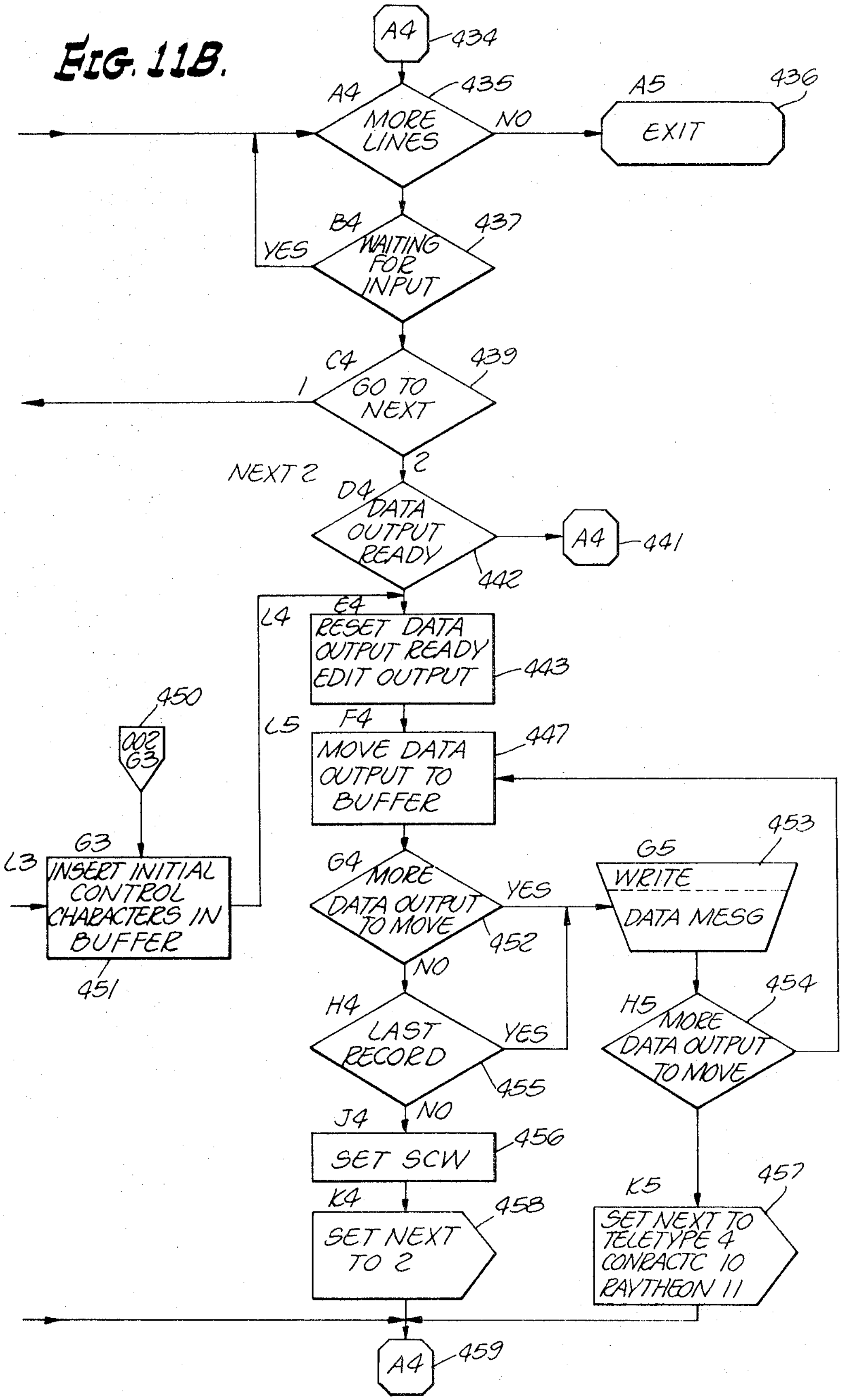
FIG. 11B is the second portion of the detailed flow chart of the Output block of FIG. 10.

The function of step 427 is to provide output to a terminal from the Main Processing Program via the Handler with a message to the terminal or from the Handler to the terminal with a poll message. The former is the output responsive to a prior input from the terminal. The latter refers to a message sent by the Handler Program to the terminals. The message is a question to each terminal asking if any input to RIMS is ready. The poll message includes a terminal address. Every terminal is polled every second by the Handler Program. FIGS. 11A and 11B illustrate the details of the flow chart of block 427.

Figure 12:
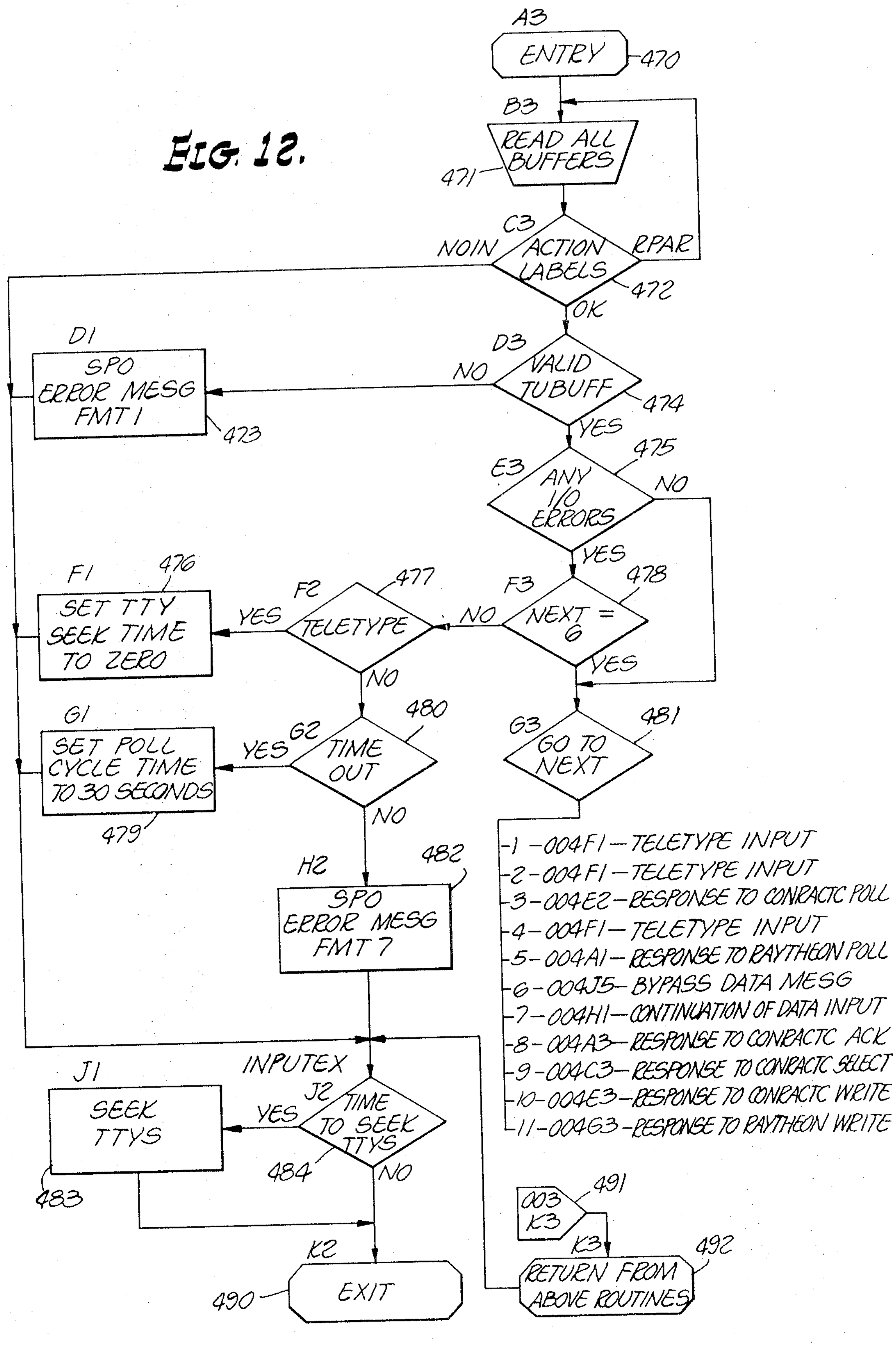
FIG. 12 is a detailed flow chart of the Input block of FIG. 10.
Figure 13A:
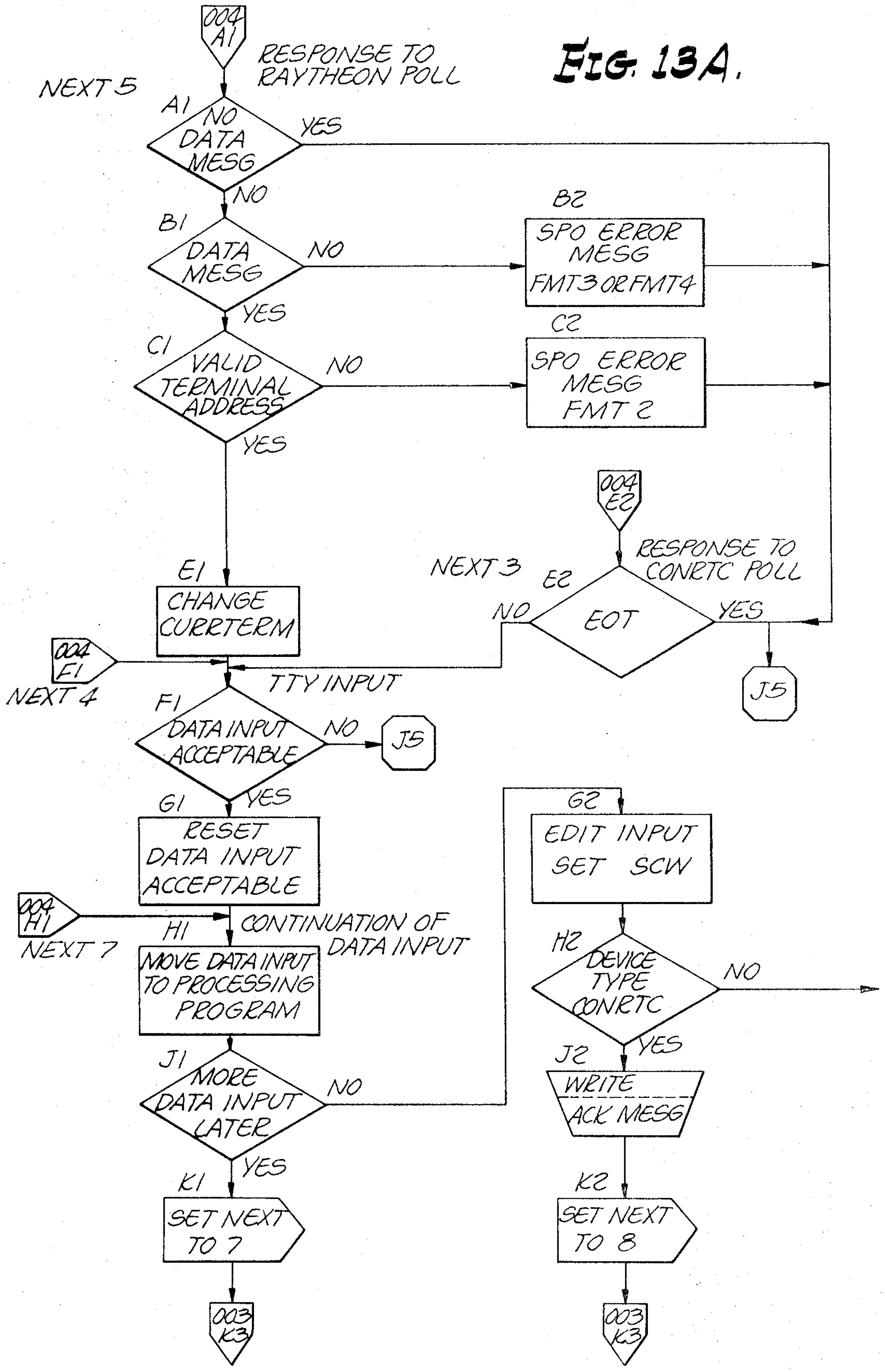
FIG. 13A is a first portion of a continuation of the flow chart of FIG. 12 illustrating flow details for various types of remote terminals.
Figure 13B:
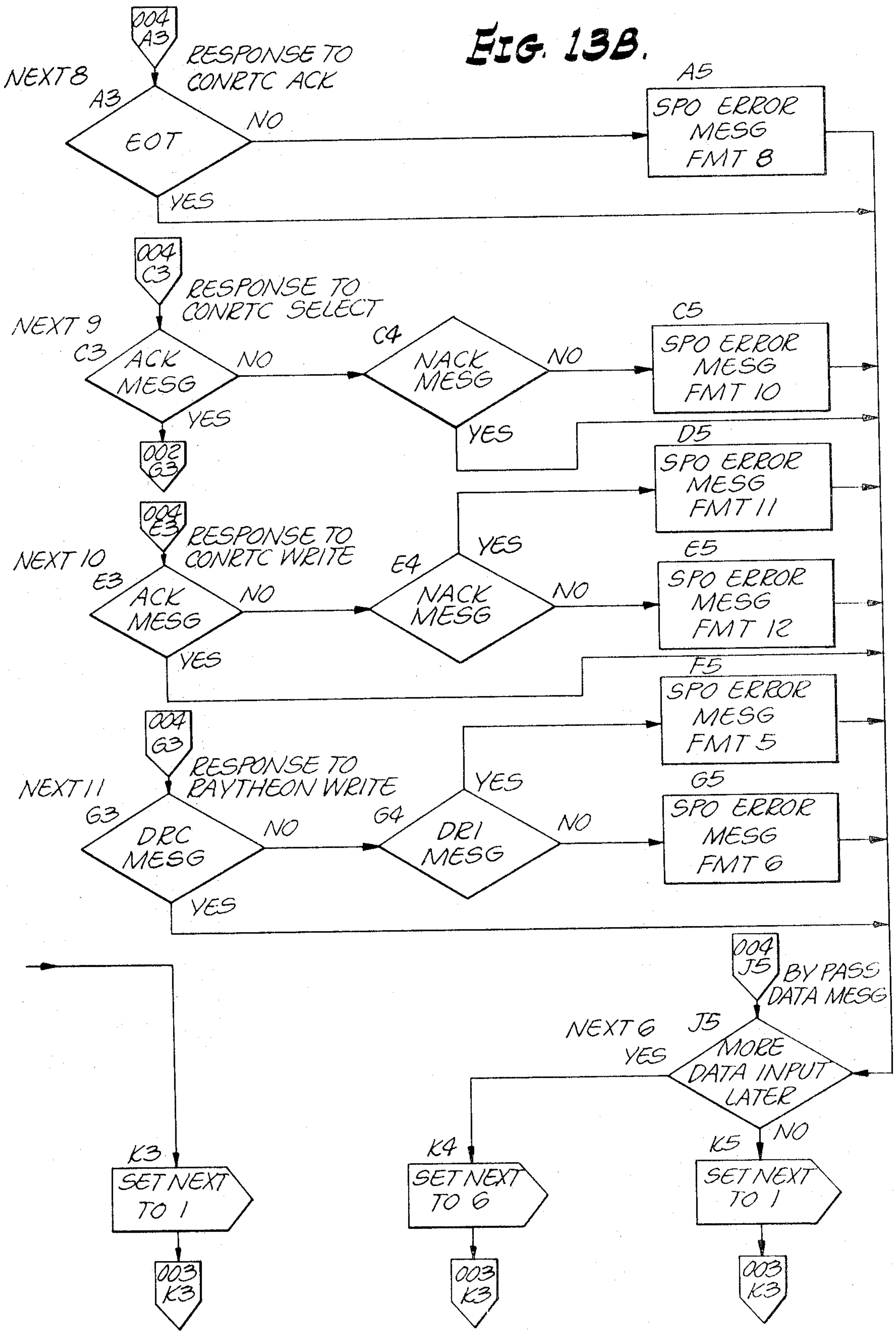
FIG. 13B is a second portion of the flow chart of FIG. 13A.

Following delivery of output messages to the terminals and the polling of each terminal to determine if it has input, control is transferred to block 428 for the reading of all lines from the terminals which have input ready. In order to save computer time, step 428 is provided with a built-in delay of 1 second. Details of the operation of step 428 are shown in FIGS. 12, 13A and 13B herein.

Following the interrogation and acceptance of all inputs by step 428, control is transferred to step 424 and the cycle repeated.

b. Output Routine

FIGS. 11A and 11B disclose the details of the output block (step 427) of FIG. 10. Referring to FIGS. 11A and 11B, terminal block 433 represents the entry to the output routine from step 426 of FIG. 10. Step 435 immediately controls a check of a telephone line between the RIMS systems and the terminals. If all lines have been checked, the output routine is ended and the logical sequence exited from terminal block 436 to the input block of step 428 in FIG. 10. If more lines are to be checked, control is transferred to step 437.

Step 437 determines whether RIMS is awaiting input from the particular telephone line looked at in step 435. Following each output to a terminal, the B5500 waits for a hardware response that indicates that the message was properly received. If step 437 determines that the B5500 is awaiting such a response from the telephone line looked at, control is retransferred to step 435 which examines the next line. If step 437 determines that a response from the line is not being awaited, control is transferred to step 439. Step 439 is a switching step. The initialization routine sets the step to 1 the first time through the output routine. When the step is set to 1, control is transferred to step 438 which determines whether more remote terminals on the telephone line must be checked. If not, control is retransferred to step 435 which either checks the next adjacent line or controls the exit from the output routine through step 436 if all lines have been checked.

If not all the terminals have been checked, step 438 transfers control to step 440 which determines if the terminal had been marked off-line in the station table by the Handler Program. If so, the next adjacent terminal is checked by step 438. If not, control is transferred to step 444 which determines whether the Main Processing Program has data output ready for the terminal being looked at. If so, step 446 changes a word (CURRTERM) in the program to indicate which terminal is presently being looked at.

Thereafter, step 449 determines whether the device at the terminal to which output is to be sent can accept the output. Certain terminals, such as the video terminals, require messages to be preceded with characters such as synchronization bits. In those devices, control is transferred to step 451 for insertion of the proper characters.

Step 443 first turns off the output ready switch which was tested by step 444 so that the next time through the logical process, the Main Processing Program will turn the switch back ON if output is ready for another terminal. Also, step 443 serves to edit the output and substitute characters where the output terminal is not capable of receiving or displaying the particular characters involved.

Step 447 controls the computer to move the data which is ready for the terminal to an output buffer. Since the buffers are limited in size, and may not hold the entire output, step 452 determines whether more data output is to be moved. If more data is to be moved, control is transferred to step 453 which controls the emptying of the core buffer and writing of the message to the terminal. Also, if step 452 determines that no more output is ready and step 455 determines that the present output includes the last record, control is again transferred to step 453 for emptying of the core buffer and transmission of the message to the terminal. In those cases where step 452 determines that there is no more data output and step 455 determines that the last record has not been sent, step 456 sets the corresponding bit in the Sleep Control Word in the dispatcher module of the Main Processing Program. The significance of the Sleep Control Word will be explained in connection with the discussion of the Dispatcher module of FIGS.

14A and 14B. Step 458 then sets the NEXT switch to 2 so that the terminal may later receive the second part of the message.

Referring again to step 439, if the switch were at 2, control would be transferred to step 442 to determine whether the data output is ready. If not, control is retransferred to step 435 via connectors 441 and 434. If so, the sequence precedes into step 447 as already explained.

Following transmission of the message from the core buffer to the terminal by step 453, control is transferred to step 454 which determines whether there is more output to be moved. If there is, control is returned to step 447 for the sequence to be repeated. If not, control is transferred to step 457 which sets switches according to the particular output terminal involved. Thereafter, terminal blocks 459 and 434 return control to step 435 which determines whether more telephone lines need be interrogated.

Returning to step 444, in those cases where the step decides that no output is ready on the terminal presently being looked at, control is transferred to step 445 which determines whether the terminal being looked at is a poll-type device. As discussed above, certain terminals must be sent a poll message as an interrogation output to determine if the terminal has any input to deliver. If it is not a poll-type device, step 445 gives a NO answer and transfers control to step 438. If step 445 determines that the terminal being looked at is a poll-type device, a step 448 determines whether it is time to poll, that is, whether 1 second has elapsed since last polling that terminal. If not, control is transferred to step 438 where the next terminal is looked at. If step 448 determines that it is time to poll, step 462 changes the current terminal poll time word. This word is looked at by step 448 to determine whether it is time to poll the present terminal.

After step 448 determines that it is time to poll the terminal being looked at, step 463 sends a poll message to the terminal. Thereafter, step 464 sets the word NEXT to call the proper routine for input. Control is then retransferred to step 435 via terminal blocks 459 and 434 and the process repeated. After all of the terminals on all of the lines have been interrogated, the output routine is exited from step 436.

Referring again to FIG. 10, control is transferred from step 427 to step 428. Step 428 is the input routine and is shown in detail in FIG. 12.

c. Input Routine

As has been explained elsewhere herein, the remote terminals of this invention communicate with the central computer via telephone lines. Each terminal connects to a Dataset for transmission of the generated codes over a telephone line. The transmitted codes are fed through a second Dataset to a Burroughs Data Communication Control Model B487. The B487 has a small buffer core storage. When the buffer becomes full, the core may be emptied as input to the B5500 through an intermediate device.

Referring to FIG. 12, a detailed flow chart for the input block (step 428) of FIG. 10 is shown. Following the sequential operation of the output block, the input routine logical process is begun as represented by terminal block 470. Thereafter, step 471 controls a reading of all of the buffers in the model B487 core storage. Step 472 checks the data read from the buffers and provides one of three outputs. Output RPAR indicates that the parity check was made and a parity error found. Following detection of a parity error, step 471 is controlled to read the buffers again to determine where the incorrect data came from. If step 472 finds that the buffers are empty and therefore therefore there is no input (NOIN), control is transferred to step 484 which determines whether it is time to check the teletype. If not, the input routine is exited through terminal block 490. If so, the teletype inputs are checked by block 483.

Returning to step 472, if the data read from the buffers is found to be acceptable, control is transferred to block 474 which determines if the data is accompanied with a valid model 487 buffer address. If it is not, step 473 sends an error message to the Supervisory Printer Operator.

If step 474 determines that the model 487 addresses are valid, step 475 determines if any input-output errors exist. If not, control is transferred via step 481 to the proper subroutine determined by the particular function and terminal device involved.

If an input-output error is found, step 477 determines whether the error is involved with a teletype terminal. If so, step 476 controls the teletype seek time to zero and transfers control to step 484 which determines that it is time to check the teletypes. If the input-output errors are not involved with a teletype terminal, step 484 determines whether the time was out. If not, step 482 sends an appropriate error message to the Supervisory Printer Operator. If time was out, step 479 is controlled to set the poll cycle time to 30 seconds and control is transferred to step 484. Thereafter, the sequence of steps 484 and 483 are continued as explained above.

Flow charts for the various subroutines to which step 481 may exit are set forth in FIGS. 13A and 13B. Since they are specific to the type of terminal involved and readily understandable from reference to the flow charts, FIGS. 13A and 13B will not be discussed in detail herein.

3. Handler Program Listing

All programs according to this invention are written in ALGOL. The program may be readily compiled by any compiler which accepts the well-known ALGOL language. The Handler source program is as follows.

```
BEGIN

COMMENT
     THIS PROGRAM RIMS/RIMS IS THE DATACOMM I/O HANDLER FOR THE RIMS
SYSTEM.  IT FIRST ZIPS THE PROCESSING PROGRAM AND WAITS UNTIL IT IS
STARTED.  IT THEN INITIALIZES THE STATION TABLES (ARRAYS LINE AND TERM).
IT THEN CONTINOUSLY PERFORMS THE FOLLOWING FIVE FUNCTIONS.
   1. TEST IF SPO OPERATOR REQUESTED ABORT AND, IF SO, GO TO END OF JOB.
   2. TEST IF SPO OPERATOR REQUESTED A TERMINAL TO BE PLACED ON-LINE,
      AND IF SO, MARK IT ON-LINE.
   3. TEST IF SPO OPERATOR REQUESTED A TERMINAL TO BE PLACED OFF-LINE,
      AND IF SO, MARK IT OFF-LINE.
   4. WRITE ALL OUTPUT DATA MESSAGES WAITING.
      IF NO DATA OUTPUT MESSAGES WAITING FOR LINE, THEN CHECK TIME
      AND WRITE POLL MESSAGES.
   5. ISSUE GENERALIZED READ WITH A WAIT TIME OF ZERO IF THE PROCESSING
      PROGRAM IS ACTIVE ELSE A WAIT TIME OF 1 SECOND.
      PROCESS ANY INPUT RECEIVED;


  DEFINE
    INFO      =  "≥"  #,              % RAYTHEON CONTROL CHARACTERS
    NODATA    =  " "  #,
    DRC       =  "$"  #,
    DRI       =  "&"  #,
    RETRANS   =  """  #,
    EOTGM     = "$←"  #,              % CONRAC AND TC-500 CONTROL CHAR
    ACKGM     = "&←"  #.
    NACKGM    = "5←"  #,
    LINEMAX   =    6  #,              % MAXIMUM NUMBER OF LINES
    TERMMAX   =   17  #,              % MAXIMUM NUMBER OF TERMINALS
    FRSTUBIT  =    9  #;              % FIRST BIT USED IN PRT
                                      % LOCATIONS IN PROCESSING PROG.


  INTEGER PRT25;
             COMMENT
             THE ABOVE INTEGER CONTAINS THE CORE ADDRESS OF PRT 25
             IN THE PROCESSING PROGRAM.  THE DEFINES LISTED BELOW ARE
             USED TO REFERENCE OTHER LOCATIONS IN ITS PRT;

    DEFINE
      SCW      = PRT25+1   #,  % SLEEP COMMUNICATION WORD; PROCESSING
                               % PROGRAM SLEEPS ON THIS WORD WHEN IT HAS
                               % NOTHING TO DO.
      ACCEPT   = PRT25+2   #,  % TRUE IF INPUT MAY BE ACCEPTED FROM TERM
      OPREADY  = PRT25+3   #,  % TRUE IF OUTPUT DATA MESG READY FOR TERM
      BREAKEY  = PRT25+4   #,  % TRUE IF BREAK KEY ON LAST OUTPUT MESG
      RUNNING  = PRT25+5   #,  % TRUE IF PROCESSING PROGRAM RUNNING.
      COMAREA  = PRT25+6   #;  % COMMON AREA IN PROCESSING PROGR FOR I/O.


  BOOLEAN
    ABORT,                            % SET TRUE BY SPO OPER TO ABORT
    INSTBLK,                          % TRUE IF BLANK TO BE INSERTED
    MORE;                             % TRUE IF MORE CHAR IN COMAREA
  INTEGER
    PUTONLINE,                        % SET TO TERM NO BY SPO OPER
    PUTOFFLINE,                       % SET TO TERM NO BY SPO OPER
    L,                                % INDEX INTO ARRAY LINE
    T,                                % INDEX INTO ARRAY TERM
    VERSION,                          % DATE OF LAST COMPILE
    SCNT,                             % COUNT OF CHR IN SOURCE AREA
```

```
  SKTIME,                                   % TIME OF LAST TTY SEEK
  T;                                        % MISC USE
 REAL
  FW;                                       % FIRST 7 CHAR OF INPUT MESG
 LABEL L0,L1,L2,L3,L4,L5,L6;
 LABEL INPUT,ERRORS,INPUTEX,OUTPUTEX,ABEND;
 LABEL
  NEXT1,NEXT2,NEXT3,NEXT4,NEXT5,NEXT6,NEXT7,NEXT8,NEXT9,NEXT10,NEXT11;
 SWITCH LIST1 ←
  NEXT1,NEXT2;
 SWITCH LIST2 ←
  NEXT4,NEXT4,NEXT3,NEXT4,NEXT5,NEXT6,NEXT7,NEXT8,NEXT9,NEXT10,NEXT11;


SAVE ARRAY LINE[0:LINEMAX,0:3];
  DEFINE
    TUBUFF   = LINE[L,0]          #, % B487 TU AND BUFF ADDRESS
    FRSTTERM = LINE[L,1].[24:6]   #, % INDEX TO FIRST TERM ON THIS LINE
    LASTTERM = LINE[L,1].[30:6]   #, % INDEX TO LAST TERM ON THIS LINE
    CURRTERM = LINE[L,1].[36:6]   #, % INDEX TO TERM NOW BEING SERVICED
    NEXT     = LINE[L,1].[42:6]   #, % INDEX TO NEXT PROCEDURE
    BSIZEIN  = LINE[L,2].[30:9]   #, % SIZE OF B487 INPUT BUFFER (CHR)
    BSIZEOUT = LINE[L,2].[39:9]   #, % SIZE OF B487 OUTPUT BUFFER (WDS)
    DCNT     = LINE[L,3]          #; % COUNT OF CHR IN DESTINATION AREA


SAVE ARRAY TERM[0:TERMMAX,0:3];
  DEFINE
    OFFLINE  = TERM[T,0].[15:3]   #, % TRUE IF TERMINAL IS OFF-LINE
    TERMADDR = TERM[T,0].[18:12]#, % HARDWARD ADDRESS OF TERMINAL
    CUADDR   = TERM[T,0].[30:6]   #, % CTL UNIT ADDR - FOR RAYTHEON ONLY
    TYPE     = TERM[T,0].[36:6]   #, % TYPE OF TERMINAL
      RAY    = TYPE = 0           #, % RAYTHEON CRT ONLY
      RAYCTL = TYPE = 1           #, % RAYTHEON CRT AND CONTROL UNIT
      TC500  = TYPE = 2           #, % TC-500
      CONRAC = TYPE = 3           #, % CONRAC CRT
      TTY    = TYPE = 4           #, % TELETYPE
      POLLTYPE      = RAYCTL OR TC500 OR CONRAC #,
    ERRCNT   = TERM[T,0].[42:6]   #, % COUNT OF I/O ERRORS
    TERMPARM = TERM[T,0]          #, % DEFINE TO PASS ABOVE TO PROCEDURES
    POLLTIME = TERM[T,1]          #, % TIME OF LAST POLL MESSAGE
    POLLCYC  = TERM[T,2]          #, % AMOUNT OF TIME BETWEEN POLLS
    COMADDR  = TERM[T,3]          #; % CORE ADDR OF COM AREA IN PROC PROG


    REAL
        STWRD;
      DEFINE
        BUSY       =    BOOLEAN (STWRD.[22:1])   #,
        ABNORM     =    BOOLEAN (STWRD.[23:1])   #,
        RDREADY    =    BOOLEAN (STWRD.[24:1])   #,
        FULLBUFF   =    BOOLEAN (STWRD.[25:1])   #,
        WTREADY    =    BOOLEAN (STWRD.[27:1])   #,
        INPUTERR   =    BOOLEAN (STWRD.[28:1])   #,
        WRITING    =    BOOLEAN (STWRD.[29:1])   #,
        NOTREADY   =    BOOLEAN (STWRD.[30:1])   #,
        ATTACHED   =    BOOLEAN (STWRD.[45:1])   #;


  SAVE ARRAY ARR[0:7];                      % ARRAY FOR INPUT RECORDS
  SAVE ARRAY ALT[0:15];                     % STORAGE AREA USED FOR EDITING
  ALPHA FILE IN DCIN 14 (20,8);
  ALPHA FILE OUT F0 14 (9,15);
  ALPHA FILE OUT F1 14 (4,15);
  ALPHA FILE OUT F2 14 (8,8);
```

```
  ALPHA FILE OUT F3 14 (8,8);
  ALPHA FILE OUT F4 14 (8,8);
  ALPHA FILE OUT F5 14 (8,8);
  ALPHA FILE OUT F6 14 (8,15);
  SWITCH FILE DCOUT := F0,F1,F2,F3,F4,F5,F6;


STREAM PROCEDURE OPTEDIT(COMADDR,TERMPARM,TYPE);
COMMENT
     THIS PROCEDURE PERFORMS CHARACTER SUBSTITUTION BEFORE WRITING THE
MESSAGE OUT TO THE TERMINAL.  THE SUBSTITUTIONS ARE:

       TERM    CHARACTERS   REPLACED
       TYPE                   WITH

     RAYTHEON      #         TERM ADDR
                   "            ≤

     CONRACTC      %=           ##

  VALUE COMADDR,TERMPARM,TYPE;
  BEGIN
    LOCAL SISAVE;
    LABEL OL0,OL1,OL2;
    SI ← COMADDR;
    CI ← CI + TYPE;
      GO TO OL0;                               % RAYTHEON
      GO TO OL0;                               % RAYTHEON CONTROL
      GO TO OL1;                               % TC-500
      GO TO OL1;                               % CONRAC
      GO TO OL2;                               % TELETYPE
OL0:
    4(32( IF SC = "←" THEN                     % RAYTHEON AND RAYTHEON CONTROL
            JUMP OUT 2 TO OL2;
          IF SC = "#"
            THEN
              BEGIN
                SISAVE ← SI;
                SI ← LOC TERMPARM;
                SI ← SI + 4;
                DI ← SISAVE;
                DS ← CHR;
                SI ← SISAVE;
              END
            ELSE
              IF SC = """
                THEN
                  BEGIN
                    SISAVE ← SI;
                    DI ← SISAVE;
                    DS ← LIT "≤";
                  END;
          SI ← SI + 1));
OL1:
    4(32( IF SC = "←" THEN                     % CONRAC AND TC-500
            JUMP OUT 2 TO OL2;
          IF SC = "%"
            THEN
              BEGIN
                SISAVE ← SI;
                SI ← SI + 1;
                IF SC = "="
                  THEN
                    BEGIN
                      SI ← SI + 1;
```

```
                DI ← SISAVE;
                DS ← 2 LIT "≠≠";
              END;
        END
      ELSE
        SI ← SI + 1));
DL2:
  END OF OTPEDIT;


STREAM PROCEDURE INPEDIT(COMADDR,ALT,TYPE);
COMMENT
     THIS PROCEDURE PERFORMS CHARACTER SUBSTITUTION BEFORE PASSING THE
INPUT DATA MESSAGE TO THE PROCESSING PROGRAM.  THE SUBSTITUTIONS ARE:

       TERM     CHARACTERS   REPLACED
       TYPE                    WITH

     RAYTHEON       ≤              "
                    ]         ELIMINATED

     CONRACTC       ≠≠
                CTL STATE
                (NON BLANK)  ELIMINATED

  VALUE COMADDR,TYPE;
  BEGIN
    LOCAL WHERE;
    LABEL IL0,IL1,IL2,IL3,IL4,IL5,TC,TC0,TC1,TC2,TC3;
    SI ← COMADDR;
    DI ← ALT;
    DS ← 16 WDS;
    DI ← COMADDR;
    DS ← 8 LIT "        ";
    SI ← COMADDR;
    DS ← 15 WDS;
    SI ← ALT;
    DI ← COMADDR;
    CI ← CI + TYPE;
      GO TO IL0;
      GO TO IL0;
      GO TO IL1;
      GO TO IL2;
      GO TO IL3;
IL0:
    SI ← SI + 7;                         % RAYTHEON AND RAYTHEON CONTROL
    4(32( IF SC = "#" THEN
            JUMP OUT 2 TO IL5;
          IF SC = "≤"
            THEN
              BEGIN
                DS ← LIT """;
                SI ← SI + 1;
              END
            ELSE
              IF SC = "]"
                THEN
                  SI ← SI + 1
                ELSE
                  DS ← CHR));
    GO TO IL4;
IL1:
    SI ← SI + 8;                         % TC-500
    GO TO TC;
IL2:
```

```
    SI ← SI + 1;
 TC:
    4(32( CI ← CI + WHERE;                      % TC-500 AND CONRAC
            GO TO TC0:
            GO TO TC1:
            GO TO TC2:
 TC0:
          IF SC = "≠"                             % CTL STATE
            THEN
              BEGIN
                TALLY ← 1;
                WHERE ← TALLY;
              END
            ELSE
              IF SC = " "
                THEN
                  DS ← LIT " "
                ELSE
                  IF SC = "≠" THEN                % TEST FOR END OF RECORD
                    JUMP OUT 2 TO IL5;
          SI ← SI + 1;
          GO TO TC3;
 TC1:
          IF SC = "≠"                             % TEXT STATE
            THEN
              BEGIN
                SI ← SI + 1;
                IF SC = "≠"
                  THEN
                    BEGIN
                      DS ← CHR;
                      TALLY ← 2;
                      WHERE ← TALLY;
                    END
                  ELSE
                    BEGIN
                      TALLY ← 0;
                      WHERE ← TALLY;
                    END
              END
            ELSE
              DS ← CHR;
          GO TO TC3;
 TC2:
          TALLY ← 1;
          WHERE ← TALLY;
 TC3:
    ));
    GO TO IL4;
 IL3:
    4(32( IF SC = "←" THEN                      % TELETYPE
            JUMP OUT 2 TO IL5;
          DS ← CHR));
 IL4:
    DI ← DI - 1;
 IL5:
    DS ← LIT "←";
  END OF INPEDIT;


STREAM PROCEDURE TERMFSG(IOAREA,TERMPARM,MESGNO);
COMMENT
     THIS PROCEDURE CONSTRUCTS NON-DATA OUTPUT MESSAGES FOR THE
TERMINALS.  THESE MESSAGES ARE:
   0. CONRAC AND TC-500 SELECT.
```

```
1. RAYTHEON POLL.
2. CONRAC AND TC-500 POLL.
3. CONRAC AND TC-500 ACK.
4. CONRAC AND TC-500 NACK.
5. INITIAL CTL CHR FOR COMRAC AND TC-500 DATA
6. INITIAL CTL CHR FOR RAYTHEON DATA.

VALUE TERMPARM,MESGNO;
BEGIN
  LABEL TL0,TL1,TL2,TL3,TL4,TL5,TL6,TL7;
  DI ← IOAREA;
  DS ← 8 LIT "00000000";
  CI ← CI + MESGNO;
    GO TO TL0;
    GO TO TL1;
    GO TO TL2;
    GO TO TL3;
    GO TO TL4;
    GO TO TL5;
    GO TO TL6;
TL0:
    DS ← 2 LIT "$≠";                    % CONRAC AND TC-500 SELECT
    SI ← LOC TERMPARM;
    SI ← SI + 3;
    DS ← 2 CHR;
    DS ← 4 LIT "≠Q%←";
    GO TO TL7;
TL1:
    DS ← 3 LIT "VVA";                   % RAYTHEON POLL
    SI ← LOC TERMPARM;
    SI ← SI + 5;
    DS ← CHR;
    DS ← 4 LIT "≤W@←";
    GO TO TL7;
TL2:
    DS ← 2 LIT "$≠";                    % CONRAC AND TC-500 POLL
    SI ← LOC TERMPARM;
    SI ← SI + 3;
    DS ← 2 CHR;
    DS ← 4 LIT "≠P%←";
    GO TO TL7;
TL3:
    DS ← 2 LIT "&←";                    % CONRAC AND TC-500 ACK
    GO TO TL7;
TL4:
    DS ← 2 LIT "5←";                    % CONRAC AND TC-500 NAK
    GO TO TL7;
TL5:
    DS ← 2 LIT "≥≠";                    % CONRAC AND TC-500 DATA
    SI ← LOC TERMPARM;
    SI ← SI + 3;
    DS ← 2 CHR;
    DS ← LIT "≠";
    DS ← LIT """;
    GO TO TL7;
TL6:
    DS ← 3 LIT "VVA";                   % RAYTHEON DATA
    SI ← LOC TERMPARM;
    SI ← SI + 5;
    DS ← CHR;
    DS ← 3 LIT "3WA";
    SI ← SI - 2;
    DS ← CHR;
TL7:
  END TERMESG;
```

```
STREAM PROCEDURE MOVETO(ARR,COMADDR,DWDS,DCHR,CNT);
COMMENT
     THIS PROCEDURE MOVES DATA INPUT MESSAGES TO THE PROCESSING
PROGRAM.  THE PROCEDURE FIRST SKIPS OVER THE CHARACTERS ALREADY IN
THE COMMUNICATION AREA (DWDS,DCHR) AND THEN MOVES (CNT) CHARACTERS.  THE
NUMBER OF CHARACTERS MOVED IS THE SIZE OF THE B487 INPUT BUFFER OR THE
REMAINING SPACE IN THE COMMUNICATION AREA, WHICH EVER IS SMALLEST;

   VALUE COMADDR,DWDS,DCHR,CNT;
   BEGIN
     SI ← ARR;
     DI ← COMADDR;
     DWDS(DI ← DI + 32);
     DI ← DI + DCHR;
     DS ← CNT CHR;
   END OF MOVETO;


INTEGER STREAM PROCEDURE MOVEFR(COMADDR,IOAREA,SWDS,SCHR,DWDS,DCHR,
                                DIV64,MOD64,MORE,INSTBLK);
COMMENT
     THIS PROCEDURE MOVES DATA OUTPUT MESSAGES FROM THE PROCESSING
PROGRAM.  THE PROCEDURE FIRST SKIPS OVER THE CHARACTERS IN THE
COMMUNICATION AREA ALREADY MOVED (SWDS,SCHR) AND ALSO OVER THE
CHARACTERS ALREADY IN THE OUTPUT BUFFER (DWDS,DCHR).  IT THEN MOVES UP
TO THE MAXIMUM NUMBER OF CHARACTERS (DIV64,MOD64).  THE MAXIMUM IS THE
REMAINING SPACE IN THE COMMUNICATION AREA OR THE OUTPUT BUFFER, WHICH
EVER IS SMALLEST.  IF INSTBLK IS TRUE, A BLANK IS INSERTED AS THE FIRST
CHARACTER OF THE BUFFER.  THE PROCEDURE SETS MORE TRUE IF ALL OF THE
CHARACTERS IN THE COMMUNICATION AREA WHERE NOT MOVED.  IT RETURNS THE
NUMBER OF CHARACTERS MOVED;

   VALUE COMADDR,SWDS,SCHR,DWDS,DCHR,DIV64,MOD64,INSTBLK;
   BEGIN
   LOCAL DISAVE;
   LABEL ML1,ML2;
     SI ← COMADDR;
     SWDS(SI ← SI + 32);
     SI ← SI + SCHR;
     DI ← IOAREA;
     DWDS(DI ← DI + 32);
     DI ← DI + DCHR;
     INSTBLK(DS ← LIT " ");
     DIV64(2(32( IF SC = "←" THEN
                  JUMP OUT 3 TO ML1;
                DS ← CHR;
                TALLY ← TALLY + 1)));
           DISAVE ← DI;
           DI ← LOC MOVEFR;
           DI ← DI + 6;
           DS ← LIT "1";
           DI ← DISAVE);
     MOD64(IF SC = "←" THEN
              JUMP OUT TO ML1;
           DS ← CHR;
           TALLY ← TALLY + 1);
     DI ← MORE;
     DS ← 8 LIT "00000001";
     GO TO ML2;
ML1:
     DS ← LIT "←";
     DI ← MORE;
     DS ← 8 LIT "00000000";
```

```
ML2:
    DISAVE ← TALLY;
    SI ← LOC DISAVE;
    SI ← SI + 7;
    DI ← LOC MOVEFR;
    DI ← DI + 7;
    DS ← CHR;
  END OF MOVEFR;


INTEGER STREAM PROCEDURE RAYEDIT(IOAREA,BSIZEWDS,INSTBLK);
COMMENT
     THIS PROCEDURE CHECKS THE OUTPUT BUFFER FOR RAYTHEON TO ASSURE
THAT IT DOES NOT END WITH CONTROL CHARACTERS.  IF IT DOES, THE CONTROL
CHARACTERS ARE REPLACED BY BLANKS, INSTBLK IS SET TRUE AND THE NUMBER
OF CHARACTERS REPLACED IS RETURNED;

  VALUE BSIZEWDS;
  BEGIN
    LOCAL SISAVE;
    SI ← IOAREA;
    BSIZEWDS(SI ← SI + 8);
    SISAVE ← SI;
    14( SI ← SI - 1;
        TALLY ← TALLY + 1;
        IF SC = "≠" THEN
          RAYEDIT ← TALLY);
    DI ← SISAVE;
    DI ← DI - RAYEDIT;
    RAYEDIT(DS ← LIT " ");
    RAYEDIT(DI ← INSTBLK;
            DS ← 8 LIT "00000001";
            JUMP OUT);
  END OF RAYEDIT;


BOOLEAN STREAM PROCEDURE ALLACCEPT(ACCEPT);
COMMENT
     THIS PROCEDURE RETURNS A VALUE OF TRUE IF THE PROCESSING PROGRAM IS
ASLEEP.  THAT IS, THE ACCEPT BIT FOR EVERY USER IS TRUE;

  VALUE ACCEPT;
  BEGIN
    LABEL AL1,AL2;
    SI ← ACCEPT;
    SKIP FRSTUBIT SB;
    TERMMAX(IF SB THEN
              GO TO AL1;
            JUMP OUT TO AL2;
AL1:        SKIP SB);
    TALLY ← 1;
    ALLACCEPT ← TALLY;
AL2:
  END OF ALLACCEPT;


COMMENT
     THIS PROCEDURE IS USED TO SET BITS IN THE PROCESSING PROGRAM;

STREAM PROCEDURE SETBIT(WORD,T);
  VALUE WORD,T;
  BEGIN
    DI ← WORD;
    SKIP FRSTUBIT DB;
    SKIP T DB;
```

```
    DS ← SET;
  END OF SETBIT;


STREAM PROCEDURE RESETBIT(WORD,T);
COMMENT
     THIS PROCEDURE IS USED TO RESET BITS IN THE PROCESSING PROGRAM;

  VALUE WORD,T;
  BEGIN
    DI ← WORD;
    SKIP FRSTUBIT DB;
    SKIP T DB;
    DS ← RESET;
  END OF RESETBIT;


BOOLEAN STREAM PROCEDURE TESTBIT(WORD,T);
COMMENT
     THIS PROCEDURE IS USED TO TEST BITS IN THE PROCESSING PROGRAM;

  VALUE WORD,T;
  BEGIN
    SI ← WORD;
    SKIP FRSTUBIT SB;
    SKIP T SB;
    IF SB THEN TALLY ← 1;
    TESTBIT ← TALLY;
  END OF TESTBIT;


ALPHA STREAM PROCEDURE NFLAG(WORD);
COMMENT
     THIS PROCEDURE IS USED TO ELIMINATE THE BLAG BIT BY SHIFTING THE
WORD ONE CHARACTER TO THE RIGHT;
  BEGIN
    SI ← WORD;
    DI ← LOC NFLAG;
    DI ← DI + 1;
    DS ← 7 CHR;
  END OF NFLAG;


FORMAT
  FMTO("RIMS OUTPUT INPOSSIBLE",

       " TERM ",I2," STATUS ",A1,A1,A1,"←"),
  FMT1("RIMS INPUT FROM INVALID TUBUFF",
       " TERM ",I2," STATUS ",A1,A1,A1,"←"),
  FMT2("RIMS INVALID RAYTHEON CRT ADDR",
       " TERM ",I2," STATUS ",A1,A1,A1,"←"),
  FMT3("RIMS RAYTHEON RETRANS MESG",
       " TERM ",I2," STATUS ",A1,A1,A1,"←"),
  FMT4("RIMS INVALID RESPONSE TO RAYTHEON POLL",
       " TERM ",I2," STATUS ",A1,A1,A1,"←"),
  FMT5("RIMS RAYTHEON DRI MESG",
       " TERM ",I2," STATUS ",A1,A1,A1,"←"),
  FMT6("RIMS INVALID RESPONSE TO RAYTHEON WRITE",
       " TERM ",I2," STATUS ",A1,A1,A1,"←"),
  FMT7("RIMS INPUT ERROR",
       " TERM ",I2," STATUS ",A1,A1,A1,"←"),
  FMT8("RIMS INVALID RESPONSE TO CONRTC ACK",
       " TERM ",I2," STATUS ",A1,A1,A1,"←"),
  FMT10("RIMS INVALID RESPONSE TO CONRTC SELECT",
       " TERM ",I2," STATUS ",A1,A1,A1,"←"),
```

```
  FMT11("RIMS NACK RESPONSE TO CONRTC WRITE",
       " TERM ",I2," STATUS ",A1,A1,A1,"←"),
  FMT12("RIMS INVALID RESPONSE TO CONRTC WRITE",
       " TERM ",I2," STATUS ",A1,A1,A1,"←");


PROCEDURE SPOWRITE(FMT);
COMMENT
     THIS PROCEDURE WRITES DATACOMM ERROR MESSAGES ON THE SPO:
  FORMAT FMT:
  BEGIN
    FILE OUT SPO 11 (1,10);

    WRITE (SPO,FMT,T,STWRD.[22:3],STWRD.[25:3],STWRD.[28:3]);
  END OF SPOWRITE;


PROCEDURE DCWRITE;
COMMENT
     THIS PROCEDURE DOES ALL DATACOMM WRITING FOR THE PROGRAM;
  BEGIN
    LABEL OPIMP,BREAK,WRITEOK;

    WRITE LOCK (DCOUT[L](TUBUFF,1))[OPIMP:BREAK];
    GO TO WRITEOK;
OPIMP:
    SPOWRITE(FMTO);
    OFFLINE ← 1;
    GO TO WRITEOK;
BREAK:
    IF NOT TESTBIT(ACCEPT,T) THEN
      SETBIT(BREAKEY,T);
WRITEOK:
  END OF DCWRITE;


  BEGIN
    STREAM PROCEDURE FILLTHE(PRT25,ZIPARR);

      BEGIN
        DI ← ZIPARR;
        DS ← 29 LIT "CC EXECUTE RIMS/MPP;  COMMON=";
        SI ← LOC PRT25;
        DS ← 5 DEC;
        DS ← 22 LIT ": PRIORITY=2; END.     ";
      END OF FILLTHE;


    REAL STREAM PROCEDURE GETADDR(WORD);
      BEGIN
        SI ← WORD;
        GETADDR ← SI:
      END OF GETADDR;


    % THIS PROCEDURE IS USED DURING PROGRAM INITIALIZATION TO OBTAIN
    % THE ADDRESS OF EACH COMMUNICATION AREA IN THE PROCESSING PROGRAM.
    REAL STREAM PROCEDURE GETCOMADDR(COMAREA,T);
      VALUE COMAREA,T;
      BEGIN
        SI ← COMAREA;
        SI ← SI + 5;
```

```
    SI ← SC;
    SI ← SI + 1;
    DS ← 0 WDS;
    SI ← SI - 8;
    T(SI ← SI + 8);
    SI ← SI + 5;
    SI ← SC;
    SI ← SI + 1;
    DS ← 0 WDS;
    SI ← SI - 8;
    GETCOMADDR ← SI;
  END OF GETCOMADDR;

ARRAY ZIPARR[0:61];
VERSION ← 061669;
PUTONLINE ← PUTOFFLINE ← -1;
FILLTHE(PRT25,ZIPARR[*]);
ZIP WITH ZIPARR[*];
WAIT (GETADDR(PRT25),32767);
L ← 0;
TUBUFF ← 0&2[9:44:4]&00[14:44:4];
FRSTTERM ← 0;
LASTTERM ← 2;
CURRTERM ← 0;
NEXT ← 1;
BSIZEIN ← 56;
BSIZEOUT ← 112;
L ← 1;
TUBUFF ← 0&3[9:44:4]&00[14:44:4];
FRSTTERM ← 11;
LASTTERM ← 11;
CURRTERM ← 11;
NEXT ← 1;
BSIZEIN ← 56;
BSIZEOUT ← 112;
L ← 2;
TUBUFF ← 0&2[9:44:4]&08[14:44:4];
FRSTTERM ← 12;
LASTTERM ← 12;
CURRTERM ← 12;
NEXT ← 4;
BSIZEIN ← 28;
BSIZEOUT ← 56;
L ← 3;
TUBUFF ← 0&2[9:44:4]&10[14:44:4];
FRSTTERM ← 13;
LASTTERM ← 13;
CURRTERM ← 13;
NEXT ← 4;
BSIZEIN ← 28;
BSIZEOUT ← 56;
L ← 4;
TUBUFF ← 0&2[9:44:4]&12[14:44:4];
FRSTTERM ← 14;
LASTTERM ← 14;
CURRTERM ← 14;
NEXT ← 4;
BSIZEIN ← 28;
BSIZEOUT ← 56;
L ← 5;
TUBUFF ← 0&2[9:44:4]&14[14:44:4];
FRSTTERM ← 15;
LASTTERM ← 15;
CURRTERM ← 15;
```

```
NEXT ← 4;
BSIZEIN ← 28;
BSIZEOUT ← 56;
L ← 6;
TUBUFF ← 0&2[9:44:4]&04[14:44:4]);
FRSTTERM ← 16;
LASTTERM ← 17;
CURRTERM ← 16;
NEXT ← 1;
BSIZEIN ← 56;
BSIZEOUT ← 112;
T ← 0;
TERMADDR ← "A";
CUADDR ← " ";
TYPE ← 0;
T ← 1;
TERMADDR ← "B";
CUADDR ← " ";
TYPE ← 0;
T ← 2;
TERMADDR ← "C";
CUADDR ← " ";
TYPE ← 1;
T ← 11;
TERMADDR ← "A2";
TYPE ← 3;
T ← 12;
TYPE ← 4;
T ← 13;
TYPE ← 4;
T ← 14;
TYPE ← 4;
T ← 15;
TYPE ← 4;
T ← 16;
TERMADDR ← "A1";
TYPE ← 3;
T ← 17;
TERMADDR ← "A3";
TYPE ← 3;
FOR L ← 0 STEP 1 UNTIL LINEMAX DO
  BEGIN
    SEEK (DCIN(TUBUFF));
  END;
FOR T ← 0 STEP 1 UNTIL TERMMAX DO
  COMADDR ← GETCOMADDR(COMAREA,T);
END;

WHILE TRUE DO
  BEGIN
    IF ABORT THEN
      GO TO ABEND;
    IF PUTONLINE ≠ -1 THEN
      BEGIN
        FOR L ← 0 STEP 1 UNTIL LINEMAX DO
          FOR T ← FRSTTERM STEP 1 UNTIL LASTTERM DO
            IF T = PUTONLINE THEN
              BEGIN
                NEXT ← 1;
                IF NOT RAY THEN
                  BEGIN
                    OFFLINE ← 0;
                    SEEK(DCIN(TUBUFF));
                    POLLCYC ← 30;
                  END;
```

```
                GO TO L1;
              END;
L1:
        PUTONLINE ← -1;
      END;
    IF PUTOFFLINE ≠ -1 THEN
      BEGIN
        FOR L ← 0 STEP 1 UNTIL LINEMAX DO
          FOR T ← FRSTTERM STEP 1 UNTIL LASTTERM DO
            IF T = PUTOFFLINE THEN
              BEGIN
                IF NOT RAY THEN
                  BEGIN
                    OFFLINE ← 1;
                    IF TTY THEN
                      RELEASE(TUBUFF);
                  END;
                GO TO L2;
              END;
L2:
        PUTOFFLINE ← -1;
      END;
    FOR L ← 0 STEP 1 UNTIL LINEMAX DO
      IF NEXT < 3 THEN
        BEGIN
          GO TO LIST1[NEXT];


* WRITE OUTPUT MESSAGES AND POLL MESSAGES
NEXT1:
          FOR T ← CURRTERM + 1 STEP 1 UNTIL LASTTERM,
                  FRSTTERM     STEP 1 UNTIL CURRTERM DO
            IF OFFLINE ≠ 1 THEN
              IF TESTBIT(OPREADY,T)
                THEN
                  BEGIN
                    CURRTERM ← T;
                    IF NOT (CONRAC OR TC500) THEN
                      GO TO L3;
                    TERMESG(DCOUT[L](0),TERMPARM,0);
                    DCWRITE;
                    NEXT ← 9;
                    GO TO OUTPUTEX;
                  END
                ELSE
                  BEGIN
                    IF POLLTYPE THEN
                      IF (I ← TIME(1)) - POLLTIME > POLLCYC
                      OR I < POLLTIME THEN
                        IF RAYCTL OR TESTBIT(ACCEPT,T) THEN
                        BEGIN
                          CURRTERM ← T;
                          POLLTIME ← I;
                          TERMESG(DCOUT[L](0),TERMPARM,
                                  IF RAYCTL THEN 1 ELSE 2);
                          DCWRITE;
                          NEXT ← IF CONRAC OR TC500 THEN 3 ELSE 5;
                          GO TO OUTPUTEX;
                        END;
                  END;
          GO TO OUTPUTEX;


* WRITE ADDITIONAL DATA OUTPUT MESSAGES
NEXT2:
```

```
            T ← CURRTERM;
            IF TESTBIT(OPREADY,T) THEN
              BEGIN
                GO TO L4;
L3:
                IF NOT TTY THEN
                  TERMESG(DCOUT[L](0),TERMPARM,IF CONRAC OR TC500
                        THEN 5 ELSE 6);
                DCNT ← IF CONRAC OR TC500 THEN 6 ELSE IF RAY OR RAYCTL
                      THEN 8 ELSE 0;
L4:
                RESETBIT(OPREADY,T);
                IF NOT TTY THEN
                  OPTEDIT(COMADDR,TERMPARM,TYPE);
                SCNT ← 0;
L5:
                I ← MOVEFR(COMADDR,DCOUT[L](1),SCNT.[37:6],SCNT.[43:5],
                        DCNT.[37:6],DCNT.[43:5],IF BSIZEOUT - DCNT
                        ≥ 64 THEN 1 ELSE 0,BSIZEOUT - DCNT,MORE,
                        INSTBLK);
                INSTBLK ← FALSE;
                DCNT ← DCNT + I;
                SCNT ← SCNT + I;
                IF MORE AND (RAY OR RAYCTL) THEN
                  SCNT ← SCNT - RAYEDIT(DCOUT[L](1),I ← BSIZEOUT DIV 8,
                                  INSTBLK);
                IF MORE OR TESTBIT(ACCEPT,T)
                  THEN
                    BEGIN
                      DCWRITE;
                      DCNT ← 0;
                      IF MORE
                        THEN
                          GO TO L5
                        ELSE
                          NEXT ← IF TTY THEN 4 ELSE IF CONRAC OR TC500
                                THEN 10 ELSE 11;
                    END
                  ELSE
                    BEGIN
                      SETBIT(SCW,T);
                      NEXT ← 2;
                    END;
              END;
OUTPUTEX:
          END;


% GENERALIZED READ AND TEST FOR ERRORS
INPUT:
      READ LOCK (DCIN(0,IF ALLACCEPT(ACCEPT) THEN 1 ELSE 0),8,ARR[*])
              [INPUTEX:INPUT]];
      STWRD ← ARR[0];
      FOR L ← 0 STEP 1 UNTIL LINEMAX DO
        IF 0&STWRD[9:9:4]&STWRD[14:14:4] = TUBUFF THEN
          GO TO L6;
      L ← T ← 0;
      SPOWRITE(FMT1);
      GO TO INPUTEX;
L6:
      T ← CURRTERM;
      IF ABNORM
      OR INPUTERR
      OR NOTREADY THEN
        IF NEXT ≠ 6 THEN
```

```
        GO TO ERRORS;
      FW ← NFLAG(ARR[1]);
      GO TO LIST2[NEXT];


% RESPONSE TO RAYTHEON POLL
NEXT5:
      POLLCYC ← 60;
      IF FW.[18:6] = NODATA
        THEN
          GO TO NEXT6
        ELSE
          IF FW.[18:6] = INFO
            THEN
              BEGIN
                FOR T ← FRSTTERM STEP 1 UNTIL LASTTERM DO
                  IF FW.[36:6] = TERMADDR THEN
                    BEGIN
                      CURRTERM ← T;
                      GO TO NEXT4;
                    END;
                SPOWRITE(FMT2);
                GO TO NEXT6;
              END
            ELSE
              IF FW.[18:6] = RETRANS
                THEN
                  BEGIN
                    SPOWRITE(FMT3);
                    GO TO NEXT6;
                  END
                ELSE
                  BEGIN
                      SPOWRITE(FMT4);
                      GO TO NEXT6;
                    END;


% RESPONSE TO CONRAC AND TC-500 POLL
NEXT3:
      POLLCYC ← 60;
      IF FW.[6:12] = EOTGM THEN
        GO TO NEXT6;


% TELETYPE INPUT
NEXT4:
      IF NOT TESTBIT(ACCEPT,T) THEN
        GO TO NEXT6;
      RESETBIT(ACCEPT,T);
      DCNT ← 0;


% CONTINUATION OF DATA INPUT
NEXT7:
      IF DCNT < 128 THEN
        BEGIN
          MOVETO(ARR[1],COMADDR,DCNT.[37:6],DCNT.[43:5],
                IF 128 - DCNT > BSIZEIN THEN BSIZEIN ELSE 128 - DCNT);
          DCNT ← DCNT + BSIZEIN;
        END;
      IF FULLBUFF
        THEN
          NEXT ← 7
        ELSE
```

```
          BEGIN
            INPEDIT(COMADDR,ALT[*],TYPE);
            SETBIT(SCN,T);
            IF CONRAC OR TC500
              THEN
                BEGIN
                  TERMESG(DCOUT[L](0),TERMPARM,3);
                  DCWRITE;
                  NEXT ← 8;
                END
              ELSE
                NEXT ← 1;
          END;
      GO TO INPUTEX;


% BYPASS DATA INPUT MESSAGE
NEXT6:
      IF FULLBUFF
        THEN
          NEXT ← 6
        ELSE
          NEXT ← 1;
      GO TO INPUTEX;


% RESPONSE TO CONRAC AND TC-500 ACK
NEXT8:
      IF FW.[6:12] ≠ EOTGM THEN
        SPOWRITE(FMT8);
      GO TO NEXT6;


% RESPONSE TO CONRAC AND TC-500 SELECT
NEXT9:
      IF FW.[6:12] = ACKGM THEN
        GO TO L3;
      IF FW.[6:12] = NACKGM
        THEN
        ELSE
          SPOWRITE(FMT10);
      GO TO NEXT6;


% RESPONSE TO CONRAC AND TC-500 WRITE
NEXT10:
      IF FW.[6:12] ≠ ACKGM THEN
        IF FW.[6:12] = NACKGM
          THEN
            SPOWRITE(FMT11)
          ELSE
            SPOWRITE(FMT12);
      GO TO NEXT6;


% RESPONSE TO RAYTHEON WRITE
NEXT11:
      IF FW.[18:6] ≠ DRC
        THEN
          IF FW.[18:6] = DRI
            THEN
            . SPOWRITE(FMT5)
            ELSE
              SPOWRITE(FMT6);
      GO TO NEXT6;
```

```
% INPUT ERROR ROUTINE
ERRORS:
      IF TTY
        THEN
          SKTIME ← 0
        ELSE
          IF NOTREADY OR (RDREADY AND INPUTERR AND NOT ABNORM)
            THEN
              POLLCYC ← 1800
            ELSE
              SPOWRITE(FMT7);
      GO TO NEXT6;
INPUTEX:
      IF (I ← TIME(1)) - SKTIME > 900 THEN
        BEGIN
          SKTIME ← I;
          FOR L ← 0 STEP 1 UNTIL LINEMAX DO
            BEGIN
              T ← FRSTTERM;
              IF TTY AND OFFLINE ≠ 1 THEN
                BEGIN
                  STWRD ← STATUS(TUBUFF,1);
                  IF NOTREADY AND ATTACHED
                    THEN
                      BEGIN
                        RELEASE(TUBUFF);
                        IF NOT TESTBIT(ACCEPT,T) THEN
                          SETBIT(BREAKEY,T);
                        END
                    ELSE
                      IF NOT NOTREADY AND NOT ATTACHED THEN
                        SEEK(DCIN(TUBUFF));
                END;
            END;
        END;
    END;
 ABEND:
   RESETBIT(RUNNING,0);
   SETBIT(SCW,47-FRSTUBIT);
 END.
```

VI. MAIN PROCESSING PROGRAM

1. Introduction

The Main Processing Program is the principal functional unit of RIMS. It accepts input provided by Handler, processes the input and provides an output error message, a signal to continue message or the data requested by the remote terminal. Main Processing Program is composed of 26 main modules and a plurality of routine modules. The first modules, Dispatcher and First, receive terminal input from the Handler and transfer control to the proper command module. This specification will describe in detail the logical sequences of certain of the Main Processing Program command modules. Others not described herein in detail are set forth via the program listing.

2. Dispatcher Module

When data or a command is entered at a user's remote terminal and the central computer can accept the input, the Main Processing Program is loaded into core under control of the Master Control Program. The exact sequence of the Main Processing Program being brought into core was explained in connection with the Handler program. Entries at the remote terminals are accepted under control of the Handler program and transferred for processing by the Main Processing Program.

Figure 14B:
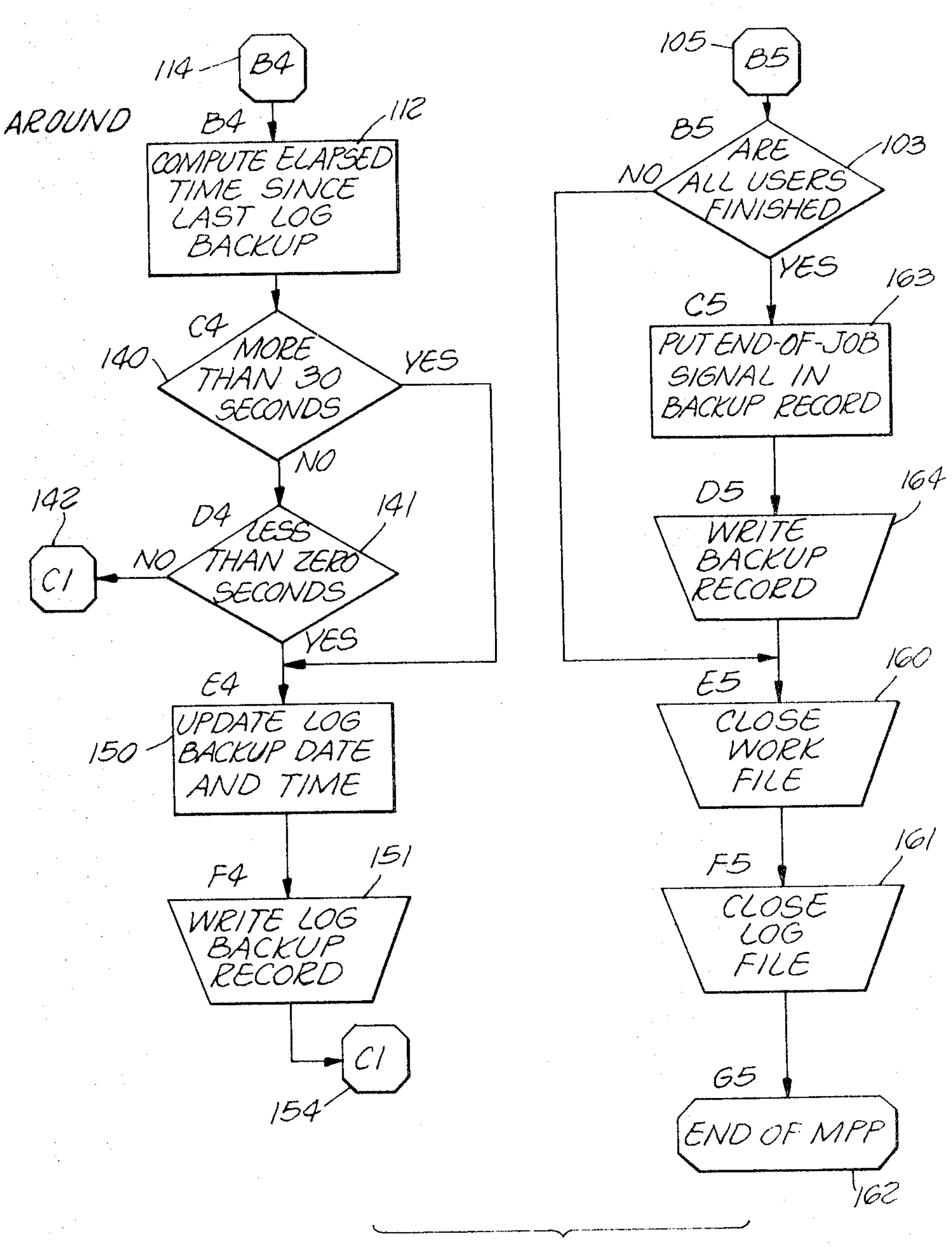
FIG. 14B is a second portion of the flow chart of FIG. 14A.

Referring to FIGS. 14A and 14B, the flow chart for the Main Processing Program Dispatcher module is shown. The Dispatcher module is the first and controlling module of the main processing program. The initial function of the Dispatcher module is to determine whether there is at least one potential user of the program. If there are no potential users, it causes the Main Processing Program to idle. If, on the other hand, there is at least one potential user of RIMS, the Dispatcher module checks each user in rotation to determine whether or not the Main Processing Program may do some processing for that user. If RIMS has nothing to process, the Dispatcher module remains idle.

As soon as the Dispatcher module finds that it may process something for a user, it initiates the processing by transferring control to one of three other modules, as will be explained below. Which of the three controls is transferred to is determined by the previous operation. When any of the three transferee modules complete processing, they return to the Dispatcher module at which time Dispatcher determines if any processing may be done for other potential users. If there are potential users waiting to be processed, the processing is accomplished by again transferring control to the proper one of the three transferee modules. If it finds no potential user, the Dispatcher module causes a temporary idle for the main Processing Program.

The detailed flow chart for the Main Processing Program Dispatcher module is shown in FIGS. 14A and 14B. Terminal block 100 represents the start of the Dispatcher module logical process.

Initialization block 101 performs a number of functions, all involving setting values, switches and so forth preparatory to execution of the Main Processing Program. Its initial function is to determine if a RIMS work file exists.

As explained herein Section IV–2, the work file is an area on disc allocated by the Main control Program solely for use by RIMS. Allocation occurs when the Master Control Program makes an entry to that effect in the disc directory, a list kept by the Master Control Program for determining which areas on disc are available and which are not. The result of the allocation is that no other program can access that portion of the disc.

Block 101 also controls such functions as loading of dictionaries, creation of the log file (a file containing the date and clock time). Details concerning the functions of block 101 may be found in the section of the Main Processing Program source listing headed Comment-Initialization Block.

Following initialization, step 102 checks a flag, which signifies whether the Main Processing Program should continue running. The running flag was turned On by initialization block 101 and will stay ON if the program is to continue. The only way the running flag will be OFF is if the Handler program or the computer console operator intervenes to stop running of the Main Processing Program. It should be noted that control may also be transferred to step 102 from steps 141 and 151 via connectors 142 or 154 and 143. Therefore, step 102 functions to check the running flag following each cycle of the Dispatcher module, as well as immediately after initialization step 101.

In those cases when step 102 determines that the running flag is OFF, control is transferred to step 103 via connectors 104 and 105. The portion of the flow chart headed by step 103 will be discussed below.

After step 102 determines that the running flag is ON, control transfers to step 107 which interrogates the condition of the Sleep Control Word (SCW). The Sleep Control Word is a binary word which has one bit uniquely corresponding to each user (terminal). If all bits of the Sleep Control Word are found by step 107 to be zero, there is no processing to be done by the Main Processing Program and control is transferred to sleep step 109.

Step 109 controls the computer to wait a predetermined length of time, in this program 30 seconds, or until a bit in the Sleep Control Word turns ON. In either case (passage of 30 seconds or a bit in the Sleep Control Word turning ON), control is transferred to Time Out step 110. If transfer to step 110 was at the end of the 30 second wait period, the "time was out" and control is transferred to step 112 via connectors 113 and 114. The flow chart headed by step 112 will be discussed below.

If, during the 30-second time period, a bit or bits in the Sleep Control Word turn ON, control is transferred to step 116 via step 110. Step 116 controls the computer to interrogate the condition of the bit of the Sleep Control Word next adjacent to the bit position pointed to at the time transfer to step 116 was effected. If the bit position occupied is an end bit at the time of transfer, step 116 controls a wraparound and the opposite end bit position is interrogated.

Following interrogation, step 117 determines whether, in the current series of interrogations, all user's bits have been interrogated. If so, control is transferred to step 112. The portion of the flow chart headed by step 112 will be discussed below.

If step 117 determines that all user's bits in the Sleep Control Word have not been checked, control is transferred to step 118. Step 118 controls the interrogation of the user's bit in the Sleep Control Word. If the bit checked is OFF, that is, zero, control is retransferred to step 116 which begins the interrogation with the next adjacent bit and the process is repeated. This looping continues until all user's bits have been checked and found to be zero, resulting in a transfer to step 112, or until a bit is found to be ON. In the latter case, step 118 transfers control to step 120 via connectors 132 and 121 which turns OFF the user's sleep control flag (bit) which originally caused the transfer. Following step 120, the user's code is assigned to the program in step 122 and the proper command procedures are begun under the control of steps 125, 127, 129 and 131.

As will be explained in connection with FIG. 15, transfer of control to step 127, entitled First module, leads into one of 24 programs, each program corresponding to a RIMS command. In two of the programs, View and List, it is possible that execution of the command will take more time than may be given to a single user. If this occurs, a portion of the servicing is accomplished and control returned to step 116 so that the next user may be serviced. Thereafter, when it is again the turn of the user who had entered the View or List command, control is transferred from step 125 to the continuation of View and List modules, steps 129 or 131, entered View 2 and List 2.

At the end of all commands, control is returned to step 116. Step 116 begins again the interrogation of each adjacent bit in the Sleep Control Word until either a user's bit is found to be ON or all user's bits are interrogated and found to be OFF, in which case transfer to step 112 from step 117 is effected.

When control is transferred to step 112, either as a result of all users' bits having been checked by step 118 or the reaching of a Time Out by step 110, step 112 computes the time lapse since the last log backup. The log backup is the step of writing the date and time in the disc log file, a file containing the current date and time.

Transfer out of sleep step 109 may be caused by a user's bit turning ON and the procedure time plus sleep time may be less than 30 seconds. In that case, step 140 transfers control to step 141 which determines whether the elapsed time is 0 or less seconds. The zero or less condition occurs when the day date in the log file has not been updated. If the elapsed time since the last log backup is determined by steps 140 and 141 to be more than 0 but less than 30 seconds, control is transferred to step 102 via connectors 142 and 143. In this case, the procedure discussed above beginning with the checking of the running flag by step 102 is repeated.

When the elapsed time is more than 30 seconds or computed to be 0 or less seconds by step 141, control is transferred from step 140 or step 141 to step 150 which determines the proper updated date and time for entry in the log file. Transfer is then effected to step 151 which writes the current update in the log and thereafter to step 102 via connectors 154 and 143. Transfer to step 102 begins again the sequence explained above.

Steps beginning with 103, reached when step 102 determines that the running flag is OFF, deal with the closing procedures of RIMS files.

If step 103 determines that all users are not finished even though the running flag is OFF, control is transferred to steps 160 and 161 which control closing of the RIMS work file and the log file. In this way, step 163, which has a function of putting an End-of-Job word in the backup record, is bypassed. In the case of a direct transfer from step 103 to step 160, the backup record contains the word Restart.

If step 103 determines that all users are finished, control is transferred to steps 163 and 164 which place the End-of-Job word in the backup record, resulting in the user's work area being cleared. Thereafter, transfer is effected to steps 160 and 161 and the sequence proceeds as discussed above.

Following step 161, terminal block 162 indicates the end of the Dispatcher module and the end of control by the Main Processing Program.

3. First Module

In the discussion of FIGS. 14A and 14B, the flow chart of the Dispatcher module, it was explained that control is transferred to step 127 for analysis and execution of an entry command. Step 127, termed the First Module, is disclosed in Figure 15.

The function of the First Module is to determine if the input from the user's remote terminal is a command or a data entry. If data, First determines the fact and transfers control to the Data module. If a command, First initially checks the validity of the command. If the command is found valid, First then checks whether the user has properly logged in at his terminal, if the present command is not a Log-In. If all conditions are met, First transfers control to the appropriate command module for execution of the command. Following execution of the command by the appropriate command module, control is returned to First and then to step 116 of the Dispatcher module (FIG. 14A).

As explained above, all commands entered at a remote terminal must satisfy a predetermined format. Each command must be preceded by an asterisk, followed by the proper abbreviation of the command, and so forth. For example, the Log-In command may take the form of "*LI: JOHN/1234." The asterisk denotes a command, LI is the abbreviation for Log-In, JOHN is the name of the terminal user and 1234 is his code number.

Figure 15:
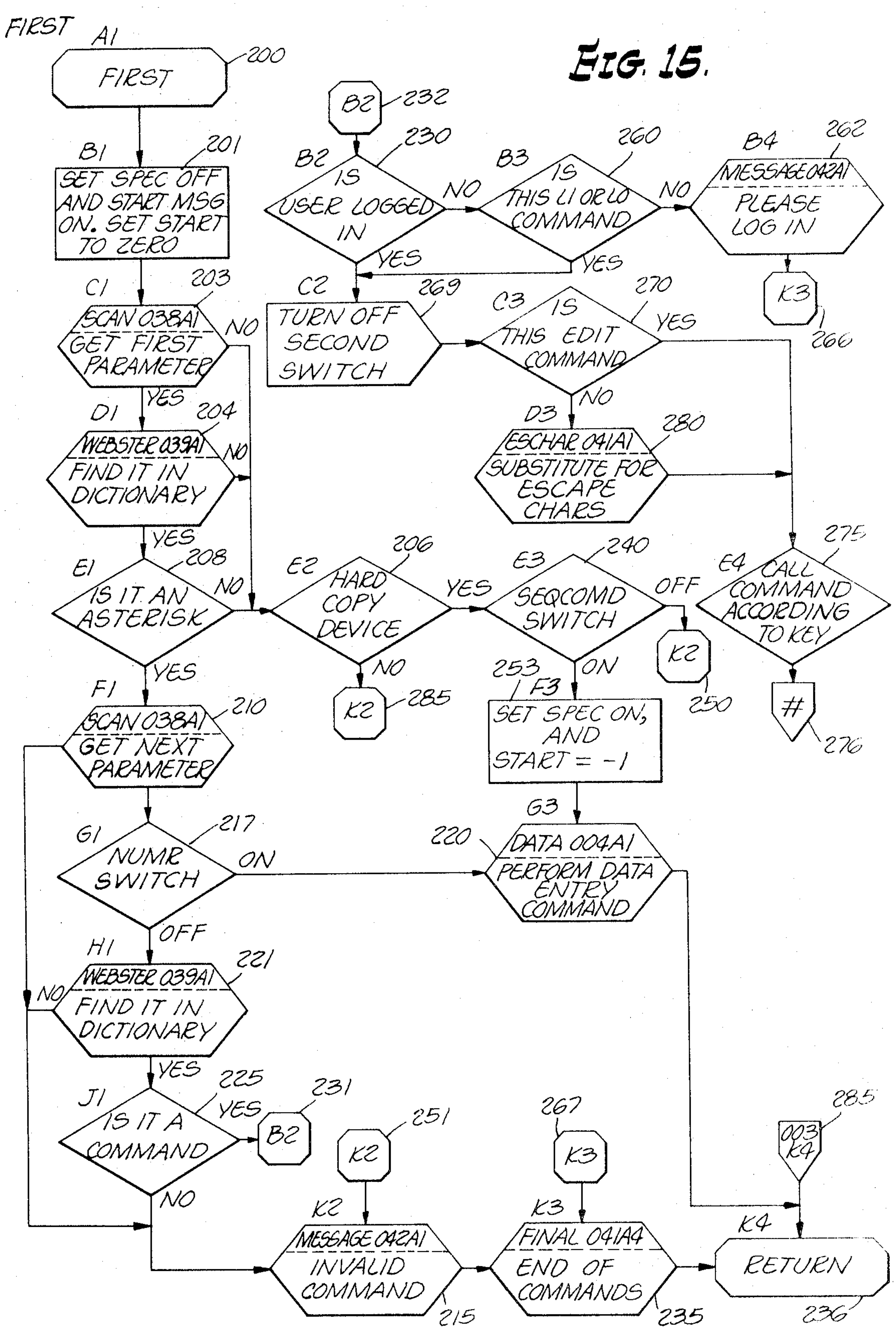
FIG. 15 is the flow chart of the first module of the MPP.

Referring to FIG. 15, the First module flow chart is shown, beginning with terminal block 200 which marks the start of the First Logical process. Step 201 initializes the First module by setting proper switches and notifying the Scan routine where to begin to scan the input. At the beginning, Scan starts at the zeroth bit position of entered characters. Subsequently, all of the entered characters are sequentially scanned. Step 201 also turns the Special Switch OFF. When data is entered, the OFF position of the Special Switch indicates that no sequence number is supplied with the data.

Following initialization, control is transferred to Scan step 203 for scanning of the first parameter. Input from the remote terminal may consist of a string of alphabetic and/or numeric characters, special characters, such as asterisks, symbols in quotes or a group mark. Scan reads the characters sequentially until it reaches a delimiter, which marks the end of the first parameter. Step 203 transfers control to Step 204 if any but the last was entered. Thus, Step 203 provides a YES answer if the input is anything except a group mark or blank followed by a group mark, in which case a NO decision is reached, transferring control to Step 206.

Step 204 compares the first parameter with all entries in the Dictionary. The Dictionary is a table in disc memory holding all commands, ALGOL delimiters, key words and format words. If the entry is found in the Dictionary, as would be the case had the entry been a command properly preceded by an asterisk, control is transferred to Step 208. If the entry is not found in the Dictionary, as would be the case with data following a sequence command or improper entries, control is transferred to step 206. Step 208 simply determines whether the first parameter compared with Dictionary entries in step 204 is an asterisk. If so, the entry is probably a command and control is transferred to step 210. If not an asterisk, control is transferred to step 206.

The basic function, then, of steps 203, 204 and 208, is to determine whether the entry is likely to be a valid command, that is, whether the entry is preceded by an asterisk. At this point, the command may still be invalid, as for example, an asterisk followed by a group mark.

Following determination that the first parameter is an asterisk, control is transferred to step 210 which scans the next parameter. Under control of this step, the Scan routine reads a string of alphanumeric characters ended by a delimiter. If no alphanumeric characters are found and instead, the second parameter is found to be a group mark or a group mark preceded by an asterisk, a NO answer is reached and control is transferred to step 215, which controls the remote terminal to print the message INVALID COMMAND to the user.

If alphanumerics are found by the Scan routine in step 210, their makeup is examined by step 217. Step 217 turns a number switch ON and transfers control to step 220 if the second parameter consists of all numbers. If any alphabetic characters are present in the second parameter, the number switch is turned or kept OFF and control transferred to step 221.

Step 221 matches the second parameter with the Dictionary entries and functions as explained in connection with step 204, above. If the parameter is not in the Dictionary, control is transferred to step 215 which generates the INVALID COMMAND message to the user. If the parameter is in the Dictionary, control is transferred to step 225 which determines whether the positive Dictionary comparison was a comparison of commands. If not, the INVALID COMMAND message is sent by step 215. If the comparison was a comparison of commands, control is transferred to Step 230 via connectors 231 and 232.

As may be readily appreciated, the function of steps 210, 217, 221 and 225 is to determine if the second portion of the entry satisfies the format requirement of a command. If so, the command is executed. If not, the user is sent an INVALID COMMAND message.

Following generation of an INVALID COMMAND message by step 215, control is transferred to step 235 which indicates that the system is ready to accept further input. Thereafter, control is returned to step 116 of FIG. 14A from terminal block 236.

If the first parameter of the entry was a group mark of an asterisk and a group mark (step 203), or was found not to be in the Dictionary (step 204), or was in the Dictionary but not an asterisk, control is transferred to Step 206. Step 206 determines whether the remote terminal being used for the entry is a hard copy device (i.e., not a video device, such as a teletype). This step is necessary because data entry requirements are different for video and hard copy terminals. When using video terminals, the user is required to precede data by a sequence number, either entered or supplied by a prior command. Hard copy devices do not have this requirement as the sequence numbers are automatically supplied by RIMS.

If the first parameter is a string of numbers, control is transferred to step 206 via step 204. If the remote terminal is a hard copy device, and no sequence number, therefore, is entered by the user, control is transferred to step 240. This step determines if the Sequence Command switch is ON or OFF. If ON, Sequence is in effect because the user has previously entered a Sequence command. Once Sequence is entered, the Sequence command switch stays ON through any number of data entries and is turned OFF only by a different following command. If Sequence is not in effect, control is transferred to step 205, via connectors 250 and 251, causing an INVALID COMMAND message to be sent to the user's remote terminal.

If Sequence is in effect, control is transferred to step 253 which turns the Special Switch ON, since data is being entered without userusupplied sequence numbers. In addition, step 253 controls the scan routine to begin its scan at the minus one bit position. Scan normally starts one bit position past the delimiter which precedes data accompanied by a sequence number by adding one to the scan position. In order to start with the zeroth character when data alone is being entered, unaccompanied by a sequence number, one is added to the minus one input bit position.

Following step 253, control is transferred to Data Module 220. It may be seen that data may be entered into a file in a number of ways. If the user is entering data from a hard copy device, he may enter a Sequence command and any amount of data. Since the Sequence command switch stays ON (step 240), control is transferred to Step 220 via Step 204, 206 and 253, causing the data to be entered. Secondly, data may be entered by a Data command, preceded with a command asterisk. If the entry is in the format "*data," control is transferred to step 220 via steps 208, 210 and 217.

Valid commands in the proper format cause a YES decision in step 225 and control is transferred to step 230 via connectors 231 and 232. Since the first command which a user must give at his terminal is Log In, step 230 determines whether the user has logged in. If not, Step 260 determines if the present entry is a Log In. If it is not, step 262 sends a message PLEASE LOG IN to the user's terminal. After the message is sent, control is transferred to step 235 via connectors 266 and 267 and then back to step 116 of the Dispatcher module as explained above.

If the user has previously logged in (step 230) or if the present command is a Log In (Step 206) control is transferred to step 269 which turns off the Sequence command switch. As explained in connection with step 240, once the Sequence command is given, Sequence is in effect (Sequence command switch is ON) until any further command is given. The further command entry turns off the Sequence command switch in step 269.

Following turnoff of the Sequence command switch, control is transferred to step 270 which determines whether the command entered is an Edit command which must be handled in a special fashion as will be explained below. If the command is Edit, step 275 controls the transfer to the Edit command module through connector 276. If the command is not Edit, step 280 generates the appropriate characters for use by the user's terminal. This is necessary because certain standard symbols are not found on some terminal devices and substitute characters, compatible with those devices must be used. Thereafter, control is transferred to Step 275 which transfers control to the appropriate command module.

Following execution of each command by the appropriate command module, control is returned via connector 285 and terminal block 236 to step 116 of the Dispatcher module. Thereafter, a new command or data may be entered at the terminal.

4. Data Module

As described in connection with the discussion of the flow chart of the First module in FIG. 15, data may be entered in the RIMS system in a number of ways. In each case, however, entry of data is under control of the data module (step 220 in FIG. 15). Flow charts for the Data command module are shown in FIGS. 16A, 16B and 17.

Figure 16A:
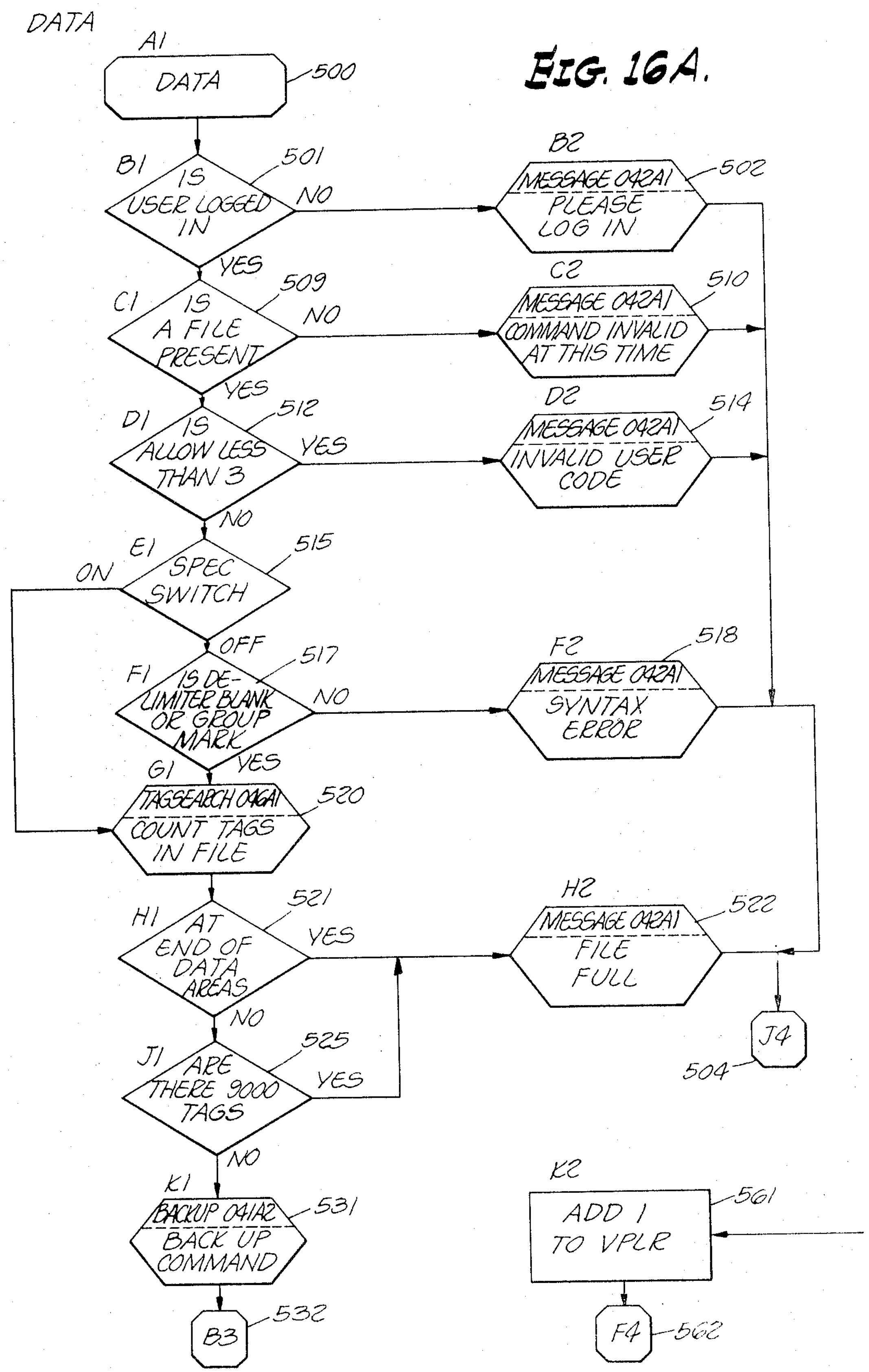
FIG. 16A is the first portion of the flow chart of the initial segment of the Data command module of the MPP.
Figure 16B:
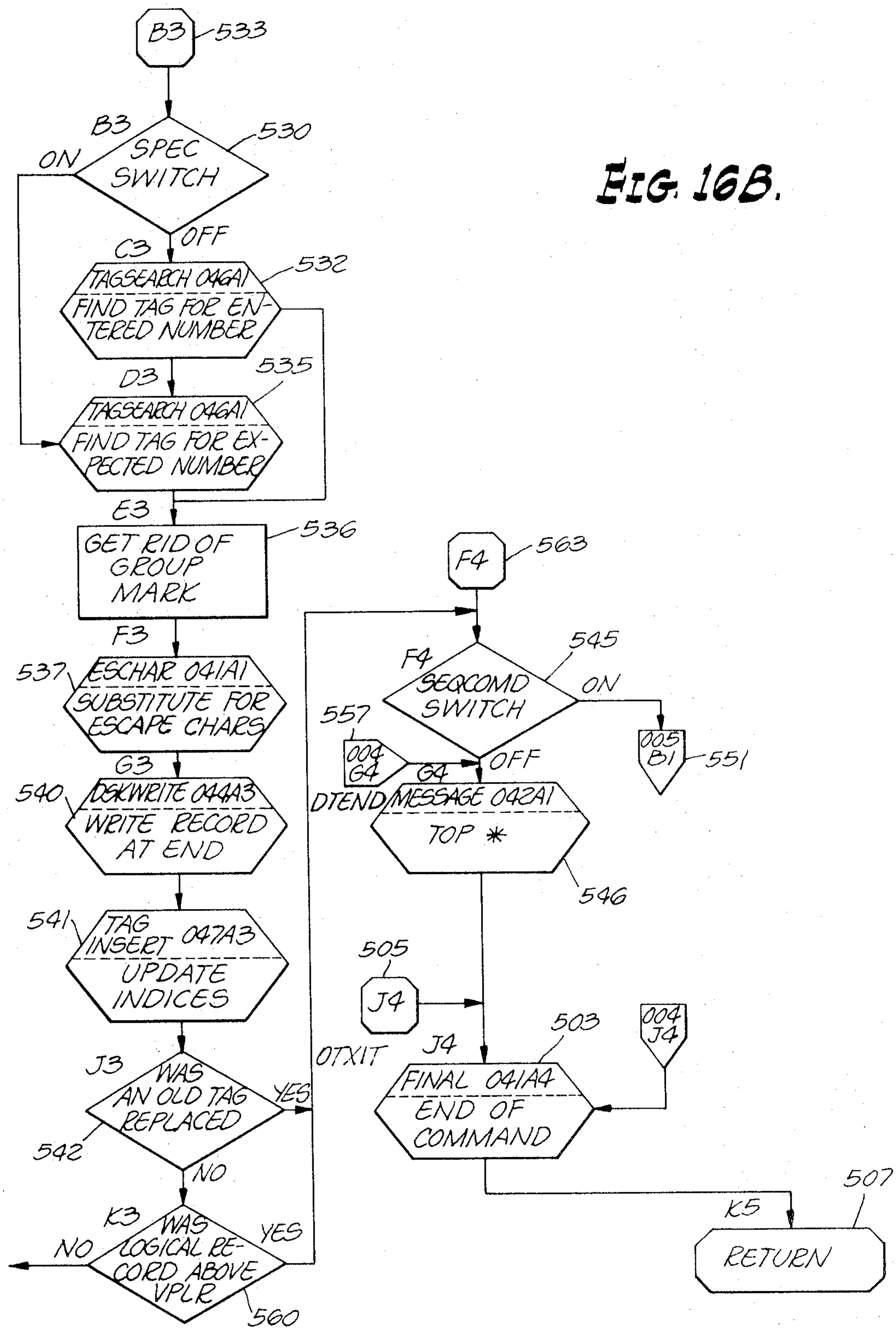
FIG. 16B is the second portion of the flow chart of FIG. 16A.
Figure 17:
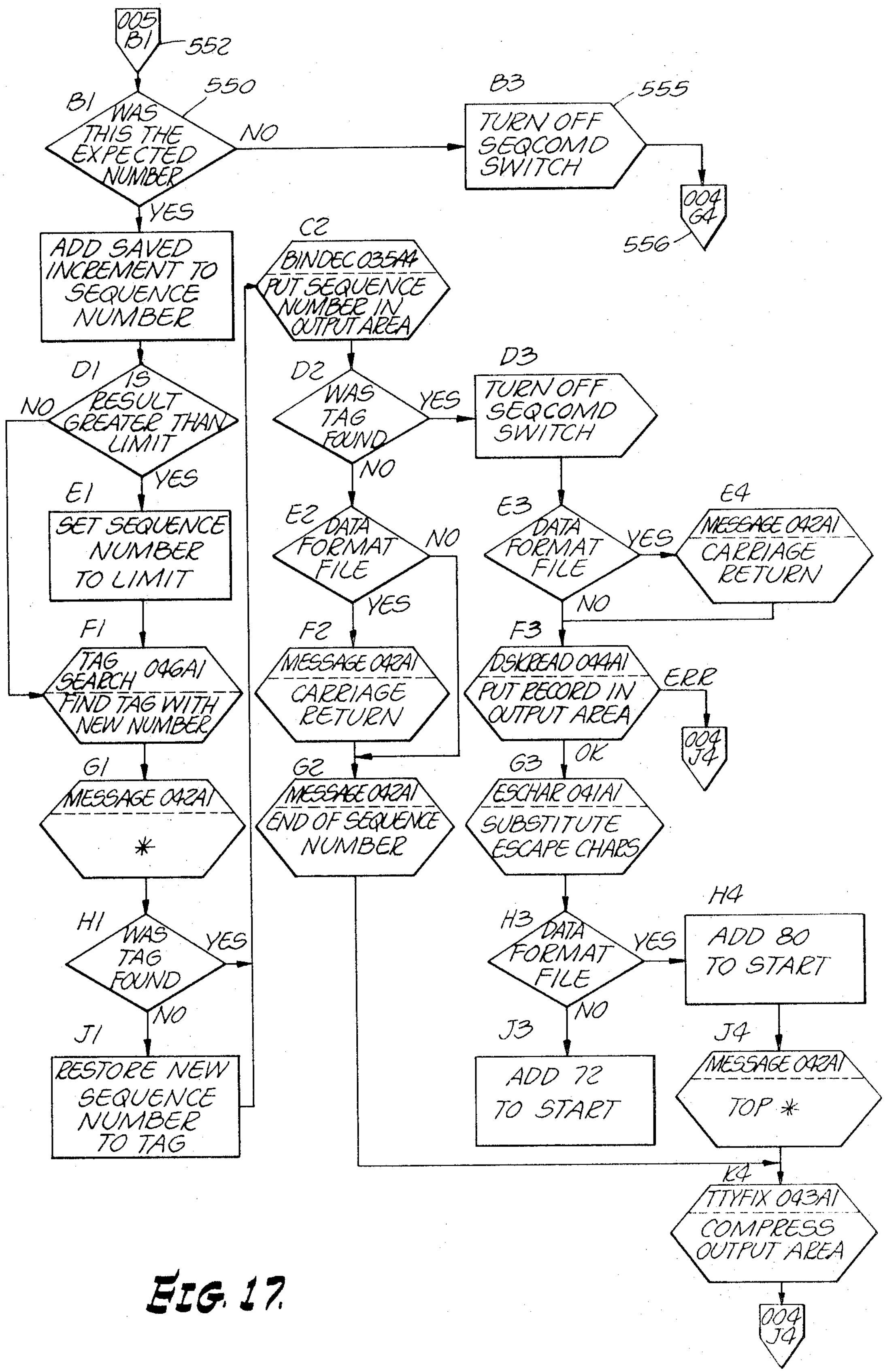
FIG. 17 is the flow chart of the final segment of the Data command module of the MPP.

Referring to FIGS. 16A and 16B, terminal block 500 indicates the beginning of the Data command logical sequence. Step 501 determines whether the user who entered the Data command at the terminal had previously logged in. If not, step 502 sends a message to the terminal user to PLEASE LOG IN. Thereafter, control is transferred to step 503 via connectors 504 and 505 to control the end of the Data command and the return to step 116 of the Dispatcher module of the Main Processing Program for the servicing of the next command.

If the present user had previously logged in, step 509 determines whether a file is present in the RIMS work area. For data to be entered, a receiving file must have been placed in some fashion in a work area in the RIMS work file. If no file is present, step 510 sends the message COMMAND INVALID AT THIS TIME to the entering terminal. Thereafter, return is made to the Dispatcher module via terminal block 507 as previously explained.

If step 509 determines that a file is present in the RIMS work area, step 512 determines whether ALLOW is less than three. This involves the security level of the user. If ALLOW is determined by step 512 to be less than three, the file cannot be changed and therefore a Data command may not be used to enter data. In that case, step 514 sends the message INVALID USER CODE to the terminal having entered the command whereafter return is made to the Dispatcher module via terminal block 507, as previously explained.

If the security level indicated by the user code is found to be satisfactory (three or more) step 515 determines whether the Special Switch is ON or OFF, depending upon whether or not the data is supplied with a sequence number. If step 515 finds the Special Switch to be OFF, step 517 determines whether the delimiter is a blank or group mark as it should be. If it is found not to be, step 518 sends a message to the terminal SYNTAX ERROR after which return is made via terminal block 507, as explained. If step 517 determines that the SYNTAX is proper, or if the Special Switch had been determined by step 515 to be ON, control is transferred to Tagsearch step 520. Tagsearch is a procedure which locates a given sequence numbered or logical record numbered tag in the RIMS work area and will count the number of tags in the file into which the data is to be loaded.

Step 521 determines whether the data areas are full, that is, whether there are 9000 records in the file. If there are, step 522 sends the message FILE FULL to the terminal after which control is returned via terminal block 507. If step 521 determines that all 9000 data areas are not full, step 525 determines whether there are 9000 tags. It is possible that there may be 9000 tags without there being 9000 data records since one data record may be referenced by more than one tag. In the case of a Duplicate command, for example, the tags are duplicated but not the records. Therefore, step 525 might determine that there are 9000 tags even though there are not 9000 data records and therefore transfer control to step 522 which sends the message FILE FULL to the terminal. If steps 521 and 525 determine that there is room for both data records and tags in the file being accessed, control is transferred to step 530 via steps 531 and connectors 532 and 533. As explained elsewhere herein, step 531, the Backup Command, is placed in the current program for future purposes and has no function herein. It may be seen in the backup routine flow chart in FIG. 54 that the only logical steps are an entry and return terminal block.

Step 530 senses the Special Switch discussed previously. If the Special Switch is OFF, Data was supplied with a sequence number. Step 532 thereafter locates a place in the tag files for the tag corresponding to the sequence number entered. If step 530 determined that the Special Switch was ON, step 535 similarly locates a tag for the expected sequence number from RIMS.

Following Tagsearch steps 532 and 535, steps 536 and 537 serve to edit the data input to delete group marks and substitute necessary characters.

Step 540 causes the data record to be written on disc. Thereafter, step 541 adds or replaces the proper tags in the Level 1 and Level 2 index blocks in the RIMS work area. Step 542 determines whether an old tag was replaced by the newly added data. If so, and step 545 is OFF, indicating that Sequence is not in effect, step 546 causes an asterisk to be sent to the terminal. Thereafter, return is made via terminal block 507, as previously explained.

If step 545 is ON by virtue of Sequence being in effect, control is transferred to step 550 in FIG. 17 via connectors 551 and 552. Step 550 determines whether the expected sequence number was received. If not, step 555 turns off the Sequence Command switch and returns to step 546 via connectors 556 and 557 (FIG. 16B). Thereafter, an asterisk is sent to the terminal by step 546 and control returned to the Dispatcher module.

Returning to FIG. 16, if step 542 determines that an old tag was not replaced, control is transferred to step 560 which determines whether the record inserted was above the VPLR, Viewed Previous Logical Record. VPLR's purpose is to keep the view pointer pointed at the last position examined. If the record inserted was above VPLR, control is transferred to step 545 and the process continued as indicated. If not, step 561 adds one to the VPLR value and transfers control to the step 545 via connectors 562 and 563. Thereafter, the sequence continues as explained previously.

FIG. 17 controls the remainder of the Data command if Sequence is in effect. The function of the remainder of the steps in FIG. 17 is primarily formating. The flow chart is straightforward and will not be explained in detail here.

5. Log In Module

Figure 18A:
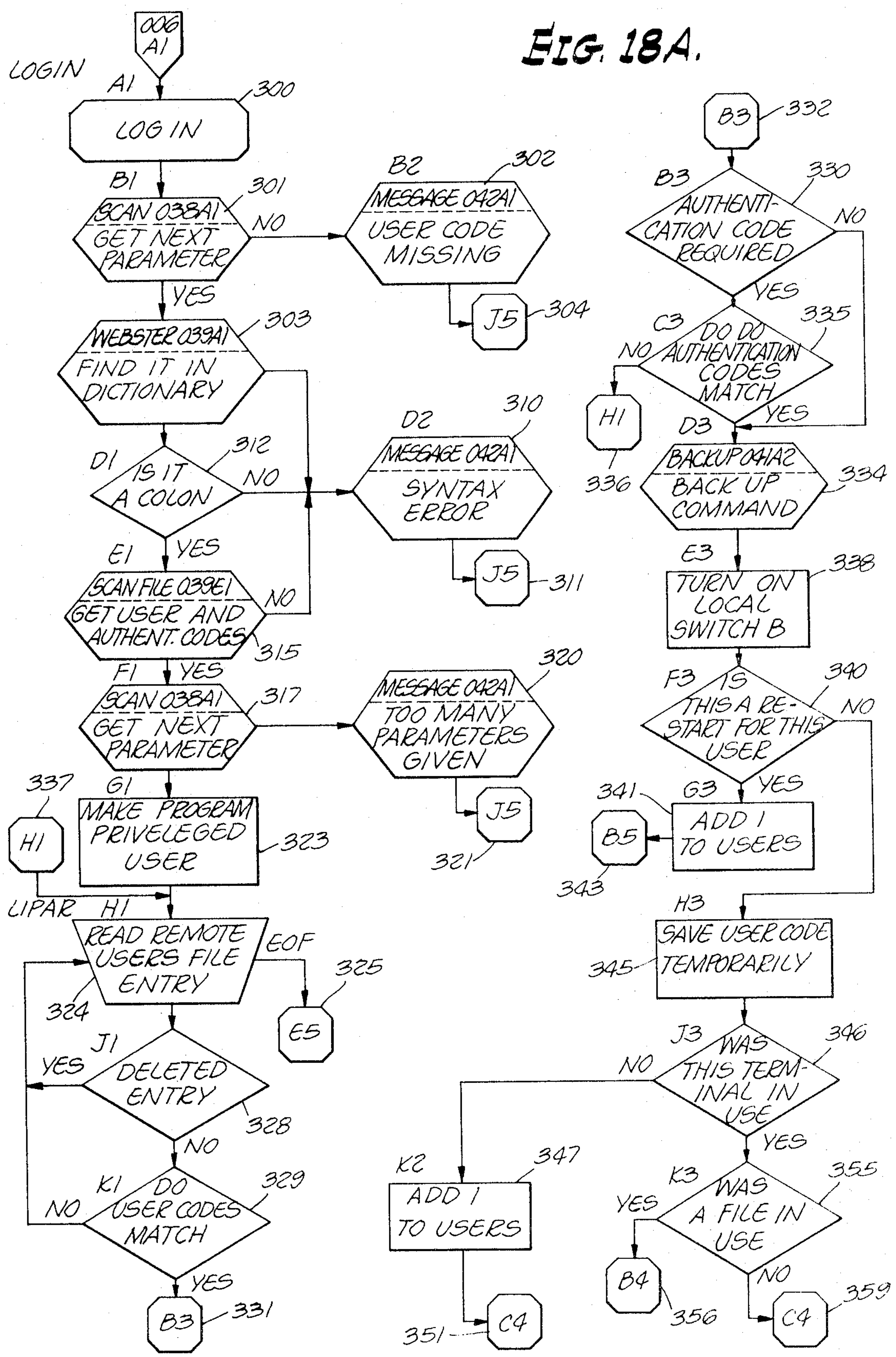
FIG. 18A is the first portion of the flow chart of the Log-In Command module of the MPP.
Figure 18B:
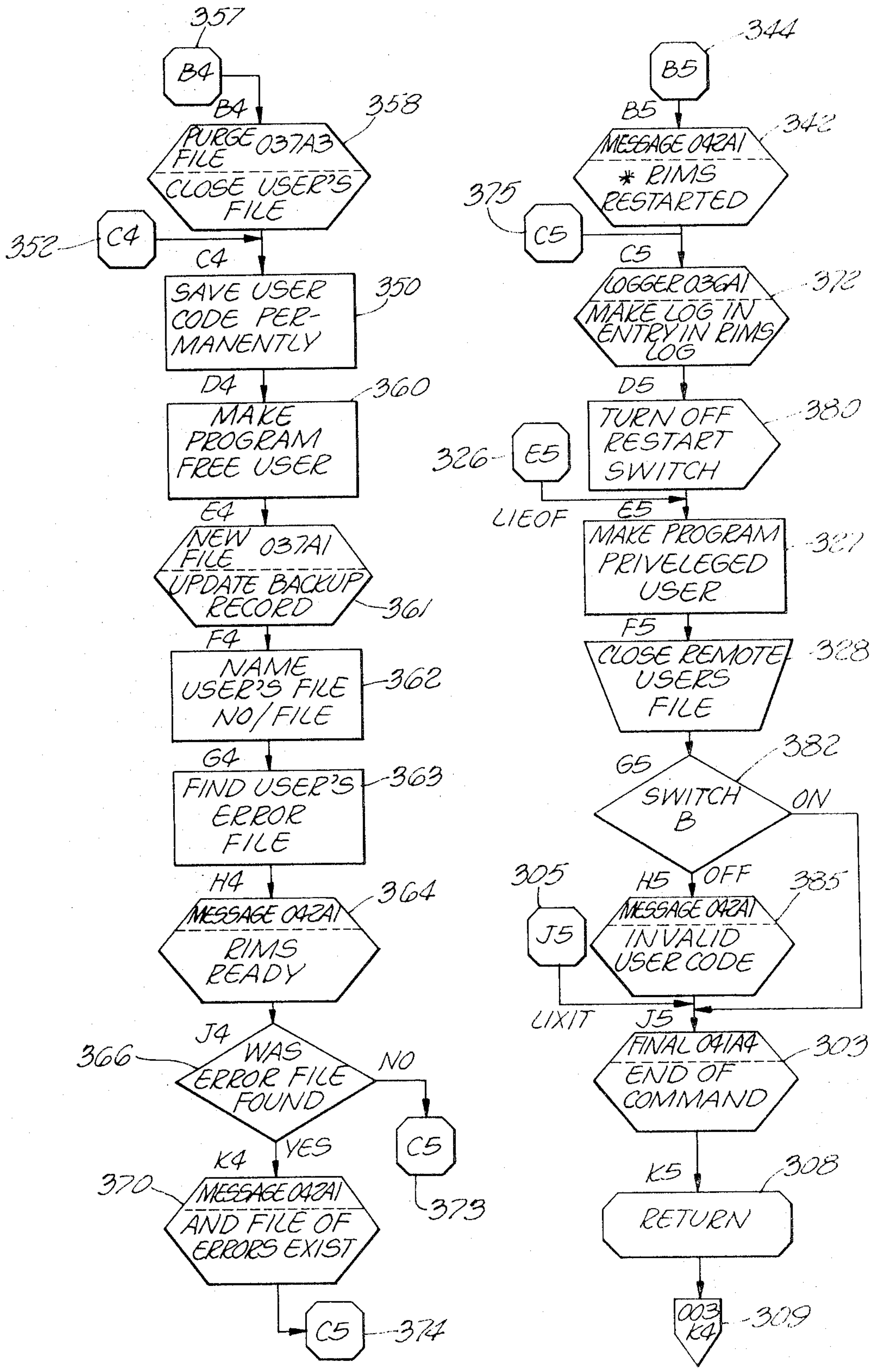
FIG. 18B is the second portion of the flow chart of FIG. 18A.

Referring to FIGS. 18A and 18B, the flow chart for the Log-In command module is shown. Log In must be the first entry from a remote terminal. No other entries will be accepted by RIMS until a successful Log In has been completed. The purpose of Log In is to enable RIMS to validate the user as an authorized user of the system.

The Log-In command follows the format "*LI: user/authentication." The asterisk is the special symbol which precedes all commands. "LI" is the abbreviation for the Log-In command. The colon mark serves as a delimiter. Blanks are not required on either side of the colon. The user code becomes part of the disc directory labeled for each file created from the terminal. For existing files, the Log-In command flow chart controls the comparison of the user code against the user code in the label of the disc. The result of the comparison determines whether the user is a valid user of the file. The / mark serves as a delimiter to separate the user code from the authentication code. The authentication code, as the name implies, is a code assigned to the user to further check his authority to use the system.

As explained in connection with the discussion of the First module, control is transferred from step 275 (FIG. 15) for all commands to the initial terminal block of the proper command module. Referring to FIG. 18A, terminal block 300 represents the beginning of the Log-In command logical process. Scan step 301 scans the input code for the proper user code according to the command format. If nothing is found between the initial colon and the following delimiter, control is transferred to step 302 which causes a message USER CODE MISSING to be sent to the remote terminal. Thereafter, control is transferred to step 303 via connectors 304 and 305 which causes termination of the Log-In command logic. Thereafter, control is transferred, via steps 308 and connector 309 back to step 236 of the First module. From there, control is transferred, as explained in connection with the First module, to step 116 of FIG. 14, the beginning of the polling loop in the Dispatcher module.

When a user code is found by step 301, step 303 determines whether the code is in the dictionary. The Webster procedure of step 303 is a go-between to and from the Look-Up procedure. It initializes proper variables, supplies proper parameters to the Look-up procedure and passes back the output of Look-up to the output of step 303. Look-up is a procedure which, in this case, compares the user code length and exact characters with the entries in the dictionary, a previously recorded table in memory. If the user code is not in the dictionary, control is transferred to step 310 which passes the message SYNTAX ERROR to the input terminal via connectors 311 and 305.

Step 312, to which control is transferred if step 303 locates the user code in the Dictionary, determines whether the user code is preceded with a colon. If it is not, the SYNTAX ERROR message is sent to the terminal. If it is a colon, control is transferred to step 315 which reads both the user and authentication codes in the input. If step 315 fails to find both codes, step 310 again sends the SYNTAX ERROR message to the remote terminal as before. If both codes are found, control is transferred to step 317 which determines whether there is a next parameter. If there is, control transfers to step 320 which causes the message TOO MANY PARAMETERS GIVEN to be sent to the terminal via connector 321. Thereafter, step 303 ends the Log-In command execution as previously explained.

The purpose of the module steps thus far is simply to monitor the input to determine whether the user code and authentication code is proper and to determine whether the command has the proper syntax. If all the requirements have been met, control is transferred to step 323 which makes the Logged-In user a privileged user of the program.

Step 324 actually compares the user's code with the codes in the user's file. The comparison is made one file entry at a time until a match or the end of the file is reached. If step 324 finds itself at the end of file, control is transferred, via connectors 325 and 326, to step 327. The function of the portion of the flow chart beginning with step 327 will be discussed below.

Following the reading of the remote user's file by step 324, control is transferred to step 328 where it is determined if the portion of the user's file read contained a deleted entry. If so, control is retransferred to step 324 where the following file entry is read. Looping continues until a nondeleted entry or the end of the file is reached. In case the end of file is reached, the transfer is via connector 325 and 326 to step 327 as explained above. When a nondeleted entry is found, step 329 determines whether the user code in the Log-In command matches the user code in the remote user's file. If it does not, the loop beginning with step 324 begins again. If there is a match, control is transferred to step 330 via connectors 331 and 332.

Step 330 functions to determine whether an authentication code is required. This is noted in the remote user's file as previously determined by file security requirements. If no authentication code is needed, control is transferred to step 334. In those cases, which would be the majority, which do require authentication codes, step 330 transfers control to step 335 which determines whether the authentication code in the command input format matches the authentication code in the remote user's file. If it does not match, control is transferred to step 324 via connectors 336 and 337 where the looping procedure is begun again.

If no authentication code was required or if the authentication code was required and found to match in the remote user's file, control is transferred to step 334. Presently, this step is a nonfunctioning step in the logical procedure and it is included to enable changes to be made in the future. The logical process continues through step 334 to step 338 which turns ON a local switch B. The purpose of the local switch is to indicate whether a proper user code has been entered. This fact will be used elsewhere in the Log-In flow chart.

Following the turning on of switch B by step 338, step 340 determines whether the current command is a restart for the present user. As explained elsewhere in connection with the RIMS work file, a restart occurs when the central computer is shut down by the console operator or a malfunction in the midst of a prior update from a terminal. In that case, the backup record in the RIMS work file contains information necessary to continue the user's work. The backup record indicates whether a restart is necessary or whether the prior user had finished with RIMS. If it is found to be a restart, step 341 adds one to the user's code in the backup record and control is transferred to step 342 via connectors 343 and 344. Step 342 transmits a message RIMS RESTARTED to the remote terminal. Thereafter, the user is free to continue his updating work.

If the present Log-In command does not represent a restart for the user Logging In, control is transferred to step 345 which causes the user code to be saved temporarily. The purpose of this step is to ensure that the following step 346 may determine whether the terminal was in use. If the user code is not saved temporarily, the answer to step 346 would always be YES. If the terminal was not in use, step 347 causes one to be added to the user's code in the backup record of the RIMS work file and transfers control to step 350 via connectors 351 and 352.

If the terminal had been in use, but had been determined by step 340 not to be a restart, control is transferred by step 355 and connectors 356 and 357 to step 358 which causes the closing of the user's file in the RIMS work file. If a file is not in use, there is no need to close the prior file and control is transferred to step 350 via connectors 359 and 352. Step 350 causes the user's code contained in the Log-In command to be saved permanently and step 360 controls the user's code to be assigned to the present program. Under the control of step 361, this information is inserted in the backup record in the RIMS work file.

Thereafter, control is transferred to Search step 363 which looks for the user's error file. After the search, step 364 causes the message RIMS READY to be sent to the remote terminal. Thereafter, the terminal user may begin to use the RIMS system.

Step 366 determines whether an error file was found. If so, the message AND FILE OF ERRORS EXISTS is added to the RIMS READY message previously sent under control of step 370. If no error file was found or if such a file was found and the proper message sent, control is transferred to step 372 via connectors 373 or 374 and 375.

Step 372 then causes a Log-In entry in the RIMS log after which step 380 turns off the restart switch. The restart switch stays off unless a computer malfunction or stoppage occurs during an update. Step 327 then makes the user a privilege user of the program after which the remote user's file is closed by step 328.

Step 382 determines whether local switch B, which indicates whether the user code is proper, was ON or OFF. If OFF, the user code is improper and step 385 controls transmission of a message INVALID USER CODE to the remote terminal. If the switch were ON, indicating that the proper user code had been found, and following the message of step 385, control is transferred to final block 303 which ends the Log-In command logical process. Thereafter, return is made to the Dispatcher module as explained above via step 308 in connector 309.

At this point, the user has logged in and has been informed that his terminal whether, in the case of the proper Log In, RIMS is ready to receive further commands or RIMS is Restarted in which case it is also ready to receive further commands. If the user does enter further commands, the sequence proceeds through the Dispatcher and First modules to the proper command module.

6. Log Out Module

Figure 19:
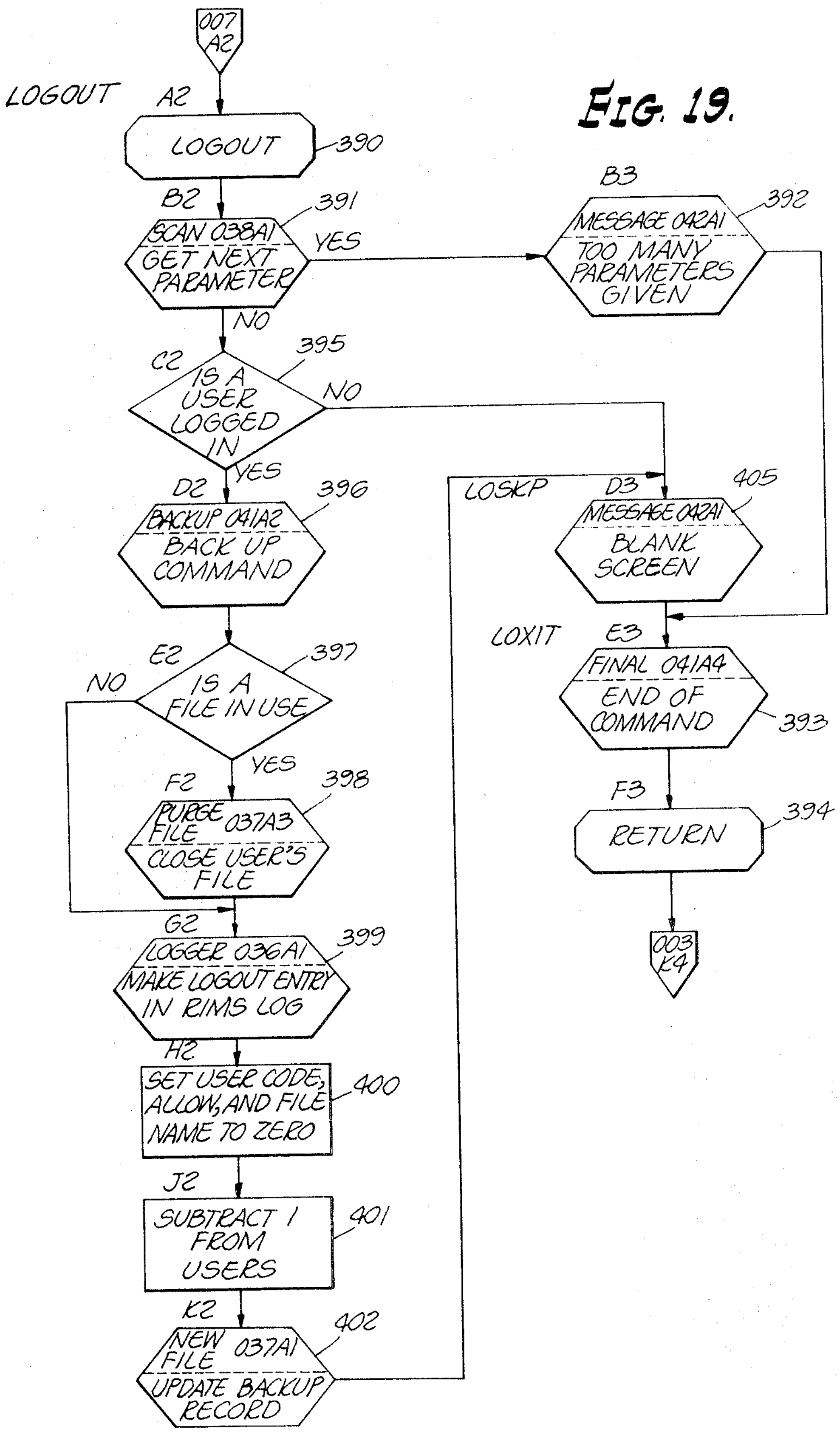
FIG. 19 is the flow chart for the Log Out command module of the MPP.

Referring to FIG. 19, the flow chart for the Log Out command is shown. The Log Out command indicates to RIMS that the user is finished with his remote terminal. It must be the last command entered by a user before leaving a terminal.

The Log Out command must take the form of "*LO." No other requirements need to be entered.

As explained in connection with the Dispatcher and First modules, an entry at a terminal preceded by an asterisk and followed by alpha characters is interpreted as a command. Control is shifted to the proper command module from step 275 of FIG. 15.

Referring to FIG. 19, terminal block 390 indicates the beginning of the Log Out module logical process. Steps 203 and 210 of the First module scan the input and read, in this case, the asterisk and the command abbreviation, LO. Scan step 391 looks for the following parameter. If one is present, an improper Log Out command was given and step 392 controls transmission of the message TOO MANY PARAMETERS GIVEN to the remote terminal. Following the message, control is transferred to step 393 which ends the Log Out command and via terminal block 394 control is returned to the First and Dispatcher modules.

If the Log Out command is given in the proper syntax, control is transferred to step 395 which determines whether a user had previously Logged In. If not, control is transferred to step 396 which blanks the screen of a video device and causes no transmission to a hard copy device. Thereafter, the command is ended and control returned via step 393 and 394 as previously explained.

If step 395 determined that a user had previously Logged In, control is transferred via step 396 to step 397. As explained in connection with the Log-In command, step 396 is a passage block and is included for future expansion of the program. Step 397 determines whether a user's file is in use in the RIMS work area. If so, step 398 closes the file. If a file is not in use, or following closing of the file, control is transferred to step 399 which makes the proper Log Out in the RIMS log. Step 400 changes the appropriate quantities and the backup record of the RIMS work area and step 401 subtracts one from the user's file in the RIMS system. Step 402 thereafter updates the backup record.

Following step 402, control is transferred to 396 where the Log Out command is terminated and returned to the First and Dispatcher modules.

7. Schedule Module

Figure 20:
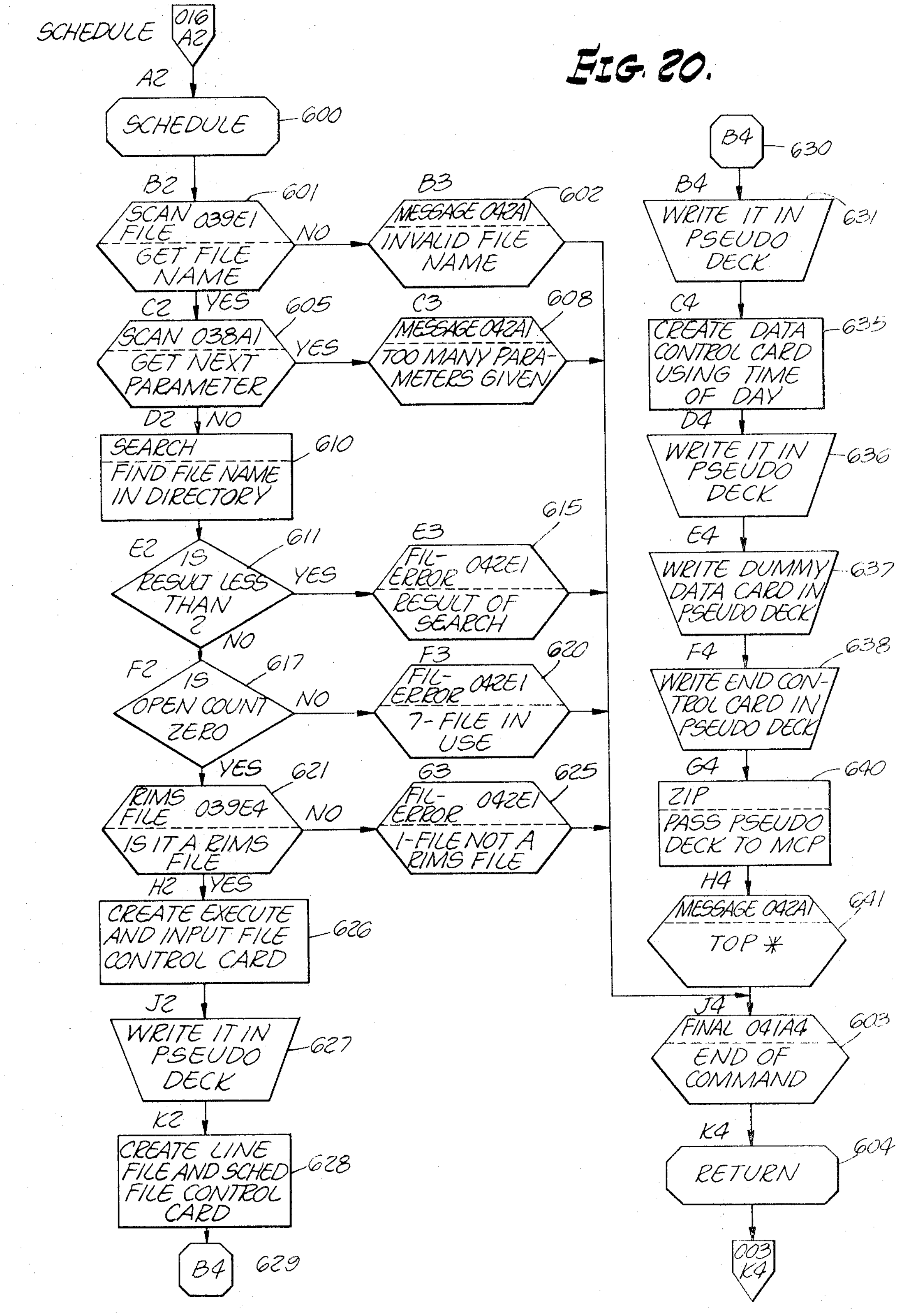
FIG. 20 is the flow chart for the Schedule command module of the MPP.

FIG. 20 discloses the Schedule command module of the Main Processing Program. The purpose of the Schedule command is to enable a program stored in a RIMS file to be automatically scheduled for execution by the central computer. For example, a RIMS file may contain a payroll program belonging to a terminal user. When the user wishes the central computer to print his payroll, he enters the Schedule command at his terminal. The Schedule command starts the Schedule program, a separate program which will be discussed in Section VII herein. It is the Schedule program which actually brings the RIMS file in for execution scheduling.

As has been explained, a file of data arranged according to this invention includes tags and other indexing data. A file in this form cannot be read by a compiler. The principal function of the Schedule sequence is to translate the RIMS-Indexed file to a sequentially indexed file for presentation to a compiler.

In order to inform the Master Control Program in the Burroughs system that the Schedule program is to be executed, it is a function of the Schedule command to create the proper control cards for communication with the Master Control Program. The Schedule program is stored on disc. Before it can be executed by the computer, it must be preceded and ended by certain control cards. The control card requirement is a necessity of the hardware and is not part of the RIMS system.

Referring to FIG. 20, terminal block 600 represents the beginning of the Schedule logical process. Step 601 scans the input command to obtain the file name entered at the terminal. If the file name is absent or not in the proper format, step 602 controls the message INVALID FILE NAME to be sent to the terminal from which the Schedule command was entered. Thereafter, control is returned via final block 603 and terminal 604 to the Dispatcher and First modules as explained elsewhere herein.

If step 601 locates a file name, step 605 checks for data in the command following the file name. Since the format of the command requires the command to be ended with the file name, step 608 controls the sending of the message TOO MANY PARAMETERS GIVEN to the entering terminal if a further parameter is found. Thereafter, control is returned via terminal block 604.

If steps 601 and 605 determine that the Schedule command inputs are in the proper format, control is transferred to step 610 which searches the file directory and returns a number of answers. For example, step 610 may return the fact that the file name is not in the directory or that the user is an invalid user. Results of the search are given numbered codes. Unacceptable results are number coded less than 2. Step 611 checks the results to see if an improper reply was made. If so, step 615 sends an error message to the terminal, after which return is made via terminal block 604.

If steps 610 and 611 establish that the file may be properly accessed, step 617 determines whether the file is in use. If the file is in use, the open count is not zero and step 620 sends the message FILE IN USE to the entering terminal, after which return is made via terminal block 604.

If the file is not in use and is available, step 621 determines whether it is a RIMS file. If it is not, the Schedule command cannot be used to Schedule the file for execution. If step 621 establishes that the file is not a RIMS file, step 625 sends the message FILE NOT A RIMS FILE to the entering terminal, after which return is made from terminal block 604.

If the file names is a RIMS file, control is transferred from step 621 to step 626 which creates a Master Control Program control card and places it in core. Thereafter, step 627 writes the control card on disc in a pseudodeck. It is called a pseudodeck because it is made to look exactly like a deck of cards. As a protective step, the control cards are placed on disc by step 627 so that they will survive a halt load which removes all the data in the computer core.

Steps 628 and 631, connected via connectors 629 and 630, create further control cards for the Master Control Program and write them in the pseudodeck. Step 635 creates a data control card using the time of day. This is done so that the Master Control Program will not wipe out the created control card as it would do with a blank card. Thereafter, steps 636, 637 and 638 insert the remainder of the control cards necessary for execution of the Schedule program in the pseudodeck.

Step 640 causes the pseudodeck to be passed to the Master Control Program which brings in the Schedule program which in turn will execute the named RIMS file. From this point, the Main Processing Program is no longer servicing a command and further commands may be entered from the same or other terminals in the usual fashion. The compilation and execution of the RIMS file takes place in the Burroughs B5500 independently of the operation of the RIMS Main Processing Program. To indicate that the terminal is again ready for entry of data or commands, step 641 returns an asterisk message to the terminal. Thereafter, return is made to the Dispatcher module via terminal block 604 as with the other commands herein.

8. Resequence Module

As explained in connection with the RIMS Commands section, Section IV–5, herein, the purpose of the Resequence command is to assign new sequence numbers to data existing in a RIMS Indexed file. It often happens that existing sequence numbers become crowded, making insertions of intermediate sequence numbers difficult, if not impossible. The Resequence command may be used to assign new sequence number to the existing data so that further insertions may be made.

An example of a proper Resequence command is "*RESEQ 100 100 : 165 2000." This command would arrange the data, presently having sequence numbers 165 through 2000 with new, evenly spaced sequence numbers beginning with 100 and having increments of 100.

Flow charts for the Resequence command are shown in FIGS. 21A, 21B and 22. Referring to FIGS. 21A, and 21B terminal block 700 indicates the beginning of the Resequence command logic. Step 701 first determines whether a RIMS file is present in the work area. The file would previously have been placed thereby either a Load or Create command. As with all types of updates, resequencing may only be accomplished on files previously located in a RIMS work area. If step 701 determines that no file is present in the work area, step 703 sends a message COMMAND INVALID AT THIS TIME to the terminal from which the command was entered. Thereafter, control is transferred to Final step 705 of FIG. 22A via connector 706 (FIG. 21) and 707 (FIG. 22) from where return is made to the Dispatcher module via ending terminal block 709.

If step 701 determines that a file is present in the RIMS work area, step 710 determines whether the user has a security level sufficient to resequence an existing file. If the word ALLOW is found to be less than 3, the user has an insufficient security classification and step 712 sends the message INVALID USER CODE to the terminal after which return is made via ending terminal block 709 (FIG. 22) via connectors 713 and 707.

After steps 701 and 710 determine that a file is in the work area and the terminal user may change the file, step 715 reads the Level 2 index block. As explained in connection with the File Organization, Section III herein, the Level 2 index block contains a one-work Level 2 tag count. This holds the number of tags in the Level 2 index and, therefore, the number of Level 1 index blocks. It is possible that a user may have entered a file via a Create command, but not followed by data records. Therefore, a Level 2 index block exists but is not followed by data records. In that case, step 717 determines that the Level 2 tag count is zero and step 719 sends a message NO RECORDS IN FILE to the entering remote terminal via terminal blocks 720 and 707 (FIG. 22) from where return is made to the Dispatcher module as previously explained.

If prior steps determine that a RIMS file is in the work area and it contains tags referencing data records, step 722 sets up all defaults. It is possible that in entering the Resequence command the user failed to give the base and increments of the new sequence numbers. In this event, the Resequence command automatically assigns default values of 100 for the base and 100 for the increment.

Following the default step, step 724 scans the next parameter in the entered command. Previously, the First module had scanned the first two parameters of the input command, * and RESEQ, so that the view pointer is at whatever follows the RESEQ word. If there is no parameter following RESEQ, control is transferred to step 725 via connectors 726 and 727. Step 725 is a Tagsearch routine for finding a tag for the default beginning sequence number. Thereafter, control is transferred to step 727 via connector 728 and 730. The portion of the flow chart headed by step 727 will be explained below.

When Scan step 724 finds a parameter following the RESEQ word, step 731 determines whether the parameter is a valid sequence number, as it would have to be in a properly formatted Resequence command. Step 731 determines whether the data appearing at the sequence number position consists of all numbers having six or fewer digits, as it must have to be a valid sequence number. If it is found to be invalid, step 733 sends the message INVALID SEQUENCE NUMBER to the entering terminal. Thereafter, control is transferred via connectors 735 and 707 (FIG. 22) to ending terminal block 709 from where return to the Dispatcher module is made.

If the parameter is found by step 731 to be a valid sequence number, step 738 saves the base number as a starting sequence number and transfers control to Scan step 740. Scan step 740 reads the next parameter in the input Resequence command which should be the increment number. If the increment is not found, control is transferred to Tagsearch step 725 via connectors 741 and 727 to find a tag for the nonsupplied increment value. Thereafter, control is transferred to step 727 via connectors 728 and 730. A discussion of the flow chart portion headed by step 727 will be given below.

The next parameter scanned by step 740 may either be the sequence number increment or the colon between the "to" portion of the Resequence command and the "from" portion. If Scan step 740 locates a parameter following the first "to" sequence number, control is transferred to step 745 via connector 746 and 747. Step 745 is the Webster procedure which determines whether the parameter scanned by step 740 is in the dictionary. If the parameter scanned by step 740 was a colon, the increment was not included by the terminal user. If the parameter is found in the dictionary, step 748 determines whether the parameter was colon. If so, control is transferred to Scan step 750 for reading the following parameter.

If the terminal user had entered an increment, step 745 would not find the parameter in the dictionary, and control would be transferred to step 752 to determine whether the increment is valid. The criteria for a valid increment is the same as for a valid sequence number, that is, it must consist of all numbers in six or fewer digits and, in addition, not be zero. If the increment is found to be invalid by step 752, control is transferred to step 755 via connectors 756 and 757. Step 755 sends the message INVALID INCREMENT TO THE entering terminal. Thereafter, control is transferred via connectors 760 and 707 (FIG. 22), and via terminal block 709 to the Dispatcher module.

If step 752 determines that the scanned parameter is a valid increment, step 758 saves the increment value. In order to be a valid increment, it must be nonzero in addition to the criteria tested in step 752. Therefore, step 760 determines whether the increment value is zero. If it is found to be, control is transferred to step 755 which causes the message INVALID INCREMENT to be sent to the terminal. Thereafter, return is made to the Dispatcher module as previously described.

If the increment is found to be valid, control is transferred to Scan step 762 for the reading of the following parameter. In a fully stated Resequence command, the parameter read by step 762 would be a colon. If no parameter is found, control is transferred to Tagsearch 725 via connectors 763 and 727. If the parameter is found, Webster Procedure 765 determines whether the parameter is in the dictionary. If it is not, step 768 causes the message SYNTAX ERROR to be sent to the entering terminal. Thereafter, control is transferred via connector 770 and 707 (FIG. 22) to the dispatcher module.

If Webster step 765 determines that the parameter is in the dictionary, step 772 determines whether the parameter found in the dictionary is a colon, as it should be. If not, a SYNTAX ERROR message is sent to the entering remote terminal by step 768. If it is found to be a colon, Scan step 750 reads the next parameter which should be the first of the old sequence numbers. If no next parameter is found, the command was improperly stated and the SYNTAX ERROR message is sent to the terminal. If the next parameter is located, control is transferred to step 775 via connectors 776 and 777.

Step 775 determines whether the scanned parameter is a valid sequence number, that is, whether it consists of all numerical characters with six or fewer digits. If not, control is transferred to step 733 via connectors 779 and 780. Step 733 sends an INVALID SEQUENCE NUMBER message to the entering terminal after which return is made to the Dispatcher module.

If the sequence number is found to be valid by step 775, step 781 stores the first of the old sequence numbers. Thereafter, Tagsearch procedure 782 locates the tag for the beginning sequence number. If the tag is not found, control is transferred to step 785 which generates the message SEQUENCE NUMBER (Sequence Number). Step 786 brings the parameter located by Scan, that is, the beginning of the old sequence numbers, into the output area so that it may form part of the message generated by step 785. Step 788 inserts a blank following the sequence number and step 790 adds the words NOT IN FILE to the message. Therefore, if sequence number 1200 is given in the command as the first record sequence number to be resequenced, and no such sequence number exists, steps 784 through 790 cause a message SEQUENCE NUMBER 1200 NOT IN FILE message to be sent to the remote terminal. Thereafter, control is transferred via connectors 791 and 707 (FIG. 22) to the Dispatcher module.

If step 784 locates the tag corresponding to the entered sequence number, step 793 causes the tag to be saved. Thereafter, Scan step 794 looks for a second parameter which would be the ending old sequence number. If the command format does not specify the ending old sequence number, the file will be resequenced to its end. In that case, control is transferred to step 725. If scan step 795 locates the last parameter, step 798 determines whether it is a valid sequence number according to the usual criteria. If it is not, control is transferred to step 733 via connectors 799 and 780 which sends the INVALID SEQUENCE NUMBER message to the terminal.

If the final sequence number is found in the command and found to be valid by step 798, step 800 sets program word to the entered sequence number. Thereafter, step 725 locates the tag for the last sequence number.

Control is then transferred to step 727 via connectors 728 and 730 where it is determined in Tagsearch procedure step 725 located the tag. If not, the step 785 message is sent to the remote terminal as previously explained. If the tag is located, control is transferred to step 802 which saves the location of the TO word tag. Thereafter, Scan step 803 determines whether there is a following parameter, which there should not be in a properly syntaxed command. If a parameter is found, step 806 sends the message TOO MANY PARAMETERS GIVEN to the terminal and control is transferred via connectors 808 and 707 (FIG. 22) to the Dispatcher module.

If step 803 determines that no parameter follows the last sequence number, control is transferred to step 810 to FIG. 22 via connectors 811 and 812. Tagsearch step 810 locates the limit for the to tag plus one. The limit is saved by step 815 as the starting tag location.

It will be recalled in connection with the discussion of FIGS. 21A and 21B that the first old sequence number value is assigned to program word "From" and the ending old sequence number is assigned to the program "To." Step 816 determines whether "From" is larger than "To." Step 816 determines whether "From" is larger than "To." If it is found to be, step 820 sends the message SEQUENCE NUMBERS IN WRONG ORDER to the terminal after which return is made via terminal block 709 to the dispatcher module.

If step 816 determined the magnitudes of the old sequence numbers to be proper, step 822 determines whether the new numbers will fit. That is, given the starting new sequence number supplied with the command and the increment supplied with the command, step 822 determines whether the final incremented sequence number will be larger than six digits. If so, step 825 sends the message INCREMENT TOO LARGE to the entering terminal, after which return is made to the Dispatcher module via terminal block 709.

If step 822 determines that all of the new sequence numbers will fit, step 826 determines whether the program word "-From" logical record value is zero. This occurs when the first of the old sequence numbers is not supplied in the Resequence command format. In such a case, the entire file is to be resequenced and control is transferred to Tagmove routing 827 which actually controls the resequencing of the tags.

If step 826 determines that the logical record number of the program word "From" is not zero, control is transferred to step 830 which determines whether the new starting number is less than the old first sequence number. If not, Tagmove procedure step 827 is again begun. If so, step 831 finds the lower limit of the "From" word by subtracting one from the number. If step 833 determines the new starting number to be lower, transfer is again made to Tagmove procedure step 827. If step 833 determines it to be higher, control is transferred to step 733 of FIG. 21 which causes the message INVALID SEQUENCE NUMBER to be sent to the entering terminal whereafter return is made to the Dispatcher module.

Following Tagmove procedure step 827, step 835 replies with an asterisk to the terminal indicating successful completion of the Resequence command. Backup command step 836 has no function herein as previously explained. Thereafter, return is made to the Dispatcher module via terminal block 709.

The purpose of the Resequence command module is to check the input command parameters and then call the service routine Tagmove which actually controls the resequencing.

9. Further Flow charts

Further flow charts, illustrating further commands, procedures and routines of the Main Processing Program are not shown. The source listing of the corresponding sections of the programs are, however, included. Therefore, one skilled in the art can readily understand the remaining portions of the programs.

10. Main Processing Program Listing

Following this section, written in extended ALGOL, is the source program listing for the Main Processing Program. It may be compiled in any compiler which will accept the language.

RIMS/MPP

RIMS/MPP IS THE MAIN PROCESSING PROGRAM OF THE RIMS SYSTEM. IT IS THIS PROGRAM THAT INTERPRETS AND PERFORMS ALL RIMS COMMANDS AND RETURNS TO THE RIMS HANDLER PROGRAM THE CORRECT RESPONSE.

EACH COMMAND IS A SEPARATE PROCEDURE, THUS THE CODE FOR A GIVEN COMMAND WILL NOT BE IN CORE UNTIL IT IS ACTUALLY NEEDED.

```
BEGIN

    DEFINE
        GM = "←" #,                    % LITERAL GROUP MARK
        ALFMT = 2 #,                   % VALUE FOR ALGOL FORMAT
        ALLOW = 42:6 #,                % 2 = LOOK, 3 = CHANGE, 7 = ALL
        BKUPTIME = 30 #,               % SECONDS BETWEEN LOG BACKUPS
        BLKSZ = 150 #,                 % SIZE OF TAG BLOCKS
        BUDATE = LOG1[1] #,            % MOST RECENT DATE
        BUTIME = LOG1[2] #,            % MOST RECENT TIME
        COFMT = 1 #,                   % VALUE FOR COBOL FORMAT
        CONRAC = "4" #,                % VALUE FOR CONRAC TERMINALS
        CRT = 1 #,                     % CRT DEVICE KIND
        DAFMT = 4 #,                   % VALUE FOR DATA FORMAT
        FOFMT = 3 #,                   % VALUE FOR FORTRAN FORMAT
        FRSTUBIT = 9 #,                % FIRST BIT OF SWITCH MASKS
        FSINCMT = 8:20 #,              % INCREMENT FOR SEQUENCE, DATA
        FSEQNO = 28:20 #,              % NEXT SEQUENCE NUMBER FOR DATA
        GOFIRST = 0 #,                 % SENDS DISPATCHER TO FIRST
        GOLIST2 = 2 #,                 % SENDS DISPATCHER TO LIST2
        GOSEQ2 = 3 #,                  % SENDS DISPATCHER TO SEQ2
        GOVIEW2 = 1 #,                 % SENDS DISPATCHER TO VIEW2
        GPFMT = 5 #,                   % VALUE FOR GP300 FORMAT
        HARDCOPY = 0 #,                % HARD COPY DEVICE KIND
        HDR = L2TAG[78] #,             % START OF HEADER INFORMATION
        KIND = 30:6 #,                 % 0 = HARD COPY, 1 = CRT
        LCNT = 20:14 #,                % LASTVIEWREC LINE COUNT FIELD
        LGTHLIM = 6 #,                 % LENGTH LIMIT FOR NUMBERS
        LINEMAX = 12 #,                % HIGHEST LINE NUMBER ON CRT
        LINES = 24:6 #,                % DEFAULT BY DEVICE TYPE
        LINMAX = 15 #,                 % HIGHEST WORD IN ARRAY LINE
        LISTLIM = 1000000 #,           % MAXIMUM RECORDS TO LIST
        LOGNO = LOG1[0] #,             % LAST RECORD # FOR RIMS/LOG
        LSEOF = 8:20 #,                % EOF POINTER FOR LISTING
        LSLIM = 28:20 #,               % NUMBER OF RECORDS TO LIST
        LSREC = 28:20 #,               % CURRENT RECORD BEING LISTED
        LSRL = 13:11 #,                % RECORD LENGTH IN LISTED FILE
        LSSECT = 24:4 #,               % SECTION OF LISTED RECORD
        LSTLGTH = 80 #,                % SIZE OF ONE LIST SECTION
        L2COUNT = L2TAG[77] #,         % NUMBER OF LEVEL 2 TAGS
        L2EOF = L2TAG[87] #,           % LAST RECORD WRITTEN LAST TIME
        L2FMT = L2TAG[76] #,           % WORD CONTAINING FILE FORMAT
        MAXTAGS = 9000 #,              % MAXIMUM NUMBER OF TAGS IN FILE
        NBKUPS = 5 #,                  % # OF ITEMS PER USER IN BACK-UP
        NDEVS = 4 #,                   % # OF DEVICE TYPES SUPPORTED
        NUSERS = (UMAX + 1) #,         % NUMBER OF POSSIBLE USERS
        RAY = "1" #,                   % VALUE FOR RAYTHEON TERMINALS
```

```
        RECSZ = 30 #,                       % RECORD SIZE FOR DATA ON DISK
        RELREC = 34:14 #,                   % RECORD ADDRESS FIELD OF TAGS
        RELRECMAX = 10139 #,                % HIGHEST REL REC IN FILE
        SEQLIM = 1000000 #,                 % MAXIMUM SEQ NO = 999,999
        SEQNO = 11:20 #,                    % SEQUENCE NUMBER FIELD OF TAGS
        SPECHRWDS = 14 #,                   % # OF SPECIAL CHAR GROUPS
        TAGBLOCKMAX = 74 #,                 % HIGHEST TAG BLOCK NUMBER
        TAGMAX = 149 #,                     % HIGHEST TAG NUMBER PER BLOCK
        TAGNORM = 120 #,                    % NORMAL # OF TAGS PER BLOCK
        TCNT = 40:8 #,                      % TAG COUNT FIELD OF L 2 TAGS
        TC500 = "2" #,                      % VALUE FOR TC500 TERMINALS
        TTY = "3" #,                        % VALUE FOR TELETYPE TERMINALS
        TYPE = 36:6 #,                      % 1 = CRT, 2 = TC500, 3 = TTY
        UMAX = 17 #,                        % HIGHEST USER (TERMINAL) NUMBER
        VISTID = L2TAG[VSTID] #,            % RIMS FILE IDENTIFICATION
        VNDX = 16:4 #,                      % CURRENT INDEX INTO VWARRAY
        VPLR = 10:14 #,                     % PREV. LOGICAL RECORD VIEWED
        VSTID = 75 #,                       % RIMS FILE IDENTIFICATION
        VREC = 34:14 #,                     % LASTVIEWREC LOG. REC. FIELD
        VWND = 1:1 #,                       % VIEW NODOC FLAG
        V2FMT = 12:4 #,                     % FORMAT SAVED FOR VIEW
        WKSZ = 76 #;                        % # OF BLOCKS PER WORK AREA

%   THE FOLLOWING DECLARATIONS MUST OCCUPY PRT LOCATIONS AS SHOWN
    INTEGER
        PRT25;                              % ADDRESS OF PRT 25 OF HANDLER
    BOOLEAN
        SCW,                                % SLEEP CONTROL WORD
        ACCEPT,                             % MASK SET TO ALLOW INPUT
        OPREADY,                            % OUTPUT IS READY TO WRITE
        BREAKEY,                            % MASK SET BY BREAK KEY
        RUNNING;                            % FALSE MEANS EOJ
    SAVE ALPHA ARRAY
        LINE [O:UMAX, O:LINMAX];            % USERS I/O AREAS
    INTEGER
        USERS,                              % CURRENT NUMBER OF USERS
        VERSION;                            % DATE OF COMPILATION
%   THE PRECEDING DECLARATIONS MUST OCCUPY PRT LOCATIONS AS SHOWN

    BOOLEAN
        CREATESW,                           % CREATE IN PROGRESS MASK
        FIRSTVIEW,                          % FIRST TIME SWITCHES FOR VIEW
        FOUND,                              % TAGSEARCH FOUND REQUESTED TAG
        LISTING,                            % MASK SET BY LIST COMMAND
        L1CHANGED,                          % L 1 BLOCK CHANGED SINCE READ
        L2CHANGED,                          % L 2 BLOCK CHANGED SINCE READ
        NUMR,                               % SCANNED WORD WAS NUMERIC ONLY
        PRESENT,                            % PACKET BEING UPDATED MASK
        RESTART,                            % MASK MEANING MAY BE RESTART
        SEQCOMD,                            % MASK SET BY SEQUENCE COMMAND
        SPEC,                               % SCANNED ONE SPECIAL CHARACTER
        STARTMSG,                           % FIRST TIME MESSAGE IS CALLED
        VIEWFBOK;                           % * V F AND * V B ALLOWED MASK
    INTEGER
        JUNK,                               % INTEGER JUNK
        CLASS,                              % CLASS OF DICTIONARY WORD
        KEY,                                % KEY OF DICTIONARY WORD
        LENGTH,                             % LENGTH OF SCANNED WORD
        QUOTES,                             % QUOTE COUNT (0 OR 2)
        TAG,                                % ACTUAL LEVEL 1 TAG FOUND
        TIMER,                              % DELAY TIME TILL LOG BACK-UP
        USER;                               % INDEX TO CURRENT USER
    REAL
        REEL,                               % REAL JUNK
        LASTAGBLK,                          % LAST NON-ZERO BLOCK READ
```

```
    LASTXUSER,                          % LAST TAGREAD USER (NON-ZERO)
    LASTOUSER,                          % LAST TAGREAD USER (ZERO)
    LOGREC,                             % LOGICAL RECORD NUMBER
    PREFIX,                             % PREFIX FROM SCANFILE
    SUFFIX,                             % SUFFIX FROM SCANFILE
    TAGLOC;                             % PHYSICAL TAG LOCATION ON DISK
ALPHA ARRAY
    ESARY [0:7],                        % FOR ESCAPE CHAR CONVERSION
    WORD [0:LINMAX],                    % CONTAINS SCANNED WORDS
    DICT [0:56],                        % KEY WORD DICTIONARY
    DOCT1 [0:52],                       % MESSAGE ASSEMBLY POINTERS
    DOCT2 [SPECHRWDS:63],               % MESSAGE ASSEMBLY WORDS
    DOCT3 [1:NDEVS,0:2×SPECHRWDS-1];% SPECIAL CHARS FOR EACH DEVICE
INTEGER ARRAY
    GOTO,                               % WHERE TO GO NEXT
    PREVBLOCK,                          % LAST BLOCK READ BY DSKREAD
    START [0:UMAX],                     % POINTER INTO LINE[USER]
    TAGROW [0:NUSERS];                  % POINTER TO USERS WORK AREA
REAL ARRAY
    BKUP,                               % CONTAINS BACK-UP RECORD
    L1TAG,                              % LEVEL 1 TAG BLOCK WORK AREA
    L2TAG [0:TAGMAX],                   % LEVEL 2 TAG BLOCK WORK AREA
    CANDO,                              % WHAT THIS USER CAN DO
    LASTVIEWREC,                        % LAST LOGICAL RECORD FOR * V
    SEQLIMIT,                           % SEQUENCE NO. LIMIT FOR DATA
    SEQSEQ,                             % NEXT SEQNO. AND INC. FOR DATA
    USERCODE [0:UMAX],                  % USER CODES
    VWARRAY [0:UMAX,0:LINEMAX],         % STORED TAGS FOR VIEW2
    LOG [0:29],                         % CONTAINS RIMS/LOG RECORDS
    LOG1 [0:2],                         % CONTAINS LOG #, DATE, & TIME
    SRCH [0:13];                        % USED FOR SEARCHES AND ZIPS
FILE
    SRCHFILE DISK SERIAL [20:30] (1,10,30),     % SEARCHING FILE
    TAGFILE DISK RANDOM "RIM " "TAGFILE" (2,150),  % WORK FILE
    LOGFILE DISK RANDOM "RIMS" "LOG" (2,30),       % LOG FILE
    SPO 11 (1,10),                         % OPERATOR MESSAGE FILE
    USER0FILE DISK RANDOM (1,RECSZ),       % USER 0 PERMANENT FILE
    USER1FILE DISK RANDOM (1,RECSZ),       % USER 1 PERMANENT FILE
    USER2FILE DISK RANDOM (1,RECSZ),       % USER 2 PERMANENT FILE
    USER3FILE DISK RANDOM (1,RECSZ),       % USER 3 PERMANENT FILE
    USER4FILE DISK RANDOM (1,RECSZ),       % USER 4 PERMANENT FILE
    USER5FILE DISK RANDOM (1,RECSZ),       % USER 5 PERMANENT FILE
    USER6FILE DISK RANDOM (1,RECSZ),       % USER 6 PERMANENT FILE
    USER7FILE DISK RANDOM (1,RECSZ),       % USER 7 PERMANENT FILE
    USER8FILE DISK RANDOM (1,RECSZ),       % USER 8 PERMANENT FILE
    USER9FILE DISK RANDOM (1,RECSZ),       % USER 9 PERMANENT FILE
    USR10FILE DISK RANDOM (1,RECSZ),       % USR 10 PERMANENT FILE
    USR11FILE DISK RANDOM (1,RECSZ),       % USR 11 PERMANENT FILE
    USR12FILE DISK RANDOM (1,RECSZ),       % USR 12 PERMANENT FILE
    USR13FILE DISK RANDOM (1,RECSZ),       % USR 13 PERMANENT FILE
    USR14FILE DISK RANDOM (1,RECSZ),       % USR 14 PERMANENT FILE
    USR15FILE DISK RANDOM (1,RECSZ),       % USR 15 PERMANENT FILE
    USR16FILE DISK RANDOM (1,RECSZ),       % USR 16 PERMANENT FILE
    USR17FILE DISK RANDOM (1,RECSZ),       % USR 17 PERMANENT FILE
    USR18FILE DISK RANDOM (1,RECSZ),       % USR 18 PERMANENT FILE
    USR19FILE DISK RANDOM (1,RECSZ);       % USR 19 PERMANENT FILE
    SWITCH FILE UFILE :=
        USER0FILE, USER1FILE, USER2FILE, USER3FILE,
        USER4FILE, USER5FILE, USER6FILE, USER7FILE,
        USER8FILE, USER9FILE, USR10FILE, USR11FILE,
        USR12FILE, USR13FILE, USR14FILE, USR15FILE,
        USR16FILE, USR17FILE, USR18FILE, USR19FILE;

LABEL AROUND;
```

```
STREAM PROCEDURE CMOVE (CMF,CMT,CMSKS,CMSKD,CML);
    COMMENT

        CMOVE MOVES CML (LENGTH) CHARACTERS FROM CMF (FROM WORD
    ADDRESS) + CMSKS (SKIP SOURCE CHARACTERS) TO CMT (TO WORD
    ADDRESS) + CMSKD (SKIP DESTINATION CHARACTERS). IT FIRST SETS
    CMWS, CMWD, AND CMW TO CMSKS, CMSKD, AND CML RESPECTIVELY, DIV 64.
    IT THEN POINTS TO THE PROPER SOURCE ADDRESS AND SKIPS FORWARD UP
    TO 4095 CHARACTERS, AND DOES THE SAME THING FOR THE DESTINATION
    ADDRESS. IT THEN MOVES UP TO 4095 CHARACTERS.;

    VALUE CMSKS, CMSKD, CML;
    BEGIN
        LOCAL CMWS, CMWD, CMW;
        SI := LOC CMSKS;  DI := LOC CMWS;
        DI := DI + 1;  DS := 7 CHR;
        SI := LOC CMSKD;  DI := LOC CMWD;
        DI := DI + 1;  DS := 7 CHR;
        SI := LOC CML;  DI := LOC CMW;
        DI := DI + 1;  DS := 7 CHR;
        SI := CMF;  SI := SI + CMSKS;
        CMWS (2 (SI := SI + 32));
        DI := CMT;  DI := DI + CMSKD;
        CMWD (2 (DI := DI + 32));
        CMW (2 (DS := 32 CHR));  DS := CML CHR;
    END OF CMOVE;


STREAM PROCEDURE WMOVE (WMF,WMT,WML);
    COMMENT

        WMOVE MOVES WML (LENGTH) WORDS FROM WMF (FROM ADDRESS) TO
    WMT (TO ADDRESS). IT FIRST SETS LOCAL VARIABLE WMW (WORDS) TO
    WML DIV 64 AND MOVES WMW x 64 WORDS. THEN IT MOVES WML MOD 64
    WORDS.;

    VALUE WML;
    BEGIN
        LOCAL WMW;
        SI := LOC WML;  DI := LOC WMW;
        DI := DI + 1;  DS := 7 CHR;
        SI := WMF;  DI := WMT;
        WMW (2 (DS := 32 WDS));  DS := WML WDS;
    END OF WMOVE;


STREAM PROCEDURE BLANKOUT (BOARY,BOLGTH);
    COMMENT

        BLANKOUT FILLS AN ARRAY ROW WITH BLANKS. IT SETS THE FIRST
    WORD TO 8 BLANKS AND THEN COPIES THAT WORD INTO "BOLGTH" SUCCESSIVE
    WORDS, THEREBY BLANKING OUT BOLGTH+1 WORDS.;

    VALUE BOLGTH;
    BEGIN
        DI := BOARY;  DS := 8 LIT "        ";
        SI := BOARY;  DS := BOLGTH WDS;
    END OF BLANKOUT;
```

```
INTEGER PROCEDURE DECBIN;
    COMMENT

        DECBIN CALLS ICV TO CONVERT THE NUMBER IN "WORD".  IT THEN
    PASSES BACK THE INTEGER OUTPUT OF ICV.

    USES: LENGTH, WORD
    CHANGES: NONE
    CALLS: ICV;

    BEGIN

    INTEGER STREAM PROCEDURE ICV (WORD,LENGTH);

        VALUE LENGTH;
        BEGIN
            SI := WORD;
            DI := LOC ICV;
            DS := LENGTH OCT;
        END OF ICV;

        DECBIN := ICV (WORD,LENGTH);
    END OF DECBIN;



PROCEDURE BINDEC (BDFORCE);
    COMMENT

        BINDEC CALLS OCV TO CONVERT THE SEQUENCE NUMBER FIELD OF "TAG"
    TO 6 DECIMAL CHARACTERS, AND PUT THE RESULT IN "LINE" AT THE
    LOCATION POINTED TO BY "START".  THEN IT ADDS 7 TO "START".

    USES: LINE, START, TAG, USER
    CHANGES: LINE, START
    CALLS: OCV;

    VALUE BDFORCE;
    BOOLEAN BDFORCE;
    BEGIN

    STREAM PROCEDURE OCV (TAG,LINE,START);

        VALUE TAG, START;
        BEGIN
            LOCAL OCW;
            SI := LOC START;  DI := LOC OCW;
            DI := DI + 1;  DS := 7 CHR;
            SI := LOC TAG;
            DI := LINE;
            OCW( 2( DI := DI + 32));
            DI := DI + START;
            DS := 6 DEC;
            DS := 1 LIT " ";
            DI := DI - 7;
            DS := 5 FILL;
        END OF OCV;

        IF BDFORCE OR CANDO[USER].[TYPE] = RAY THEN
        BEGIN
            OCV (TAG.[SEQNO],LINE[USER,*],START[USER]);
            START[USER] := START[USER] + 7;
        END;
    END OF BINDEC;
```

```
STREAM PROCEDURE SETBIT (SBWRD,SBUSR);
    COMMENT

        THIS PROCEDURE IS USED TO SET "SBUSR"S BIT IN "SBWRD",;

    VALUE SBUSR;
    BEGIN
        DI := SBWRD;  SKIP FRSTUBIT DB;
        SKIP SBUSR DB;
        DS := SET;
    END OF SETBIT;


STREAM PROCEDURE RESETBIT (RBWRD,RBUSR);
    COMMENT

        THIS PROCEDURE IS USED TO RESET "RBUSR"S BIT IN "RBWRD",;

    VALUE RBUSR;
    BEGIN
        DI := RBWRD;  SKIP FRSTUBIT DB;
        SKIP RBUSR DB;
        DS := RESET;
    END OF RESETBIT;


BOOLEAN STREAM PROCEDURE TESTBIT (TBWRD,TBUSR);
    COMMENT

        TESTBIT RETURNS A TRUE VALUE IF "TBUSR"S BIT IN "TBWRD" IS A 1,;

    VALUE TBUSR;
    BEGIN
        SI := TBWRD;  SKIP FRSTUBIT SB;
        SKIP TBUSR SB;
        IF SB THEN TALLY := 1;
        TESTBIT := TALLY;
    END OF TESTBIT;


ALPHA STREAM PROCEDURE CHARACTER (LINE,START);
    COMMENT

        CHARACTER GETS ONE CHARACTER FROM LINE + START, AND RETURNS
    IT IN THE LOW ORDER POSITION OF THE FUNCTION,;

    VALUE START;
    BEGIN
        SI := LOC START;  SI := SI + 1;
        DI := LOC CHARACTER;  DS := 7 CHR;
        SI := LINE;  SI := SI + START;
        CHARACTER (2 (SI := SI + 32));
        DI := LOC CHARACTER;  DS := 7 LIT "0";
        DS := 1 CHR;
    END OF CHARACTER;
```

```
INTEGER STREAM PROCEDURE GETADDR(GAWORD);
    COMMENT

        GETADDR RETURNS THE INTEGER ADDRESS OF "GAWORD".;

    BEGIN
        SI := GAWORD;
        GETADDR := SI;
    END OF GETADDR;


STREAM PROCEDURE BLANKGM (LINE,START,BGLGTH);
    COMMENT

        BLANKGM SCANS ACROSS "LINE" FROM "START" LOOKING FOR A GROUP
    MARK IN UP TO "BGLGTH" CHARACTERS.  IF IT FINDS ONE, IT SETS IT
    TO A BLANK.;

    VALUE START, BGLGTH;
    BEGIN
        LOCAL BGSKP, BGWDS;
        LABEL BGXIT;
        SI := LOC START;  DI := LOC BGSKP;
        DI := DI + 1;  DS := 7 CHR;
        SI := LOC BGLGTH;  DI := LOC BGWDS;
        DI := DI + 1;  DS := 7 CHR;
        SI := LINE;
        BGSKP( 2(SI := SI + 32));  SI := SI + START;
        BGWDS( 2( 32( IF SC = GM THEN
        BEGIN
            BGSKP := SI;  SI := SI + 63;
            DI := BGSKP;  DS := 1 LIT " ";
            DI := DI - 63;  SI := SI - 63;
        END;
        SI := SI + 1)));
        BGLGTH( IF SC = GM THEN
        BEGIN
            BGSKP := SI;  SI := SI + 63;
            DI := BGSKP;  DS := 1 LIT " ";
            DI := DI - 63;  SI := SI - 63;
        END;
        SI := SI + 1);
      BGXIT:
    END OF BLANKGM;


BOOLEAN PROCEDURE SCAN;
    COMMENT

        SCAN CALLS ISOLATE TO BREAK OUT A STRING OF CHARACTERS FROM
    THE CURRENT USERS INPUT ARRAY, "LINE".  SCAN THEN UPDATES
    THE INPUT POINTER, "START", AND RETURNS A VALUE OF TRUE IF
    ISOLATE WAS TRUE.

    USES: LENGTH, LINE, NUMR, QUOTES, SPEC, START, USER, WORD
    CHANGES: LENGTH, NUMR, QUOTES, SPEC, START, WORD
    CALLS: BLANKOUT, ISOLATE;

    BEGIN
        INTEGER SCBLANKS;                    % BLANK COUNTER


    BOOLEAN STREAM PROCEDURE ISOLATE (WORD,LINE,
```

```
    START,SCBLANKS,LENGTH,NUMR,SPEC,QUOTES);
    COMMENT

    ISOLATE PLACES INTO ARRAY "WORD" A STRING OF ALPHANUMERIC
CHARACTERS, ONE SPECIAL CHARACTER, OR A QUOTED STRING.  IT FIRST
STEPS OVER "START" CHARACTERS IN ARRAY "LINE", AND STEPS OVER AND
COUNTS BLANKS.  IF THE FIRST NON-BLANK IS ALPHANUMERIC, IT PUTS
CHARACTERS INTO "WORD" UNTIL A BLANK OR SPECIAL CHARACTER IS FOUND.
IF THE FIRST NON-BLANK IS A SPECIAL CHARACTER OTHER THAN QUOTE, IT
PUTS ONLY THAT ONE CHARACTER INTO "WORD".  IF THE FIRST NON-BLANK
IS A QUOTE, ISOLATE STEPS OVER IT AND PUTS THE FOLLOWING CHARACTERS,
INCLUDING BLANKS AND SPECIAL CHARACTERS, INTO "WORD", UNTIL IT
COMES TO ANOTHER QUOTE.  IF NO ENDING QUOTE IS FOUND BEFORE THE
GROUP MARK, IT RETURNS A VALUE OF FALSE, AS THOUGH NOTHING HAD
BEEN FOUND.  IF THE FIRST NON-BLANK IS A GROUP MARK, A VALUE OF
FALSE IS RETURNED.  IF A TRUE VALUE IS RETURNED (FOUND SOMETHING),
"LENGTH" IS SET TO THE LENGTH OF THE ITEM PLACED IN "WORD", "NUMR"
IS SET TO TRUE IF ONLY NUMERICS WERE FOUND, AND "QUOTES" IS SET
TO 2 IF THE ITEM WAS ENCLOSED IN QUOTES.  "QUOTES" IS USED BY SCAN
TO ADD THE LENGTH OF THE QUOTES WHEN UPDATING "START".;

    VALUE START;
    BEGIN
        LOCAL ISBLNK, ISCHR, ISONE, ISSAV, ISWDS;
        LABEL ISBGN, ISNBL, ISALF, ISNAL, ISQUO, ISNQO, ISPEC,
              ISXIT;
        SI := LOC START;              % GET NUMBER TO SKIP
        DI := LOC ISWDS;
        DI := DI + 1;
        DS := 7 CHR;                  % SAVE START DIV 64
        DI := LOC ISONE;              % SET UP FOR GTR THAN 64 COUNT
        DS := 1 LIT "1";
        SI := LINE;                   % POINT TO START OF INPUT
        ISWDS (2 (SI := SI + 32));    % SKIP (START) CHARACTERS
        SI := SI + START;
      ISBGN:
        2( 32(                        % COUNT 64 LOOP
            IF SC NEQ " " THEN JUMP OUT 2 TO ISNBL;
            SI := SI + 1;             % SKIP AND COUNT BLANKS
            TALLY := TALLY + 1 ));
        ISSAV := SI;
        SI := LOC ISONE;
        DI := SCBLANKS;               % ADD 64 TO BLANK COUNT
        DI := DI + 6;
        DS := 1 ADD;
        SI := ISSAV;
        GO TO ISBGN;                  % GO BACK FOR MORE BLANKS
      ISNBL:
        ISBLNK := TALLY;              % SAVE BLANK COUNT
        TALLY := 0;                   % SET FALSE VALUE SO FAR
        DI := WORD;                   % POINT TO START OF OUTPUT
        ISWDS := DI;                  % SAVE DESTINATION INDEX
        IF SC GTR "9" THEN GO TO ISPEC;
        IF SC = ALPHA THEN
      ISALF:
        BEGIN                 COMMENT SCAN ALPHANUMERIC CHARACTERS;
            2( 32(                    % COUNT 64 LOOP
                IF SC GTR "9" THEN JUMP OUT 2 TO ISNAL;
                IF SC = ALPHA THEN ELSE JUMP OUT 2 TO ISNAL;
                IF SC LSS "0" THEN
                BEGIN                 % IF NOT NUMERIC,
                    DI := NUMR;       % SET NUMR FALSE
                    DS := 8 LIT "00000000";
                END;
                DI := ISWDS;          % MOVE 1 CHARACTER
```

```
            DS := 1 CHR;
            ISWDS := DI;
            TALLY := TALLY + 1 ));  % AND COUNT IT
        ISSAV := SI;
        SI := LOC ISONE;
        DI := LENGTH;              % ADD 64 TO LENGTH
        DI := DI + 6;
        DS := 1 AUD;
        SI := ISSAV;
        GO TO ISALF;               % GO GET MORE CHARACTERS
      ISNAL:
        ISCHR := TALLY;            % SAVE CHARACTER COUNT
        TALLY := 1;                % EXIT WITH TRUE VALUE
    END
    ELSE
    BEGIN                COMMENT SCAN STRING OR SPECIAL CHAR;
        IF SC NEQ GM THEN
        BEGIN
            IF SC = """ THEN
            BEGIN        COMMENT SCAN STRING WITHIN QUOTES;
                DI := QUOTES;    % SET QUOTES TO 1
                DS := 8 LIT "00000001";
                DI := NUMR;      % SET NUMR FALSE
                DS := 8 LIT "00000000";
                SI := SI + 1;    % STEP PAST QUOTE
              ISQUO:
                DI := ISWDS;
                2( 32(           % COUNT 64 LOOP
                    IF SC = """ THEN JUMP OUT 2 TO ISNQO;
                    IF SC = GM THEN
                    BEGIN   COMMENT NO ENDING QUOTE;
                        ISCHR := TALLY;     % SAVE COUNT
                        TALLY := 0; % EXIT WITH FALSE VALUE
                        JUMP OUT 2 TO ISXIT;
                    END;
                    DS := 1 CHR;     % MOVE 1 CHARACTER
                    TALLY := TALLY + 1 ));  % AND COUNT IT
                ISSAV := SI;
                SI := LOC ISONE;
                ISWDS := DI;
                DI := LENGTH;    % ADD 64 TO LENGTH
                DI := DI + 6;
                DS := 1 ADD;
                SI := ISSAV;
                GO TO ISQUO;     % GO GET MORE CHARACTERS
              ISNQO:
                DI := QUOTES;    % SET QUOTES TO 2
                DS := 8 LIT "00000002";
                ISCHR := TALLY; % SAVE CHARACTER COUNT
                TALLY := 1;      % EXIT WITH TRUE VALUE
            END
            ELSE
          ISPEC:
            BEGIN        COMMENT SCAN 1 SPECIAL CHARACTER;
                DI := SPEC;      % SET SPEC TRUE
                DS := 8 LIT "00000001";
                DI := NUMR;      % SET NUMR FALSE
                DS := 8 LIT "00000000";
                DI := ISWDS;     % MOVE 1 CHARACTER
                DS := 1 CHR;
                TALLY := 1;      % EXIT WITH TRUE VALUE
                ISCHR := TALLY; % AND CHARACTER COUNT OF 1
    END;END;END;
  ISXIT:
    SI := LOC ISBLNK;            % PASS BLANK COUNT
```

```
        SI := SI + 7;  DI := SCBLANKS;
        DI := DI + 7;  DS := 1 CHR;
        SI := LOC ISCHR;              % PASS CHARACTER COUNT
        SI := SI + 7;  DI := LENGTH;
        DI := DI + 7;  DS := 1 CHR;
        ISOLATE := TALLY;             % SET PROCEDURE TRUE OR FALSE
    END OF ISOLATE;

    BLANKOUT (WORD,LINMAX);
    NUMR := TRUE;                     % INITIALIZE BOOLEANS
    SCBLANKS := LENGTH := QUOTES := REAL (SPEC := FALSE);
    SCAN := ISOLATE (WORD,LINE[USER,*],START[USER],SCBLANKS,
     LENGTH,NUMR,SPEC,QUOTES) AND LENGTH GTR 0;
    START[USER] := START[USER] + SCBLANKS + LENGTH + QUOTES;
END OF SCAN;



BOOLEAN PROCEDURE WEBSTER;
    COMMENT

        WEBSTER IS MERELY A GO-BETWEEN TO AND FROM LOOKUP.  IT
    INITIALIZES VARIABLES, SUPPLIES PARAMETERS TO LOOKUP, AND
    PASSES BACK THE OUTPUT OF LOOKUP TO THE CALLING ROUTINE.

    USES: CLASS, DICT, KEY, LENGTH, WORD
    CHANGES: CLASS, KEY
    CALLS: LOOKUP;

    BEGIN

    BOOLEAN STREAM PROCEDURE LOOKUP (WORD,DICT,LENGTH,CLASS,KEY);

        COMMENT

        LOOKUP COMPARES THE WORD IN "WORD" WITH ENTRIES IN THE
    TABLE, "DICT", FOR A LENGTH OF "LENGTH".  IF THE LENGTHS OF
    THE TWO WORDS AND THE WORDS MATCH, LOOKUP RETURNS A VALUE OF TRUE,
    AND SETS THE PROPER VALUES INTO "CLASS" AND "KEY".;

        VALUE LENGTH;
        BEGIN
            LOCAL LUNTRYS, LULGTH;
            LABEL LUXIT;
            SI := DICT;  DI := LOC LUNTRYS;
            DS := 1 WDS;                  % SAVE NUMBER OF ENTRIES
            2 ( LUNTRYS (                 % LOOP THAT MANY TIMES
            DI := LOC LENGTH;
            DI := DI + 7;                 % POINT TO LENGTH
            IF 1 SC = DC THEN
            BEGIN              COMMENT COMPARE EQUAL LENGTH WORDS;
                DI := WORD;
                IF LENGTH SC = DC THEN
                BEGIN          COMMENT THEY MATCH;
                    DI := CLASS;  DI := DI + 7;
                    DS := 1 CHR;          % RETURN CLASS OF WORD
                    DI := KEY;  DI := DI + 7;
                    DS := 1 CHR;          % RETURN KEY OF WORD
                    TALLY := 1;           % SET RESULT TRUE
                    JUMP OUT 2 TO LUXIT;     % AND EXIT
            END;END
            ELSE
            BEGIN              COMMENT LENGTHS NOT EQUAL;
                DI := LOC LULGTH;  DI := DI + 7;
```

```
            SI := SI - 1;
            DS := 1 CHR;                 % GET DICTIONARY WORD LENGTH
            SI := SI + LULGTH;           % STEP PAST THE WORD
        END;
        SI := SI + 2 )));                % STEP PAST CLASS AND KEY
      LUXIT:
        LOOKUP := TALLY;                 % TRUE IF FOUND, ELSE FALSE
    END OF LOOKUP;

    CLASS := KEY := 0;                   % INITIALIZE
    IF LENGTH LEQ 10 THEN
    WEBSTER := LOOKUP (WORD,DICT,LENGTH,CLASS,KEY);
  END OF WEBSTER;



PROCEDURE SETLENGTHS (SLRL,SLBL);
    COMMENT

        SETLENGTHS SETS UP THE RECORD AND BLOCK LENGTHS OF THE USERS
    FILE IN THE FIB, SO THAT THE BUFFERS AND I/O DESCRIPTORS CAN
    ACCOMMODATE VARYING RECORD SIZES.  IT MAY ONLY BE USED WHEN THE
    FILE IS CLOSED.

    USES: UFILE, USER
    CHANGES: UFILE
    CALLS: SLGTHS;

    VALUE SLRL, SLBL;
    INTEGER SLRL, SLBL;
    BEGIN

    STREAM PROCEDURE SLGTHS (SLFILE,SLINFO,SLTECH);

        VALUE SLINFO, SLTECH;
        BEGIN
            LOCAL SL1;
            SI := SLFILE;  SI := SI - 24;
            DI := LOC SL1;  DS := 1 WDS;
            DI := DI - 3;  DS := 3 RESET;
            DI := SL1;
            DI := DI + 47;  SKIP 4 DB;
            SI := LOC SLTECH;  SKIP 46 SB;
            2(IF SB THEN DS := SET ELSE DS := RESET;  SKIP 1 SB));
            2(DI := DI + 48));
            SI := LOC SLINFO;  DS := 1 WDS;
        END OF SLGTHS;

        SLGTHS (UFILE[USER],SLRL&SLBL[18:33:15]&SLBL[3:33:15],
         (SLRL LSS SLBL));
    END OF SETLENGTHS;



STREAM PROCEDURE SETROWSIZE (SRFILE,SRSIZE);
    COMMENT

        SETROWSIZE FINDS ITS WAY INTO THE FILE INFORMATION BLOCK OF
    THE NAMED FILE, AND SETS THE ROW SIZE FIELD TO "SRSIZE".  THIS IS
    NECESSARY BECAUSE THE DUMB MCP DOESNT KNOW THE DIFFERENCE BETWEEN
    A 30 WORD RECORD AND A 150 WORD RECORD, AND IT REALLY MAKES QUITE
    A DIFFERENCE AS TO WHEN A READ OR WRITE GOES TO THE NEXT EXTENT.;
```

```
VALUE SRSIZE;
BEGIN
    LOCAL SRADDR;
    SI := SRFILE;                           % POINT TO FILE TANK WORD 5
    SI := SI - 24;                          % POINT TO FIB POINTER WORD
    DI := LOC SRADDR;                       % GET ENTIRE WORD
    DS := 1 WDS;
    DI := DI - 3;                           % MAKE IT FIB ADDRESS
    DS := 3 RESET;
    DI := SRADDR;                           % POINT TO FIB WORD 0
    DI := DI + 32;                          % SKIP TO WORD
    DI := DI + 37;                          %        WITH ROW INFO
    SKIP 3 DB;                              % POINT TO SIZE FIELD
    SI := LOC SRSIZE;                       % POINT TO SRSIZE
    SI := SI + 5;                           % POINT TO LOW ORDER, AND
    SKIP 3 SB;                              %     MOVE IN NEW SIZE FIELD
    15 (IF SB THEN DS := SET ELSE DS := RESET;  SKIP 1 SB);
END OF SETROWSIZE;


PROCEDURE GETFILENAME (PREFIX,SUFFIX);
    COMMENT

        GETFILENAME GETS THE NAME OF THE USERS FILE FROM THE FPB SO
    THAT NO DISK READING IS DONE DUE TO A DIRECTORY SEARCH.

    USES: PRT25, UFILE, USER
    CHANGES: *PREFIX, *SUFFIX
    CALLS: GFID, GFPBI;

    REAL PREFIX, SUFFIX;
    BEGIN
        INTEGER I;


    INTEGER STREAM PROCEDURE GFPBI (GFILE);
        BEGIN
            SI := GFILE;  SI := SI - 24;
            DI := LOC GFPBI;  DS := 1 WDS;
            SI := GFPBI;  SI := SI + 34;
            DI := LOC GFPBI;  DS := 6 LIT "0";
            DS := 2 CHR;
        END OF GFPBI;

    STREAM PROCEDURE GFID (PRT25,GFSKIP,PREFIX,SUFFIX);
        VALUE GFSKIP;
        BEGIN
            LOCAL GF1, GF2;
            SI := PRT25;  3(SI := SI - 48);
            DI := LOC GF1;  DS := 1 WDS;
            SI := LOC GFSKIP;  DI := LOC GF2;
            DI := DI + 1;  DS := 7 CHR;
            SI := GF1;  GFSKIP(SI := SI + 8);
            GF2(16(SI := SI + 32));
            DI := PREFIX;  DS := 1 WDS;
            DI := SUFFIX;  DS := 1 WDS;
        END OF GFID;

        GFID (PRT25, IF BOOLEAN ((I := GFPBI (UFILE[USER])).[36:1])
         THEN I.[37:11] ELSE 5×(I.[37:11]-1),PREFIX,SUFFIX);
    END OF GETFILENAME;
```

```
BOOLEAN PROCEDURE SCANFILE;
    COMMENT

        SCANFILE RETURNS A TRUE VALUE IF A LEGAL FILE NAME
    (PREFIX/SUFFIX, PREFIX/"SUFFIX", "PREFIX"/SUFFIX, OR
    "PREFIX"/"SUFFIX") IS FOUND. IT MOVES THE PREFIX AND SUFFIX TO
    GLOBAL VARIABLES "PREFIX" AND "SUFFIX", RESPECTIVELY.

    USES: CLASS, KEY, PREFIX, SPEC, SUFFIX, WORD
    CHANGES: PREFIX, SUFFIX
    CALLS: CMOVE, SCAN, WEBSTER;

    BEGIN
        PREFIX := SUFFIX := 0;
        IF SCAN AND NOT SPEC THEN
        BEGIN                        COMMENT GET PREFIX;
            CMOVE (WORD,PREFIX,0,1,7);
            IF SCAN AND WEBSTER AND CLASS = 1 AND KEY = 2 THEN
             IF SCANFILE := SCAN AND NOT SPEC THEN
             CMOVE (WORD,SUFFIX,0,1,7); % GET SUFFIX
        END;
    END OF SCANFILE;


BOOLEAN PROCEDURE RIMSFILE;
    COMMENT

        RIMSFILE CHECKS TO SEE IF THE FILE IN SRCH IS LARGE ENOUGH
    TO BE A RIMS FILE, AND IF IT IS, READS THE PROPER RECORD, LOCATES
    THE PROPER WORD IN THE RECORD, AND COMPARES THAT WORD WITH THE RIMS
    IDENTIFICATION KEYWORD. IF THEY MATCH, RIMSFILE IS TRUE.

    USES: L2TAG, SRCH
    CHANGES: NONE
    CALLS: RF;

    BEGIN
        INTEGER I;

        FILE RFILE DISK RANDOM (1,SRCH[3],SRCH[4]);

    BOOLEAN STREAM PROCEDURE RF (RFILE,RFID);
        VALUE RFID;
        BEGIN
            SI := RFILE;  DI := LOC RFID;
            IF 8 SC = DC THEN TALLY := 1;
            RF := TALLY;
        END OF RF;

        IF SRCH[3] × (SRCH[5] + 1) GEQ 2 × BLKSZ + RECSZ THEN
        BEGIN
            FILL RFILE WITH SRCH[1], SRCH[2];
            READ (RFILE[I:=VSTID DIV SRCH[3]]);
            RIMSFILE := RF (RFILE(I:=VSTID MOD SRCH[3]),"VISTAII");
            CLOSE (RFILE,RELEASE);
        END;
    END OF RIMSFILE;


PROCEDURE MESSAGE (MSNO);
    VALUE MSNO;
```

```
    INTEGER MSNO;
    FORWARD;


BOOLEAN PROCEDURE DSKREAD (DRMOVIT);
    COMMENT

        DSKREAD IS USED TO RETRIEVE RECORDS FROM THE USERS FILE.
    IT OBTAINS THE RELATIVE RECORD NUMBER OF THE REQUESTED RECORD
    FROM THE GLOBAL "TAG". IT THEN CHECKS THE GLOBAL "PREVBLOCK" AND
    THE CURRENT BLOCK COMPUTED FROM TAG TO SEE IF THE BLOCK CONTAINING
    THE REQUESTED RECORD IS ALREADY IN THE BUFFER. IF IT IS, THEN
    A DISK READ IS NOT NECESSARY. "DRMOVIT" IS CHECKE$ TO SEE IF A
    RECORD SHOULD BE MOVED FROM THE BUFFER TO "LINE". IF ONE SHOULD,
    THEN THE REQUESTED RECORD IS LOCATED IN THE BUFFER AND MOVED TO
    THE ARRAY "LINE", BEGINNING AT THE RELATIVE LOCATION CONTAINED IN
    THE ARRAY "START".

    USES: JUNK, LINE, PREVBLOCK, START, STARTMSG, TAG, UFILE, USER
    CHANGES: JUNK, LINE, PREVBLOCK, STARTMSG
    CALLS: CMOVE, MESSAGE
    ERRORS: INPUT ERROR;

    VALUE DRMOVIT;
    BOOLEAN DRMOVIT;
    BEGIN
        INTEGER DRCURRBLK;

        LABEL DRERR, DRXIT;

        IF DRCURRBLK := TAG.[RELREC] DIV 3 NEQ PREVBLOCK[USER] THEN
         READ (UFILE[USER][DRCURRBLK]) [DRERR];
        IF DRMOVIT THEN
         CMOVE (UFILE[USER](0),LINE[USER,*],JUNK :=
          TAG.[RELREC] MOD 3 × 80,START[USER],80);
        PREVBLOCK[USER] := DRCURRBLK;
        DSKREAD := TRUE;
        GO TO DRXIT;
      DRERR:
        STARTMSG := TRUE;
        MESSAGE (35);                 % INPUT ERROR
      DRXIT:
    END OF DSKREAD;


PROCEDURE DSKWRITE;
    COMMENT

        DSKWRITE WRITES DATA RECORDS, TAKEN FROM THE GLOBAL ARRAY
    "LINE", INTO THE NEXT AVAILABLE DATA RECORD LOCATION OF A USERS
    FILE. IF THE DATA RECORD IS TO BE THE FIRST RECORD IN A DATA
    BLOCK, THEN A DISK READ IS NOT NECESSARY. IF THE RELATIVE BLOCK
    JUST WRITTEN IS THE FIRST OF A ROW, THE USER FILE IS LOCKED, SO
    THAT THE DISK DIRECTORY IS UPDATED. THE RELATIVE RECORD NUMBER OF
    THE RECORD JUST WRITTEN IS PLACED IN THE GLOBALS "TAG" AND "L2EOF".

    USES: LINE, L2CHANGED, L2TAG, PREVBLOCK, REEL, START, TAG, UFILE,
         USER
    CHANGES: L2CHANGED, L2TAG, PREVBLOCK, REEL, TAG, UFILE
    CALLS: BLANKOUT, CMOVE, DSKREAD;

    BEGIN
```

```
        INTEGER  DWBUFRELREC, DWROWMOD;

        BOOLEAN  DWSKPL1;

        IF ((L2EOF := L2EOF + 1) - 15) MOD 135 = 0 THEN
        BEGIN
            L2EOF := L2EOF + 15;
            DWSKPL1 := TRUE;
        END;
        TAG.[RELREC] := L2EOF;
        IF DWBUFRELREC := L2EOF MOD 3 NEQ 0 THEN
         REEL := REAL (DSKREAD (FALSE))
        ELSE
         BLANKOUT (UFILE[USER](0),RECSZ-1);
        CMOVE (LINE[USER,*],UFILE[USER](0),START[USER],
         (DWBUFRELREC × 80),(IF DWROWMOD := 8 × (LINMAX + 1) -
         START[USER] LSS 80 THEN DWROWMOD ELSE 80));
        WRITE (UFILE[USER][PREVBLOCK[USER] := L2EOF DIV 3]);
        IF DWROWMOD := L2EOF MOD 510 = 0 OR
         DWSKPL1 AND DWROWMOD LEQ 15 THEN
        BEGIN
            LOCK (UFILE[USER]);
            PREVBLOCK[USER] := 0;
        END;
        L2CHANGED := TRUE;
    END OF DSKWRITE;



PROCEDURE BKUPWRITE;
    COMMENT

    BKUPWRITE WRITES THE NEW BACK-UP RECORD INTO THE RIMS WORK FILE.

    USES: BKUP, TAGFILE
    CHANGES: TAGFILE
    CALLS: NONE;

    BEGIN
        WRITE (TAGFILE[0],BLKSZ,BKUP[*]);
    END OF BKUPWRITE;



PROCEDURE TAGWRITE (TWBLOCK);
    COMMENT

        TAGWRITE WRITES A TAG BLOCK INTO THE CURRENT USERS AREA IN THE
    RIMS WORK FILE.  IT CHECKS TO SEE IF THE BLOCK PRESENTLY IN THE
    ARRAY TO BE USED HAS BEEN CHANGED SINCE THE LAST TAGREAD FOR THE
    SAME ARRAY, AND WRITES IT BACK INTO ITS PROPER LOCATION IF
    NECESSARY.  BLOCK 0 IS WRITTEN FROM THE "L2TAG" ARRAY, AND ALL
    OTHER BLOCKS ARE WRITTEN FROM THE "L1TAG" ARRAY.

    USES: LASTAGBLK, LASTXUSER, LASTOUSER, L1CHANGED, L1TAG,
          L2CHANGED, L2TAG, TAGFILE, TAGROW, USER
    CHANGES: L1CHANGED, L2CHANGED, TAGFILE
    CALLS: NONE;

    VALUE TWBLOCK;
    REAL TWBLOCK;                             % TAG BLOCK NUMBER
    BEGIN
        IF TWBLOCK = 0 THEN
        BEGIN
```

```
            IF L2CHANGED THEN
            BEGIN                     COMMENT WRITE LEVEL 2 TAG BLOCK;
                WRITE (TAGFILE[TAGROW[LASTOUSER]×WKSZ+1],BLKSZ,
                 L2TAG[*]);
                L2CHANGED := FALSE;
        END;END
        ELSE
        BEGIN
            IF L1CHANGED THEN
            BEGIN                     COMMENT WRITE LEVEL 1 TAG BLOCK;
                WRITE (TAGFILE[TAGROW[LASTXUSER]×WKSZ+TWBLOCK+1],BLKSZ,
                 L1TAG[*]);
                L1CHANGED := FALSE;
        END;END;
    END OF TAGWRITE;


PROCEDURE TAGREAD (TRBLOCK);
    COMMENT

        TAGREAD READS A TAG BLOCK FROM THE CURRENT USERS AREA IN THE
    RIMS WORK FILE.  IT FIRST CHECKS TO SEE IF THE USER OR BLOCK
    NUMBER HAS CHANGED, AND IF EITHER ONE HAS, IT CALLS TAGWRITE,
    WHICH WILL WRITE THE ARRAY BACK IF NECESSARY.  THEN IF THE
    REQUESTED BLOCK IS NOT ALREADY IN THE ARRAY, IT READS THE BLOCK.
    BLOCK 0 GOES TO THE "L2TAG" ARRAY, AND ALL OTHER BLOCKS GO TO
    THE "L1TAG" ARRAY.

    USES: LASTAGBLK, LASTXUSER, LASTOUSER, L1TAG, L2TAG, TAGFILE,
          TAGROW, USER
    CHANGES: LASTAGBLK, LASTXUSER, LASTOUSER, L1TAG, L2TAG
    CALLS: TAGWRITE;

    VALUE TRBLOCK;
    REAL TRBLOCK;                              % TAG BLOCK NUMBER
    BEGIN
        IF TRBLOCK = 0 THEN
        BEGIN                     COMMENT READ LEVEL 2 TAG BLOCK;
            IF USER NEQ LASTOUSER THEN
            BEGIN                 COMMENT DIFFERENT BLOCK WANTED;
                TAGWRITE (0);
                READ (TAGFILE[TAGROW[USER]×WKSZ+1],BLKSZ,L2TAG[*]);
                LASTOUSER := USER;
        END;END
        ELSE
        BEGIN                     COMMENT READ LEVEL 1 TAG BLOCK;
            IF USER NEQ LASTXUSER OR TRBLOCK NEQ LASTAGBLK THEN
            BEGIN                 COMMENT DIFFERENT BLOCK WANTED;
                TAGWRITE (LASTAGBLK);
                READ (TAGFILE[TAGROW[USER]×WKSZ+TRBLOCK+1],BLKSZ,
                 L1TAG[*]);
                LASTXUSER := USER;
                LASTAGBLK := TRBLOCK;
        END;END;
    END OF TAGREAD;


PROCEDURE TAGSEARCH (TSTP,TSWCH);
    COMMENT

        TAGSEARCH LOCATES A GIVEN SEQUENCE NUMBERED OR LOGICAL
    RECORD NUMBERED TAG IN THE CURRENT USERS AREA OF THE RIMS
    WORK FILE.  IT ALWAYS RETURNS THE LOCATION AND LOGICAL RECORD
```

NUMBER OF THE DESIRED TAG (OR IF NOT FOUND, THE NEXT HIGHER TAG) IN "TAGLOC" AND "LOGREC" RESPECTIVELY. THE BOOLEAN VARIABLE "FOUND" IS SET APPROPRIATELY, AND IF TRUE, THE TAG ITSELF IS ALSO RETURNED IN "TAG". USING THE LEVEL 2 ARRAY, TAGSEARCH SKIPS OVER LEVEL 1 BLOCKS WHOSE SEQUENCE NUMBERS OR ACCUMULATED COUNTS ARE TOO LOW. WHILE SKIPPING OVER LEVEL 1 BLOCKS, IT KEEPS TRACK OF THE LOGICAL RECORD COUNT. WHEN IT FINDS A HIGH SEQUENCE NUMBER OR ACCUMULATED COUNT IT READS THE APPROPRIATE LEVEL 1 TAG BLOCK. THEN FOR A SEQUENCE NUMBER SEARCH, IT SCANS THROUGH THE TAGS UNTIL IT FINDS ONE EQUAL TO (FOUND SET TO TRUE) OR HIGHER THAN THE TAG DESIRED. FOR A LOGICAL RECORD NUMBER SEARCH, IT JUST PICKS OUT THE TAG IT WANTS. THE TAG, LOGICAL RECORD NUMBER, AND TAG LOCATION ARE THEN RETURNED TO THE CALLING ROUTINE.

```
USES: FOUND, LOGREC, L1TAG, L2TAG, TAG, TAGLOC
CHANGES: FOUND, LOGREC, TAG, TAGLOC
CALLS: TAGREAD;

VALUE TSTP, TSWCH;
REAL TSTP,                              % 0 = SEQ NO, 1 = LOG REC NO
     TSWCH;                             % SEQ NO OR LOG REC NO WANTED
BEGIN
    INTEGER I, J, K, L, M;

    LABEL TSBLK,TSXIT;

    TAGREAD (REAL (FOUND := FALSE));    % GET LEVEL 2 TAG BLOCK
    TAG.[SEQNO] := SEQLIM;
    IF (K := L2COUNT - 1) LSS 0 THEN    % SET SEARCH LIMIT
    GO TO TSXIT;
    FOR I := 0 STEP 1 UNTIL K DO
    IF (IF TSTP = 0 THEN
          IF L2TAG[I].[TCNT] GTR 0 THEN
            L2TAG[I].[SEQNO]
          ELSE -(1)
        ELSE L+L2TAG[I].[TCNT]-1)
     GEQ TSWCH THEN GO TO TSBLK       % FIND PROPER LEVEL 1 TAG BLOCK
    ELSE
     L := L + J := L2TAG[I].[TCNT];
    I := K;
    GO TO TSXIT;
  TSBLK:
    TAGREAD (I+1);                      % GET LEVEL 1 TAG BLOCK
    IF TSTP = 0 THEN
    BEGIN                     COMMENT SEQUENCE NUMBER SEARCH;
        M := L2TAG[I].[TCNT] - 1;
        FOR J := 0 STEP 1 UNTIL M DO
        IF TSWCH LEQ K := L1TAG[J].[SEQNO] THEN
        BEGIN                 COMMENT FOUND EQUAL OR HIGH TAG;
            TAG := L1TAG[J];            % SAVE TAG
            FOUND := TSWCH = K;         % TRUE IF EXACTLY EQUAL
            GO TO TSXIT;
        END
        ELSE                            % IF NOT FOUND YET,
        L := L + 1;                     % COUNT LOGICAL RECORDS
    END
    ELSE
    BEGIN                     COMMENT LOGICAL RECORD NUMBER SEARCH;
        TAG := L1TAG[J:=TSWCH-L];       % SAVE TAG
        L := TSWCH;
        FOUND := TRUE;
    END;
  TSXIT:
    TAGLOC := I × BLKSZ + J;            % SAVE TAG POSITION
```

```
        LOGREC := L;                    % SAVE LOGICAL RECORD NUMBER
    END OF TAGSEARCH;



PROCEDURE TAGDELETE (TDFST,TDLST);
    COMMENT

        TAGDELETE EITHER ELIMINATES OR MAKES INACCESSIBLE THE
    TAGS IN LOCATIONS FROM "TDFST" (FIRST) TO "TDLST" (LAST).
    IF THE TAGS TO BE DELETED EXTEND TO OR BEYOND THE LAST TAG IN
    A BLOCK, ONLY THE LEVEL 2 TAG FIELDS FOR THAT BLOCK ARE DECREASED.
    OTHERWISE THE TAGS TO BE DELETED ARE OVERLAYED BY HIGHER TAGS
    WITHIN THAT BLOCK AND THE LEVEL 2 COUNT FIELD IS DECREASED.  THEN
    "L2COUNT" IS DECREASED IF POSSIBLE.

    USES: L1CHANGED, L1TAG, L2CHANGED, L2TAG
    CHANGES: L1CHANGED, L1TAG, L2CHANGED, L2TAG
    CALLS: TAGREAD, WMOVE;

    VALUE TDFST, TDLST;
    REAL TDFST, TDLST;                  % TAGS TO BE DELETED
    BEGIN
        INTEGER TDL2IND, TDSH1, TDSH2, TDSHLIM;

        LABEL TDAGAIN, TDCOUNTDOWN;

      TDAGAIN:
        IF (TDSH2 := TDLST - TDFST + 1) GTR 0 THEN
        BEGIN                   COMMENT AT LEAST 1 TO SHIFT;
            TAGREAD (1 + TDL2IND := TDFST DIV BLKSZ);
            IF TDSH2 GEQ L2TAG[TDL2IND].[TCNT] -
             (TDSH1 := TDFST MOD BLKSZ) THEN
            BEGIN               COMMENT DELETE TO END OF TAG BLOCK;
                L2TAG[TDL2IND].[TCNT] := TDSH1;
                IF TDSH1 GTR 0 THEN L2TAG[TDL2IND].[SEQNO] :=
                 L1TAG[TDSH1-1].[SEQNO];
                TDFST := TDFST - TDSH1 + BLKSZ;
                GO TO TDAGAIN;
            END;
            L2TAG[TDL2IND].[TCNT] :=
             (TDSHLIM := L2TAG[TDL2IND].[TCNT] - TDSH2);
            WMOVE (L1TAG[TDSH1+TDSH2],L1TAG[TDSH1],TDSHLIM-TDSH1);
            L1CHANGED := TRUE;
        END;
      TDCOUNTDOWN:
        IF L2COUNT GTR 0 THEN
         IF L2TAG[L2COUNT-1].[TCNT] = 0 THEN
        BEGIN                   COMMENT STRIP OFF EXCESS LEVEL 2 TAGS;
            L2COUNT := L2COUNT - 1;
            GO TO TDCOUNTDOWN;
        END;
        L2CHANGED := TRUE;
    END OF TAGDELETE;



PROCEDURE TAGMOVE (TMSTRT,TMFROM,TMTO,TMNUM,TMINC,TMORE,TMSKIP);
    COMMENT

        TAGMOVE REARRANGES THE TAGS WITHIN A USERS WORK FILE AREA.
    IT PUTS THEM IN THE NORMAL ARRANGEMENT OF 120 TAGS PER BLOCK EXCEPT
    THE LAST BLOCK, WHICH MAY BE SHORT.  AS IT IS NORMALIZING THE TAG
```

BLOCKS, IT MAY ALSO RELOCATE AND RESEQUENCE SOME OF THE TAGS, OR IT CAN DUPLICATE SOME. TWO BOOLEAN PARAMETERS INDICATE WHAT THE ROUTINE IS TO DO. TMORE TELLS IT TO MOVE AND RESEQUENCE THE TAGS IN THE RANGE OF TAG LOCATIONS TMFROM THROUGH TMTO, PUTTING THEM IN THE LOCATION SPECIFIED BY TMSTRT. TMSKIP TELLS THE ROUTINE TO SKIP OVER THE ORIGINAL TAGS IT IS RESEQUENCING. IF BOTH TMORE AND TMSKIP ARE FALSE, THE OPERATION WILL BE A SIMPLE REORGANIZATION. IF ONLY TMORE IS TRUE, IT WILL DUPLICATE A RANGE OF TAGS. IF ONLY TMSKIP IS TRUE, IT WILL DELETE A RANGE OF TAGS. IF BOTH ARE TRUE, THE ROUTINE WILL RELOCATE A RANGE OF TAGS. THE ROUTINE READS INTO ARRAY L1TAG AND WRITES INTO THE SPARE WORK FILE AREA AFTER MOVING 120 TAGS INTO ARRAY TMOUT. AS TAGS IN L1TAG ARE EXHAUSTED IT READS MORE, UNTIL THERE ARE NO MORE USEFUL LEVEL 1 TAG BLOCKS. IT THEN WRITES THE LAST NEW LEVEL 1 BLOCK AND THE NEW LEVEL 2 BLOCK, SWAPS USER AREA AND SPARE AREA POINTERS, AND UPDATES THE BACK-UP RECORD.

```
USES: BKUP, JUNK, LASTAGBLK, L1TAG, L2CHANGED, L2TAG, TAGFILE,
     TAGROW, USER
CHANGES: BKUP, JUNK, LASTAGBLK, L1TAG, L2CHANGED, L2TAG, TAGFILE,
        TAGROW
CALLS: BKUPWRITE, TAGREAD, WMOVE;

VALUE TMSTRT, TMFROM, TMTO, TMNUM, TMINC, TMORE, TMSKIP;
INTEGER TMSTRT, TMFROM, TMTO, TMNUM, TMINC;
BOOLEAN TMORE, TMSKIP;
BEGIN
    BOOLEAN TMINSRT;

    INTEGER I, J, K, L, M, N;
    REAL ARRAY TMOUT, TML2 [0:TAGMAX];
    LABEL TMNEXT, TMREAD, TMINSERT, TMOVED, TMXIT;

    TMNUM := TMNUM - TMINC;
    TAGREAD (0);
    WMOVE (L2TAG,TML2,BLKSZ);
  TMNEXT:
    IF J = 0 THEN
    BEGIN
        IF I = L2COUNT THEN GO TO TMXIT;
      TMREAD:
        N := L2TAG[I].[TCNT];
        I := I + 1;
        IF N = 0 THEN GO TO TMNEXT;
        IF J LSS N THEN
         TAGREAD (I);
    END;
    IF TMINSRT THEN
    BEGIN                       COMMENT IN PROCESS OF MOVING;
        TMOUT[K] := L1TAG[J];
        TMOUT[K].[SEQNO] := TMNUM := TMNUM + TMINC;
        GO TO TMOVED;
    END;
    IF TMSKIP AND (JUNK := (I - 1) × BLKSZ + J) = TMFROM THEN
    BEGIN                       COMMENT PERFORM SKIP OVER TAGS;
        I := TMTO DIV BLKSZ;
        J := TMTO MOD BLKSZ + 1;
        TMSKIP := FALSE;
        GO TO TMREAD;
    END;
    IF TMORE THEN IF JUNK = TMSTRT THEN
  TMINSERT:
    BEGIN                       COMMENT SET UP TO RESEQUENCE;
        I := TMFROM DIV BLKSZ;
        J := TMFROM MOD BLKSZ;
        TMINSRT := BOOLEAN (L := 1);
```

```
        GO TO TMREAD;
    END;
    IF L := (IF TAGNORM - K LSS N - J THEN TAGNORM - K ELSE N - J)
     GTR 0 THEN
    BEGIN
        IF TMSKIP THEN IF I - 1 = TMFROM DIV BLKSZ THEN
         L := (IF L LSS (JUNK := TMFROM MOD BLKSZ - J)
         THEN L ELSE JUNK);
        IF TMORE THEN IF I - 1 = TMSTRT DIV BLKSZ THEN
         L := (IF L LSS (JUNK := TMSTRT MOD BLKSZ - J)
         THEN L ELSE JUNK);
        WMOVE (L1TAG[J],TMOUT[K],L);
    END;
  TMOVED:
    IF K := K + L = TAGNORM OR I = L2COUNT AND
     NOT (TMORE OR TMSKIP) AND K GTR 0 THEN
    BEGIN                       COMMENT WRITE NEW LEVEL 1 BLOCK;
        WRITE (TAGFILE[TAGROW[NUSERS]×WKSZ+M+2],BLKSZ,TMOUT[*]);
        TML2[M].[TCNT] := K;
        TML2[M].[SEQNO] := TMOUT[K-1].[SEQNO];
        K := 0;
        M := M + 1;
    END;
    J := J + L;
    IF TMINSRT THEN IF (I - 1) × BLKSZ + J GTR TMTO THEN
    BEGIN                       COMMENT END OF RESEQUENCE;
        I := TMSTRT DIV BLKSZ;
        J := TMSTRT MOD BLKSZ;
        TMORE := TMINSRT := FALSE;
        GO TO TMREAD;
    END;
    IF J = N THEN J := 0;
    GO TO TMNEXT;
  TMXIT:
    IF TMORE THEN GO TO TMINSERT;
    WMOVE (TML2,L2TAG,BLKSZ);
    WMOVE (TMOUT,L1TAG,BLKSZ);
    LASTAGBLK := L2COUNT := M;
    L2CHANGED := TRUE;
    N := TAGROW[NUSERS];
    BKUP[NUSERS×NBKUPS+2] := TAGROW[NUSERS] := TAGROW[USER];
    BKUP[USER×NBKUPS+2] := TAGROW[USER] := N;
    BKUPWRITE;
END OF TAGMOVE;



PROCEDURE TAGINSERT;
    COMMENT

        TAGINSERT EITHER REPLACES OR ADDS A TAG TO A TAG BLOCK.
    IF THE TAG TO BE INSERTED DOES NOT MATCH THE TAG PREVIOUSLY
    IN THE DESIRED LOCATION, THE TAGS FROM THAT LOCATION UP ARE
    SHIFTED RIGHT ONE POSITION.  THE TAG IS THEN INSERTED, THE
    LEVEL 2 TAG IS UPDATED, AND IF THE TAG BLOCK IS NOW COMPLETELY
    FULL, TAGMOVE IS CALLED TO FIX THINGS UP.

    USES: FOUND, L1CHANGED, L1TAG, L2CHANGED, L2TAG, TAG, TAGLOC
    CHANGES: L1CHANGED, L1TAG, L2CHANGED, L2TAG
    CALLS: TAGREAD, TAGMOVE;

    BEGIN
        INTEGER I, J, K, L;
```

```
        BOOLEAN B;

        TAGREAD (0);
        IF L2COUNT GTR 0 THEN
        J := L2TAG[K := TAGLOC DIV BLKSZ].[TCNT];
        TAGREAD (K+1);                      % READ TAG BLOCK
        L := TAGLOC MOD BLKSZ;
        B := TRUE;
        IF J GTR 0 THEN
        BEGIN
            IF B := (TRUE AND NOT FOUND) THEN
            FOR I := J - 1 STEP -1 UNTIL L DO
            L1TAG[I+1] := L1TAG[I];         % SHIFT EXISTING TAGS
        END
        ELSE
        IF K = L2COUNT THEN
         L2COUNT := L2COUNT + 1;            % START NEW BLOCK
        L1TAG[L] := TAG;                    % ADD NEW TAG
        L2TAG[K].[TCNT] := J := J + REAL (B);   % UPDATE LEVEL 2 TAG
        L2TAG[K].[SEQNO] := L1TAG[J-1].[SEQNO];
        L1CHANGED := TRUE;                  % ALWAYS
        L2CHANGED := L2CHANGED OR B;        % SET TRUE IF TAG ADDED
        IF J = BLKSZ THEN
        TAGMOVE (0,0,0,0,0,FALSE,FALSE);       % REORG IF BLOCK IS FULL
    END OF TAGINSERT;


PROCEDURE MESSAGE (MSNO);
    COMMENT

        MESSAGE ASSEMBLES OUTPUT MESSAGES BY MOVING INDIVIDUAL
    WORDS OF 7 CHARACTERS OR LESS TO THE OUTPUT AREA, "LINE".
        A POINTER TO THE NEXT OPEN POSITION IN THE OUTPUT AREA
    IS MAINTAINED IN THE ARRAY "START" SO THAT ADDITIONAL
    PORTIONS OF A MESSAGE MAY BE ASSEMBLED AT A LATER TIME.
    THE ARRAY "DOCT1" IS AN ARRAY OF MESSAGE ASSEMBLY
    POINTER WORDS.
        THE ARRAY "DOCT2" IS AN ARRAY OF WORDS, EACH OF WHICH
    CONTAINS A MESSAGE WORD OF 7 CHARACTERS OR LESS AND ITS
    CORRESPONDING LENGTH.
        THE ARRAY "DOCT3" IS SIMILAR TO "DOCT2", BUT CONTAINS
    THE SPECIAL CHARACTER COMBINATIONS FOR EACH DEVICE TYPE.

    USES: CANDO, DOCT1, DOCT2, DOCT3, LINE, START, STARTMSG, USER
    CHANGES: LINE, START, STARTMSG
    CALLS: BLANKOUT, CMOVE;

    VALUE   MSNO;
    INTEGER MSNO;
    BEGIN
        INTEGER MSWDPNT, MSPNTR, MSWDLN;

        LABEL MSLOOP1, MSLOOP2;

        IF STARTMSG THEN
        BEGIN
            BLANKOUT (LINE[USER,*],LINMAX);
            START[USER] := REAL (STARTMSG := FALSE);
        END;
      MSLOOP1:
        MSWDPNT := DOCT1[MSNO].[12:36];
      MSLOOP2:
        IF MSWDPNT := MSWDPNT.[12:30] NEQ 0 THEN
```

```
        BEGIN
            MSWDLN := (IF MSPNTR := MSWDPNT.[42:6] GEQ
             SPECHRWDS THEN DOCT2[MSPNTR] ELSE
             DOCT3[CANDO[USER].[TYPE],2×MSPNTR]).[2:4]]
            IF MSPNTR GEQ SPECHRWDS THEN
             CMOVE (DOCT2[MSPNTR],LINE[USER,*],1,START[USER],
             MSWDLN)
            ELSE
             CMOVE (DOCT3[CANDO[USER].[TYPE],2×MSPNTR],
             LINE[USER,*],1,START[USER],MSWDLN);
            START[USER] := START[USER] + MSWDLN;
            GO TO MSLOOP2;
        END
        ELSE
        IF MSNO := DOCT1[MSNO].[6:6] NEQ 0 THEN
         GO TO MSLOOP1;
    END OF MESSAGE;



PROCEDURE ESCHAR(ESCVT);
    COMMENT

        ESCHAR IS CALLED TO EDIT DATA COMING FROM OR GOING TO ITS
    PERMANENT RESIDENCE.
        BECAUSE CERTAIN SPECIAL CHARACTERS ARE PHYSICALLY IMPOSSIBLE
    TO ENTER FROM OR DISPLAY UPON DIFFERENT TYPES OF TERMINALS, A
    PAIR OF "ESCAPE CHARACTERS" (THE FIRST OF WHICH IS A GIVEN
    SPECIAL CHARACTER FOR A GIVEN DEVICE TYPE, AND THE SECOND IS
    SOME OTHER TEMPORARY USEABLE SPECIAL CHARACTER) WILL BE
    SUBSTITUTED UPON ENTRY FROM OR DISPLAY UPON A TERMINAL.
        AFTER RECEIPT OF A LINE OF DATA FROM A TERMINAL, THE ESCAPE
    CHARACTER PAIR WILL BE REPLACED BY THE PERMANENT CHARACTER
    THAT THEY WERE REPRESENTING.
        ESCHAR MUST BE TOLD WHETHER THE DATA IS COMING FROM
    OR GOING TO ITS PERMANENT RESIDENCE, AND THE TYPE OF TERMINAL
    INVOLVED.

    USES: CANDO, LINE, START, USER
    CHANGES: LINE, START
    CALLS: BLANKOUT, CMOVE, ESCANER;

    VALUE ESCVT;                  % DIRECTION OF CONVERSION
    BOOLEAN ESCVT;                % FALSE = TO DISK, TRUE = FROM DISK
    BEGIN
        ALPHA ARRAY ESALTARY [0:LINMAX];

        INTEGER ESLGTH;

    STREAM PROCEDURE ESCANER
        (ESSRC,ESSKPSRC,ESARY,ESALT,ESLN,ESBL,ESTYP);
        VALUE  ESSKPSRC,ESLN,ESBL,ESTYP;
        BEGIN
            LOCAL  ESARYELMTS,ESCTL,ESELMBGN,ESDIV64,ESSRCSV,
                   ESALTSV,ESARYSKP,ESMVCHR,ESELMSV,ESSLMT,ESOLMT;
            LABEL  ESLOOP1,ESLOOP2,ESINPNT,ESMOVE,ESSRCHX,ESCANERX;
            SI := ESARY;
            DI := LOC ESARYELMTS;
            DS := WDS;                      % SAVE ESARY ELEMENTS COUNT
            SI := SI + ESTYP;  SI := SI - 1;
            ESCTL := SI;                    % SAVE LOC OF ES SPC CHAR
            SI := SI + NOEVS;  SI := SI + 1;
            SI := SI - ESTYP;
            ESELMBGN := SI;                 % SAVE LOC OF 1ST ESARY ELMT
```

```
 SI := LOC ESSKPSRC;          % SET UP TO SKIP START
 DI := LOC ESDIV64;  DI := DI + 1; % CHARACTERS INTO INPUT
 DS := 7 CHR;
 SI := ESSRC;
 ESDIV64(2(SI := SI + 32));  % SKIP PAST START CHARS
 SI := SI + ESSKPSRC;
 ESSRCSV := SI;               % SAVE INPUT POINTER
 SI := LOC ESLN;              % ESTAB LIMIT OF INPUT
 DI := LOC ESDIV64;  DI := DI + 1;
 DS := 7 CHR;
 SI := ESSRCSV;
 ESDIV64(2(SI := SI + 32));
 SI := SI + ESLN;
 ESSLMT := SI;                % SAVE INPUT LIMIT
 DI := ESALT;
 ESALTSV := DI;               % SAVE OUTPUT POINTER
 ESDIV64(2(DI := DI + 32));  % ESTAB LIMIT OF OUTPUT
 DI := DI + ESLN;
 ESDLMT := DI;                % SAVE OUTPUT LIMIT
ESLOOP1:
 SI := LOC ESSRCSV;  SI := SI + 5;
 DI := LOC ESSLMT;  DI := DI + 5;
 IF 3 SC = DC THEN            % TEST IF INPUT EXHAUSTED
  GO TO ESCANERX;
 SI := LOC ESBL;  SI := SI + 7;
 IF SC = "1" THEN             % IF TRUE THEN FROM DISK
 BEGIN
     SI := ESSRCSV;
     IF SC = ALPHA THEN       % TEST FOR NON-SPECIAL CHAR
      GO TO ESINPNT;
     SI := LOC ESTYP;  SI := SI + 7;
     IF SC = RAY THEN         % TEST IF RAYTHEON
     BEGIN
         SI := ESSRCSV;
         IF SC = """ THEN     % SPECIAL CASE
         BEGIN
             DI := ESSRCSV;
             DS := LIT "≤";
             GO TO ESINPNT;
         END;
     END;
     DI := LOC ESARYSKP;
     DS := 8 LIT "00000001"; % SET TO POINT TO DISK CHAR
     GO TO ESLOOP2;
 END;
 SI := LOC ESTYP;  SI := SI + 7;
 IF SC = RAY THEN             % TEST IF RAYTHEON
 BEGIN
     SI := ESSRCSV;           % POINT TO INPUT CHAR
     IF SC = "≤" THEN         % SPECIAL CASE RAYTHEON
     BEGIN
         DI := ESSRCSV;
         DS := LIT """;
         GO TO ESINPNT;
     END;
 END;
 SI := ESSRCSV;               % POINT TO INPUT CHAR
 DI := ESCTL;                 % POINT TO ESCAPE SPC CHAR
 IF SC ≠ DC THEN GO TO ESINPNT;
 ESSRCSV := SI;               % SAVE INPUT CHAR POINTER
 SI := LOC ESSRCSV;  SI := SI + 5;
 DI := LOC ESSLMT;   DI := DI + 5;
 IF 3 SC = DC THEN            % TEST IF INPUT EXHAUSTED
  GO TO ESCANERX;
 DI := LOC ESARYSKP;
```

```
    DS := 8 LIT "00000002";       % SET TO POINT TO TERM CHAR
  ESLOOP2:
    DI := ESELMBGN;               % POINT TO 1ST ESARY ELEMENT
    ESARYELMTS(                   % SEARCH ESARY
    SI := ESSRCSV;                % POINT TO INPUT CHAR
    DI := DI + ESARYSKP;          % POINT TO APPROP ESARY CHAR
    IF SC ≠ DC THEN               % TEST IF INPUT ESARY CHAR
    BEGIN
        DI := DI - ESARYSKP;
        GO TO ESSRCHX;
    END;
    DI := DI - 1;                 % SET UP TO POINT TO ESARY
    DI := DI - ESARYSKP;          % TERMINAL TYPE
    SI := LOC ESTYP;  SI := SI + 7;   % POINT TO ACTUAL TERM
    IF SC = DC THEN               % TEST IF TERM TYPES EQUAL
    BEGIN                         % TERM TYPES EQUAL
        DI := DI - 1;
        ESELMSV := DI;
        SI := LOC ESBL;  SI := SI + 7;
        DI:=LOC ESARYSKP;
        IF SC = "1" THEN
        BEGIN
            DS := 8 LIT "00000002";
            SI := LOC ESALTSV;  SI := SI + 5;
            DI := LOC ESDLMT;  DI := DI + 5;
            IF 3 SC = DC THEN   % TEST IF OUTPUT EXHAUSTED
             JUMP OUT TO ESCANERX;
            DI := ESALTSV;
            SI := ESCTL;
            DS := 1 CHR;          % MOVE ES SPL CHAR TO OUTPUT
            ESALTSV := DI;        % SV UPDATED OUTPUT POINTER
        END
        ELSE
        DS := 8 LIT "00000001";
        DI := ESELMSV;
        DI := DI + ESARYSKP;      % SAVE ESARY TERMINAL OR
        ESMVCHR := DI;            % DISK CHAR POINTER
        JUMP OUT TO ESMOVE;
    END;
  ESSRCHX:
    DI := DI + 2);                % PNT TO NEXT ESARY ELEMENT
    SI := LOC ESBL;  SI := SI + 7;
    IF SC = "1" THEN GO ESINPNT;
    SI := ESSRCSV;
    SI := SI - 1;
    ESSRCSV := SI;
  ESINPNT:
    SI := ESSRCSV;
    ESMVCHR := SI;
  ESMOVE:
    SI := LOC ESALTSV;  SI := SI + 5;
    DI := LOC ESDLMT;   DI := DI + 5;
    IF 3 SC ≠ DC THEN             % TEST IF OUTPUT EXHAUSTED
    BEGIN
        SI := ESMVCHR;            % POINT TO CHAR TO BE MOVED
        DI := ESALTSV;
        DS := 1 CHR;              % MOVE CHAR TO OUTPUT
        ESALTSV := DI;
        SI := ESSRCSV;
        SI := SI + 1;             % POINT TO NEXT INPUT CHAR
        ESSRCSV := SI;
        GO ESLOOP1;               % LOOP THRU INPUT
    END;
  ESCANERX:
END ESCANER;
```

```
        BLANKOUT(ESALTARY[*],LINMAX);
        ESCANER(LINE[USER,*],START[USER],ESARY[*],ESALTARY[*],
         ESLGTH := 8 × (LINMAX+1) - START[USER],ESCVT,
         CANDO[USER].[TYPE]);
        CMOVE(ESALTARY[*],LINE[USER,*],0,START[USER],ESLGTH);
    END ESCHAR;



PROCEDURE TTYFIX;
    COMMENT

        TTYFIX CALLS LOCAL STREAM PROCEDURE "TTREDUCE" TO REDUCE THE
    NUMBER OF CHARACTERS TO BE TYPED ON A TELETYPE, OR "TCREDUCE" TO
    REDUCE THE NUMBER OF CHARACTERS TO BE TYPED ON A TC500.
    TTREDUCE SCANS ACROSS "LINE" LOOKING FOR CARRIAGE RETURN AND LINE
    FEED CHARACTERS, AND IF IT FINDS A PAIR, BACKS UP TO THE LAST NON-
    BLANK + 1, AND PUTS THEM THERE.  IF A LINE OF OUTPUT IS MORE THAN
    72 CHARACTERS LONG, IT INSERTS A CR LF RO GROUP AFTER 72 CHARACTERS.
    TCREDUCE SCANS FROM THE END OF THE MESSAGE TO A NON-BLANK, INSERTS
    A GROUP MARK, AND UPDATES "START".

    USES: CANDO, LINE, START, USER
    CHANGES: LINE, START
    CALLS: TCREDUCE, TTREDUCE;

    IF CANDO[USER].[TYPE] = TTY THEN
    BEGIN
        ALPHA ARRAY TTALT [0:LINMAX];


    STREAM PROCEDURE TTREDUCE (LINE,TTALT);
        BEGIN
            LOCAL TTSAVS, TTSAVD;
            LABEL TTBGN, TTBLNK, TTINSRT, TTXIT;
            SI := LINE;  DI := TTALT;
            DS := 1 LIT GM;
          TTINSRT:
            IF SC = GM THEN GO TO TTXIT;
            IF SC NEQ "≤" THEN
            IF SC NEQ "≠" THEN
            IF SC NEQ "<" THEN
             GO TO TTBGN;
            DS := 1 CHR;
            GO TO TTINSRT;
          TTBGN:
            2( 36(                      % LOOP 72 TIMES
                IF SC = GM THEN JUMP OUT 2 TO TTXIT;
                IF SC = "≤" THEN
                BEGIN            COMMENT FOUND CARRIAGE RETURN;
                    TTSAVS := SI;
                    TTSAVD := DI;
                    DI := DI + 63;       % GET DI AWAY FROM SI
                    SI := TTSAVD;
                  TTBLNK:
                    SI := SI - 1;
                    IF SC = " " THEN GO TO TTBLNK;
                    IF SC = "<" THEN GO TO TTBLNK;
                    IF SC = "≠" THEN
                    BEGIN        COMMENT BACK TO LINE FEED;
                        SI := SI - 1;
                        IF SC = "≤" THEN GO TO TTBLNK;
                    END;
```

```
                SI := SI + 1;
                TTSAVD := SI;
                SI := TTSAVS;
                DI := TTSAVD;
                JUMP OUT 2 TO TTINSRT;
            END;
            DS := 1 CHR ));
        DS := 3 LIT "S≠<";
        GO TO TTBGN;
      TTXIT:
        DS := 1 LIT GM;
        SI := TTALT;  SI := SI + 1;
        DI := LINE;  DS := 7 CHR;
        8( DS := LINMAX CHR));
    END OF TTREDUCE;

    TTREDUCE (LINE[USER,*],TTALT[*]));
END
ELSE

IF CANDO[USER].[TYPE] = TC500 THEN
BEGIN

INTEGER STREAM PROCEDURE TCREDUCE (LINE,START,MAX));

    VALUE MAX;
    BEGIN
        LOCAL TCST1, TCST2, TCONE, TCACUM;
        LABEL TCL1;
        DI := LOC TCONE;  DS := 1 LIT "1";
        SI := START;  DI := LOC TCST1;
        DI := DI + 1;  DS := 7 CHR;
        DI := LOC TCST2;  DI := DI + 7;
        DS := 1 CHR;  SI := LINE;
        TCST1(2(SI := SI + 32));
        SI := SI + TCST2;  SI := SI - 2;
        TCST1 := SI;  SI := LOC MAX;
        DI := LOC TCST2;  DI := DI + 1;
        DS := 7 CHR;  SI := TCST1;
        TCST2(2(32(IF SC NEQ " " THEN JUMP OUT 3 TO TCL1;
          SI := SI - 1;  TALLY := TALLY + 1));
         DI := LOC TCACUM;  TCST1 := SI;
         SI := LOC TCONE;  DS := 1 ADD;  SI := TCST1);
        MAX (IF SC NEQ " " THEN JUMP OUT;
         SI := SI - 1;  TALLY := TALLY + 1);
      TCL1:
        TCST1 := SI;  SI := SI + 63;
        DI := TCST1;  DI := DI + 1;
        DS := 1 LIT GM;  TCREDUCE := TALLY;
        SI := LOC TCACUM;  DI := LOC TCREDUCE;
        DI := DI + 6;  DS := 1 CHR;
    END OF TCREDUCE;

    START[USER] := START[USER] - TCREDUCE (LINE[USER,*],
     START[USER],START[USER] - 1);
END OF TTYFIX;



STREAM PROCEDURE LGFILL (LGBUFF,LGNTRY));
    COMMENT

        LOGFILL PUTS "LGNTRY" INTO 3 WORDS AT "LGBUFF", AND ZEROES
    THE NEXT 27 WORDS.;
```

```
BEGIN
    SI := LGNTRY;  DI := LGBUFF;
    DS := 3 WDS;  DS := 8 LIT "00000000";
    SI := LGBUFF;  SI := SI + 24;  DS := 26 WDS;
END OF LGFILL;


PROCEDURE BACKUP;  COMMENT DUMMY FOR NOW;;


REAL PROCEDURE CONVERTIME (CVTM);
    COMMENT

        CONVERTIME CONVERTS THE BINARY VALUE OF THE MACHINE TIMER TO
    THE DECIMAL TIME OF DAY IN THE FORMAT "OOHHMMSS".

    USES: JUNK
    CHANGES: JUNK
    CALLS: CVTIME;

    VALUE CVTM;
    REAL CVTM;
    BEGIN

    REAL STREAM PROCEDURE CVTIME (HRS,MINS,SECS);

        VALUE HRS, MINS, SECS;
        BEGIN
            SI := LOC HRS;  DI := LOC CVTIME;
            DS := 4 DEC;  DS := 2 DEC;  DS := 2 DEC;
        END OF CVTIME;

        CONVERTIME := CVTIME
         (JUNK := CVTM DIV 216000,
          JUNK := CVTM MOD 216000 DIV 3600,
          JUNK := CVTM MOD  3600  DIV  60);
    END OF CONVERTIME;


PROCEDURE CREATELOG;
    COMMENT

        CREATELOG CREATES THE FILE "RIMS/LOG".

    USES: LOG, LOG1, REEL
    CHANGES: LOG, LOG1, REEL
    CALLS: LGFILL;

    BEGIN
        SAVE FILE CRLOGFILE DISK RANDOM [1:801]

         "RIMS" "LOG" (1,30,SAVE 999);

        REEL := STATUS (0,7);
        LOGNO := -1;
        LGFILL (LOG[*],LOG1);
        WRITE (CRLOGFILE[0],30,LOG[*]);
        WRITE (CRLOGFILE[800]);
        LOCK (CRLOGFILE);
    END OF CREATELOG;
```

```
PROCEDURE LOGGER (LGINOUT);
    VALUE LGINOUT;
    INTEGER LGINOUT;
    FORWARD;


PROCEDURE LOGOVERFLOW;
    COMMENT

        LOGOVERFLOW WRITES A TYPE 3 ENTRY INTO THE LOG FILE, CLOSES IT,
    AND RENAMES IT TO <JULIAN DATE>/<TIME OF DAY>.  IT THEN ZIPS THE
    RIMS LOG ANALYZING PROGRAM, CALLS CREATELOG TO CREATE A NEW LOG
    FILE, AND MAKES LOG-IN (TYPE 1) ENTRIES INTO THE NEW LOG FOR EACH
    USER CURRENTLY LOGGED IN.

    USES: BKUP, CANDO, LOG, LOGFILE, LOG1, REEL, SPO, SRCH, SRCHFILE,
          USER, USERCODE
    CHANGES: LOG, LOGFILE, LOG1, REEL, SPO, SRCH, SRCHFILE
    CALLS: CMOVE, CONVERTIME, CREATELOG, LGFILL, LOGGER;

    BEGIN
        INTEGER I, J, K;

        FORMAT LOGFMT ("RIMS LOG NAMED ",A5,"/",A6," BEING PRINTED.←");


        LABEL LOLP;

        BUDATE := TIME (0);  BUTIME := TIME (1);
        LOGGER (3);  CLOSE (LOGFILE);
        I := CONVERTIME (BUTIME);
        REEL := STATUS (0,7);
        FILL SRCH[*] WITH
         "CC CHANG","E  RIMS/","LOG  TO ","        ","/       ",

         ";  END. ","        ","        ","        ","        ";

        CMOVE (BUDATE,SRCH[3],3,1,5);
        CMOVE (I,SRCH[4],2,1,6);
        ZIP WITH SRCH[*];
        WRITE (SPO,LOGFMT,BUDATE,I);
        FILL SRCHFILE WITH "RIMS    ", "LOG     ";
     LOLP:
        SEARCH (SRCHFILE,SRCH[*]);
        IF SRCH[0] NEQ -1 THEN
        BEGIN
            WHEN (1);  GO TO LOLP;
        END;
        FILL SRCH[*] WITH
         "CC EXECU","TE RIMS/","LOGDUMP;"," FILE IN","PUT =   ",

         "     /  ","     ;  ","END.    ","        ","        ";

        CMOVE (BUDATE,SRCH[4],3,6,5);
        CMOVE (I,SRCH[5],2,6,6);
        ZIP WITH SRCH[*];
        CREATELOG;
        LOG[1] := BUDATE;  LOG[2] := I;  LOG[4] := 3;
        FOR J := 0 STEP 1 UNTIL UMAX DO
        IF USERCODE[J] NEQ 0 THEN
```

```
    BEGIN
        K := (LOGNO := LOGNO + 1) MOD 6 x 5;
        LOG[K] := USERCODE[J];
        LOG[K + 1] := BUDATE;
        LOG[K + 2] := I;
        LOG[K + 3] := CANDO[J].[TYPE] & J [30:36:12];
        LOG[K + 4] := 1;
        IF K = 25 THEN
        BEGIN
            WRITE (LOGFILE[LOGNO DIV 6 + 1],30,LOG[*]);
            LGFILL (LOG[*],LOG1);
    END;END;
    IF K NEQ 25 THEN
     WRITE (LOGFILE[LOGNO DIV 6 + 1],30,LOG[*]);
    LGFILL (LOGFILE(0),LOG1);
    WRITE (LOGFILE[0]);
  END OF LOGOVERFLOW;



PROCEDURE LOGGER (LGINOUT);
    COMMENT

        LOGGER WRITES ONE RECORD INTO RIMS/LOG AND UPDATES THE FIRST
    RECORD IN THAT FILE FOR USE IN RESTARTING.

    USES: BKUP, CANDO, LOG, LOGFILE, LOG1, SPO, USER, USERCODE
    CHANGES: LOG, LOGFILE, LOG1, SPO
    CALLS: LGFILL, LGMSG, LOGOVERFLOW;

    VALUE LGINOUT;
    INTEGER LGINOUT;
    BEGIN
        INTEGER I;


    STREAM PROCEDURE LGMSG (LGFILE,LGTYPE,LGTIME,LGUSER,LGTERM);
        VALUE LGTYPE, LGTIME, LGUSER, LGTERM;
        BEGIN
            DI := LGFILE;  DS := 9 LIT "RIMS LOG ";
            SI := LOC LGTYPE;  SI := SI + 7;
            IF SC = "1" THEN DS := 2 LIT "IN"
            ELSE DS := 3 LIT "OUT";
            DS := 4 LIT " AT ";
            SI := LOC LGTIME;  SI := SI + 2;
            DS := 4 CHR;  DS := 4 LIT " BY ";
            SI := LOC LGUSER;  SI := SI + 1;
            7( IF SC = " " THEN JUMP OUT;  DS := 1 CHR);
            DS := 7 LIT ", TERM ";  SI := LOC LGTERM;
            DS := 2 DEC;  DS := 1 LIT GM;
            DI := DI - 3;  DS := 1 FILL;
        END OF LGMSG;

        I := ((LOGNO := LOGNO + 1) MOD 6) x 5;
        LOG[I + 4] := LGINOUT;
        IF LGINOUT LSS 3 THEN
        BEGIN
            LOG[I] := USERCODE[USER];
            LOG[I + 1] := BUDATE := TIME (0);
            LOG[I + 3] := CANDO[USER].[TYPE] & USER [30:36:12];
            LOG[I + 2] := CONVERTIME (BUTIME := TIME (1));
            LGMSG (SPO(0),LGINOUT,LOG[I+2],USERCODE[USER],USER);
            WRITE (SPO);
        END
```

```
    ELSE
    BEGIN
        LOG[I] := LOG[I + 3] := 0;
        LOG[I + 1] := BUDATE;
        LOG[I + 2] := CONVERTIME (BUTIME);
    END;
    REEL := STATUS (0,7);
    WRITE (LOGFILE[LOGNO DIV 6 + 1],30,LOG[*]);
    IF (LOGNO + 1) MOD 6 = 0 THEN
     LGFILL (LOG[*],LOG1);
    LGFILL (LOGFILE(0),LOG1);
    WRITE (LOGFILE[0]);
    IF LOGNO = 4798 THEN LOGOVERFLOW;
    REEL := STATUS (USERCODE[USER],8);
END OF LOGGER;



PROCEDURE FINAL;
    COMMENT

        FINAL IS THE LAST MODULE CALLED BY ALL THE COMMAND MODULES.
    FINAL SETS THE OPREADY SWITCH (WHICH IS CHECKED BY RIMS) SO THAT
    RIMS WILL WRITE THE CONTENTS OF "LINE" FOR THE CURRENT USER ON THE
    REMOTE TERMINALS. FINAL THEN SETS THE ACCEPT SWITCH FOR THE CURRENT
    USER SO THAT RIMS MAY FILL "LINE" WITH THE NEXT RECORD FROM THE
    CURRENT USER. FINAL THEN SETS THE GOTO INDEX SO THAT DISPATCH WILL
    GO TO THE MODULE "FIRST" WHENEVER THE NEXT RECORD FROM THE USER
    IS PROCESSED.  THEN IT CALLS TAGWRITE TO WRITE TAGS, IF NECESSARY.

    USES: ACCEPT, GOTO, LASTAGBLK, OPREADY, USER
    CHANGES: ACCEPT, GOTO, OPREADY
    CALLS: SETBIT, TAGWRITE;

    BEGIN
        SETBIT (OPREADY,USER);
        SETBIT (ACCEPT,USER);
        GOTO[USER] := GOFIRST;
        TAGWRITE (0);  TAGWRITE (LASTAGBLK);
    END OF FINAL;


PROCEDURE FILERROR (FERRNO);
    COMMENT

        FILERROR CONSTRUCTS ERROR MESSAGES PERTAINING TO FILE ERRORS.
    IT INSERTS THE FILE NAME FROM "PREFIX" AND "SUFFIX" INTO THE
    MESSAGES.  FOR "FERRNO" = -1, THE MESSAGE IS "P/S NOT FOUND".
    FOR 1, "P/S NOT A RIMS FILE".
    FOR 4, "P/S NOT A TC500 FILE".
    FOR 5, "P/S".
    FOR 6, "P/S EXISTS".
    FOR 7, "P/S IN USE".
    FOR 0, 2, OR 3, THE MESSAGE IS "INVALID USER OF P/S".

    USES: LINE, PREFIX, START, SUFFIX, USER
    CHANGES: LINE, PREFIX, START, SUFFIX
    CALLS: ESCHAR, FEMOVE, MESSAGE;

    VALUE FERRNO;
    INTEGER FERRNO;
    BEGIN
        INTEGER I, J;
```

```
INTEGER STREAM PROCEDURE FEMOVE (LINE,START,PREFIX,SUFFIX);
    VALUE START;
    BEGIN
        LOCAL FELINE, FE1;
        SI := LOC START;  DI := LOC FELINE;
        DI := DI + 1;  DS := 7 CHR;
        DI := LINE;
        FELINE ( 2( DI := DI + 32));
        DI := DI + START;
        SI := PREFIX;  SI := SI + 7;  TALLY := 7;
        6(IF SC NEQ " " THEN JUMP OUT; SI:=SI-1; TALLY:=TALLY+63);
        FE1 := TALLY;  SI := PREFIX;  SI := SI + 1;  DS := FE1 CHR;
        DS := 1 LIT "/";
        SI := SUFFIX;  SI := SI + 7;  TALLY := 7;
        6(IF SC NEQ " " THEN JUMP OUT; SI:=SI-1; TALLY:=TALLY+63);
        FELINE:=TALLY;  SI:=SUFFIX;  SI:=SI+1;  DS := FELINE CHR;
        TALLY := TALLY + FE1;  TALLY := TALLY + 1;
        FEMOVE := TALLY;
    END OF FEMOVE;

    IF FERRNO NEQ 0 AND FERRNO NEQ 2 AND FERRNO NEQ 3 THEN
    BEGIN                    COMMENT MESSAGES WITH FILE NAME FIRST;
        IF FERRNO = 5 THEN
        BEGIN
            MESSAGE (3);
            START[USER] := START[USER] + 1;
        END
        ELSE
         MESSAGE (2);
        I := START[USER];
        START[USER] := START[USER] + REAL (FERRNO GEQ 6) +
         FEMOVE (LINE[USER,*],START[USER],PREFIX,SUFFIX);
        J := START[USER];  START[USER] := I;
        ESCHAR (TRUE);  START[USER] := J;
        MESSAGE (IF FERRNO = 7 THEN 32
            ELSE IF FERRNO = 6 THEN 38
            ELSE IF FERRNO = 5 THEN 16
            ELSE IF FERRNO = 4 THEN 47
            ELSE IF FERRNO = 1 THEN 33 ELSE 31);
    END
    ELSE
    BEGIN                    COMMENT MESSAGES WITH FILE NAME LAST;
        MESSAGE (30);
        I := START[USER];
        START[USER] := START[USER] +
         FEMOVE (LINE[USER,*],START[USER],PREFIX,SUFFIX) + 1;
        J := START[USER];  START[USER] := I;
        ESCHAR (TRUE);  START[USER] := J;
        MESSAGE (16);
    END;
  END OF FILERROR;


PROCEDURE NEWFILE;
    COMMENT

        NEWFILE SETS UP UFILE[USER], UPDATES THE BACKUP RECORD, AND
    RESETS VIEWFBOK.

    USES: BKUP, PREFIX, SUFFIX, USER, USERCODE, VIEWFBOK
    CHANGES: BKUP, VIEWFBOK
```

```
    CALLS: BKUPWRITE, RESETBIT, SETLENGTHS;

    BEGIN
        SETLENGTHS (RECSZ,RECSZ);
        BKUP[JUNK := USER × NBKUPS] := PREFIX;
        BKUP[JUNK + 1] := SUFFIX;
        BKUP[JUNK + 3] := USERCODE[USER];
        BKUP[JUNK + 4] := CANDO[USER].[ALLOW];
        BKUPWRITE;
        RESETBIT (VIEWFBOK,USER);
    END OF NEWFILE;


PROCEDURE PURGEFILE;
    COMMENT

        PURGEFILE MARKS THE CURRENT USERS FILE NOT PRESENT, AND CLOSES
    THE FILE.  IF THE FILE WAS BEING CREATED, PURGEFILE ALSO REMOVES
    THE FILES NAME FROM THE DISK DIRECTORY.  IT THEN UPDATES THE
    BACKUP RECORD.

    USES: BKUP, CREATESW, LISTING, PREFIX, PRESENT, PREVBLOCK, SRCH,
          SUFFIX, TAGFILE, UFILE, USER, VIEWFBOK
    CHANGES: BKUP, CREATESW, LISTING, PREFIX, PRESENT, PREVBLOCK, SRCH,
             SUFFIX, TAGFILE, UFILE, VIEWFBOK
    CALLS: BKUPWRITE, CMOVE, RESETBIT, TESTBIT;

    BEGIN
        INTEGER I;


        PREVBLOCK[USER] := 0;
        GETFILENAME (PREFIX,SUFFIX);
        CLOSE (UFILE[USER],RELEASE);
        IF TESTBIT (CREATESW,USER) THEN
        BEGIN
            RESETBIT (CREATESW,USER);
            FILL SRCH[*] WITH
             "CC REMOV",OCT2560776060606060,OCT6060776177606060,

             OCT6060606077606060," ; END. ";

            CMOVE (PREFIX,SRCH[1],1,3,7);
            CMOVE (SUFFIX,SRCH[2],1,5,7);
            ZIP WITH SRCH[*];
            SRCH[1] := PREFIX;
            SRCH[2] := SUFFIX;
        END;
        IF TESTBIT (PRESENT,USER) THEN
        BEGIN
            RESETBIT (PRESENT,USER);
            BKUP[I:=USER×NBKUPS]:=BKUP[I+1]:=BKUP[I+4]:=0;
            BKUPWRITE;
        END;
        RESETBIT (LISTING,USER);
        RESETBIT (VIEWFBOK,USER);
    END OF PURGEFILE;


PROCEDURE FIRSTSEQ (FSNUM,FSINC,FSMSG);
    COMMENT
```

```
    FIRSTSEQ IS COMMON TO THE CREATE AND SEQUENCE COMMANDS.  IT
SETS UP THE NEXT SEQUENCE NUMBER TO DISPLAY, THE INCREMENT, AND
THE LIMIT FOR THE FOLLOWING DATA COMMANDS.  IT ALSO DISPLAYS THE
FIRST SEQUENCE NUMBER ON THE CRT.  IT THEN TURNS ON "SEQCOMD".

USES: L2TAG, SEQCOMD, SEQLIMIT, SEQSEQ, TAG, USER
CHANGES: SEQCOMD, SEQLIMIT, SEQSEQ, TAG
CALLS: BINDEC, MESSAGE, SETBIT, TTYFIX;

VALUE FSNUM, FSINC, FSMSG;
INTEGER FSNUM, FSINC, FSMSG;
BEGIN
    MESSAGE (FSMSG);
    SEQLIMIT[USER] := IF TAG.[SEQNO] LSS SEQLIM THEN
     TAG.[SEQNO] ELSE SEQLIM - 1;
    TAG.[SEQNO] := FSNUM;
    BINDEC (TRUE);
    IF L2FMT = DAFMT THEN
    BEGIN
        MESSAGE (29);
        IF CANDO[USER].[TYPE] = CONRAC THEN
         START[USER] := START[USER] - 1;
    END
    ELSE
    IF CANDO[USER].[TYPE] = CONRAC THEN
    BEGIN
        MESSAGE (29);
        START[USER] := START[USER] - 2;
    END;
    SEQSEQ[USER].[FSINCMT] := FSINC;
    SEQSEQ[USER].[FSEQNO] := FSNUM;
    SETBIT (SEQCOMD,USER);
    MESSAGE (52);
    TTYFIX;
END OF FIRSTSEQ;


PROCEDURE DATA;
  COMMENT

    DATA INSERTS THE RECORD ENTERED FROM THE TERMINAL INTO ITS
PROPER PLACE IN THE FILE.  THEN, IF A SEQUENCE COMMAND IS IN
EFFECT, IT PUTS THE NEXT SEQUENCE NUMBER ON THE SCREEN.  IF THE
RECORD FOR THE NEW SEQUENCE NUMBER OR ONE BETWEEN THE OLD AND NEW
NUMBERS EXISTS, IT DISPLAYS THAT RECORD AND CANCELS THE SEQUENCE
COMMAND.  THE SEQUENCE COMMAND IS ALSO CANCELLED IF A NUMBER OTHER
THAN THE EXPECTED ONE IS ENTERED.

USES: CANDO, FOUND, GOTO, LENGTH, LINE, LOGREC, L2TAG, OPREADY,
      PRESENT, RESTART, SEQCOMD, SEQLIMIT, SEQSEQ, SPEC, START,
      TAG, USER, USERCODE
CHANGES: CANDO, GOTO, OPREADY, SEQCOMD, SEQSEQ, START, TAG
CALLS: BACKUP, BINDEC, BLANKGM, CHARACTER, DECBIN, DSKREAD,
       DSKWRITE, ESCHAR, FINAL, MESSAGE, RESETBIT, SETBIT,
       TAGINSERT, TAGSEARCH, TESTBIT, TTYFIX
ERRORS: PLEASE LOG IN
        COMMAND INVALID AT THIS TIME
        INVALID USER CODE
        INVALID SEQUENCE NUMBER
        SYNTAX ERROR
        FILE FULL;

BEGIN
    INTEGER I;
```

```
LABEL DTXIT, DTCNI;

IF USERCODE[USER] = 0 OR TESTBIT (RESTART,USER) THEN
BEGIN                    COMMENT PLEASE LOG IN;
    MESSAGE (41);
    GO TO DTXIT;
END;
IF NOT TESTBIT (PRESENT,USER) THEN
BEGIN                    COMMENT COMMAND INVALID AT THIS TIME;
    MESSAGE (7);
    GO TO DTXIT;
END;
IF CANDO[USER].[ALLOW] LSS 3 THEN
BEGIN                    COMMENT INVALID USER CODE;
    MESSAGE (37);
    GO TO DTXIT;
END;
IF NOT SPEC AND LENGTH GTR LGTHLIM THEN
BEGIN                    COMMENT INVALID SEQUENCE NUMBER;
    MESSAGE (13);
    GO TO DTXIT;
END;
IF NOT SPEC AND CHARACTER (LINE[USER,*],START[USER]) NEQ
 " " AND CHARACTER (LINE[USER,*],START[USER]) NEQ GM THEN
BEGIN                    COMMENT SYNTAX ERROR;
    MESSAGE (36);
    GO TO DTXIT;
END;
TAGSEARCH (0,SEQLIM);
IF L2EOF GEQ RELRECMAX OR LOGREC GEQ MAXTAGS THEN
BEGIN                    COMMENT FILE FULL;
    MESSAGE (39);
    GO TO DTXIT;
END;
BACKUP;
TAGSEARCH (0,I := (IF SPEC THEN SEQSEQ[USER].[FSEQNO]
                   ELSE DECBIN));
BLANKGM (LINE[USER,*],START[USER] := START[USER] + 1,
 8 × (LINMAX + 1) - START[USER]);
ESCHAR (FALSE);
DSKWRITE;
TAG.[SEQNO] := I;
TAGINSERT;
IF NOT FOUND AND LOGREC LEQ CANDO[USER].[VPLR] THEN
 CANDO[USER].[VPLR] := CANDO[USER].[VPLR] + 1;
IF TESTBIT (SEQCOMD,USER) THEN
BEGIN                    COMMENT CONTINUE SEQUENCE COMMAND;
    IF I NEQ SEQSEQ[USER].[FSEQNO] THEN
    BEGIN                COMMENT NOT EXPECTED SEQUENCE NUMBER;
        RESETBIT (SEQCOMD,USER);
        MESSAGE (46);
        GO TO DTXIT;
    END;
    SEQSEQ[USER].[FSEQNO] := I := I + SEQSEQ[USER].[FSINCMT];
    TAGSEARCH (0,I := IF I GTR SEQLIMIT[USER] THEN
     SEQLIMIT[USER] ELSE I);
    MESSAGE (51);
    IF NOT FOUND THEN
     TAG.[SEQNO] := I;
    BINDEC (TRUE);
    IF FOUND THEN
    BEGIN                COMMENT DISPLAY RECORD;
        RESETBIT (SEQCOMD,USER);
        IF L2FMT = DAFMT THEN MESSAGE (29);
```

```
            IF DSKREAD (TRUE) THEN ELSE GO TO DTXIT;
            ESCHAR (TRUE);
            START[USER] := START[USER] + (IF L2FMT = DAFMT
             THEN 80 ELSE 72);
            MESSAGE (16);
            TTYFIX;
        END
        ELSE
        BEGIN
            IF L2FMT = DAFMT THEN
            BEGIN
                MESSAGE (29);
                IF CANDO[USER].[TYPE] = CONRAC THEN
                 START[USER] := START[USER] - 1;
            END
            ELSE
            IF CANDO[USER].[TYPE] = CONRAC THEN
            BEGIN
                MESSAGE (29);
                START[USER] := START[USER] - 2;
            END;
            MESSAGE (52);
    END;END
    ELSE
     MESSAGE (46);
  DTXIT:
    FINAL;
  DTCNT:
END OF DATA;



PROCEDURE LOGIN;
    COMMENT

        LOGIN FIRST CHECKS FOR SYNTAX ERRORS, AND IF NONE ARE FOUND,
    READS THE REMOTE USERS FILE TO SEE IF THE USER CODE IS VALID.  IF
    IT IS, AND THIS IS A RESTART, AND IT IS THE SAME USER AS BEFORE,
    LOGIN MERELY TURNS OFF THE RESTART SWITCH FOR THIS USER.  IF IT
    IS NOT A RESTART, OR IT IS A DIFFERENT USER, LOGIN CANCELS ANY
    PREVIOUS UPDATE, SETS THE NEW USER CODE, AND UPDATES THE BACKUP
    RECORD.

    USES: CLASS, KEY, LISTING, PREFIX, PRESENT, REEL, RESTART, SRCH,
          SRCHFILE, SUFFIX, UFILE, USER, USERCODE, USERS
    CHANGES: PREFIX, REEL, RESTART, SRCH, SRCHFILE, SUFFIX, UFILE,
             USERCODE, USERS
    CALLS: BACKUP, FINAL, LOGGER, MESSAGE, NEWFILE, PURGEFILE, RESETBIT,
           SCAN, SCANFILE, TESTBIT, WEBSTER
    ERRORS: TOO MANY PARAMETERS GIVEN
            INVALID USER CODE
            SYNTAX ERROR
            USER CODE MISSING;

    BEGIN
        BOOLEAN B;

        REAL I;
        FILE IN LOGINFILE DISK SERIAL "REMOTE" "USERS" (2,10,30);
        LABEL LIPAR, LIEOF, LIXIT;

        IF SCAN THEN
        BEGIN
            IF WEBSTER AND CLASS = 1 AND KEY = 3 AND SCANFILE THEN
```

```
          BEGIN
              IF SCAN THEN
              BEGIN           COMMENT TOO MANY PARAMETERS GIVEN;
                  MESSAGE (9);
                  GO TO LIXIT;
              END;
              REEL := STATUS (0,7);
              WHILE TRUE DO
              BEGIN           COMMENT CHECK USER CODE;
                  READ (LOGINFILE,7,SRCH[*]) [LIEOF:LIPAR];
                  IF SRCH[0] = 76 THEN GO TO LIEOF;
                  IF SRCH[0] NEQ 12 THEN
                   IF REAL (BOOLEAN (SRCH[0]) EQV
                   BOOLEAN (PREFIX)) = REAL (NOT FALSE) THEN
                   IF SRCH[6] GEQ 0
                   OR REAL (BOOLEAN ( -(SRCH[6])) EQV
                   BOOLEAN (SUFFIX)) = REAL (NOT FALSE) THEN
                  BEGIN
                      BACKUP;
                      B := TRUE;
                      IF TESTBIT (RESTART,USER) AND
                       REAL (BOOLEAN (USERCODE[USER]) EQV
                       BOOLEAN (PREFIX)) = REAL (NOT FALSE) THEN
                      BEGIN   COMMENT SAME USER AS BEFORE;
                          USERS := USERS + 1;
                          MESSAGE (43);
                      END
                      ELSE
                      BEGIN   COMMENT NEW USER;
                          I := PREFIX;
                          IF USERCODE[USER] = 0 THEN
                           USERS := USERS + 1
                          ELSE
                          IF TESTBIT (PRESENT,USER) OR
                           TESTBIT (LISTING,USER) THEN
                           PURGEFILE;
                          USERCODE[USER] := I;
                          REEL := STATUS (I,8);
                          PREFIX := SUFFIX := 0;
                          NEWFILE;
                          FILL UFILE[USER] WITH "NO     ","FILE   ";
                          FILL SRCHFILE WITH I,"ERRORS ";
                          SEARCH (SRCHFILE,SRCH[*]);
                          MESSAGE(IF SRCH[0] GEQ 2 THEN 49 ELSE 42);
                      END;
                      LOGGER (1);
                      RESETBIT (RESTART,USER);
                      GO TO LIEOF;
                  END;
                LIPAR:
              END;
            LIEOF:
              REEL := STATUS (0,7);
              CLOSE (LOGINFILE,RELEASE);
              IF NOT B THEN
               MESSAGE (37);  COMMENT INVALID USER CODE;
          END
          ELSE
           MESSAGE (36);      COMMENT SYNTAX ERROR;
      END
      ELSE
       MESSAGE (40);          COMMENT USER CODE MISSING;
  LIXIT:
    FINAL;
END OF LOGIN;
```

```
PROCEDURE LOGOUT;
    COMMENT

        LOGOUT FIRST CHECKS TO SEE IF AN UPDATE IS IN PROGRESS.
    IF THERE IS A FILE BEING UPDATED, LOGOUT CANCELS THE UPDATE.
    IT THEN SETS THE USER CODE FOR THAT TERMINAL TO ZERO, AND UPDATES
    THE BACKUP RECORD.

    USES: CANDO, LISTING, PREFIX, PRESENT, SUFFIX, USER, USERCODE, USERS
    CHANGES: CANDO, PREFIX, PRESENT, SUFFIX, USERCODE, USERS
    CALLS: BACKUP, FINAL, LOGGER, MESSAGE, NEWFILE, PURGEFILE, SCAN,
          TESTBIT
    ERRORS: TOO MANY PARAMETERS GIVEN;

    BEGIN
        INTEGER I, J;

        LABEL LOSKP, LOXIT;

        IF SCAN THEN
        BEGIN                   COMMENT TOO MANY PARAMETERS GIVEN;
            MESSAGE (9);
            GO TO LOXIT;
        END;
        IF USERCODE[USER] = 0 THEN GO TO LOSKP;
        BACKUP;
        IF TESTBIT (PRESENT,USER) OR TESTBIT (LISTING,USER) THEN
         PURGEFILE;
        LOGGER (2);
        USERCODE[USER] := PREFIX := SUFFIX := 0;
        USERS := USERS - 1;
        CANDO[USER].[ALLOW] := 0;
        NEWFILE;
      LOSKP:
        MESSAGE (1);
      LOXIT:
        FINAL;
    END OF LOGOUT;


PROCEDURE PRINTDIR;
            COMMENT:

PRINTDIR    THIS MODULE IS USED TO LOOKUP A FILE NAME IN THE DISK
            DIRECTORY. IF THE FILE EXISTS AND THE USER IS VALID
            THEN THE FILE"S CHARACTERISTICS AND THE FILE"S STATUS
            ARE DISPLAYED.
            CHARACTERISTICS: TYPE USER
                             RECORD LENGTH
                             BLOCK LENGTH
                             EOF POINTER
            FILE STATUS    : FILE INTERLOCK
                             DATE OF LAST ACCESS
                             OPEN COUNT

            USES: LINE, PREFIX, SRCH, SRCHFILE, START, SUFFIX, USER
            CHANGES: LINE, SRCH, SRCHFILE, START
            CALLS: CMOVE, FILERROR, FINAL, MESSAGE, PDCVT, PDFILL,
                   PDTBIT, SCAN, SCANFILE, TTYFIX
```

```
            LOCAL PROCEDURES PDFILL,PDCVT,PDTBIT
        ERRORS: TOO MANY PARAMETERS GIVEN
                INVALID USER
                FILE NOT FOUND
                INVALID FILE NAME;

BEGIN
    LABEL   PDEXIT;

    REAL    PDWD;

    STREAM PROCEDURE PDFILL (PDARY,PDFSKP);
        VALUE  PDFSKP;
        BEGIN
            DI := PDARY;            DI := DI + PDFSKP;
            DS := 3 LIT "TU=";      DI := DI + 3;
            DS := 3 LIT "RL=";      DI := DI + 8;
            DS := 3 LIT "BL=";      DI := DI + 8;
            DS := 4 LIT "EOF=";     DI := DI + 10;
            DS := 4 LIT "ITK=";     DI := DI + 4;
            DS := 4 LIT "LAC=";     DI := DI + 8;
            DS := 3 LIT "OC=";
        END OF PDFILL;

    BOOLEAN STREAM PROCEDURE PDTBIT (PDTWD,PDSKB);
        VALUE  PDSKB;
        BEGIN
            SI := PDTWD;  SKIP PDSKB SB;
            IF SB THEN TALLY := 1;
            PDTBIT := TALLY;
        END OF PDTBIT;

    STREAM PROCEDURE PDCVT(PDS,PDD,PDSKD,PDDLN,PDSUP);
        VALUE  PDSKD,PDDLN,PDSUP;
        BEGIN
            LOCAL PDDIV;
            SI := LOC PDSKD;  DI := LOC PDDIV;
            DI := DI + 1;  DS := 7 CHR;
            SI := PDS;
            DI := PDD;
            PDDIV(2(DI := DI + 32));
            DI := DI + PDSKD;
            DS := PDDLN DEC;          % TRANSFER AND CONVERT TO DEC
            DI := DI - PDDLN;
            DS := PDSUP FILL;         % SUPPRESS ZEROS
        END OF PDCVT;

    IF SCANFILE
    THEN
    BEGIN
        IF SCAN
        THEN
        BEGIN
            MESSAGE (9);              % TOO MANY PARAMETERS GIVEN
            GO PDEXIT;
        END;
        FILL SRCHFILE WITH PREFIX, SUFFIX; % IN CASE OF WRONG MCP
        SRCH[1] := PREFIX;  SRCH[2] := SUFFIX;
        SRCH[3] := 0;  SRCH[6] := "*/%&#$@";
        SEARCH (SRCHFILE,SRCH[*]);
        IF SRCH[0] LEQ 0
        THEN
        BEGIN
            FILERROR (SRCH[0]);       % FILE NOT FOUND OR INVALID USER
            GO PDEXIT;
```

```
        END;
        MESSAGE (3);                   % SETUP MESSAGE
                                       % FILL IN PD DISPLAY FORMAT
        PDFILL (LINE[USER,*],START[USER] + 1);
        PDCVT (SRCH[0],LINE[USER,*],(START[USER] + 4),1,0);
        PDCVT (SRCH[3],LINE[USER,*],(START[USER] + 10),5,4);
        PDCVT (SRCH[4],LINE[USER,*],(START[USER] + 21),5,4);
        PDCVT (SRCH[5],LINE[USER,*],(START[USER] + 33),7,6);
        PDWD := IF PDTBIT (SRCH[6],1) THEN "Y" ELSE "N";
        CMOVE (PDWD,LINE[USER,*],7,(START[USER] + 47),1);
        PDWD := SRCH[6].[12:18];
        PDCVT (PDWD,LINE[USER,*],(START[USER] + 55),5,4);
        PDWD := SRCH[6].[42:6];
        PDCVT (PDWD,LINE[USER,*],START[USER] + 66,1,0);
        START[USER] := START[USER] + 67;
        MESSAGE (16);                  % END UP MESSAGE
        TTYFIX;
    END
    ELSE
    MESSAGE (34);                      % INVALID FILE NAME
  PDEXIT:
    FINAL;
  END OF PRINTDIR;



PROCEDURE REMOVE;
    COMMENT

        REMOVE FIRST MAKES SURE THAT THE CURRENT USER IS ALLOWED TO
    PERFORM LIBRARY MAINTENANCE ON THE SPECIFIED FILE, AND THEN ZIPS
    A REMOVE CONTROL CARD TO REMOVE THE FILE.

    USES: PREFIX, SRCH, SRCHFILE, SUFFIX
    CHANGES: SRCH, SRCHFILE
    CALLS: BACKUP, CMOVE, FILERROR, FINAL, MESSAGE, SCAN, SCANFILE
    ERRORS: TOO MANY PARAMETERS GIVEN
            FILE NOT FOUND
            INVALID USER OF FILE
            FILE IN USE
            INVALID FILE NAME;

    BEGIN
        LABEL RMXIT;


        IF SCANFILE THEN
        BEGIN
            IF SCAN THEN
            BEGIN               COMMENT TOO MANY PARAMETERS GIVEN;
                MESSAGE (9);
                GO TO RMXIT;
            END;
            FILL SRCHFILE WITH PREFIX, SUFFIX;
            SEARCH (SRCHFILE,SRCH[*]);
            IF SRCH[0] NEQ 7 OR SRCH[6] GTR 0 THEN
            BEGIN               COMMENT CANT OR WONT REMOVE FILE;
                FILERROR (SRCH[0]);
                GO TO RMXIT;
            END;
            BACKUP;
            FILL SRCH[*] WITH
             "CC REMOV",OCT2560776060606060,OCT6060776177606060,
```

```
          OCT6060606077606060," ; END. ";

          CMOVE (PREFIX,SRCH[1],1,3,7);
          CMOVE (SUFFIX,SRCH[2],1,5,7);
          ZIP WITH SRCH[*];
          MESSAGE (5);
      END
      ELSE
       MESSAGE (34);           COMMENT INVALID FILE NAME;
    RMXIT:
      FINAL;
  END OF REMOVE;



PROCEDURE CHANGE;
    COMMENT

        CHANGE FIRST MAKES SURE THAT THE CURRENT USER IS ALLOWED
    TO PERFORM LIBRARY MAINTENANCE ON THE SPECIFIED FILE AND
    THAT THE FILE IS NOT IN USE.  THEN IF THERE IS NO FILE IN
    THE DIRECTORY WITH THE NEW NAME, CHANGE ZIPS A CONTROL CARD
    WHICH WILL CHANGE THE NAME OF THE FILE.

    USES: CLASS, KEY, PREFIX, SRCH, SRCHFILE, SUFFIX
    CHANGES: SRCH, SRCHFILE
    CALLS: BACKUP, CMOVE, FILERROR, FINAL, MESSAGE, SCAN,
           SCANFILE, WEBSTER
    ERRORS: FILE NOT FOUND
            INVALID USER OF FILE
            FILE IN USE
            TOO MANY PARAMETERS GIVEN
            FILE EXISTS
            INVALID FILE NAME
            SYNTAX ERROR;

    BEGIN
        REAL P, S;

        LABEL CHIFN, CHXIT;

        IF SCANFILE THEN
        BEGIN
            FILL SRCHFILE WITH P := PREFIX, S := SUFFIX;
            SEARCH (SRCHFILE,SRCH[*]);
            IF SRCH[0] LSS 7 OR SRCH[6] GTR 0 THEN
            BEGIN              COMMENT NOT FOUND, INV. USER, OR IN USE;
                FILERROR (SRCH[0]);
                GO TO CHXIT;
            END;
            IF SCAN AND WEBSTER AND CLASS = 4 AND KEY = 8 THEN
            BEGIN
                IF SCANFILE THEN
                BEGIN
                    IF SCAN THEN
                    BEGIN       COMMENT TOO MANY PARAMETERS GIVEN;
                        MESSAGE (9);
                        GO TO CHXIT;
                    END;
                    FILL SRCHFILE WITH PREFIX, SUFFIX;
                    SEARCH (SRCHFILE,SRCH[*]);
                    IF SRCH[0] NEQ -1 THEN
                    BEGIN       COMMENT FILE EXISTS;
                        FILERROR (6);
```

```
                GO TO CHXIT;
            END;
            FILL SRCH[*] WITH
             "CC CHANG",OCT2560776060606060,

             OCT6060776177606060,OCT6060606077606346,
             OCT6077606060606060,OCT6077617760606060,
             OCT6060607756606060,"END.    ";

            CMOVE (P,SRCH[1],1,3,7);
            CMOVE (S,SRCH[2],1,5,7);
            CMOVE (PREFIX,SRCH[4],1,2,7);
            CMOVE (SUFFIX,SRCH[5],1,4,7);
            ZIP WITH SRCH[*];
            BACKUP;
            MESSAGE (5);
        END
        ELSE
      CHIFN:
        BEGIN              COMMENT INVALID FILE NAME;
            MESSAGE (34);
            GO TO CHXIT;
    END;END
    ELSE
    BEGIN                  COMMENT SYNTAX.ERROR;
        MESSAGE (36);
        GO TO CHXIT;
END;END
ELSE GO TO CHIFN;
CHXIT:
  FINAL;
END OF CHANGE;




PROCEDURE LOAD;
    COMMENT

        LOAD CHECKS TO SEE IF AN UPDATE IS IN PROGRESS, AND IF SO,
    CANCELS IT.  IT THEN LOOKS FOR A VALID FILE NAME, AND IF ONE IS
    FOUND, LOAD CHECKS TO SEE IF THE USER MAY ACCESS THE NAMED FILE.
    THEN IT CHECKS TO SEE IF THE FILE IS IN THE RIMS FORMAT.  IF IT
    IS, THE LEVEL 1 TAGS AND THE LEVEL 2 TAGS ARE COPIED INTO THE WORK
    FILE, THE USERS DATA FILE IS INITIALIZED, THE BACKUP RECORD IS
    UPDATED, AND THE FILE IS MARKED PRESENT.

    USES: CANDO, CREATESW, FIRSTVIEW, LASTAGBLK, LASTXUSER, LASTOUSER,
          LISTING, L1CHANGED, L1TAG, L2CHANGED, L2TAG, PREFIX, PRESENT,
          PREVBLOCK, SRCH, SUFFIX, TAG, TAGFILE, UFILE, USER
    CHANGES: CANDO, FIRSTVIEW, LASTXUSER, LASTOUSER, L1CHANGED, L1TAG,
             L2CHANGED, L2TAG, PRESENT, PREVBLOCK, SRCH, TAG, TAGFILE,
             UFILE
    CALLS: BACKUP, DSKREAD, FILERROR, FINAL, MESSAGE, NEWFILE,
           PURGEFILE, RIMSFILE, SCAN, SCANFILE, SETBIT, SETROWSIZE,
           TAGWRITE, TESTBIT
    ERRORS: TOO MANY PARAMETERS GIVEN
            FILE NOT FOUND
            INVALID USER OF FILE
            FILE IN USE
            FILE NOT A RIMS FILE
            INVALID FILE NAME
            INPUT ERROR;

    BEGIN
```

```
INTEGER I;

FILE IN LOADFILE DISK RANDOM (1,BLKSZ);
LABEL LDEOF, LDPAR, LDEND, LDERR, LDXIT;

IF TESTBIT (PRESENT,USER) OR TESTBIT (LISTING,USER) THEN
BEGIN
    I := REAL (TESTBIT (CREATESW,USER));
    PURGEFILE;
END;
IF SCANFILE THEN
BEGIN
    IF SCAN THEN
    BEGIN                   COMMENT TOO MANY PARAMETERS GIVEN;
        MESSAGE (9);
        GO TO LDXIT;
    END;
    IF BOOLEAN (I) THEN
     IF REAL (BOOLEAN (PREFIX) EQV BOOLEAN (SRCH[1])) =
     REAL (NOT FALSE) THEN
     IF REAL (BOOLEAN (SUFFIX) EQV BOOLEAN (SRCH[2])) =
     REAL (NOT FALSE) THEN
    BEGIN                   COMMENT FILE NOT FOUND;
    COMMENT  IT IS BEING REMOVED BY PURGEFILE;
        FILERROR (-1);
        GO TO LDXIT;
    END;
    FILL LOADFILE WITH PREFIX, SUFFIX;
    SEARCH (LOADFILE,SRCH[*]);
    IF SRCH[0] LSS 2 THEN
    BEGIN                   COMMENT CANT OR WONT LOAD THIS FILE;
        FILERROR (SRCH[0]);
        GO TO LDXIT;
    END;
    IF SRCH[6] GTR 0 THEN
    BEGIN                   COMMENT FILE IN USE;
        FILERROR (7);
        GO TO LDXIT;
    END;
    IF NOT RIMSFILE THEN
    BEGIN                   COMMENT FILE NOT A RIMS FILE;
        FILERROR (1);
        GO TO LDXIT;
    END;
    TAGWRITE (0);  TAGWRITE (LASTAGBLK);
    LASTXUSER := LASTOUSER := USER;
    READ (LOADFILE[0],BLKSZ,L2TAG[*]) [LDEOF:LDPAR];
    SETROWSIZE (LOADFILE,34);   % FIX FILE INFORMATION BLOCK
    FOR I := 1 STEP 1 UNTIL L2COUNT DO
    BEGIN                   COMMENT READ IN LEVEL 1 TAGS;
        READ (LOADFILE[9×I-8],BLKSZ,L1TAG[*]) [LDEOF:LDPAR];
        L1CHANGED := TRUE;
        TAGWRITE (LASTAGBLK := I);
    END;
    L2CHANGED := TRUE;
    TAGWRITE (0);
    CANDO[USER].[ALLOW] := SRCH[0];
    FILL UFILE[USER] WITH PREFIX, SUFFIX;
    NEWFILE;
    SETBIT (PRESENT,USER);
    SETBIT (FIRSTVIEW,USER);
    PREVBLOCK[USER] := 0;
    TAG.[RELREC] := 30;
    IF DSKREAD (FALSE) THEN ELSE GO TO LDEND;
    BACKUP;
```

```
            MESSAGE (5);
            GO TO LDEND;
        END;
        MESSAGE (34);           COMMENT INVALID FILE NAME;
        GO TO LDXIT;
      LDEOF:
      LDPAR:
        MESSAGE (35);           COMMENT INPUT ERROR;
      LDEND:
        SETROWSIZE (LOADFILE,170);      % RESTORE FILE INFORMATION BLOCK
      LDERR:
        CLOSE (LOADFILE,RELEASE);
      LDXIT:
        FINAL;
    END OF LOAD;


PROCEDURE SEQUENCE;
    COMMENT

        SEQUENCE SEARCHES FOR THE REQUESTED TAG, AND IF IT FINDS IT,
    PUTS IT ON THE CRT SCREEN FOR VIEWING OR CHANGING.  IF THE TAG IS
    NOT FOUND, SEQUENCE CALLS FIRSTSEQ TO SET UP FOR FOLLOWING DATA
    AND DISPLAY THE SEQUENCE NUMBER ON THE CRT.  IF NO INCREMENT IS
    GIVEN, 10 IS ASSUMED.

    USES: FOUND, GOTO, LENGTH, L2TAG, NUMR, OPREADY, PRESENT,
          SEQSEQ, START, USER
    CHANGES: GOTO, OPREADY, SEQSEQ, START
    CALLS: BACKUP, BINDEC, DECBIN, DSKREAD, ESCHAR, FINAL, FIRSTSEQ,
           MESSAGE, SCAN, SETBIT, TAGSEARCH, TESTBIT, TTYFIX
    ERRORS: COMMAND INVALID AT THIS TIME
            INVALID INCREMENT
            TOO MANY PARAMETERS GIVEN
            INVALID SEQUENCE NUMBER
            SEQUENCE NUMBER MISSING;

    BEGIN
        INTEGER SQNUM, SQINC;

        LABEL SQXIT, SQCNT;

        IF NOT TESTBIT (PRESENT,USER) THEN
        BEGIN                   COMMENT COMMAND INVALID AT THIS TIME;
            MESSAGE (7);
            GO TO SQXIT;
        END;
        IF SCAN THEN
        BEGIN
            IF NUMR AND LENGTH LEQ LGTHLIM THEN
            BEGIN
                SQNUM := DECBIN;
                IF SCAN THEN
                BEGIN
                    IF NUMR AND LENGTH LEQ LGTHLIM THEN
                    BEGIN
                        IF SQINC := DECBIN = 0 THEN
                        BEGIN   COMMENT INVALID INCREMENT;
                            MESSAGE (15);
                            GO TO SQXIT;
                        END;
                        IF SCAN THEN
                        BEGIN   COMMENT TOO MANY PARAMETERS GIVEN;
```

```
                        MESSAGE (9);
                        GO TO SQXIT;
                END;END
                ELSE
                BEGIN         COMMENT INVALID INCREMENT;
                    MESSAGE (15);
                    GO TO SQXIT;
            END;END
            ELSE
            SQINC := 10;
        END
        ELSE
        BEGIN                    COMMENT INVALID SEQUENCE NUMBER;
            MESSAGE (13);
            GO TO SQXIT;
    END;END
    ELSE
    BEGIN                        COMMENT SEQUENCE NUMBER MISSING;
        MESSAGE (11);
        GO TO SQXIT;
    END;
    BACKUP;
    TAGSEARCH (0,SQNUM);
    IF FOUND THEN
    BEGIN                        COMMENT DISPLAY RECORD;
        MESSAGE (3);
        BINDEC (TRUE);
        IF L2FMT = DAFMT THEN MESSAGE (29);
        IF DSKREAD (TRUE) THEN ELSE GO TO SQXIT;
        ESCHAR (TRUE);
        START[USER] := START[USER] + (IF L2FMT = DAFMT
         THEN 80 ELSE 72);
        MESSAGE (16);
        TTYFIX;
    END
    ELSE
     FIRSTSEQ (SQNUM,SQINC,51);
  SQXIT:
    FINAL;
  SQCNT:
END OF SEQUENCE;



PROCEDURE VIEW2 (V2CRTFIRST);
    COMMENT

        VIEW2 IS THE DATA WRITING PORTION OF THE VIEW COMMAND.  IT USES
    ONE TAG FROM ARRAY "VWARRAY" TO GET DATA RECORDS TO DISPLAY.  IF IT
    USES UP ALL THE TAGS IN VWARRAY AND THERE ARE STILL MORE RECORDS TO
    DISPLAY, IT SETS UP VWARRAY AGAIN, AS IN VIEW.  IF "NO" WAS ENTERED
    IN THE VIEW COMMAND, IT SKIPS ALL RECORDS BEGINNING WITH "@".
    AFTER DISPLAYING ONE RECORD, IT SETS GOTO TO RETURN, AND EXITS.

    USES: BREAKEY, CANDO, FIRSTVIEW, FOUND, GOTO, LASTVIEWREC, LINE,
          OPREADY, SCW, START, STARTMSG, TAG, USER, VWARRAY
    CHANGES: FIRSTVIEW, GOTO, LASTVIEWREC, OPREADY, SCW, START,
             STARTMSG, VWARRAY
    CALLS: BINDEC, CHARACTER, DSKREAD, ESCHAR, FINAL, MESSAGE, RESETBIT,
           SETBIT, TAGSEARCH, TESTBIT, TTYFIX
    ERRORS: END OF FILE;

    VALUE V2CRTFIRST;
    BOOLEAN V2CRTFIRST;
```

```
BEGIN
    INTEGER I;

    REAL R;
    LABEL V2XIT, V2END;

    STARTMSG := TRUE;
    IF (R := LASTVIEWREC[USER]).[LCNT] GTR 0
     AND NOT TESTBIT (BREAKEY,USER) THEN
    BEGIN
        IF R.[VNDX] GTR LINEMAX THEN
        BEGIN                  COMMENT REFILL VWARRAY;
            FOR I := 0 STEP 1 UNTIL LINEMAX DO
            BEGIN
                TAGSEARCH (1,R.[VREC] + I);
                VWARRAY[USER,I] := (IF FOUND THEN TAG ELSE -1);
            END;
            R.[VNDX] := 0;
        END;
        MESSAGE (IF V2CRTFIRST OR TESTBIT (FIRSTVIEW,USER)
         THEN 3 ELSE 4);
        I := R.[VNDX];
        IF VWARRAY[USER,I] = -1 THEN
        BEGIN                  COMMENT END OF FILE;
            START[USER] := START[USER] - 1;
            MESSAGE (22);
            IF CANDO[USER].[TYPE] = TC500 THEN
            BEGIN
                START[USER] := START[USER] - 1;
                MESSAGE (48);
            END;
            GO TO V2END;
        END;
        TAG := VWARRAY[USER,I];
        BINDEC (TRUE);
        R.[VNDX] := I + 1;
        IF R.[V2FMT] = DAFMT THEN
         MESSAGE (29);                 % NEW LINE FOR DATA FORMAT
        IF DSKREAD (TRUE) THEN ELSE GO TO V2END;
        IF BOOLEAN (R.[VWND]) THEN
         IF CHARACTER (LINE[USER,*],START[USER]) = "@" THEN
        BEGIN                  COMMENT SKIP DOCUMENTATION RECORD;
            IF V2CRTFIRST THEN SETBIT (FIRSTVIEW,USER);
            SETBIT (SCW,USER);
            GO TO V2XIT;
        END;
        RESETBIT (FIRSTVIEW,USER);
        ESCHAR (TRUE);
        START[USER] := START[USER] +
         (IF R.[V2FMT] = DAFMT THEN 80 ELSE 72);
        MESSAGE (6);
        TTYFIX;
        SETBIT (OPREADY,USER);
        R.[LCNT] := R.[LCNT] - 1;
      V2XIT:
        R.[VREC] := R.[VREC] + 1;
        LASTVIEWREC[USER] := R;
        GOTO[USER] := GOVIEW2;
    END
    ELSE
    BEGIN                      COMMENT END OF VIEW;
        IF CANDO[USER].[TYPE] = TTY THEN
        BEGIN
            MESSAGE (4);  MESSAGE (6);
        END
```

```
          ELSE
           MESSAGE (0);
         V2END:
          FINAL;
       END;
    END OF VIEW2;


PROCEDURE VIEW;
    COMMENT

        VIEW SCANS FOR UP TO 5 OPTIONAL PARAMETERS:
    1. A SEQUENCE NUMBER WHICH IS TO BE THE FIRST RECORD VIEWED.  IF
     THIS SEQUENCE NUMBER DOES NOT EXIST, THE PRECEDING RECORD WILL BE
     THE FIRST ONE VIEWED.
    2. A DIRECTION TO SKIP RECORDS, FROM EITHER THE PREVIOUSLY VIEWED
     RECORDS OR THE ABOVE SEQUENCE NUMBER IF IT WAS ENTERED.
    3. THE NUMBER OF RECORDS TO SKIP.  IF PARAMETER 2 IS ENTERED AND
     THIS NUMBER IS OMITTED, THE ASSUMED NUMBER WILL BE 13 FOR A CRT
     AND NON-DATA FORMAT FILE, AND 6 FOR OTHER DEVICE TYPES OR DATA
     FORMAT FILES.
    4. "NO" INDICATES THAT DOCUMENTATION RECORDS ("@" IN COLUMN 1) ARE
     NOT TO BE DISPLAYED.
    5. THE NUMBER OF LINES TO BE DISPLAYED.  IF THIS PARAMETER IS
     OMITTED, THE ASSUMED VALUE IS THE SAME AS FOR PARAMETER 3.
        VIEW FIRST SETS UP THE INFORMATION NECESSARY FOR VIEW2 TO
    DISPLAY UP TO 13 LINES.  IF THIS INFORMATION IS NOT ENOUGH (E.G.
    SOME LINES ARE DOCUMENTATION AND "NO" HAS BEEN ENTERED), VIEW2
    MUST DO ITS OWN SETUP AS REQUIRED.  VIEW THEN CALLS VIEW2 TO
    CONTINUE THE OPERATION.

    USES: BREAKEY, CANDO, CLASS, FIRSTVIEW, FOUND, KEY, LASTVIEWREC,
          LENGTH, LINE, LOGREC, L2TAG, NUMR, PRESENT, START, TAG, USER,
          VIEWFBOK, VWARRAY, WORD
    CHANGES: BREAKEY, CANDO, FIRSTVIEW, LASTVIEWREC, LENGTH, LINE,
             LOGREC, START, VIEWFBOK, VWARRAY
    CALLS: CMOVE, DECBIN, ESCHAR, FINAL, MESSAGE, RESETBIT, SCAN,
           SETBIT, TAGREAD, TAGSEARCH, TESTBIT, TTYFIX, VIEW2, WEBSTER
    ERRORS: COMMAND INVALID AT THIS TIME
            INVALID SEQUENCE NUMBER
            TOO MANY PARAMETERS GIVEN
            INVALID INCREMENT
            XXX NOT A VALID PARAMETER
            SYNTAX ERROR
            NO RECORDS IN FILE;

    BEGIN
        BOOLEAN VWNODOC;

        INTEGER I, J, K;
        REAL R;
        LABEL VWIP, VWDFLT, VWXIT, VWEND;

        IF NOT TESTBIT (PRESENT,USER) THEN
        BEGIN                    COMMENT COMMAND INVALID AT THIS TIME;
            MESSAGE (7);
            GO TO VWXIT;
        END;
        TAGREAD (0);
        I := J := K := (IF CANDO[USER].[KIND] = CRT AND L2FMT = DAFMT
         THEN CANDO[USER].[LINES] DIV 2 ELSE CANDO[USER].[LINES]);
        LOGREC := CANDO[USER].[VPLR];
        R := LASTVIEWREC[USER];
```

```
IF SCAN THEN
BEGIN
    IF NUMR THEN
    BEGIN
        IF LENGTH LEQ LGTHLIM THEN
        BEGIN
            TAGSEARCH (0,DECBIN);
            IF NOT FOUND AND LOGREC GTR 0 THEN
             LOGREC := LOGREC - 1;
            SETBIT (VIEWFBOK,USER);
            I := 0;
            IF SCAN THEN
            ELSE GO TO VWDFLT;
        END
        ELSE
        BEGIN               COMMENT INVALID SEQUENCE NUMBER;
            MESSAGE (13);
            GO TO VWXIT;
    END;END
    ELSE
    IF WEBSTER AND CLASS = 4 AND KEY = 3 THEN
    BEGIN                   COMMENT * VIEW HDR;
        IF SCAN THEN
        BEGIN               COMMENT TOO MANY PARAMETERS GIVEN;
            MESSAGE (9);
            GO TO VWXIT;
        END;
        MESSAGE (23);
        CMOVE (HDR,LINE[USER,*],0,START[USER],72);
        ESCHAR (TRUE);
        START[USER] := START[USER] + 72;
        MESSAGE (16);
        TTYFIX;
        GO TO VWXIT;
END;END
ELSE
 GO TO VWDFLT;
IF WEBSTER AND CLASS = 4 AND KEY LEQ 2 THEN
BEGIN
    I := K & REAL (KEY = 2) [1:47:1];
    IF SCAN THEN
    BEGIN
        IF NUMR THEN
        BEGIN
            IF LENGTH LEQ 4 THEN
            BEGIN
                I.[2:46] := DECBIN;
                IF SCAN THEN
                ELSE GO TO VWDFLT;
            END
            ELSE
            BEGIN       COMMENT INVALID INCREMENT;
                MESSAGE (15);
                GO TO VWXIT;
    END;END;END
    ELSE GO TO VWDFLT;
END;
IF VWNODOC := (WEBSTER AND CLASS = 4 AND KEY = 9) THEN
 IF SCAN THEN
 ELSE GO TO VWDFLT;
IF WEBSTER AND CLASS = 1 AND KEY = 3 THEN
BEGIN
    IF SCAN THEN
    BEGIN
        IF NUMR AND LENGTH LEQ 4 THEN
```

```
            BEGIN
                IF J GTR DECBIN THEN J := DECBIN;
                IF SCAN THEN
                BEGIN       COMMENT TOO MANY PARAMETERS GIVEN;
                    MESSAGE (9);
                    GO TO VWXIT;
            END;END
            ELSE
          VWIP:
            BEGIN           COMMENT XXX NOT A VALID PARAMETER;
                MESSAGE (2);
                IF LENGTH GTR 30 THEN LENGTH := 30;
                CMOVE (WORD,LINE[USER,*],0,START[USER],LENGTH);
                ESCHAR (TRUE);
                START[USER] := START[USER] + LENGTH;
                MESSAGE (21);
                GO TO VWXIT;
        END;END
        ELSE
        BEGIN               COMMENT SYNTAX ERROR;
            MESSAGE (36);
            GO TO VWXIT;
    END;END
    ELSE
     GO TO VWIP;
  VWDFLT:
    IF NOT TESTBIT (VIEWFBOK,USER) THEN
    IF TESTBIT (FIRSTVIEW,USER) THEN
    BEGIN
        RESETBIT (FIRSTVIEW,USER);
        LOGREC := I := 0;
    END
    ELSE
    BEGIN               COMMENT COMMAND INVALID AT THIS TIME;
        MESSAGE (7);
        GO TO VWXIT;
    END;
    IF LOGREC := LOGREC + I LSS 0 THEN LOGREC := 0;
    R.[VNDX] := 0;
    R.[VREC] := LOGREC;
    R.[VWND] := REAL (VWNODOC);
    R.[V2FMT] := L2FMT;
    R.[LCNT] := J;
    LASTVIEWREC[USER] := R;
    CANDO[USER].[VPLR] := LOGREC;
    FOR K := 0 STEP 1 UNTIL LINEMAX DO
    BEGIN
        TAGSEARCH (1,LOGREC + REAL (K GTR 0));
        IF FOUND THEN
         VWARRAY[USER,K] := TAG
        ELSE
        BEGIN               COMMENT END OF FILE;
            IF LOGREC = 0 THEN
            BEGIN           COMMENT NO RECORDS IN FILE;
                MESSAGE (26);
              VWXIT:
                FINAL;
                GO TO VWEND;
            END
            ELSE
            IF K = 0 THEN
            BEGIN
                TAGSEARCH (0,SEQLIM);
                LOGREC := LOGREC - 1;
                K := -1;
```

```
            END
            ELSE
             VWARRAY[USER,K] := -1;
      END;END;
      RESETBIT (BREAKEY,USER);
      VIEW2 (TRUE);
      SETBIT (VIEWFBOK,USER);
    VWEND:
  END OF VIEW;



PROCEDURE SAVER;
    COMMENT

        SAVER FIRST CHECKS TO SEE IF AN UPDATE IS CURRENTLY IN PROGRESS,
    AND IF SO, CHECKS FOR 1 PARAMETER.  IT LEAVES "KEY" SET TO THAT
    PARAMETERS KEY, OR "PUBLIC" IF NONE GIVEN, FOR USE LATER.
    SAVER THEN WRITES ALL USEFUL TAGS INTO THE USERS
    PERMANENT FILE, AND LOCKS THAT FILE.  IT THEN UPDATES THE BACKUP
    RECORD AND RESETS PRESENT AND CREATESW.  THEN, IF NO PARAMETER WAS
    GIVEN, IT ZIPS A CONTROL CARD MAKING THE FILE A PUBLIC FILE.  IF
    THE PARAMETER WAS "FREE", IT ZIPS A FREE CONTROL CARD.  IF THE
    PARAMETER WAS "SOLE", IT ZIPS A RELEASE CARD.  IF THE PARAMETER
    WAS "INFO", IT ZIPS AN INFO CARD.  HOWEVER, IF NO CHANGE IS
    REQUIRED, IT DOES NOT ZIP ANYTHING.

    USES: CANDO, CLASS, CREATESW, KEY, LENGTH, LINE, L1TAG, L2TAG,
          PREFIX, PRESENT, REEL, SRCH, START, SUFFIX, UFILE, USER, WORD
    CHANGES: CANDO, CREATESW, KEY, LENGTH, LINE, L2TAG, PREFIX, PRESENT,
             REEL, SRCH, START, SUFFIX, UFILE
    CALLS: BACKUP, CMOVE, ESCHAR, FINAL, GETFILENAME, MESSAGE, NEWFILE,
           RESETBIT, SCAN, SETROWSIZE, TAGREAD, TESTBIT, WEBSTER
    ERRORS: COMMAND INVALID AT THIS TIME
            INVALID PARAMETER
            TOO MANY PARAMETERS GIVEN
            NO RECORDS IN FILE;

    BEGIN
        INTEGER I;

        FILE OUT SAVEFILE DISK RANDOM (1,BLKSZ);
        LABEL SVOK, SVXIT;

        IF NOT TESTBIT (PRESENT,USER) THEN
        BEGIN                       COMMENT COMMAND INVALID AT THIS TIME;
            MESSAGE (7);
            GO TO SVXIT;
        END;
        IF SCAN THEN
        BEGIN
            IF NOT WEBSTER OR CLASS NEQ 4 OR KEY LSS 4 OR KEY GTR 7
             THEN
            BEGIN                   COMMENT INVALID PARAMETER;
                MESSAGE (2);
                IF LENGTH GTR 30 THEN LENGTH := 30;
                CMOVE (WORD,LINE[USER,*],0,START[USER],LENGTH);
                ESCHAR (TRUE);
                START[USER] := START[USER] + LENGTH;
                MESSAGE (21);
                GO TO SVXIT;
        END;END
        ELSE
         KEY := 7;
```

```
IF SCAN THEN
BEGIN                       COMMENT TOO MANY PARAMETERS GIVEN;
    MESSAGE (9);
    GO TO SVXIT;
END;
IF CANDO[USER].[ALLOW] LSS 3 THEN GO TO SVOK;
TAGREAD (0);
IF L2COUNT = 0 THEN
BEGIN                       COMMENT NO RECORDS IN FILE;
    MESSAGE (26);
    GO TO SVXIT;
END;
IF (I := L2COUNT × 135 - 105) GTR L2EOF THEN
 WRITE (UFILE[USER][I DIV 3]);
LOCK (UFILE[USER]);
GETFILENAME (PREFIX,SUFFIX);
FILL SAVEFILE WITH PREFIX, SUFFIX;
WRITE (SAVEFILE[0],BLKSZ,L2TAG[*]);
SETROWSIZE (SAVEFILE,34);         % FIX FILE INFORMATION BLOCK
FOR I := 1 STEP 1 UNTIL L2COUNT DO
BEGIN
    TAGREAD (I);
    WRITE (SAVEFILE[9×I-8],BLKSZ,L1TAG[*]);
END;
SETROWSIZE (SAVEFILE,170);        % RESTORE FILE INFORMATION BLOCK
CLOSE (SAVEFILE,RELEASE);
WRITE (UFILE[USER][0],30,L2TAG[*]);
LOCK (UFILE[USER]);
REEL := STATUS (0,3);
SEARCH (UFILE[USER],SRCH[*]);
REEL := STATUS (0,4);
IF (I := SRCH[0]) = 7 OR CANDO[USER].[ALLOW] NEQ 7 OR
 KEY = I × (I + 1) / 6 + 5 THEN GO TO SVOK;
IF KEY = 5 THEN
 FILL SRCH[*] WITH
 "CC RELEA",OCT6225776060606060,OCT6060776177606060,

 OCT6060606077606060," ; END. "
ELSE

IF KEY = 6 THEN
 FILL SRCH[*] WITH
 "CC INFO ",OCT6060776060606060,OCT6060776177606060,

 OCT6060606077606060," ; END. "
ELSE

IF KEY = 7 THEN
 FILL SRCH[*] WITH
 "CC PUBLI",OCT2360776060606060,OCT6060776177606060,

 OCT6060606077606060," ; END. "
ELSE

 FILL SRCH[*] WITH
 "CC  FREE",OCT6060776060606060,OCT6060776177606060,

 OCT6060606077606060," ; END. ";

CMOVE (PREFIX,SRCH[1],1,3,7);
CMOVE (SUFFIX,SRCH[2],1,5,7);
ZIP WITH SRCH[*];
SVOK:
CANDO[USER].[ALLOW] := PREFIX := SUFFIX := 0;
NEWFILE;
```

```
      RESETBIT (PRESENT,USER);
      RESETBIT (CREATESW,USER);
      BACKUP;
      MESSAGE (5);
    SVXIT:
      FINAL;
  END OF SAVER;



PROCEDURE SCHEDULE;
    COMMENT

        SCHEDULE SEARCHES FOR THE FILE TO BE SCHEDULED, AND MAKES
    SURE THAT THE FILE EXISTS, THAT THE USER IS A VALID USER, THAT THE
    FILE IS NOT IN USE, AND THAT IT IS A RIMS FILE.  SCHEDULE THEN
    CREATES A FILE OF CONTROL CARDS WHICH WILL CAUSE THE PROGRAM
    RIMS/SCHEDUL TO BE SCHEDULED BY THE MCP, AND ZIPS IT.

    USES: PREFIX, REEL, SRCH, SRCHFILE, SUFFIX, USER, USERCODE
    CHANGES: REEL, SRCH, SRCHFILE
    CALLS: CMOVE, CONVERTIME, FILERROR, FINAL, MESSAGE, RIMSFILE, SCAN,
           SCANFILE
    ERRORS: TOO MANY PARAMETERS GIVEN
            FILE NOT FOUND
            INVALID USER OF FILE
            FILE IN USE
            FILE NOT A RIMS FILE
            INVALID FILE NAME;

    BEGIN
        LABEL SDXIT;


        IF SCANFILE THEN
        BEGIN
            IF SCAN THEN
            BEGIN                   COMMENT TOO MANY PARAMETERS GIVEN;
                MESSAGE (9);
                GO TO SDXIT;
            END;
            FILL SRCHFILE WITH PREFIX, SUFFIX;
            SEARCH (SRCHFILE,SRCH[*]);
            IF SRCH[0] LSS 2 THEN
            BEGIN                   COMMENT NOT FOUND OR INVALID USER;
                FILERROR (SRCH[0]);
                GO TO SDXIT;
            END;
            IF SRCH[6] GTR 0 THEN
            BEGIN                   COMMENT FILE IN USE;
                FILERROR (7);
                GO TO SDXIT;
            END;
            IF NOT RIMSFILE THEN
            BEGIN                   COMMENT FILE NOT A RIMS FILE;
                FILERROR (1);
                GO TO SDXIT;
            END;
            FILL SRCH[*] WITH
             "CC EXECU","TE RIMS/","SCHEDUL;","FILE INP",

             OCT6463607560776060,OCT6060606060776177,
             OCT6060606060606077,"        ","        ",1;
```

```
          CMOVE (PREFIX,SRCH[4],1,6,7);
          CMOVE (SUFFIX,SRCH[6],1,0,7);
          WRITE (SRCHFILE,10,SRCH[*]);
          FILL SRCH[*] WITH
           "CC FILE ","LINE =  ",OCT7760606060606060,

           OCT7761255151465162,"; FILE S","CHED =  ",
           "        ","        ","        ",2;

          CMOVE (USERCODE[USER],SRCH[2],1,1,7);
          REEL := CONVERTIME (TIME (1));
          CMOVE (REEL,SRCH[5],2,7,6);
          WRITE (SRCHFILE,10,SRCH[*]);
          FILL SRCH[*] WITH
           "CC DATA ","        ","        ",

           "        ","        ","        ",
           "        ","        ","        ",4;

          CMOVE (REEL,SRCH[1],2,0,6);
          WRITE (SRCHFILE,10,SRCH[*]);
          BLANKOUT (SRCH[*],1);
          WRITE (SRCHFILE,10,SRCH[*]);
          REEL := "CC END.";
          CMOVE (REEL,SRCH[0],1,0,7);
          WRITE (SRCHFILE,10,SRCH[*]);
          ZIP WITH SRCHFILE;
          MESSAGE (5);
      END
      ELSE
       MESSAGE (34);
    SOXIT:
      FINAL;
  END OF SCHEDULE;


PROCEDURE RESEQUENCE;
    COMMENT

        RESEQUENCE SCANS FOR UP TO 4 OPTIONAL PARAMETERS.  THE FIRST
    IS THE SEQUENCE NUMBER TO ASSIGN TO THE FIRST RESEQUENCED TAG.
    THE SECOND IS THE INCREMENT TO USE (100 IS ASSUMED).  THEN A COLON,
    IF ANYTHING FOLLOWS.  THE THIRD PARAMETER IS THE PRESENT SEQUENCE
    NUMBER AT WHICH TO START RESEQUENCING, FOR A PARTIAL RESEQ.  THE
    FOURTH IS THE LAST EXISTING SEQUENCE NUMBER TO RESEQ (THE LAST
    TAG IS ASSUMED).  IF ONLY UP TO THE FIRST TWO PARAMETERS ARE GIVEN,
    THE ENTIRE FILE WILL BE RESEQUENCED.  IF NO STARTING SEQUENCE
    NUMBER IS GIVEN, THE FILE WILL BE RESEQUENCED FROM 100 BY 100.
    RESEQUENCE SETS UP PARAMETERS AND PASSES THEM TO TAGMOVE, WHICH DOES
    THE ACTUAL RESEQUENCING, AND REORGANIZES THE TAGS AT THE SAME TIME.

    USES: CANDO, CLASS, FOUND, KEY, LENGTH, LINE, LOGREC, L2TAG, NUMR,
          PRESENT, START, TAG, TAGLOC, USER, WORD
    CHANGES: LINE, L2TAG, START
    CALLS: BACKUP, CMOVE, DECBIN, FINAL, MESSAGE, SCAN, TAGMOVE,
           TAGREAD, TAGSEARCH, TESTBIT, WEBSTER
    ERRORS: COMMAND INVALID AT THIS TIME
            INVALID USER CODE
            NO RECORDS IN FILE
            INVALID INCREMENT
            SYNTAX ERROR
            INVALID SEQUENCE NUMBER
            TOO MANY PARAMETERS GIVEN
```

```
        SEQUENCE NUMBER XXX NOT IN FILE
        SEQUENCE NUMBERS IN WRONG ORDER
        INCREMENT TOO LARGE;

BEGIN
    INTEGER RSTRT, RSINC, RSFROM, RSTO, RSFLR, RSFTL, RSTTL, RSSTL;

    LABEL RSII, RSSE, RSISN, RSNIP, RSDFLT, RSXIT;

    IF NOT TESTBIT (PRESENT,USER) THEN
    BEGIN                    COMMENT COMMAND INVALID AT THIS TIME;
        MESSAGE (7);
        GO TO RSXIT;
    END;
    IF CANDO[USER].[ALLOW] LSS 3 THEN
    BEGIN                    COMMENT INVALID USER CODE;
        MESSAGE (37);
        GO TO RSXIT;
    END;
    TAGREAD (0);
    IF L2COUNT = 0 THEN
    BEGIN                    COMMENT NO RECORDS IN FILE;
        MESSAGE (26);
        GO TO RSXIT;
    END;
    RSTRT := RSINC := 100;
    WHILE L2TAG[RSFTL].[TCNT] = 0 DO
     RSFTL := RSFTL + 1;
    RSFTL := RSFTL × BLKSZ;
    RSTO := L2TAG[L2COUNT-1].[SEQNO];
    IF SCAN THEN
    BEGIN
        IF NUMR AND LENGTH LEQ LGTHLIM THEN
        BEGIN
            RSTRT := DECBIN;
            IF SCAN THEN
            BEGIN
                IF WEBSTER AND CLASS = 1 AND KEY = 3 THEN
                ELSE
                IF NUMR AND LENGTH LEQ LGTHLIM THEN
                BEGIN
                    IF (RSINC := DECBIN) = 0 THEN
                  RSII:
                    BEGIN   COMMENT INVALID INCREMENT;
                        MESSAGE (15);
                        GO TO RSXIT;
                    END;
                    IF SCAN THEN
                    BEGIN
                        IF WEBSTER AND CLASS = 1 AND KEY = 3 THEN
                        ELSE
                      RSSE:
                        BEGIN   COMMENT SYNTAX ERROR;
                            MESSAGE (36);
                            GO TO RSXIT;
                    END;END
                    ELSE
                     GO TO RSDFLT;
                END
                ELSE
                 GO TO RSII;
            END
            ELSE
             GO TO RSDFLT;
        END
```

```
      ELSE
    RSISN:
      BEGIN                    COMMENT INVALID SEQUENCE NUMBER;
          MESSAGE (13);
          GO TO RSXIT;
  END;END
  ELSE
   GO TO RSDFLT;
  IF SCAN THEN
  BEGIN
      IF NUMR AND LENGTH LEQ LGTHLIM THEN
      BEGIN
          TAGSEARCH (0, RSFROM := DECBIN);
          IF FOUND THEN
          BEGIN
              RSFLR := LOGREC;
              RSFTL := TAGLOC;
              IF SCAN THEN
              BEGIN
                  IF NUMR AND LENGTH LEQ LGTHLIM THEN
                   RSTO := DECBIN
                  ELSE
                   GO TO RSISN;
          END;END
          ELSE
           GO TO RSNIP;
      END
      ELSE
       GO TO RSISN;
  END
  ELSE
   GO TO RSSE;
RSDFLT:
  TAGSEARCH (0,RSTO);
  IF FOUND THEN
  BEGIN
      RSTTL := TAGLOC;
      IF SCAN THEN
      BEGIN                    COMMENT TOO MANY PARAMETERS GIVEN;
          MESSAGE (9);
          GO TO RSXIT;
  END;END
  ELSE
RSNIP:
  BEGIN                        COMMENT SEQUENCE NUMBER XXX NOT IN FILE;
      MESSAGE (19);
      CMOVE (WORD,LINE[USER,*],0,START[USER]+1,LENGTH);
      START[USER] := START[USER] + LENGTH + 1;
      MESSAGE (20);
      GO TO RSXIT;
  END;
  TAGSEARCH (0, RSTO + 1);          % GET LIMIT
  RSSTL := TAGLOC;
  IF RSFROM GTR RSTO THEN
  BEGIN                        COMMENT SEQ. NUMBERS IN WRONG ORDER;
      MESSAGE (17);
      GO TO RSXIT;
  END;
  IF (LOGREC - RSFLR - 1) × RSINC + RSTRT GEQ TAG.[SEQNO] THEN
  BEGIN                        COMMENT INCREMENT TOO LARGE;
      MESSAGE (25);
      GO TO RSXIT;
  END;
  IF RSFLR GTR 0 THEN IF RSTRT LSS RSFROM THEN
  BEGIN
```

```
            TAGSEARCH (1, RSFLR - 1);
            IF RSTRT LEQ TAG.[SEQNO] THEN GO TO RSISN;
        END;
        TAGMOVE (RSSTL, RSFTL, RSTTL, RSTRT, RSINC, TRUE, TRUE);
        BACKUP;
        MESSAGE (5);
      RSXIT:
        FINAL;
    END OF RESEQUENCE:



PROCEDURE DELETE;
    COMMENT

        DELETE SCANS FOR 1 OR 2 PARAMETERS.  IF IT FINDS ONLY ONE IT
    CALLS TAGDELETE TO DELETE THE ONE TAG.  IF IT FINDS TWO PARAMETERS
    IT CALLS TAGDELETE TO DELETE ALL THE TAGS FROM THE FIRST SEQUENCE
    NUMBER THROUGH THE SECOND.

    USES: CANDO, FOUND, LENGTH, LINE, LOGREC, NUMR, PRESENT, START,
          TAGLOC, USER, WORD
    CHANGES: CANDO, LINE, START
    CALLS: BACKUP, CMOVE, DECBIN, FINAL, MESSAGE, SCAN, TAGDELETE,
           TAGSEARCH, TESTBIT
    ERRORS: COMMAND INVALID AT THIS TIME
            INVALID USER CODE
            TOO MANY PARAMETERS
            SEQUENCE NUMBER XXX NOT IN FILE
            INVALID SEQUENCE NUMBER
            SEQUENCE NUMBER MISSING
            SEQUENCE NUMBERS IN WRONG ORDER;

    BEGIN
        INTEGER I, DLFST, DLAST, DLFLR, DLLLR;

        LABEL DLNIP, DLISN, DLXIT;

        IF NOT TESTBIT (PRESENT,USER) THEN
        BEGIN                   COMMENT COMMAND INVALID AT THIS TIME;
            MESSAGE (7);
            GO TO DLXIT;
        END;
        IF CANDO[USER].[ALLOW] LSS 3 THEN
        BEGIN                   COMMENT INVALID USER CODE;
            MESSAGE (37);
            GO TO DLXIT;
        END;
        IF SCAN THEN
        BEGIN
            IF NUMR AND LENGTH LEQ LGTHLIM THEN
            BEGIN               COMMENT GET FIRST PARAMETER;
                TAGSEARCH (0,DECBIN);
                IF FOUND THEN
                BEGIN           COMMENT SAVE FIRST TAG LOCATION;
                    DLFST := DLAST := TAGLOC;
                    DLFLR := DLLLR := LOGREC;
                    IF SCAN THEN
                    BEGIN
                        IF NUMR AND LENGTH LEQ LGTHLIM THEN
                        BEGIN   COMMENT GET SECOND PARAMETER;
                            TAGSEARCH (0,DECBIN);
                            IF FOUND THEN
                            BEGIN   COMMENT SAVE SECOND TAG LOCATION;
```

```
                              DLAST := TAGLOC;
                              DLLLR := LOGREC;
                              IF SCAN THEN
                              BEGIN   COMMENT TOO MANY PARAMETERS;
                                  MESSAGE (9);
                                  GO TO DLXIT
                          END;END
                          ELSE
                           GO TO DLNIP;
                      END
                      ELSE
                       GO TO DLISN;
              END;END
              ELSE
            DLNIP:
              BEGIN           COMMENT SEQ NO XXX NOT IN FILE;
                  MESSAGE (19);
                  CMOVE (WORD,LINE[USER,*],0,START[USER]+1,LENGTH);
                  START[USER] := START[USER] + LENGTH + 1;
                  MESSAGE (20);
                  GO TO DLXIT;
          END;END
          ELSE
        DLISN:
          BEGIN               COMMENT INVALID SEQUENCE NUMBER;
              MESSAGE (13);
              GO TO DLXIT;
      END;END
      ELSE
      BEGIN                   COMMENT SEQUENCE NUMBER MISSING;
          MESSAGE (11);
          GO TO DLXIT;
      END;
      IF DLFST GTR DLAST THEN
      BEGIN                   COMMENT SEQUENCE NUMBERS IN WRONG ORDER;
          MESSAGE (17);
          GO TO DLXIT;
      END;
      TAGDELETE (DLFST,DLAST);
      BACKUP;
      MESSAGE (5);
      IF (I := CANDO[USER].[VPLR]) GEQ DLFLR AND
       I LEQ DLLLR THEN
       CANDO[USER].[VPLR] := (IF DLFLR = 0 THEN 0 ELSE DLFLR - 1)
      ELSE
      IF I GTR DLLLR THEN
       CANDO[USER].[VPLR] := I + DLFLR - DLLLR - 1;
    DLXIT:
      FINAL;
  END OF DELETE;


PROCEDURE CREATE;
    COMMENT

        CREATE CHECKS TO SEE IF AN UPDATE IS IN PROGRESS, AND IF SO,
    CANCELS IT.  IT THEN LOOKS FOR A VALID FILE NAME, AND IF ONE IS
    FOUND, CREATE CHECKS TO SEE IF IT ALREADY EXISTS.  IF IT DOES
    NOT, CREATE SCANS FOR A FORMAT, AND IF NOTHING IS FOUND, ASSUMES
    COBOL.  IT THEN INITIALIZES ALL NECESSARY VARIABLES AND THE LEVEL
    2 INDEX, WRITES ONE RECORD INTO A PERMANENT FILE AND LOCKS IT,
    UPDATES THE BACKUP RECORD, AND MARKS THE PACKET PRESENT.
```

```
USES: CANDO, CLASS, CREATESW, FIRSTVIEW, KEY, LASTOUSER, LENGTH,
      LINE, LISTING, L2CHANGED, L2TAG, PREFIX, PRESENT, SRCH, START,
      SUFFIX, TAG, UFILE, USER, WORD
CHANGES: CANDO, CREATESW, FIRSTVIEW, LASTOUSER, LENGTH, LINE,
         L2CHANGED, L2TAG, PREFIX, PRESENT, SRCH, START, TAG, UFILE
CALLS: BACKUP, BLANKOUT, CMOVE, DSKWRITE, ESCHAR, FILERROR, FINAL,
       FIRSTSEQ, MESSAGE, NEWFILE, PURGEFILE, SCAN, SCANFILE,
       SETBIT, TAGWRITE, TESTBIT, WEBSTER, WMOVE
ERRORS: FILE EXISTS
        NOT A VALID PARAMETER
        TOO MANY PARAMETERS GIVEN
        INVALID FILE NAME;

BEGIN
    INTEGER I;

    REAL P, S;
    FILE OUT CREATEFILE DISK RANDOM [20:170] (5,RECSZ,SAVE 100);
    LABEL CRXIT;

    IF SCANFILE THEN
    BEGIN
        FILL CREATEFILE WITH P := PREFIX, S := SUFFIX;
        SEARCH (CREATEFILE,SRCH[*]);
        IF SRCH[0] NEQ -1 THEN
        BEGIN                   COMMENT FILE EXISTS;
            FILERROR (6);
            GO TO CRXIT;
        END;
        IF SCAN THEN
        BEGIN
            IF WEBSTER AND CLASS = 3 THEN ELSE
            BEGIN               COMMENT NOT A VALID PARAMETER;
                MESSAGE (2);
                IF LENGTH GTR 30 THEN LENGTH := 30;
                CMOVE (WORD,LINE[USER,*],0,START[USER],LENGTH);
                ESCHAR (TRUE);
                START[USER] := START[USER] + LENGTH;
                MESSAGE (21);
                GO TO CRXIT;
            END;
            IF SCAN THEN
            BEGIN               COMMENT TOO MANY PARAMETERS GIVEN;
                MESSAGE (9);
                GO TO CRXIT;
        END;END
        ELSE
         KEY := COFMT;
        IF TESTBIT (PRESENT,USER) OR TESTBIT (LISTING,USER) THEN
         PURGEFILE;
        TAGWRITE (0);
        L2TAG[0] := 0;
        WMOVE (L2TAG[0],L2TAG[1],TAGMAX);
        VISTID := "VISTAII";
        L2FMT := KEY;
        L2EOF := 29;
        BLANKOUT (HDR,8);
        LASTOUSER := USER;
        L2CHANGED := TRUE;
        TAGWRITE (0);
        FOR I := 0 STEP 1 UNTIL 4 DO
        BEGIN                   COMMENT CREATE LEVEL 2 TAG BLOCK;
            WMOVE(L2TAG[I×RECSZ],CREATEFILE(0),RECSZ);
            WRITE(CREATEFILE[I]);
        END;
```

```
            WRITE (CREATEFILE[10]);
            LOCK (CREATEFILE);
            FILL UFILE[USER] WITH P, S;
            SETBIT (CREATESW,USER);
            PREFIX := -P;  SUFFIX := S;
            CANDO[USER].[ALLOW] := 7;
            LASTOUSER := NUSERS;
            NEWFILE;
            DSKWRITE;                     % TO OPEN FILE
            L2EOF := 29;
            TAG.[SEQNO] := SEQLIM;
            BACKUP;
            FIRSTSEQ (100,100,3);
            SETBIT (PRESENT,USER);
            SETBIT (FIRSTVIEW,USER);
        END
        ELSE
         MESSAGE (34);          COMMENT INVALID FILE NAME;
      CRXIT:
        FINAL;
    END OF CREATE;



PROCEDURE HEADER;
    COMMENT

        HEADER PLACES 72 CHARACTERS OF INFORMATION FROM ARRAY "LINE"
    INTO THE HEADER PORTION OF THE LEVEL 2 TAG BLOCK.

    USES: CANDO, LINE, L2CHANGED, L2TAG, PRESENT, START, USER
    CHANGES: L2CHANGED, L2TAG, START
    CALLS: BACKUP, BLANKGM, BLANKOUT, CHARACTER, CMOVE, FINAL, MESSAGE,
           TAGREAD, TESTBIT
    ERRORS: COMMAND INVALID AT THIS TIME
            INVALID USER CODE
            SYNTAX ERROR;

    BEGIN
        INTEGER I;

        LABEL HDXIT;

        IF NOT TESTBIT (PRESENT,USER) THEN
        BEGIN                     COMMENT COMMAND INVALID AT THIS TIME;
            MESSAGE (7);
            GO TO HDXIT;
        END;
        IF CANDO[USER].[ALLOW] LSS 3 THEN
        BEGIN                     COMMENT INVALID USER CODE;
            MESSAGE (37);
            GO TO HDXIT;
        END;
        IF CHARACTER (LINE[USER,*],START[USER]) NEQ " " AND
         CHARACTER (LINE[USER,*],START[USER]) NEQ GM THEN
        BEGIN                     COMMENT SYNTAX ERROR;
            MESSAGE (36);
            GO TO HDXIT;
        END;
        BACKUP;
        TAGREAD (0);
        BLANKGM (LINE[USER,*],START[USER] := START[USER] + 1,
         (I := 8 × (LINMAX + 1) - START[USER]));
        BLANKOUT (HDR,9);
```

```
        CMOVE (LINE[USER,*],HDR,START[USER],0,
         (IF I LSS 72 THEN I ELSE 72));
        L2CHANGED := TRUE;
        MESSAGE (5);
      HDXIT:
        FINAL;
    END OF HEADER;



PROCEDURE MOVEDUP (MVDEL);
    COMMENT

        MOVEDUP HANDLES BOTH THE MOVE AND DUP COMMANDS.  IF THE INPUT
    PARAMETER MVDEL IS TRUE, IT DELETES THE OLD VERSION OF THE TAGS
    IT MOVES.  IF FALSE, IT DOES NOT REMOVE THEM, THEREBY DUPLICATING
    THE TAGS.  MOVEDUP SCANS FOR UP TO 4 PARAMETERS:  A SEQUENCE NUMBER
    AT WHICH TO START PUTTING THE NEW TAGS (IT MUST NOT EXIST), AN
    INCREMENT (OPTIONAL) TO STEP THE NEW SEQUENCE NUMBERS BY, THEN A
    COLON, AND A STARTING (REQUIRED) AND ENDING (OPTIONAL) OLD SEQUENCE
    NUMBER, BOTH OF WHICH MUST EXIST.  IF THE STATEMENT IS VALID,
    MOVEDUP CALLS TAGMOVE TO DO THE DIRTY WORK.

    USES: CANDO, CLASS, FOUND, KEY, LENGTH, LINE, LOGREC, NUMR,
          PRESENT, START, TAG, TAGLOC, USER, WORD
    CHANGES: CANDO, LINE, START
    CALLS: BACKUP, CMOVE, DECBIN, FINAL, MESSAGE, SCAN, TAGMOVE,
           TAGSEARCH, TESTBIT, WEBSTER
    ERRORS: COMMAND INVALID AT THIS TIME
            INVALID USER CODE
            SEQUENCE NUMBER XXX EXISTS
            INVALID INCREMENT
            SYNTAX ERROR
            SEQUENCE NUMBER XXX NOT IN FILE
            TOO MANY PARAMETERS GIVEN
            INVALID SEQUENCE NUMBER
            SEQUENCE NUMBER MISSING
            SEQUENCE NUMBERS IN WRONG ORDER
            INCREMENT TOO LARGE
            TOO MANY RECORDS;

    VALUE MVDEL;
    BOOLEAN MVDEL;
    BEGIN
        INTEGER MVSTRT, MVSTL, MVLIM, MVINC, MVFROM, MVFLR, MVFTL,

                MVTO, MVTLR, MVTTL, MVSLR;
        LABEL MVII, MVSE, MVNIP, MVISN, MVSNM, MVDFLT, MVXIT;

        IF NOT TESTBIT (PRESENT,USER) THEN
        BEGIN                      COMMENT COMMAND INVALID AT THIS TIME;
            MESSAGE (7);
            GO TO MVXIT;
        END;
        IF CANDO[USER].[ALLOW] LSS 3 THEN
        BEGIN                      COMMENT INVALID USER CODE;
            MESSAGE (37);
            GO TO MVXIT;
        END;
        IF SCAN THEN
        BEGIN
            IF NUMR AND LENGTH LEQ LGTHLIM THEN
            BEGIN                  COMMENT CHECK FIRST PARAMETER;
                TAGSEARCH (0,MVSTRT:=DECBIN);
```

```
IF FOUND THEN
BEGIN          COMMENT SEQUENCE NUMBER XXX EXISTS;
    MESSAGE (19);
    CMOVE (WORD,LINE[USER,*],0,START[USER]+1,LENGTH);
    START[USER] := START[USER] + LENGTH + 2;
    MESSAGE (38);
    GO TO MVXIT;
END;
MVSLR := LOGREC;
MVSTL := TAGLOC;
MVLIM := TAG.[SEQNO];
IF SCAN THEN
BEGIN
    IF WEBSTER AND CLASS = 1 AND KEY = 3 THEN
     MVINC := 10        % 10 IS DEFAULT INCREMENT
    ELSE
    BEGIN        COMMENT CHECK SECOND PARAMETER;
        IF NUMR AND LENGTH LEQ LGTHLIM THEN
        BEGIN
            IF MVINC := DECBIN = 0 THEN
          MVII:
            BEGIN   COMMENT INVALID INCREMENT;
                MESSAGE (15);
                GO TO MVXIT;
            END;
            IF SCAN AND WEBSTER AND CLASS=1 AND KEY=3
             THEN ELSE
          MVSE:
            BEGIN   COMMENT SYNTAX ERROR;
                MESSAGE (36);
                GO TO MVXIT;
        END;END
        ELSE
         GO TO MVII;
    END;
    IF SCAN THEN
    BEGIN        COMMENT CHECK THIRD PARAMETER;
        IF NUMR AND LENGTH LEQ LGTHLIM THEN
        BEGIN
            TAGSEARCH (0,MVFROM:=DECBIN);
            IF NOT FOUND THEN
          MVNIP:
            BEGIN   COMMENT SEQ NO XXX NOT IN FILE;
                MESSAGE (19);
                CMOVE (WORD,LINE[USER,*],0,
                 START[USER]+1,LENGTH);
                START[USER] := START[USER]+LENGTH+1;
                MESSAGE (20);
                GO TO MVXIT;
            END;
            MVFLR := LOGREC;
            MVFTL := TAGLOC;
            IF SCAN THEN
            BEGIN   COMMENT CHECK FOURTH PARAMETER;
                IF NUMR AND LENGTH LEQ LGTHLIM THEN
                BEGIN
                    TAGSEARCH (0,MVTO:=DECBIN);
                    IF NOT FOUND THEN GO TO MVNIP;
                    MVTLR := LOGREC;
                    MVTTL := TAGLOC;
                    IF SCAN THEN
                    BEGIN   COMMENT TOO MANY PARAMETERS;
                        MESSAGE (9);
                        GO TO MVXIT;
                END;END
```

```
                    ELSE
                  MVISN:
                    BEGIN   COMMENT INVALID SEQUENCE NO;
                        MESSAGE (13);
                        GO TO MVXIT;
                END;END
                ELSE
                BEGIN   COMMENT DEFAULT: TO = FROM;
                    MVTO := MVFROM;
                    MVTLR := MVFLR;
                    MVTTL := MVFTL;
                    GO TO MVDFLT;
            END;END
            ELSE
             GO TO MVISN;
        END
        ELSE
      MVSNM:
        BEGIN       COMMENT SEQUENCE NUMBER MISSING;
            MESSAGE (11);
            GO TO MVXIT;
    END;END
    ELSE
     GO TO MVSE;
END
ELSE
 GO TO MVISN;
END
ELSE
 GO TO MVSNM;
MVDFLT:
  IF MVFROM GTR MVTO OR MVSTRT GEQ MVFROM AND MVSTRT LEQ MVTO THEN
  BEGIN                    COMMENT SEQUENCE NUMBERS IN WRONG ORDER;
      MESSAGE (17);
      GO TO MVXIT;
  END;
  IF MVDEL AND MVSTL = MVFTL THEN
  BEGIN
      TAGSEARCH (1,MVTLR+1);
      MVSLR := LOGREC;
      MVSTL := TAGLOC;
      MVLIM := TAG.[SEQNO];
  END;
  IF (MVTLR-MVFLR)×MVINC+MVSTRT GEQ MVLIM THEN
  BEGIN                    COMMENT INCREMENT TOO LARGE;
      MESSAGE (25);
      GO TO MVXIT;
  END;
  IF NOT MVDEL THEN
  BEGIN
      TAGSEARCH (0,SEQLIM);        % COUNT RECORDS IN FILE
      IF (MVTLR - MVFLR + LOGREC + 1) GTR MAXTAGS THEN
      BEGIN                COMMENT TOO MANY RECORDS;
          MESSAGE (44);
          GO TO MVXIT;
  END;END;
  TAGMOVE (MVSTL,MVFTL,MVTTL,MVSTRT,MVINC,TRUE,MVDEL);
  BACKUP;
  MESSAGE (5);
  MVTTL := MVTLR - MVFLR + 1;
  MVLIM := CANDO[USER].[VPLR];
  IF MVDEL THEN
  BEGIN
      IF MVLIM GEQ MVFLR AND MVLIM LEQ MVTLR THEN
       MVLIM := (IF MVFLR = 0 THEN 0 ELSE MVFLR - 1)
```

```
            ELSE
            IF MVLIM GTR MVTLR AND MVLIM LSS MVSLR THEN
             MVLIM := MVLIM - MVTTL
            ELSE
            IF MVLIM GEQ MVSLR AND MVLIM LSS MVFLR THEN
             MVLIM := MVLIM + MVTTL;
        END
        ELSE
        IF MVLIM GTR MVSLR THEN MVLIM := MVLIM + MVTTL;
        CANDO[USER].[VPLR] := MVLIM;
      MVXIT:
        FINAL;
    END OF MOVEDUP;



PROCEDURE CANCEL;
    COMMENT

        CANCEL CALLS PURGEFILE TO CANCEL ANY UPDATE TAKING PLACE.

    USES: CANDO, LISTING, PRESENT, USER
    CHANGES: CANDO
    CALLS: BACKUP, FINAL, MESSAGE, PURGEFILE, SCAN, TESTBIT
    ERRORS: TOO MANY PARAMETERS GIVEN
            COMMAND INVALID AT THIS TIME;

    BEGIN
        IF TESTBIT (PRESENT,USER) OR TESTBIT (LISTING,USER) THEN
        IF SCAN THEN
         MESSAGE (9)            COMMENT TOO MANY PARAMETERS GIVEN;
        ELSE
        BEGIN
            CANDO[USER].[ALLOW] := 0;
            PURGEFILE;
            BACKUP;
            MESSAGE (5);
        END
        ELSE
         MESSAGE (7);           COMMENT COMMAND INVALID AT THIS TIME;
        FINAL;
    END OF CANCEL;


PROCEDURE FILENAME;
    COMMENT

        FILENAME DISPLAYS THE NAME OF THE FILE PRESENTLY BEING USED, OR
    IF NONE IS IN USE, IT DISPLAYS THE NAME OF THE ONE PREVIOUSLY USED.

    USES: PREFIX, SUFFIX
    CHANGES: PREFIX, SUFFIX
    CALLS: FILERROR, FINAL, GETFILENAME, MESSAGE, SCAN
    ERRORS: TOO MANY PARAMETERS GIVEN;

    BEGIN
        IF SCAN THEN
         MESSAGE (9)            COMMENT TOO MANY PARAMETERS GIVEN;
        ELSE
        BEGIN
            GETFILENAME (PREFIX,SUFFIX);
            FILERROR (5);
        END;
```

```
        FINAL;
    END OF FILENAME;



PROCEDURE LIST2 (LTCRTFIRST);
    COMMENT

        LIST2 IS THE DATA WRITING PORTION OF THE LIST AND PGLD COMMANDS.
    IT BREAKS UP THE DATA RECORDS OF A SEQUENTIAL FILE INTO 80 CHARACTER
    SEGMENTS, AND TRANSMITS THEM SEPARATELY AS 80 OR 82 CHARACTER
    RECORDS.  ON A LIST COMMAND TO A TC500, EACH RECORD (SEGMENT) IS
    PRECEDED BY A TWO CHARACTER PREFIX CONSISTING OF AN ASTERISK AND A
    DIGIT.  IF THE DIGIT IS 1, THE RECORD IS TO BE CONTINUED.  IF THE
    DIGIT IS 2, THE RECORD IS COMPLETE (THIS IS THE LAST SEGMENT).  IF
    THE DIGIT IS 3, IT IS THE LAST SEGMENT AND THE END OF THE REQUESTED
    PORTION OF THE FILE.

    USES: ACCEPT, BREAKEY, CANDO, GOTO, LINE, LISTING, OPREADY,
          SEQLIMIT, SEQSEQ, START, STARTMSG, UFILE, USER
    CHANGES: ACCEPT, GOTO, LINE, LISTING, OPREADY, SEQLIMIT, SEQSEQ,
             START, STARTMSG
    CALLS: CMOVE, ESCHAR, FINAL, MESSAGE, PURGEFILE, SETBIT, TESTBIT,
           TTYFIX
    ERRORS: INPUT ERROR
            END OF FILE;

    VALUE LTCRTFIRST;
    BOOLEAN LTCRTFIRST;
    BEGIN
        BOOLEAN LTREC, LTFIN, LTTC, LTCRT, LTLST;

        INTEGER I, J, K, N;
        LABEL LTXIT, LTPAR, LTEOF, LTEND;

        STARTMSG := TRUE;
        IF TESTBIT (BREAKEY,USER) THEN
        BEGIN
            MESSAGE (16);
            GO TO LTXIT;
        END;
        LTLST := TESTBIT (LISTING,USER);
        LTTC := (CANDO[USER].[TYPE] = TC500);
        LTCRT := (CANDO[USER].[KIND] = CRT);
        J := SEQSEQ[USER].[LSREC];
        IF I := (SEQSEQ[USER].[LSSECT]) = 0 THEN
        BEGIN                      COMMENT GET NEXT RECORD;
            SEQLIMIT[USER].[LSLIM] := SEQLIMIT[USER].[LSLIM]-1;
            SEQSEQ[USER].[LSREC] := J := J + 1;
            READ (UFILE[USER][J - 1]) [LTEOF:LTPAR];
        END
        ELSE
         IF NOT LTTC THEN SEQLIMIT[USER].[LSLIM] :=
          SEQLIMIT[USER].[LSLIM] - 1;
        J := J - 1;
        LTFIN := (SEQLIMIT[USER].[LSLIM] = 0);
        MESSAGE (IF LTCRTFIRST THEN 3 ELSE 4);
        N:=(IF (LTREC:=(I+1)×LSTLGTH GEQ (K:=SEQSEQ[USER].[LSRL]))
         THEN (IF LTFIN THEN "*3" ELSE "*2") ELSE "*1");
        IF LTLST AND LTTC THEN
        BEGIN
            CMOVE (N,LINE[USER,*],7,START[USER],1);
            START[USER] := START[USER] + 1;
        END
        ELSE
```

```
      START[USER] := START[USER] - 1;
     CMOVE (UFILE[USER](0),LINE[USER,*],I×LSTLGTH,START[USER],
      K:=(IF LTREC THEN ((K-1) MOD LSTLGTH + 1) ELSE LSTLGTH));
     ESCHAR (TRUE);
     START[USER] := START[USER] + LSTLGTH;
     SEQSEQ[USER].[LSSECT] := (IF LTREC THEN 0 ELSE (I + 1));
     MESSAGE (IF LTFIN AND (LTREC OR LTCRT) THEN 16 ELSE 6);
     TTYFIX;
     IF LTFIN AND LTCRT OR
      LTREC AND LTTC AND LTLST OR
      LTFIN AND LTREC AND (LTTC OR LTLST) THEN
   LTXIT:
     FINAL
     ELSE
     BEGIN
         SETBIT (OPREADY,USER);
         GOTO[USER] := GOLIST2;
     END;
     GO TO LTEND;
   LTPAR:
     MESSAGE (35);            COMMENT INPUT ERROR;
     SETBIT (LISTING,USER);
     PURGEFILE;
     GO TO LTXIT;
   LTEOF:
     IF LTLST THEN
     BEGIN                    COMMENT END OF FILE;
         MESSAGE (IF LTCRTFIRST THEN 3 ELSE 4);
         START[USER] := START[USER] - 1;
         MESSAGE (22);
         SEQSEQ[USER].[LSREC] := SEQSEQ[USER].[LSREC] - 1;
         GO TO LTXIT;
     END
     ELSE
     BEGIN
         SETBIT (LISTING,USER);
         PURGEFILE;
         SETBIT (ACCEPT,USER);
         GOTO[USER] := GOFIRST;
     END;
   LTEND:
 END OF LIST2;



PROCEDURE LISTER;
    COMMENT

        LISTER DISPLAYS RECORDS (UP TO 1,280 CHARACTERS IN LENGTH) FROM
    A SEQUENTIAL FILE.  IT FIRST SCANS THE INPUT MESSAGE FOR UP TO 3
    OPTIONAL PARAMETERS.  IF THE FIRST PARAMETER IS PRESENT IT MUST
    BE A VALID FILE NAME OF A FILE TO BE LISTED.  IF THE SECOND
    PARAMETER IS PRESENT IT MUST BE AN F OR B FOLLOWED BY THE NUMBER OF
    RECORDS TO BE SKIPPED, FORWARD OR BACKWARD.  IF THE THIRD PARAMETER
    IS PRESENT, IT MUST BE A NUMBER INDICATING THE MAXIMUM NUMBER OF
    COMPLETE RECORDS TO BE LISTED.  THESE PARAMETERS MAY BE GIVEN IN
    ANY COMBINATION, OR NOT AT ALL.  IF NOT GIVEN, LIST WILL CONTINUE
    FROM WHEREVER IT LEFT OFF.

    USES: BREAKEY, CANDO, CLASS, GOTO, KEY, LENGTH, LINE, LISTING, NUMR,
          OPREADY, PREFIX, PRESENT, SEQLIMIT, SEQSEQ, SRCH, SRCHFILE,
          START, SUFFIX, UFILE, USER, WORD
    CHANGES: BREAKEY, GOTO, LENGTH, LINE, LISTING, OPREADY, SEQLIMIT,
             SEQSEQ, SRCH, SRCHFILE, START, UFILE
```

```
CALLS: CMOVE, DECBIN, ESCHAR, FILERROR, FINAL, LIST2, MESSAGE,
       PURGEFILE, RESETBIT, SCAN, SCANFILE, SETBIT, SETLENGTHS,
       TESTBIT, WEBSTER
ERRORS: COMMAND INVALID AT THIS TIME
        NO RECORDS IN FILE
        RECORDS TOO LARGE
        NOT A VALID PARAMETER
        INVALID INCREMENT
        SYNTAX ERROR
        INVALID FILE NAME
        TOO MANY PARAMETERS GIVEN;

BEGIN
    BOOLEAN B;

    INTEGER I;
    REAL P, S;
    LABEL LSCNT, LSXIT;

    IF TESTBIT (PRESENT,USER) THEN
    BEGIN                       COMMENT COMMAND INVALID AT THIS TIME;
        MESSAGE (7);
        GO TO LSXIT;
    END;
    I := START[USER];
    SEQLIMIT[USER].[LSLIM] := CANDO[USER].[LINES];
    B := (CANDO[USER].[KIND] = CRT);
    IF SCANFILE THEN
    BEGIN
        IF TESTBIT (LISTING,USER) THEN
        BEGIN
            P := PREFIX;  S := SUFFIX;
            PURGEFILE;
            PREFIX := P;  SUFFIX := S;
        END;
        FILL SRCHFILE WITH PREFIX, SUFFIX;
        SEARCH (SRCHFILE,SRCH[*]);
        IF SRCH[0] LSS 2 THEN
        BEGIN
            FILERROR (SRCH[0]);
            GO TO LSXIT;
        END;
        IF SRCH[3] = 0 OR SRCH[4] = 0 OR SRCH[5] LSS 0 THEN
        BEGIN                   COMMENT NO RECORDS IN FILE;
            MESSAGE (26);
            GO TO LSXIT;
        END;
        IF SRCH[3] GTR (IF CANDO[USER].[TYPE] = TC500 THEN
         18 ELSE 160) THEN
        BEGIN                   COMMENT RECORDS TOO LARGE;
            MESSAGE (45);
            GO TO LSXIT;
        END;
        FILL UFILE[USER] WITH PREFIX, SUFFIX;
        SETLENGTHS (SRCH[3],SRCH[4]);
        SEQLIMIT[USER].[LSEOF] := SRCH[5];
        SEQSEQ[USER] := 0;
        SEQSEQ[USER].[LSRL] := SRCH[3] x 8;
        SETBIT (LISTING,USER);
        B := TRUE;
    END
    ELSE
     START[USER] := I;
    IF TESTBIT (LISTING,USER) THEN
    BEGIN
```

```
        IF SCAN THEN
        BEGIN
            IF WEBSTER AND CLASS = 4 AND KEY LEQ 2 THEN
            BEGIN
                IF SCAN THEN
                BEGIN
                    IF NUMR AND LENGTH LEQ LGTHLIM THEN
                    BEGIN
                        B := TRUE;
                        I := DECBIN;
                        IF KEY = 2 THEN I := - I;
                        SEQSEQ[USER].[LSSECT] := 0;
                        SEQSEQ[USER].[LSREC] := (IF I := I +
                         SEQSEQ[USER].[LSREC] LSS 0 THEN
                         0 ELSE I);
                        IF I GTR I:=SEQLIMIT[USER].[LSEOF] THEN
                         SEQSEQ[USER].[LSREC] := I;
                        IF SCAN THEN
                      LSCNT:
                        BEGIN
                            B := FALSE;
                            IF NUMR AND LENGTH LEQ LGTHLIM THEN
                             SEQLIMIT[USER].[LSLIM] := DECBIN
                            ELSE
                            BEGIN   COMMENT NOT A VALID PARAMETER;
                                MESSAGE (2);
                                IF LENGTH GTR 30 THEN LENGTH := 30;
                                CMOVE (WORD,LINE[USER,*],0,
                                 START[USER],LENGTH);
                                ESCHAR (TRUE);
                                START[USER]:=START[USER]+LENGTH;
                                MESSAGE (21);
                                GO TO LSXIT;
                    END;END;END
                    ELSE
                    BEGIN   COMMENT INVALID INCREMENT;
                        MESSAGE (15);
                        GO TO LSXIT;
                END;END
                ELSE
                BEGIN        COMMENT SYNTAX ERROR;
                    MESSAGE (36);
                    GO TO LSXIT;
            END;END
            ELSE
             GO TO LSCNT;
    END;END
    ELSE
    BEGIN                    COMMENT INVALID FILE NAME;
        MESSAGE (34);
        GO TO LSXIT;
    END;
    IF SEQLIMIT[USER].[LSLIM] GTR (I := CANDO[USER].[LINES]) THEN
     SEQLIMIT[USER].[LSLIM] := I;
    RESETBIT (BREAKEY,USER);
    IF SCAN THEN
    BEGIN                    COMMENT TOO MANY PARAMETERS GIVEN;
        MESSAGE (9);
      LSXIT:
        FINAL;
    END
    ELSE
     LIST2 (TRUE);
END OF LISTER;
```

```
PROCEDURE PROGLOAD;
    COMMENT

        PROGLOAD TRANSMITS A SPECIALLY FORMATTED SEQUENTIAL FILE TO
    A TC500 TERMINAL FOR EXECUTION.  THE LAST RECORD OF THE FILE
    CONTAINS THE INSTRUCTIONS FOR THE TC500 TO BRANCH TO THE PROGRAM
    JUST LOADED.  PROGLOAD SETS UP THE NECESSARY VARIABLES FOR LIST2,
    AND CALLS LIST2 TO SEND THE FILE TO THE TC500.

    USES: CANDO, LISTING, PREFIX, PRESENT, SEQLIMIT, SEQSEQ, SRCH,
          SRCHFILE, SUFFIX, UFILE, USER
    CHANGES: SEQLIMIT, SEQSEQ, SRCH, SRCHFILE, UFILE
    CALLS: FILERROR, FINAL, LIST2, MESSAGE, PURGEFILE, SCAN,
           SCANFILE, SETLENGTHS, TESTBIT
    ERRORS: INVALID COMMAND
            COMMAND INVALID AT THIS TIME
            TOO MANY PARAMETERS GIVEN
            FILE NOT FOUND
            INVALID USER OF FILE
            FILE IN USE
            FILE NOT A TC500 FILE
            INVALID FILE NAME;

    BEGIN
        LABEL PLXIT;


        IF CANDO[USER].[TYPE] NEQ TC500 THEN
        BEGIN                       COMMENT INVALID COMMAND;
            MESSAGE (24);
            GO TO PLXIT;
        END;
        IF TESTBIT (PRESENT,USER) THEN
        BEGIN                       COMMENT COMMAND INVALID AT THIS TIME;
            MESSAGE (7);
            GO TO PLXIT;
        END;
        IF TESTBIT (LISTING,USER) THEN PURGEFILE;
        IF SCANFILE THEN
        BEGIN
            IF SCAN THEN
            BEGIN                   COMMENT TOO MANY PARAMETERS GIVEN;
                MESSAGE (9);
                GO TO PLXIT;
            END;
            FILL SRCHFILE WITH PREFIX, SUFFIX;
            SEARCH (SRCHFILE,SRCH[*]);
            IF SRCH[0] LSS 2 THEN
            BEGIN
                FILERROR (SRCH[0]);
                GO TO PLXIT;
            END;
            IF SRCH[6] GTR 0 THEN
            BEGIN                   COMMENT FILE IN USE;
                FILERROR (7);
                GO TO PLXIT;
            END;
            IF SRCH[3] NEQ 10 THEN
            BEGIN                   COMMENT FILE NOT A TC500 FILE;
                FILERROR (4);
                GO TO PLXIT;
            END;
```

```
        FILL UFILE[USER] WITH PREFIX, SUFFIX;
        SETLENGTHS (SRCH[3],SRCH[4]);
    %   HEADER CHECK GOES HERE.  (FILERROR (4); GO TO PLXIT;)
        SEQLIMIT[USER] := LISTLIM;
        SEQSEQ[USER] := 0;
        SEQSEQ[USER].[LSRL] := 80;
        SEQSEQ[USER].[LSREC] := 0;   % (1 WHEN HEADER CHECKING.)
        RESETBIT (BREAKEY,USER);
        LIST2 (FALSE);
    END
    ELSE
    BEGIN                        COMMENT INVALID FILE NAME;
        MESSAGE (34);
      PLXIT:
        FINAL;
    END;
END OF PROGLOAD;



PROCEDURE FOURMAT;
    COMMENT

        FOURMAT IS USED TO DISPLAY OR CHANGE THE FORMAT OF A FILE.
    IF THERE IS NO INPUT PARAMETER, IT DISPLAYS THE FILES FORMAT.
    IF THE INPUT PARAMETER IS A VALID FORMAT, THAT BECOMES THE FILES
    FORMAT.  ANY OTHER PARAMETER IS AN ERROR.

    USES: CANDO, CLASS, KEY, LENGTH, LINE, L2CHANGED, L2TAG, PRESENT,
          START, USER, WORD
    CHANGES: LENGTH, LINE, L2CHANGED, L2TAG, START
    CALLS: BACKUP, CMOVE, ESCHAR, FINAL, FMOUT, MESSAGE, SCAN, TAGREAD,
           TESTBIT, WEBSTER
    ERRORS: COMMAND INVALID AT THIS TIME
            INVALID USER CODE
            TOO MANY PARAMETERS GIVEN .
            INVALID PARAMETER;

    BEGIN
        LABEL FMXIT;


    INTEGER STREAM PROCEDURE FMOUT (LINE,START,FMTYPE);
        VALUE START, FMTYPE;
        BEGIN
            LABEL FM1, FM2, FM3, FM4, FM5, FM6, FMEND;
            DI := LINE;  DI := DI + START;
            CI := CI + FMTYPE;
            GO TO FMEND;
            GO TO FM1;
            GO TO FM2;
            GO TO FM3;
            GO TO FM4;
            GO TO FM5;
            GO TO FM6;
          FM1:  DS := 5 LIT "COBOL";  TALLY := 5;  GO TO FMEND;
          FM2:  DS := 5 LIT "ALGOL";  TALLY := 5;  GO TO FMEND;
          FM3:  DS := 7 LIT "FORTRAN";  TALLY := 7;  GO TO FMEND;
          FM4:  DS := 4 LIT "DATA";  TALLY := 4;  GO TO FMEND;
          FM5:  DS := 5 LIT "GP300";  TALLY := 5;  GO TO FMEND;
          FM6:  DS := 5 LIT "BASIC";  TALLY := 5;  GO TO FMEND;
          FMEND:
            FMOUT := TALLY;
        END OF FMOUT;
```

```
        IF NOT TESTBIT (PRESENT,USER) THEN
        BEGIN                    COMMENT COMMAND INVALID AT THIS TIME;
            MESSAGE (7);
            GO TO FMXIT;
        END;
        TAGREAD (0);
        IF SCAN THEN
        BEGIN
            IF CANDO[USER],[ALLOW] LSS 3 THEN
            BEGIN                COMMENT INVALID USER CODE;
                MESSAGE (37);
                GO TO FMXIT;
            END;
            IF WEBSTER AND CLASS = 3 THEN
            BEGIN
                IF SCAN THEN
                BEGIN            COMMENT TOO MANY PARAMETERS GIVEN;
                    MESSAGE (9);
                    GO TO FMXIT;
                END;
                L2FMT := KEY;
                L2CHANGED := TRUE;
                BACKUP;
                MESSAGE (5);
            END
            ELSE
            BEGIN                COMMENT XXX NOT A VALID PARAMETER;
                MESSAGE (2);
                IF LENGTH GTR 30 THEN LENGTH := 30;
                CMOVE (WORD,LINE[USER,*],0,START[USER],LENGTH);
                ESCHAR (TRUE);
                START[USER] := START[USER] + LENGTH;
                MESSAGE (21);
        END;END
        ELSE
        BEGIN
            MESSAGE (3);
            START[USER] := START[USER] + 1 +
             FMOUT (LINE[USER,*],START[USER] + 1,L2FMT);
            MESSAGE (16);
        END;
      FMXIT:
        FINAL;
    END OF FOURMAT;



PROCEDURE TORIMS;
    COMMENT

        TORIMS CREATES A FILE OF CONTROL CARDS WHICH WILL CAUSE THE
    PROGRAM RIMS/TORIMS TO BE SCHEDULED.

    USES: CLASS, KEY, LENGTH, LINE, PREFIX, SRCH, SRCHFILE, START,
          SUFFIX, USER, WORD
    CHANGES: LENGTH, LINE, SRCH, SRCHFILE, START
    CALLS: CMOVE, ESCHAR, FILERROR, FINAL, MESSAGE, SCAN, SCANFILE,
           WEBSTER
    ERRORS: FILE NOT FOUND
            INVALID USER OF FILE
            FILE IN USE
            FILE EXISTS
            XXX NOT A VALID PARAMETER
```

```
        TOO MANY PARAMETERS GIVEN
        INVALID FILE NAME
        SYNTAX ERROR;

BEGIN
    BOOLEAN TRR;

    INTEGER TRF;
    REAL TRP, TRS;
    LABEL TRESEQ, TRIP, TRXIT;

    IF SCANFILE THEN
    BEGIN
        FILL SRCHFILE WITH PREFIX, SUFFIX;
        SEARCH (SRCHFILE,SRCH[*]);
        IF SRCH[0] LSS 2 THEN
        BEGIN
            FILERROR (SRCH[0]);
            GO TO TRXIT;
        END;
        IF SRCH[6] GTR 0 THEN
        BEGIN
            FILERROR (7);
            GO TO TRXIT;
        END;
        TRP := PREFIX;  TRS := SUFFIX;
        IF SCAN AND WEBSTER AND CLASS = 4 AND KEY = 8 THEN
        BEGIN
            IF SCANFILE THEN
            BEGIN
                FILL SRCHFILE WITH PREFIX, SUFFIX;
                SEARCH (SRCHFILE,SRCH[*]);
                IF SRCH[0] NEQ -(1) THEN
                BEGIN
                    FILERROR (6);
                    GO TO TRXIT;
                END;
                TRF := COFMT;
                IF SCAN THEN
                BEGIN
                    IF WEBSTER THEN
                    BEGIN
                        IF CLASS = 3 THEN
                         TRF := KEY
                        ELSE
                         GO TO TRESEQ;
                        IF SCAN THEN
                        BEGIN
                            IF WEBSTER THEN
                          TRESEQ:
                            IF TRR := (CLASS = 2 AND KEY = 11) THEN
                            ELSE
                          TRIP:
                            BEGIN   COMMENT INVALID PARAMETER;
                                MESSAGE (2);
                                IF LENGTH GTR 30 THEN LENGTH := 30;
                                CMOVE (WORD,LINE[USER,*],0,
                                 START[USER],LENGTH);
                                ESCHAR (TRUE);
                                START[USER]:=START[USER]+LENGTH;
                                MESSAGE (21);
                                GO TO TRXIT;
                            END
                            ELSE GO TO TRIP;
                    END;END
```

```
                ELSE GO TO TRIP;
            END;
            IF SCAN THEN
            BEGIN       COMMENT TOO MANY PARAMETERS GIVEN;
                MESSAGE (9);
                GO TO TRXIT;
            END;
            FILL SRCH[*] WITH
             "CC EXECU","TE RIMS/","TORIMS; ","FILE INP",

             OCT6463757760606060,OCT6060607761776060,
             OCT6060606060776062,"ERIAL;CO","MMON=    ",1;

            CMOVE (TRP,SRCH[4],1,4,7);
            CMOVE (TRS,SRCH[5],1,6,7);
            CMOVE (TRR,SRCH[8],7,5,1);
            CMOVE (TRF,SRCH[8],7,6,1);
            WRITE (SRCHFILE,10,SRCH[*]);
            FILL SRCH[*] WITH
             "CC FILE ","OUTPUT =",OCT7760606060606060,

             OCT7761776060606060,OCT6060775660263143,
             OCT2560433145257577,OCT6060606060606077,
             "/ERRORS;"," END.    ",1;

            CMOVE (PREFIX,SRCH[2],1,1,7);
            CMOVE (SUFFIX,SRCH[3],1,3,7);
            CMOVE (USERCODE[USER],SRCH[6],1,0,7);
            WRITE (SRCHFILE,10,SRCH[*]);
            ZIP WITH SRCHFILE;
            MESSAGE (5);
        END
        ELSE
         MESSAGE (34);
    END
    ELSE
     MESSAGE (36);
  END
  ELSE
   MESSAGE (34);
 TRXIT:
  FINAL;
END OF TORIMS;



PROCEDURE TOSEQ;
    COMMENT

        TOSEQ CREATES A FILE OF CONTROL CARDS WHICH WILL CAUSE THE
    PROGRAM RIMS/TOSEQ TO BE SCHEDULED.

    USES: CLASS, KEY, PREFIX, SRCH, SRCHFILE, SUFFIX, USER, USERCODE
    CHANGES: SRCH, SRCHFILE
    CALLS: CMOVE, ESCHAR, FILERROR, FINAL, MESSAGE, RIMSFILE, SCAN,
           SCANFILE, WEBSTER
    ERRORS: FILE NOT FOUND
            INVALID USER OF FILE
            FILE IN USE
            FILE EXISTS
            TOO MANY PARAMETERS GIVEN
            INVALID FILE NAME
            SYNTAX ERROR
            FILE NOT A RIMS FILE;
```

```
BEGIN
    REAL TSP, TSS;

    LABEL TSXIT;

    IF SCANFILE THEN
    BEGIN
        FILL SRCHFILE WITH PREFIX, SUFFIX;
        SEARCH (SRCHFILE,SRCH[*]);
        IF SRCH[0] LSS 2 THEN
        BEGIN
            FILERROR (SRCH[0]);
            GO TO TSXIT;
        END;
        IF SRCH[6] GTR 0 THEN
        BEGIN
            FILERROR (7);
            GO TO TSXIT;
        END;
        IF RIMSFILE THEN
        BEGIN
            TSP := PREFIX;  TSS := SUFFIX;
            IF SCAN AND WEBSTER AND CLASS = 4 AND KEY = 8 THEN
            BEGIN
                IF SCANFILE THEN
                BEGIN
                    FILL SRCHFILE WITH PREFIX, SUFFIX;
                    SEARCH (SRCHFILE,SRCH[*]);
                    IF SRCH[0] NEQ -(1) THEN
                    BEGIN
                        FILERROR (6);
                        GO TO TSXIT;
                    END;
                    IF SCAN THEN
                    BEGIN      COMMENT TOO MANY PARAMETERS GIVEN;
                        MESSAGE (9);
                        GO TO TSXIT;
                    END;
                    FILL SRCH[*] WITH
                     "CC EXECU","TE RIMS/","TOSEQ; F","ILE INPU",

                     OCT6375776060606060,OCT6060776177606060,
                     OCT6060606077606060,"        ","        ",1;

                    CMOVE (TSP,SRCH[4],1,3,7);
                    CMOVE (TSS,SRCH[5],1,5,7);
                    WRITE (SRCHFILE,10,SRCH[*]);
                    FILL SRCH[*] WITH
                     "CC FILE ","OUTPUT =",OCT7760606060606060,

                     OCT7761776060606060,OCT6060775660263143,
                     OCT2560433145256075,OCT7760606060606060,
                     OCT7761255151465162,"; END.  ",1;

                    CMOVE (PREFIX,SRCH[2],1,1,7);
                    CMOVE (SUFFIX,SRCH[3],1,3,7);
                    CMOVE (USERCODE[USER],SRCH[6],1,1,7);
                    WRITE (SRCHFILE,10,SRCH[*]);
                    ZIP WITH SRCHFILE;
                    MESSAGE (5);
                END
                ELSE
                 MESSAGE (34);
            END
```

```
            ELSE
             MESSAGE (36);
        END
        ELSE
         FILERROR (1);
    END
    ELSE
     MESSAGE (34);
  TSXIT:
    FINAL;
 END OF TOSEQ;



PROCEDURE EDIT;
    COMMENT

        EDIT SCANS FOR A SEQUENCE NUMBER, AND IF THAT RECORD EXISTS IN
    THE FILE, SCANS TO A NON-BLANK.  THIS CHARACTER IS THEN USED AS THE
    DELIMITER FOR A STRING OF CHARACTERS TO BE REPLACED IN THE RECORD.
    THE RECORD IS READ, AND WHEN THE STRING IS FOUND, THE REMAINING
    ENTERED CHARACTERS (FROM THE SECOND "DELIMITER" TO THE GROUP MARK)
    ARE USED TO REPLACE THE ORIGINAL STRING.  THE NEW RECORD IS THEN
    WRITTEN AT THE END OF THE FILE, AND THE TAGS ARE UPDATED.

    USES: CANDO, FOUND, LENGTH, LINE, L2TAG, NUMR, PRESENT, START, TAG,
          USER, WORD
    CHANGES: LENGTH, LINE, START, TAG, WORD
    CALLS: BACKUP, BLANKOUT, CMOVE, DECBIN, DSKREAD, DSKWRITE, EDITIT,
           EDITSCAN, ESCHAR, FINAL, MESSAGE, SCAN, TAGINSERT, TAGSEARCH,
           TESTBIT, WMOVE
    ERRORS: COMMAND INVALID AT THIS TIME
            INVALID USER CODE
            SEQUENCE NUMBER XXX NOT IN FILE
            SYNTAX ERROR
            XXX NOT A VALID PARAMETER
            INVALID SEQUENCE NUMBER
            SEQUENCE NUMBER MISSING;

    BEGIN
        ALPHA ARRAY EDARY1 [0:LINMAX], EDARY2 [0:2 × LINMAX + 1];

        INTEGER EDSEQNO, EDBLANKS;
        LABEL EDXIT;

    BOOLEAN STREAM PROCEDURE EDITSCAN (WORD,LINE,START,ESBLANKS,LENGTH);
        VALUE START;
        BEGIN
            LOCAL ESBLNK, ESCHR, ESONE, ESSAV, ESWDS, ESDLM;
            LABEL ESBGN, ESNBL, ESSCN, ESXIT, ESEND;
            DI := LOC ESONE;  DS := 1 LIT "1";
            SI := LOC START;  DI := LOC ESWDS;
            DI := DI + 1;  DS := 7 CHR;
            SI := LINE;  SI := SI + START;
            ESWDS (2 (SI := SI + 32));
          ESBGN:
            2 (32 (IF SC NEQ " " THEN JUMP OUT 2 TO ESNBL;
                SI := SI + 1;  TALLY := TALLY + 1));
            ESSAV := SI;  SI := LOC ESONE;
            DI := ESBLANKS;  DI := DI + 6;
            DS := 1 ADD;  SI := ESSAV;  GO TO ESBGN;
          ESNBL:
            ESBLNK := TALLY;  TALLY := 0;
            IF SC = GM THEN GO TO ESXIT;
```

```
        DI := LOC ESDLM;  DS := 1 CHR;
        DI := WORD;  ESWDS := DI;
      ESSCN:
        2 (32 (DI := LOC ESDLM;
            IF SC = GM THEN JUMP OUT 2 TO ESEND;
            IF 1 SC = DC THEN
            BEGIN
                ESCHR := TALLY;  TALLY := 1;
                JUMP OUT 2 TO ESXIT;
            END;
            TALLY := TALLY + 1;
            SI := SI - 1;  DI := ESWDS;
            DS := 1 CHR;  ESWDS := DI));
        ESSAV := SI;  SI := LOC ESONE;
        DI := LENGTH;  DI := DI + 6;
        DS := 1 ADD;  SI := ESSAV;  GO TO ESSCN;
      ESXIT:
        SI := LOC ESBLNK;  SI := SI + 7;
        DI := ESBLANKS;  DI := DI + 7;  DS := 1 CHR;
        SI := LOC ESCHR;  SI := SI + 7;
        DI := LENGTH;  DI := DI + 7;  DS := 1 CHR;
        EDITSCAN := TALLY;
      ESEND:
    END OF EDITSCAN;

BOOLEAN STREAM PROCEDURE EDITIT (EIARY1,EIARY2,LINE,WORD,LENGTH,
                                 EILOOP);
    VALUE EILOOP, LENGTH;
    BEGIN
        LOCAL EILGTH, EISWITCH, EISAV1, EISAV2, EISAV3;
        LABEL EIREP, EIFIN;
        SI := EIARY1;  EISAV1 := SI;
        SI := EIARY2;  EISAV2 := SI;
        DI := LINE;  EISAV3 := DI;
        SI := LOC LENGTH;  DI := LOC EILGTH;
        DI := DI + 1;  DS := 7 CHR;
        8 (EILOOP (SI := LOC EISWITCH;
            IF SC = "0" THEN
            BEGIN           COMMENT BEFORE REPLACEMENT;
                SI := EISAV2;  DI := WORD;
                IF 1 SC = DC THEN
                BEGIN
                    SI := SI - 1;  DI := DI - 1;
                    TALLY := 1;
                    EILGTH (2 (IF 32 SC NEQ DC THEN TALLY := 0));
                    IF LENGTH SC NEQ DC THEN TALLY := 0;
                    EISWITCH := TALLY;  EISAV2 := SI;
                    SI := LOC EISWITCH;  SI := SI + 7;
                    IF SC = "1" THEN
                    BEGIN
                        DI := LOC EISWITCH;  DS := 1 LIT "1";
                        GO TO EIREP;
                    END;
                    SI := EISAV2;  SI := SI - LENGTH;
                    EILGTH (2 (SI := SI - 32));
                END
                ELSE
                 SI := SI - 1;
                DI := EISAV3;  DS := 1 CHR;
                EISAV2 := SI;  EISAV3 := DI;
            END
            ELSE
            IF SC = "1" THEN
          EIREP:
            BEGIN           COMMENT DURING REPLACEMENT;
```

```
                SI := EISAV1;
                IF SC = GM THEN
                BEGIN
                    DI := LOC EISWITCH;  DS := 1 LIT "2";
                    DI := EISAV3;  GO TO EIFIN;
                END;
                DI := EISAV3;  DS := 1 CHR;
                EISAV1 := SI;  EISAV3 := DI;
            END
            ELSE
          EIFIN:
            BEGIN             COMMENT AFTER REPLACEMENT;
                SI := EISAV2;  DS := 1 CHR;
                EISAV2 := SI;
            END));
        SI := LOC EISWITCH;
        IF SC = "0" THEN TALLY := 0 ELSE TALLY := 1;
        EDITIT := TALLY;
    END OF EDITIT;

    IF NOT TESTBIT (PRESENT,USER) THEN
    BEGIN                    COMMENT COMMAND INVALID AT THIS TIME;
        MESSAGE (7);
        GO TO EDXIT;
    END;
    IF CANDO[USER].[ALLOW] LSS 3 THEN
    BEGIN                    COMMENT INVALID USER CODE;
        MESSAGE (37);
        GO TO EDXIT;
    END;
    IF SCAN THEN
    BEGIN
        IF NUMR AND LENGTH LEQ LGTHLIM THEN
        BEGIN
            TAGSEARCH (0,EDSEQNO := DECBIN);
            IF NOT FOUND THEN
            BEGIN            COMMENT SEQUENCE NUMBER XXX NOT IN FILE;
                MESSAGE (19);
                CMOVE(WORD,LINE[USER,*],0,START[USER]+1,LENGTH);
                START[USER] := START[USER] + LENGTH + 1;
                MESSAGE (20);
                GO TO EDXIT;
            END;
            LENGTH := EDBLANKS := 0;
            IF NOT EDITSCAN (WORD,LINE[USER,*],START[USER],
             EDBLANKS,LENGTH) OR LENGTH = 0 THEN
            BEGIN            COMMENT SYNTAX ERROR;
                MESSAGE (36);
                GO TO EDXIT;
            END;
            BACKUP;
            CMOVE (LINE[USER,*],EDARY1,START[USER] :=
             START[USER] + EDBLANKS + LENGTH + 2,0,
             8 × (LINMAX + 1) - START[USER]);
            BLANKOUT (LINE[USER,*],LINMAX);
            BLANKOUT (EDARY2,2 × LINMAX + 1);
            START[USER] := 0;
            IF DSKREAD (TRUE) THEN ELSE GO TO EDXIT;
            IF L2FMT NEQ DAFMT THEN BLANKOUT (LINE[USER,9],0);
            ESCHAR (TRUE);
            WMOVE (LINE[USER,*],EDARY2,LINMAX + 1);
            IF EDITIT (EDARY1,EDARY2,LINE[USER,*],WORD,LENGTH,
             LINMAX + 1) THEN
            BEGIN
                ESCHAR (FALSE);
```

```
                DSKWRITE;
                TAG.[SEQNO] := EDSEQNO;
                TAGINSERT;
                MESSAGE (5);
            END
            ELSE
            BEGIN                COMMENT XXX NOT A VALID PARAMETER;
                MESSAGE (2);
                IF LENGTH GTR 30 THEN LENGTH := 30;
                CMOVE (WORD,LINE[USER,*],0,START[USER],LENGTH);
                ESCHAR (TRUE);
                START[USER] := START[USER] + LENGTH;
                MESSAGE (21);
        END;END
        ELSE
         MESSAGE (13);       COMMENT INVALID SEQUENCE NUMBER;
    END
    ELSE
     MESSAGE (11);           COMMENT SEQUENCE NUMBER MISSING;
  EDXIT:
    FINAL;
END OF EDIT;



PROCEDURE FIRST;
    COMMENT

        THIS MODULE IS ENTERED WHENEVER A RECORD IS RECEIVED FROM A
    TERMINAL. INITIALLY IT SETS STARTMSG TO TRUE AND SETS START TO ZERO.
    IT THEN SCANS THE RECORD FOR AN ASTERISK AND IF ONE IS FOUND, FIRST
    THEN DETERMINES WHETHER A NUMBER OR A VALID COMMAND IS THE NEXT
    ENTRY IN THE RECORD. IF THE ENTRY IS A NUMBER, FIRST CALLS DATA. IF
    THE ENTRY IS A VALID COMMAND, FIRST RESETS THE SWITCH SEQCOMD AND
    THEN CALLS THE APPROPRIATE COMMAND MODULE.
        ALL OTHER ENTRIES IN THE FIRST TWO FIELDS OF THE RECORD ARE
    ERRORS, IN WHICH CASE FIRST CALLS MESSAGE.

    USES: CANDO, CLASS, KEY, NUMR, RESTART, SEQCOMD, SPEC, START,
          STARTMSG, USER, USERCODE
    CHANGES: SEQCOMD, SPEC, START, STARTMSG
    CALLS: ALL COMMANDS, ESCHAR, FINAL, MESSAGE, RESETBIT, SCAN,
           TESTBIT, WEBSTER
    ERRORS: PLEASE LOG IN
            INVALID COMMAND;

    BEGIN
        STARTMSG:=TRUE;
        START[USER] := REAL (SPEC := FALSE);
        IF SCAN AND WEBSTER AND CLASS=1 AND KEY=1 THEN
        IF SCAN THEN
            IF NUMR THEN
                DATA
            ELSE
                IF WEBSTER AND CLASS=2 THEN
                IF (REAL (BOOLEAN (USERCODE[USER]) EQV FALSE) =
                 REAL (NOT FALSE) OR TESTBIT (RESTART,USER))
                 AND KEY GTR 2 THEN
                BEGIN        COMMENT PLEASE LOG IN;
                    MESSAGE (41);
                    FINAL;
                END
                ELSE
                BEGIN
```

```
                RESETBIT (SEQCOMD,USER);
                IF KEY NEQ 25 THEN ESCHAR (FALSE);
                CASE KEY-1 OF
                BEGIN
                    LOGIN;              % LI
                    LOGOUT;             % LO
                    PRINTDIR;           % PD
                    REMOVE;             % RM
                    CHANGE;             % CH
                    LOAD;               % L
                    SEQUENCE;           % S
                    VIEW;               % V
                    SAVER;              % SA
                    SCHEDULE;           % SC
                    RESEQUENCE;         % RS
                    COMMENT UNUSED;;%   .Q
                    DELETE;             % D
                    CREATE;             % C
                    HEADER;             % H
                    MOVEDUP (TRUE);     % M
                    MOVEDUP (FALSE);%   DUP
                    CANCEL;             % CN
                    FILENAME;           % FN
                    LISTER;             % LS
                    PROGLOAD;           % PGLD
                    FOURMAT;            % FM
                    TORIMS;             % TORIMS
                    TOSEQ;              % TOSEQ
                    EDIT;               % E
                END;


            END
            ELSE
            BEGIN                   COMMENT INVALID COMMAND;
                MESSAGE (24);
                FINAL;
            END
    ELSE
    BEGIN                           COMMENT INVALID COMMAND;
        MESSAGE (24);
        FINAL;
    END
    ELSE
    IF CANDO[USER].[KIND] = HARDCOPY AND TESTBIT (SEQCOMD,USER)
     THEN
    BEGIN                           COMMENT NO COMMAND, JUST DATA;
        SPEC := TRUE;
        START[USER] := - 1;
        DATA;
    END
    ELSE
    BEGIN                           COMMENT INVALID COMMAND;
        MESSAGE (24);
        FINAL;
    END;
END OF FIRST;


BEGIN  COMMENT

INITIALIZATION BLOCK

     THIS BLOCK FIRST DETERMINES IF THE RIMS WORK FILE EXISTS, AND
```

```
IF IT DOES NOT, IT IS CREATED.  IF THE WORK FILE EXISTS, THE BACK-UP
RECORD IS CHECKED TO SEE IF THIS EXECUTION IS A RESTART.  IF NOT,
THE BACK-UP RECORD IS INITIALIZED.  IF IT IS A RESTART, THE USERS
FILES, CREATE SWITCHES, PRESENT SWITCHES, WORK AREA ASSIGNMENTS,
USER CODES, AND ALLOW CODES ARE SET FROM THE BACK-UP RECORD.  THEN
THE USERS FILES ARE CHECKED TO MAKE SURE THEY STILL EXIST WITH THE
SAME FILE SECURITY, AND IF NOT, THOSE USERS CANNOT BE RESTARTED.
THE SPARE WORK AREA ASSIGNMENT IS THEN COMPUTED.
    NEXT, THIS BLOCK DETERMINES IF THE LOG FILE EXISTS, AND IF IT
DOES NOT, IT IS CREATED.  IF IT EXISTS, ARRAY "LOG" IS INITIALIZED
FROM THE LOG FILE.  THEN A TYPE 3 LOG ENTRY IS MADE.
    NEXT, THE KEY WORD, ESCAPE CHARACTER, MESSAGE POINTER, MESSAGE
WORD, AND MESSAGE SPECIAL CHARACTER DICTIONARIES ARE FILLED.
    NEXT, THE USERS FILES ARE CHECKED TO SEE IF THE END-OF-FILE
POINTERS HAVE BEEN PROPERLY RECORDED IN THE DISK DIRECTORY, AND
IF NOT, A DUMMY RECORD IS WRITTEN JUST BEYOND THE LAST RECORD,
AND THE DIRECTORY IS UPDATED BY LOCKING THE FILE.
    NEXT, THE "RUNNING" SWITCH IS TURNED ON, AND "LASTXUSER" AND
"LASTOUSER" ARE INITIALIZED TO FORCE FIRST-TIME TAG READING.
    LAST, THE ADDRESS OF PRT LOCATION 25 (OCTAL) IS PASSED TO THE
RIMS HANDLER PROGRAM, THEREBY AWAKENING IT AND STARTING THE SYSTEM
RUNNING.

USES: ACCEPT, BKUP, CANDO, CREATESW, DICT, DOCT1, DOCT2, DOCT3,
      ESARY, GOTO, LASTXUSER, LASTOUSER, LINE, LOG, LOGFILE,
      LOG1, L2TAG, PRESENT, PREVBLOCK, PRT25, REEL,
      RESTART, RUNNING, SRCH, START, TAGFILE, TAGROW, UFILE, USER,
      USERCODE, USERS, VERSION
CHANGES: ACCEPT, BKUP, CANDO, CREATESW, DICT, DOCT1, DOCT2, DOCT3,
         ESARY, GOTO, LASTXUSER, LASTOUSER, LINE, LOG, LOG1,
         PRESENT, PREVBLOCK, REEL, RESTART, RUNNING, SRCH,
         START, TAGFILE, TAGROW, UFILE, USER, USERCODE, USERS,
         VERSION
CALLS: BKUPWRITE, BLANKOUT, CREATELOG, FILLES, FILLTHE, LOGGER,
       PASSADDR, RESETBIT, RESTARTIT, SETBIT, TAGREAD, TESTBIT,
       WMOVE
ERRORS: NONE;

    INTEGER I, J, NTSUM;

    SAVE FILE CRTAGFILE DISK SERIAL [1:1+WKSZ×(NUSERS+1)]
        "RIM " "TAGFILE" (2,BLKSZ, SAVE 999);

STREAM PROCEDURE PASSADDR (PS25VALU,PS25ADDR);
    VALUE PS25VALU;
    BEGIN
        DI:=PS25VALU;
        SI := PS25ADDR;
        PS25ADDR := SI;
        SI:=LOC PS25ADDR;
        DS:=1 WDS;
    END OF PASSADDR;

BOOLEAN STREAM PROCEDURE RESTARTIT (KEYWD);
    BEGIN
        LOCAL L;
        DI := LOC L;  DS := 8 LIT "0RESTART";
        DI := LOC L;  SI := KEYWD;
        IF 8 SC = DC THEN TALLY := 1;
        RESTARTIT := TALLY;
    END OF RESTARTIT;

STREAM PROCEDURE FILLTHE (DICT);
    COMMENT
```

FILLTHE FILLS THE ARRAY "DICT" WITH ALL THE RIMS RESERVED WORDS. THE FORMAT OF EACH ENTRY IS: 1 CHARACTER BINARY LENGTH OF THE WORD, (LENGTH) CHARACTERS FOR THE WORD, 1 CHARACTER FOR THE BINARY CLASS, AND 1 CHARACTER FOR A BINARY KEY, WHICH IS UNIQUE FOR EACH RESERVED WORD WITHIN A CLASS. CLASS 1 IS FOR DELIMITERS, CLASS 2 IS FOR COMMANDS, CLASS 3 IS FOR FORMATS, AND CLASS 4 IS FOR KEYWORD PARAMETERS. WORD 0 OF "DICT" CONTAINS THE NUMBER OF DICTIONARY ENTRIES.;

```
BEGIN
    LOCAL FTNTRYS;
    TALLY := 35;  FTNTRYS := TALLY;  % 70 ENTRIES IN DICTIONARY
    SI := LOC FTNTRYS;  DI := DICT;  % 456 CHARACTERS USED
    DS := 1 WDS;                     % STORE COUNT IN WORD 0
                             COMMENT    CLASS    KEY        ;
    DS := 4 LIT "1*11";          %        1       1     *
    DS := 4 LIT "1/12";          %        1       2     /
    DS := 4 LIT "1:13";          %        1       3     :
    DS := 5 LIT "2LI21";         %        2       1     LI
    DS := 5 LIT "2LO22";         %        2       2     LO
    DS := 5 LIT "2PD23";         %        2       3     PD
    DS := 5 LIT "2RM24";         %        2       4     RM
    DS := 5 LIT "2CH25";         %        2       5     CH
    DS := 4 LIT "1L26";          %        2       6     L
    DS := 4 LIT "1S27";          %        2       7     S
    DS := 4 LIT "1V28";          %        2       8     V
    DS := 5 LIT "2SA29";         %        2       9     SA
    DS := 5 LIT "2SC2#";         %        2      10     SC
    DS := 5 LIT "2RS2@";         %        2      11     RS
    DS := 4 LIT "1D2:";          %        2      13     D
    DS := 4 LIT "1C2>";          %        2      14     C
    DS := 4 LIT "1H2≥";          %        2      15     H
    DS := 4 LIT "1M2+";          %        2      16     M
    DS := 6 LIT "3DUP2A";        %        2      17     DUP
    DS := 5 LIT "2CN2B";         %        2      18     CN
    DS := 5 LIT "2FN2C";         %        2      19     FN
    DS := 5 LIT "2LS2D";         %        2      20     LS
    DS := 7 LIT "4PGLD2E";       %        2      21     PGLD
    DS := 5 LIT "2FM2F";         %        2      22     FM
    DS := 4 LIT "1E2I";          %        2      25     E
    DS := 5 LIT "2CO31";         %        3       1     CO
    DS := 5 LIT "2AL32";         %        3       2     AL
    DS := 5 LIT "2FO33";         %        3       3     FO
    DS := 5 LIT "2DA34";         %        3       4     DA
    DS := 5 LIT "2GP35";         %        3       5     GP
    DS := 5 LIT "2BA36";         %        3       6     BA
    DS := 4 LIT "1F41";          %        4       1     F
    DS := 4 LIT "1+41";          %        4       1     +
    DS := 4 LIT "1B42";          %        4       2     B
    DS := 4 LIT "1-42";          %        4       2     -
    DS := 6 LIT "3HDR43";        %        4       3     HDR
    DS := 7 LIT "4FREE44";       %        4       4     FREE
    DS := 7 LIT "4SOLE45";       %        4       5     SOLE
    DS := 7 LIT "4INFO46";       %        4       6     INFO
    DS := 9 LIT "6PUBLIC47";     %        4       7     PUBLIC
    DS := 5 LIT "2TO48";         %        4       8     TO
    DS := 5 LIT "2NO49";         %        4       9     NO
    DS := 9 LIT "6REMOVE24";     %        2       4     REMOVE
    DS := 9 LIT "6CHANGE25";     %        2       5     CHANGE
    DS := 7 LIT "4LOAD26";       %        2       6     LOAD
    DS :=11 LIT "8SEQUENCE27";   %        2       7     SEQUENCE
    DS := 7 LIT "4VIEW28";       %        2       8     VIEW
    DS := 7 LIT "4SAVE29";       %        2       9     SAVE
    DS :=11 LIT "8SCHEDULE2#";   %        2      10     SCHEDULE
    DS := 8 LIT "5RESEQ2@";      %        2      11     RESEQ
```

```
        DS := 9 LIT "6DELETE2:";      %      2      13     DELETE
        DS := 9 LIT "6CREATE2>";      %      2      14     CREATE
        DS := 9 LIT "6HEADER2≥";      %      2      15     HEADER
        DS := 7 LIT "4MOVE2+";        %      2      16     MOVE
        DS :=12 LIT "9DUPLICATE2A";   %      2      17     DUPLICATE
        DS := 9 LIT "6CANCEL2B";      %      2      18     CANCEL
        DS :=11 LIT "8FILENAME2C";    %      2      19     FILENAME
        DS := 7 LIT "4LIST2D";        %      2      20     LIST
        DS :=11 LIT "8PROGLOAD2E";    %      2      21     PROGLOAD
        DS := 9 LIT "6FORMAT2F";      %      2      22     FORMAT
        DS := 9 LIT "6TORIMS2G";      %      2      23     TORIMS
        DS := 8 LIT "5TOSEQ2H";       %      2      24     TOSEQ
        DS := 7 LIT "4EDIT2I";        %      2      25     EDIT
        DS := 8 LIT "5COBOL31";       %      3       1     COBOL
        DS := 8 LIT "5ALGOL32";       %      3       2     ALGOL
        DS :=10 LIT "7FORTRAN33";     %      3       3     FORTRAN
        DS := 7 LIT "4DATA34";        %      3       4     DATA
        DS := 8 LIT "5GP30035";       %      3       5     GP300
        DS := 8 LIT "5BASIC36";       %      3       6     BASIC
        DS := 4 LIT "1*11";           % EXTRA
    END OF FILLTHE;

STREAM PROCEDURE FILLES(ESARY);
                COMMENT

FILLES          THIS PROCEDURE FILLS THE ARRAY "ESARY" WITH THE ESCAPE
                CHARACTER CONVERSION ELEMENTS. EACH ELEMENT IS COMPOSED
                OF 3 CHARACTERS.
                THE FORMAT OF EACH ELEMENT IS:
                                    1ST CHAR -- TYPE
                                      1 = RAYTHEON  (RAY)
                                      2 = TC500
                                      3 = TELETYPE  (TTY)
                                      4 = CONRAC
                                    2ND CHAR -- PERMANENT CHARACTER
                                    3RD CHAR -- TERMINAL CHARACTER
                WORD 0 OF "ESARY" CONTAINS THE NUMBER OF ESARY ELEMENTS
                WORD 1 IN "ESARY" CONTAINS THE ESCAPE CONTROL
                SPECIAL CHARACTERS FOR EACH DEVICE.;

    BEGIN
        LOCAL ESELEMS;
        TALLY := 17;                  % NUMBER OF ESARY ELEMENTS
        ESELEMS := TALLY;
        SI := LOC ESELEMS;            % TOTAL OF 63 CHARACTERS USED
        DI := ESARY;
        DS := WDS;                    % SET 1ST WORD OF ESARY TO COUNT
        DS := LIT "≥";                % ESCAPE SPECIAL CONTROL CHAR RAY
        DS := LIT "%";                % ESCAPE SPECIAL CONTROL CHAR TC500
        DS := LIT "%";                % ESCAPE SPECIAL CONTROL CHAR TTY
        DS := LIT "%";                % ESCAPE SPECIAL CONTROL CHAR CONRAC
        DS := 3 LIT "1≤<";            % THE FOLLOWING ELEMENTS ARE RAYTHEON
        DS := 3 LIT "1≥>";
        DS := 3 LIT "1≠*";
        DS := 3 LIT "1←=";
        DS := 3 LIT "1[(";
        DS := 3 LIT "1])";
        DS := 3 LIT "1×X";
        DS := 3 LIT "1#+";
        DS := 3 LIT "2←=";            % THE FOLLOWING ELEMENTS ARE TC500
        DS := 3 LIT "3≤(";            % THE FOLLOWING ELEMENTS ARE TTY
        DS := 3 LIT "3≥)";
        DS := 3 LIT "3≠=";
        DS := 3 LIT "3←=";
        DS := 3 LIT "3<[";
```

```
    DS := 3 LIT "3>]";
    DS := 3 LIT "4←=";         % THE FOLLOWING ELEMENTS ARE CONRAC
    DS := 3 LIT "4≠=";
END FILLES;

    SEARCH (CRTAGFILE,SRCH[*]);
    IF SRCH[0] = -(1) THEN
    BEGIN                      COMMENT START FROM SCRATCH;
        REEL := STATUS (0,3);
        FOR I := 0 STEP 1 UNTIL NUSERS DO
         BKUP[I×NBKUPS+2] := TAGROW[I] := I;
        BKUP[I := NUSERS × NBKUPS] := "SPARE  ";
        BKUP[I + 1] := "AREA   ";
        BKUP[I + 3] := "RIMS   ";
        BKUP[TAGMAX] := "RESTART";
        WRITE (CRTAGFILE,BLKSZ,BKUP[*]);
        FOR I := 1 STEP 1 UNTIL WKSZ×(NUSERS+1) DO
        BEGIN
            WMOVE (CRTAGFILE(0),CRTAGFILE(1),TAGMAX);
            WRITE (CRTAGFILE);
        END;
        LOCK (CRTAGFILE);
    END
    ELSE
    BEGIN                      COMMENT TAGFILE EXISTS;
        READ (TAGFILE[0],BLKSZ,BKUP[*]);
        IF NOT RESTARTIT (BKUP[TAGMAX]) THEN
        BEGIN                  COMMENT IT IS A NEW EXECUTION;
            BKUP[0] := 0;
            WMOVE (BKUP[0],BKUP[1],TAGMAX);
            FOR I := 0 STEP 1 UNTIL NUSERS DO
             BKUP[I × NBKUPS + 2] := TAGROW[I] := I;
            BKUP[I := NUSERS × NBKUPS] := "SPARE  ";
            BKUP[I + 1] := "AREA   ";
            BKUP[I + 3] := "RIMS   ";
            BKUP[TAGMAX] := "RESTART";
            BKUPWRITE;
        END
        ELSE
        BEGIN                  COMMENT IT IS A RESTART;
            FOR I := 0 STEP 1 UNTIL UMAX DO
            BEGIN
                FILL UFILE[I] WITH
                 ABS (BKUP[J := I × NBKUPS]), BKUP[J + 1];
                IF BKUP[J] LSS 0 THEN
                 SETBIT (CREATESW,I);
                IF BKUP[J] NEQ 0 OR BKUP[J + 1] NEQ 0 THEN
                 SETBIT (PRESENT,I);
                NTSUM := NTSUM + TAGROW[I] := BKUP[J + 2];
                IF REAL (BOOLEAN (USERCODE[I] := BKUP[J + 3])
                 EQV FALSE) NEQ REAL (NOT FALSE) THEN
                BEGIN
                    IF TESTBIT (PRESENT,I) THEN
                     SETBIT (RESTART,I)
                    ELSE USERCODE[I] := 0;
                END;
                CANDO[I].[ALLOW] := BKUP[J + 4];
                IF TESTBIT (RESTART,I) THEN
                BEGIN
                    REEL := STATUS (USERCODE[I],8);
                    SEARCH (UFILE[I],SRCH[*]);
                    IF SRCH[0] NEQ CANDO[I].[ALLOW] THEN
                    BEGIN
                        RESETBIT (RESTART,I);
                        RESETBIT (PRESENT,I);
```

```
                    RESETBIT (CREATESW,I);
                    CANDO[I].[ALLOW] := USERCODE[I] := 0;
          END;END;END;
          BKUP[NUSERS × NBKUPS + 2] := TAGROW[NUSERS] :=
           NUSERS × (NUSERS+1) DIV 2 - NTSUM;
END;END;
REEL := STATUS (0,7);
SEARCH (LOGFILE,SRCH[*]);
IF SRCH[0] = -1 THEN
 CREATELOG
ELSE
 READ (LOGFILE[0],3,LOG1[*]);
IF BUDATE = 0 THEN
BEGIN
    BUDATE := TIME (0);
    BUTIME := TIME (1);
END;
READ (LOGFILE[LOGNO DIV 6 + 1],30,LOG[*]);
LOGGER (3);
FILLTHE (DICT);
FILLES (ESARY[*]);
FILL DOCT1[*] WITH                  % SET UP MESSAGE POINTERS
    OCT00000000100000,              %  0 "*" END OF VIEW

    OCT00000000000100,              %  1 ERASE SCREEN
    OCT00000000000300,              %  2 " " SETUP FOR ERRORS
    OCT00000000000600,              %  3 "*" SETUP FOR *V  AND *C
    OCT00000000000500,              %  4 "*" SETUP FOR VIEW2
    OCT00000000100700,              %  5 "* " OK RESULT
    OCT00000000001500,              %  6 "←" END OF LINE
    OCT10761752440300,              %  7 "COMMAND INVALID "
    OCT00001013167700,              %  8 "AT THIS TIME"
    OCT12232221200300,              %  9 "TOO MANY PARAMETER"
    OCT00001013252400,              % 10 "S GIVEN"
    OCT14313027260300,              % 11 "SEQUENCE NUMBER MISS"
    OCT00000010133200,              % 12 "ING "
    OCT16272676170300,              % 13 "INVALID SEQUENCE "
    OCT00000010133000,              % 14 "NUMBER"
    OCT20343376170300,              % 15 "INVALID INCREMENT "
    OCT00000000101300,              % 16 "*" END OF ERRORS
    OCT22243027260300,              % 17 "SEQUENCE NUMBERS "
    OCT00101336351700,              % 18 "IN WRONG ORDER"
    OCT00003027260300,              % 19 "SEQUENCE NUMBER"---
    OCT20005740173700,              % 20 ---" NOT IN FILE "
    OCT20232276423700,              % 21 ---" NOT A VALID PARAMETER"
    OCT20005740414300,              % 22 ---" END OF FILE "
    OCT00000000450700,              % 23 "*     H " SETUP *V HDR
    OCT20524476170300,              % 24 "INVALID COMMAND "
    OCT20462034330300,              % 25 "INCREMENT TOO LARGE"
    OCT33172450470300,              % 26 "NO RECORDS IN"
    OCT00001013574000,              % 27 " FILE "
    OCT00000000000200,              % 28 "*" END OF DATA RECORD
    OCT00000000001200,              % 29 "]" CRT CARRIAGE RETURN
    OCT00515376170300,              % 30 "INVALID USER OF"---
    OCT00001013543700,              % 31 ---" NOT FOUND"
    OCT00001013551700,              % 32 --- "IN USE"
    OCT20005756423700,              % 33 ---" NOT A RIMS FILE "
    OCT20605776170300,              % 34 "INVALID FILE NAME"
    OCT20006261170300,              % 35 "INPUT ERROR"
    OCT20000062630300,              % 36 "SYNTAX ERROR"
    OCT20645376170300,              % 37 "INVALID USER CODE"
    OCT00000010136500,              % 38 --- "EXISTS"
    OCT20006657400300,              % 39 " FILE FULL"
    OCT20323164530300,              % 40 "USER CODE MISSING"
    OCT20001770670300,              % 41 "PLEASE LOG IN"
```

```
    OCT00101371560700,          % 42 "RIMS READY"
    OCT20007372560700,          % 43 "RIMS RESTARTED"
    OCT20245021200300,          % 44 "TOO MANY RECORDS"
    OCT20462024500300,          % 45 "RECORDS TOO LARGE"
    OCT00000000101100,          % 46 "*" END OF DATA INPUT
    OCT20005774423700,          % 47 " NOT A TC500 FILE "
    OCT00000000007500,          % 48 TC500 END OF ALPHA CHARS
    OCT62524071560700,          % 49 "RIMS READY AND "
    OCT20652462415700,          % 50 "FILE OF ERRORS EXISTS"
    OCT00000000000400,          % 51 "*" END OF SEQUENCE COMD
    OCT00000000001400;          % 52 "←" END OF SEQUENCE NO.

FILL DOCT2[*] WITH              % SET UP MESSAGE WORDS
    OCT662606331442500,         % 16 "S TIME"

    OCT23145000000000,          % 17 "IN"
    OCT46346466000000,          % 20 "TOO "
    OCT54421457060000,          % 21 "MANY "
    OCT64721512144250O,         % 22 "PARAME"
    OCT36325510000000,          % 23 "TER"
    OCT26260000000000,          % 24 "S "
    OCT52731652545000O,         % 25 "GIVEN"
    OCT36225500000000,          % 26 "SEQ"
    OCT66425452325600O,         % 27 "UENCE "
    OCT64564442225510O,         % 30 "NUMBER"
    OCT56044316262000O,         % 31 " MISS"
    OCT43145276000000,          % 32 "ING "
    OCT53145235125000,          % 33 "INCRE"
    OCT54425456360000,          % 34 "MENT "
    OCT66066514645270O,         % 35 " WRONG"
    OCT66046512425510O,         % 36 " ORDER"
    OCT56045466360000,          % 37 " NOT "
    OCT16000000000000,          % 40 " "
    OCT24626000000000,          % 41 "OF"
    OCT22160000000000,          % 42 "A "
    OCT56025452460000,          % 43 " END "
    OCT42346444400000,          % 44 "COMM"
    OCT66060606030600O,         % 45 "    H "
    OCT54321512725000O,         % 46 "LARGE"
    OCT46045466000000,          % 47 " NO "
    OCT65125234651240O,         % 50 "RECORD"
    OCT46046266000000,          % 51 " OF "
    OCT42145246000000,          % 52 "AND "
    OCT46462255100000,          % 53 "USER"
    OCT52646644524000O,         % 54 "FOUND"
    OCT46064622500000,          % 55 " USE"
    OCT55131446260000,          % 56 "RIMS "
    OCT52631432560000,          % 57 "FILE "
    OCT44521442500000,          % 60 "NAME"
    OCT34764630000000,          % 61 "PUT"
    OCT66025515146510O,         % 62 " ERROR"
    OCT66270456321670O,         % 63 "SYNTAX"
    OCT56023462425000O,         % 64 " CODE"
    OCT62567316263620O,         % 65 "EXISTS"
    OCT42664434300000,          % 66 "FULL"
    OCT64743252162250O,         % 67 "PLEASE"
    OCT56043462760000,          % 70 " LOG "
    OCT55125212470000,          % 71 "READY"
    OCT65125626321510O,         % 72 "RESTAR"
    OCT36325240000000,          % 73 "TED"
    OCT66323050000600O,         % 74 "TC500 "
    OCT47420743700000,          % 75 "≠◊≠←"
    OCT66521433124600O,         % 76 "VALID "
    OCT62163606330310O;         % 77 "AT THI"
```

```
FILL DOCT3[RAY,*] WITH              % SET UP RAYTHEON SPEC CHARS
     OCT1274662112436621,OCT1274530000000000,% 00 "≠WA#LWA#≠*"

     OCT0463661337000000,OCT0000000000000000,% 01 "TW@←"
     OCT1153746621124366,OCT1337000000000000,% 02 "*≠WA#LW@←"
     OCT0274600000000000,OCT0000000000000000,% 03 "≠ "
     OCT0274530000000000,OCT0000000000000000,% 04 "≠*"
     OCT0153000000000000,OCT0000000000000000,% 05 "*"
     OCT0663662112745300,OCT0000000000000000,% 06 "TWA#≠*"
     OCT0763662112745360,OCT0000000000000000,% 07 "TWA#≠* "
     OCT0474661337000000,OCT0000000000000000,% 10 "≠W@←"
     OCT0643662112745300,OCT0000000000000000,% 11 "LWA#≠*"
     OCT0176000000000000,OCT0000000000000000,% 12 "]"
     OCT1274662112436621,OCT1274530000000000,% 13 "≠WA#LWA#≠*"
     OCT0474661337000000,OCT0000000000000000,% 14 "≠W@←"
     OCT0137000000000000,OCT0000000000000000;% 15 "←"

FILL DOCT3[TC500,*] WITH            % SET UP TC500 SPECIAL CHARS
     OCT0000000000000000,OCT0000000000000000,% 00 NULL

     OCT0137000000000000,OCT0000000000000000,% 01 "←"
     OCT0137000000000000,OCT0000000000000000,% 02 "←"
     OCT0160000000000000,OCT0000000000000000,% 03 " "
     OCT0153000000000000,OCT0000000000000000,% 04 "*"
     OCT0153000000000000,OCT0000000000000000,% 05 "*"
     OCT0153000000000000,OCT0000000000000000,% 06 "*"
     OCT0253600000000000,OCT0000000000000000,% 07 "* "
     OCT0137000000000000,OCT0000000000000000,% 10 "←"
     OCT0000000000000000,OCT0000000000000000,% 11 NULL
     OCT0000000000000000,OCT0000000000000000,% 12 NULL
     OCT0000000000000000,OCT0000000000000000,% 13 NULL
     OCT0137000000000000,OCT0000000000000000,% 14 "←"
     OCT0137000000000000,OCT0000000000000000;% 15 "←"

FILL DOCT3[TTY,*] WITH              % SET UP TELETYPE SPEC CHARS
     OCT0457743653000000,OCT0000000000000000,% 00 "≤≠<*"

     OCT0557747474370000,OCT0000000000000000,% 01 "≤≠≠≠←"
     OCT0457743637000000,OCT0000000000000000,% 02 "≤≠<←"
     OCT0457743660000000,OCT0000000000000000,% 03 "≤≠< "
     OCT0457743653000000,OCT0000000000000000,% 04 "≤≠<*"
     OCT0153000000000000,OCT0000000000000000,% 05 "*"
     OCT0457743653000000,OCT0000000000000000,% 06 "≤≠<*"
     OCT0557743653600000,OCT0000000000000000,% 07 "≤≠<* "
     OCT0457743637000000,OCT0000000000000000,% 10 "≤≠<←"
     OCT0000000000000000,OCT0000000000000000,% 11 NULL
     OCT0357743600000000,OCT0000000000000000,% 12 "≤≠<"
     OCT0000000000000000,OCT0000000000000000,% 13 NULL
     OCT0137000000000000,OCT0000000000000000,% 14 "←"
     OCT0457743637000000,OCT0000000000000000;% 15 "≤≠<←"

FILL DOCT3[CONRAC,*] WITH           % SET UP CONRAC SPEC CHARS
     OCT0774046060607453,OCT0000000000000000,% 00 "≠4   ≠*"

     OCT0672606060123700,OCT0000000000000000,% 01 ",    #←"
     OCT1053740460606012,OCT3700000000000000,% 02 "*≠4    #←"
     OCT0555606074600000,OCT0000000000000000,% 03 ")   ≠ "
     OCT0555606074530000,OCT0000000000000000,% 04 ")   ≠*"
     OCT0153000000000000,OCT0000000000000000,% 05 "*"
     OCT0672606060745300,OCT0000000000000000,% 06 ",    ≠*"
     OCT0772606060745360,OCT0000000000000000,% 07 ",    ≠* "
     OCT0374123700000000,OCT0000000000000000,% 10 "≠#←"
     OCT0604606060745300,OCT0000000000000000,% 11 "4    ≠*"
     OCT0374547400000000,OCT0000000000000000,% 12 "≠-≠"
     OCT0774046060607453,OCT0000000000000000,% 13 "≠4    ≠*"
```

```
        OCT0212370000000000,OCT0000000000000000,% 14 "#←"
        OCT0137000000000000,OCT0000000000000000;% 15 "←"

    FOR USER := 0 STEP 1 UNTIL UMAX DO
    BEGIN
        PREVBLOCK[USER] := 0;
        IF TESTBIT (RESTART,USER) THEN
        BEGIN
            REEL := STATUS (USERCODE[USER],8);
            TAGREAD (0);
            SEARCH (UFILE[USER],SRCH[*]);
            IF SRCH[3] DIV RECSZ × SRCH[5] LSS L2EOF DIV 3 THEN
            BEGIN
                WRITE (UFILE[USER][L2EOF DIV 3 + 1]);
                LOCK (UFILE[USER]);
        END;END;
        SETBIT (ACCEPT,USER);
        START[USER] := 0;
        BLANKOUT (LINE[USER,*],LINMAX);
        GOTO[USER] := GOFIRST;
    END;
    FOR I := 0 STEP 1 UNTIL 10 DO BEGIN
     CANDO[I].[TYPE] := RAY;  CANDO[I].[KIND] := CRT;
     CANDO[I].[LINES] := 13;  END;
    FOR I := 11 STEP 1 UNTIL 11 DO BEGIN
     CANDO[I].[TYPE] := TC500;  CANDO[I].[KIND] := HARDCOPY;
     CANDO[I].[LINES] := 6;  END;
    FOR I := 12 STEP 1 UNTIL 15 DO BEGIN
     CANDO[I].[TYPE] := TTY;  CANDO[I].[KIND] := HARDCOPY;
     CANDO[I].[LINES] := 6;  END;
    FOR I := 16 STEP 1 UNTIL 17, 11 DO BEGIN
     CANDO[I].[TYPE] := CONRAC;  CANDO[I].[KIND] := CRT;
     CANDO[I].[LINES] := 12;  END;
    SETBIT (RUNNING,0);
    LASTxUSER := LASTOUSER := NUSERS;
    IF PRT25 GTR 0 THEN
     PASSADDR (PRT25,PRT25);
    SRCH[0] := REAL (NOT FALSE);
    WRITE (SPO,1,SRCH[*]);
    VERSION := 061969;          % SET DATE OF COMPILATION
END OF INITIALIZATION BLOCK;
```

COMMENT DISPATCH

THIS MODULE IS THE ONLY OPEN CODE IN THE MPP. IT CHECKS EACH BIT IN THE SLEEP COMMUNICATE WORD TO DETERMINE IF THERE IS ANYTHING IT CAN DO FOR A USER. IF IT FINDS ALL BITS ZERO, IT GOES TO SLEEP ON THE SCW UNTIL A BIT IS TURNED ON BY THE DATACOM HANDLING PROGRAM. WHEN IT WAKES UP, IT EXECUTES A CASE STATEMENT WHICH TAKES IT TO THE APPROPRIATE PROCEDURE BASED ON AN INDEX VALUE IN THE GOTO ARRAY THAT WAS PLACED THERE BY THE PREVIOUS PROCEDURE. WHEN RE-ENTERED THE DISPATCHER ALWAYS CONTINUES ITS SEARCH WITH THE NEXT USER IN SEQUENCE. AFTER EACH OPERATION, OR 30 SECONDS (WHICHEVER OCCURS FIRST), THE LOG BACK-UP RECORD IS WRITTEN WITH THE CURRENT DATE AND TIME. WHEN "RUNNING" IS TURNED OFF BY THE RIMS HANDLER PROGRAM, END-OF-JOB HOUSEKEEPING IS PERFORMED.

USES: BKUP, GOTO, JUNK, LOGFILE, LOG1, L2TAG, REEL, RESTART,
      RUNNING, SCW, TAGFILE, TIMER, USER, USERCODE, USERS
CHANGES: BKUP, JUNK, LOGFILE, LOG1, REEL, SCW, TAGFILE, TIMER, USER
CALLS: BKUPWRITE, FIRST, GETADDR, LGFILL, LIST2, RESETBIT,
       SEQUENCE2, TESTBIT, VIEW2

```
ERRORS: NONE;

WHILE TESTBIT (RUNNING,0) DO
BEGIN
    IF REAL (SCW) = 0 THEN
     IF BOOLEAN (DELAY (GETADDR (SCW),REAL (NOT FALSE),TIMER))
      THEN ELSE GO AROUND;
    FOR USER := USER+1 STEP 1 UNTIL UMAX,
               0      STEP 1 UNTIL UMAX DO
     IF TESTBIT(SCW,USER) THEN
    BEGIN
        RESETBIT(SCW,USER);
        REEL := STATUS (USERCODE[USER],8);
        CASE GOTO[USER] OF
        BEGIN
            FIRST;
            VIEW2 (FALSE);
            LIST2 (FALSE);
    END;END;


   AROUND:
     IF TIMER := ((JUNK := TIME (1)) - BUTIME) DIV 60 LSS 0
      OR TIMER GEQ BKUPTIME THEN
     BEGIN
         BUDATE := TIME (0);
         BUTIME := JUNK;
         LGFILL (LOGFILE(0),LOG1);
         WRITE (LOGFILE[0]);
 END;END;
 IF REAL (RESTART) = 0 AND USERS = 0 THEN
 BEGIN
     BKUP[TAGMAX] := "ENDJOB";
     BKUPWRITE;
 END;
 CLOSE (TAGFILE);
 CLOSE (LOGFILE);

END OF RIMS MPP.
```

VII. SCHEDULE PROGRAM

1. Introduction

One of the applications of the Remote Input Management System is computer program development. In writing a program, the programmer usually must make many changes, testing the program repeatedly by executing it on the computer it is being written to control. RIMS is ideal for this use. From a remote terminal, a programmer may enter a program, instruction by instruction or line by line. By using the View command, portions or all of the previously entered program may be read out by the terminal. By using a variety of RIMS commands, each line in the program may be changed, duplicated, moved or deleted entirely. Finally, by use of the Schedule command, the program may be executed by the computer at any time. In this fashion, the program may be written and debugged by the programmer from a remote terminal. He does not have to wait the usual hours or days of turn-around time usually necessary when the program has to be changed and executed by reading cards into a reader at the computer location.

As explained in the discussion of the Schedule command in Section IV–5, herein, the Schedule program is executed as a result of a Schedule command being received by the Main Processing Program.

The main function of the Schedule program is to convert RIMS-Indexed filed, which contain control cards, to sequential files which are acceptable by the compiler. Also, the Schedule program resolves Kopy statements found in the RIMS files to be executed.

By the use of a Kopy statement in a file to be executed, all or a portion of a second file can be included in the original file at the position of the record containing the Kopy statement. Any Kopy statement found in the second file may also Kopy all or a portion of a third file. A total of six levels of Kopy statements may be used. A RIMS file may contain up to 9,000 data records. One record or all 9,000 may be Kopy statements. Similarly, the single or multiple files brought in may each contain one or up to 9,000 Kopy statements. In this way, a single RIMS file of 9,000 data records may be expanded to a nearly indefinite size.

In translating a RIMS file to a sequential file, the Schedule program removes a sequence number from a Level 1 tag and moves it into core in proper relative position with its associated data record. For example, if the sequential file is to be GP–300 format, the data record is placed around the sequence number in core. When the core group is full, it is read out to disc as the beginning of the sequential file. Sequence numbers in ascending order, along with associated data records, are copied from the RIMS file, into core, and then onto disc. This procedure continues, through the first RIMS files, and any other RIMS files, included via Kopy statements, until the sequential file is fully placed on disc. Since the Schedule program preceded and ended the sequential file with the control cards necessary for execution under control of the Master Control Program, the file may now be executed. The last significant step of the Schedule program is a Zip step which causes the assembled sequential file to be executed.

2. Outer Block Flow Chart

Referring to FIG. 23, the Outer block flow chart of the Schedule program is shown. As previously explained, the Schedule command entered from a remote terminal starts the Schedule program.

Step 900 in FIG. 23 is the beginning terminal block for the Outer block flow chart of the Schedule program. Step 901 enters the day of last compile in location 35 of the Program Reference Table (PRT). The purpose of this step, a manner of convention, is to make sure that the console operator does not load an old version of the program which has since been corrected.

Step 902 opens a dummy deck so that the pseudodeck is not lost in the case of a computer halt load. As previously stated, a halt load removes data stored in core.

Readvistafile step 905 is the main procedure of the program. It calls itself recursively to copy all or portions of other RIMS-Indexed files. The procedure will be explained in detail in connection with the discussion of FIGS. 24A and 24B, 25A and 25B.

Following the Readvistafile procedure, step 907 determines if there are any errors in the input file. The type of error checked is a Kopy statement which refers to a file which does not exist, the user is not a legitimate user, and so forth. If an error is found, the appropriate error message is sent to the terminal by step 910. Thereafter, the dummy file created by step 902 is closed and control transferred to closing terminal block 912, ending the Schedule program.

If no errors are found in the input file by step 907, control is transferred to step 915 which places a control card at the end of the sequential output file. The control card is necessary for execution of the output file.

Following step 915, step 918 determines whether the control card was for a COBOL compile. COBOL has a priority system dependent upon the length of the compiled file. Longer files are given lower priority and shorter files worked first. If step 918 finds a COBOL compile, step 920 computes and stores its priority value, based on length.

Following step 920, or step 918 if no COBOL compile is involved, step 922 links control cards. This is a requirement of the Burroughs hardware. If a COBOL compile is involved, step 923 inserts the proper priority values as determined in step 920.

Step 925 is a logic routine which changes the output record length from 150 to 10 words. A 10-word record length is a requirement of the Master Control Program.

Following step 925, step 926 determines whether a common card with a value ending in actual seven was used to execute the Schedule program. If so, the file is not sent for execution but is used for debugging purposes, and Zip step 928 is bypassed by step 930. Step 928 causes the output file to be executed if a no answer is reached by step 926.

At the end of either step 928 or step 930, the dummy file created by step 902 is closed and the Schedule program ended at ending terminal block 912.

3. The Kopy Statement

A Kopy statement causes RIMS to replace the record containing the statement with all or part of the file named in the statement. The replacement takes place only when the file containing the Kopy statement is scheduled for execution by means of the Schedule command. The records which replace the Kopy statement do not become a permanent part of the file containing the statement.

The format for the Kopy statement is: "KOPY prefix/suffix DOC (RC repchrs, RB, NR) ("from key" "thru key")—("-from key" "thru key")."

"Prefix/suffix" is the name if the file to be copied. If the "-prefix" portion of the file name is deleted, RIMS supplies the DICTNRY name (Dictionary).

"Doc" is included to cause documentation records to be copied. A documentation record has an 0 sign in column seven. If this parameter is omitted, documentation lines are not copied.

"RC repchrs" causes RIMS to scan each copied record for a set of three successive ampersands. The parameter "repchrs" must be three or less nonblank characters which will replace each set of ampersands found in the records of the file to be copied. If "repchrs" is less than three characters, leading blanks are provided by RIMS so that all three ampersands are always replaced. For COBOL formatted files, "repchrs" must begin with I, O, D or W and be followed by two numeric digits, or the parameter "RB" must be used instead. "RB" causes RIMS to scan each copied record for sets of three successive ampersands and replace them with blanks if found. Additionally, if the file is in COBOL format and the ampersands are followed by a hyphen, the hyphen will also be blanked.

"NR" causes RIMS not to replace ampersands. This is also the parameter supplied by RIMS if the other parameters are omitted in the Kopy statements.

"From key" is a field of one to 26 characters which RIMS scans for each record of the file to be copied. RIMS begins copying records starting from the first record it finds containing the "from key." If there are no characters between the quote marks enclosing this parameter, RIMS starts copying the file from the beginning.

"Thru key" is a field of one to 26 characters which RIMS scans for in each record following the record containing the "-from key." The last record copied is the record containing the "thru key." If there are no records specified between the quote marks enclosing this parameter, RIMS will continue copying records to the end of the named file.

The dash is a continuation character that allows additional "from key" and "thru key" parameters. The continuation character must appear in the next data record following the Kopy statements. More than one continuation record may be used. RIMS begins scanning at the beginning of the copied file for the first "from key" in each continuation record. The continuation character must be in column seven for COBOL formatted files and in column one for all other files.

"From key" and "thru key," following the dash, operate as above. They cause a group of records, starting with the record containing the "from key," through the record containing the "thru key," to be copied. The only limitations are the number of these parameters used in space in the record. However, the parameters must appear in the same order as the groups of records appear in the file. If this parameter is omitted, the entire file is copied.

4. Readvistafile Procedure

Readvistafile procedure flow charts are disclosed in FIGS. 24A, 24B, 25A, 25B and 26. The procedure functions both to assemble input RIMS-Indexed files into sequential files and to resolve Kopy statements found in the input files. This section will first detail the operation of the procedure in translating a RIMS Indexed file not containing a Kopy statement.

a. File Translation With No Kopy Statement

Referring to FIGS. 24A and 24B, beginning terminal block 935 represents the start of the Readvistafile procedure.

Step 936 adds one to the number of recursive calls of the procedure. Initially, the count is set at a minus one so that the first time through, the count will indicate the usual zeroth time. Because of hardware limitations, no more than six Kopy statement levels may be used.

Step 937 determines if the file to be copied is in the disc directory. The same test was made by the outer block (Step 907, FIG. 23) of the Schedule file. However, after the first test, the file may have been removed. If so, step 937 gives a NO answer and control is transferred to step 939 which causes an appropriate error message to be sent to the proper terminal. Thereafter, control is transferred via connectors 940 and 941 (FIG. 26) where ending terminal block 942 indicates the end of the Readvistafile procedure. Control there is transferred to step 907 of the outer block (FIG. 23) for the Schedule program to continue.

If step 937 found the input file in the disc directory, step 944 determines if the user is a valid user of the file. If not, control is transferred to step 939 for transmission of an appropriate error message to the remote terminal after which return is made as described above.

If step 944 determines that the user is a valid user of the file, step 946 checks whether the file to be copied is in use at that time. Except for certain files (Prefix, Dictionary, Utility and Routine files), no file may be brought in via a Kopy statement if it is in use. If the input file is in use, step 947 determines whether it is one of the excepted files. If not, control is again transferred to step 939 for transmission of the appropriate error message.

If it is determined by steps 946 and 947 that the input file is not in use or, if in use, that it is an excepted file, control is transferred to step 949 which causes the portion of the Level 2 index block following the tags (the second half) of the input file to be read into an array. RIMS-Indexed Step 950 then looks at the RIMS ID word in the partial Level 2 index array to determine if the file referenced by the Kopy statement is a RIMS-Indexed file. As previously explained, only RIMS-Indexed files may be copied via a Kopy statement. If it is not a RIMS-Indexed file, control is transferred to step 939 for transmission of the appropriate error message. Thereafter, return is made in the usual fashion.

If step 950 finds that the input file is a RIMS-Indexed file, step 951 reads the format word in the partial Level 2 array and sets a global article. This information is necessary for the proper positioning of the sequence numbers and associated data records in the sequential file being built.

Step 953 then reads the entire Level 2 index block into an array in core and step 954 reads the first (or next) Level 1 index block into a second array. Thereafter, control is transferred to step 955 via connectors 956 and 957.

Step 955 reads the data record pointed to by the first (or next) tag within the Level 1 tag array created by step 954.

Since this section describes formation of an output file without Kopy statements, steps 957 and 958 determine that neither the previous record was nor the present record is a Kopy statement. Control is transferred from step 958 via connectors 961 and 962 (FIG. 25A) to step 960 of that Figure.

Step 960 determines the type of record pointed to, i.e., whether ordinary data, a control card for the Master Control Program or an invalid record. If the record is ordinary data, control is transferred from step 961 to step 962 which decreases the output record count by one.

Step 964 causes the data record to be moved into an output buffer. Each data record is smaller than the buffer size. When successive data records (with their associated sequence numbers) fill the output buffer, step 966 controls the buffer contents to be read out to disc as the beginning of the sequential record.

Following step 966, control is transferred via connectors 967 and 968 (FIG. 26) to step 970 which determines whether all of the Level 1 tags in the block have been processed. If so, return to the outer block flow chart (FIGS. 64A and 64B) is made via step 971 and terminal block 948. If not, control is transferred via connectors 973 and 957 (FIG. 24B) to step 955 which reads the record at the next Level 1 tag. This procedure is repeated until all tags and associated data records in the first Level 1 block have been read.

After the last tag of each Level 1 index block is processed, step 970 (FIG. 26) transfers control to step 971 which determines if all Level 2 tags have been processed. Since there are as many Level 2 tags as Level 1 blocks, control will be transferred to step 954 (FIG. 24A) via connectors 975 and 976. Step 954 reads the next Level 1 index block into an array and the procedure repeats. This looping continues until all Level 1 index tags have been processed and step 971 gives a YES answer, ending the Readvistafile procedure at terminal block 942.

b. File Translation With Kopy Statement Included

If Readvistafile translates a RIMS Indexed file to a sequential file and encounters a Kopy statement, the procedure calls itself recursively.

Referring to FIG. 25A, step 960 determines the type of record pointed at by the Level 1 tag currently being processed. If the record is a Kopy statement, control is transferred via step 961 to step 980 which gives a NO answer—the record is not a control card. Control is transferred from step 980 via connectors 981 and 982 (FIG. 26) to step 983 which determines that the record is a Kopy statement.

If step 983 and the prior steps determine that the record is neither data, a control card nor a Kopy statement, then the record must be invalid. In this event, control is transferred from step 983 via connectors 985 and 986 (FIG. 24A) to step 939 which sends the appropriate error message. Thereafter, return to the outer block is made, as previously explained.

Referring again to FIG. 26, if the data record pointed to by the Level 1 tag presently looked at is a Kopy statement, step 983 gives a YES answer and transfers control to step 988.

A maximum of six serial Kopy statements may be used, due to hardware limitations. Step 988 determines if the maximum has been exceeded. If so, control is transferred via connectors 989 and 986 (FIG. 24A) to step 939 for transmission of the appropriate error message. Thereafter, return is made as previously explained.

Referring again to FIG. 26, if the maximum recursive Kopies have not been exceeded, step 988 gives a NO answer and calls the Readvistafile procedure, block 990. The procedure continues to call itself until no further Kopy statements are encountered or until a maximum number of recursive Kopies have been reached. Each time the procedure calls itself, the logic steps through the logical steps beginning with step 935 of FIG. 24A.

In order to understand the recursive calling of the Readvistafile procedure, it will be assumed that an original file, titled A/B, includes a Kopy statement as a data record requiring that a portion file C/D be copied. Step 983 (FIG. 26) will establish that the record looked at in file A/B contained a Kopy statement and will call the Readvistafile procedure of block 990. The procedure advances through the logical steps of FIGS. 24A and 24B until it reaches step 958 which gives a YES answer to the question: "Is a copy in progress?" Thereafter, control is transferred to step 993 which determines whether the Kopy statement included the documentation parameter. If the documentation parameter (DOC) was present, the documentation records will be copied. If documentation is not wanted, control is transferred to step 995 to determine whether the ampersand sign appeared in the record. If it does not appear, or if documentation is wanted, control is transferred to step 997.

Step 997 determines whether the procedure is looking for a "from key" or a "thru key." If the "from key" stated in the Kopy statement is the second record in file C/D, then the answer to step 997 on the first time through will be YES, the procedure is looking for either a "from key" or a "thru key." Step 998 will also give a YES answer since the procedure is looking for a "from key." Control then is transferred to step 999 which determines whether the "from key" was found in the record. Since the first data record is contained in the array and the "from key" is in the second, the answer to step 999 is NO, and control is transferred via connectors 1000 and 968 (FIG. 26) to step 970 which determines whether all Level 1 tags in the index block have been processed. Since only the first data record has been processed, the answer in step 970 is NO, and control is transferred via connectors 973 and 957 (FIG. 24B) to step 955 which reads the next adjacent record. In the example herein, the second record, now present in the array, contains the "from key."

Since a Kopy statement is in progress, control is transferred to step 997 via steps 958 and 993. Step 997 determines that the procedure is looking for the "thru key," gives a YES answer and transfers control to step 998. Step 998 determines that the "from key" is still being looked for and transfers control to step 999 that determines whether the key was found in the data record presently in the array. In the example herein, the "from key" is found in the second data record, and step 999 now gives a YES answer. Control is transferred to step 1001 which determines whether replacement character parameters were used in the Kopy statement. If so, step 1002 replaces the characters requested.

Following either step 1001 or step 1002, control is transferred via either connectors 1003 or 1004 to step 1005 (FIG. 25A) via connector 1006.

Step 1005 determines whether the "thru key" was found in the data record presently in the array. In the example herein, the second data record is still in the array, and the answer to step 1005 is NO. Control is transferred to step 960 via connectors 1007 and 962 to determine the type of record. If the record is ordinary data, steps 961 through 966 move the record into the output buffer from where it is eventually written on disc If the record in file C/D located by the "from key" is a second Kopy statement, step 961 will determine this fact. Thereafter, the Readvistafile procedure will be again called as previously explained when step 983 (FIG. 26) establishes that the record contained the Kopy statement.

Assuming that file C/D contains in its data records between the "from key" and the "thru key" ordinary data, the data is read into the output buffer and control transferred to step 970 of FIG. 26.

Step 970 determines whether all of the tags in the Level 1 block have been processed. If not, control is transferred to step 955 (FIG. 24B) which reads the data record pointed to by the next adjacent Level 1 tag.

When the third data record of file C/D is in the array, step 997 still gives a YES answer since the procedure is looking for the "thru key." Control is transferred to step 998 which determines that the procedure is no longer looking for the "from key" and transfers control to step 1001. The third data record is read into the output buffer after which the fourth data record is loaded into the array and the process repeated. The looping continues until step 1005 (FIG. 25A) determines that the "thru key" was found. When the data record is loaded into the array containing the "thru key," step 1005 gives a YES answer and transfers control to step 1010 which sets a switch and the procedure continues which loads the "from key" record into the output buffer. On the next time through the logic, step 997 gives a NO answer to the question: "Is the procedure looking for either a "from key" or "thru key?" Step 1012 determines whether there are unresolved keys left in the Kopy statement. If not, step 1013 determines whether the "thru key" was found in the previous record. If it was, control is transferred via connectors 1015 and 941 (FIG. 26) to end terminal block 942 of the Readvistafile. Since, in the example herein, the Readvistafile procedure has been called by itself, the end of this procedure is the entry to step 970 of the original Readvistafile procedure. Thereafter, the interrogation of the records in file A/B continues as previously explained.

The original Readvistafile procedure reads the following record in the first file A/B. Step 957 gives a YES answer to the question: "Was the previous record a Kopy statement?" and transfers control to step 1020. The purpose of step 1020 is to determine whether there is a continuation character in the data record of file A/B following the first Kopy statement. If so, a continuation of the Kopy statement is to be made. Step 1021 determines whether there are valid keys in the continuation record. If not, control is transferred via connectors 1022 and 986 to step 939 which writes the appropriate error message to the terminal. If there are valid keys in the continuation record, control is transferred to connectors 1025 and 1026 (FIG. 26) to Readvistafile procedure block 990 which again calls the procedure. The sequence is then repeated as described above.

c. File Containing a Control Card

If the record read by the Readvistafile procedure contains a control card, step 980 (FIG. 25A) gives a YES answer. The remainder of FIG. 25A is involved with the procedure for passing a control card to the Master Control Program. Also, the proper priorities, and so forth, are set up. Since the control card procedure is readily apparent from a review of the flow chart of FIG. 25A, the details will not be stated here.

5. Schedule Program Listing

As will all programs herein, the Schedule program is written in ALGOL and may be readily compiled by any compiler which will accept that language. The Schedule program is as follows.

UTILITY RIMS/SCHEDULE

SCHEDULE CONVERTS A RIMS-INDEXED DATA FILE WHICH BEGINS AND ENDS WITH CONTROL CARDS, INTO A SEQUENTIAL FILE AND THEN ZIPS THE FILE. SCHEDULE SCANS THE DATA RECORDS FOR CONTROL CARDS AND KOPY STATEMENTS. WHEN A CONTROL CARD IS FOUND, A BINARY POINTER IS CONSTRUCTED AND INSERTED INTO WORD 10 OF THE RECORD. WHEN A KOPY STATEMENT IS FOUND, SCHEDULE INSERTS RECORDS FROM THE COPIED FILE INTO THE ORIGINAL FILE. IF A KOPY STATEMENT IS FOUND IN THE COPIED FILE. THAT KOPY STATEMENT AND ANY CONTROL CARDS ARE ALSO RESOLVED. A DEFINE ALLOWS A MAXIMUM OF 6 FILES TO BE RECURSIVELY REFERENCED AT ONE TIME AS A RESULT OF NESTED KOPY STATEMENTS.

```
USES: RIMS-INDEXED DATA FILE
CHANGES: NOTHING. CREATES A SEQUENTIAL FILE
CALLS: ZIPS THE SEQUENTIAL FILE
ERRORS: FILE NOT IN DIRECTORY
        INVALID USER
        FILE IN USE
        NOT A RIMS FILE
        INVALID COPY STATEMENT
        FIRST CARD NOT A CC CARD

BEGIN

INTEGER COMON, SEQNO, I, J, K, L,
        CCOUNT,CBLCOUNT,VERSION,ERRFLE,
        PRCSS,CBLREC1,BUFREC,
        NBROFCOPIES, START, STOP,
        RECCOUNT;
REAL D;    % D AS IN DUMMY
ALPHA MPREFX, MSUFFX, NPREFX, NSUFFX,
      USER,REPCHRS, CPREFX, CSUFFX;
BOOLEAN PREVERRORS, BADKEY, NOTRMS,
        BOOL, CMPL, CCINWKARRY,
        PREVCMEX, PREVCBL, CORESW,
        NEWFLE,NODIR, INVUSR, INUSE;
INTEGER ARRAY CCARRY[0:9,0:9],        % FOR SAVING CONTROL CARDS
        CBLCC, CBLPRTY [0:4];
ARRAY SRCHARRY[0:6],          % FOR SEARCHING FILES
      WKARRY[0:9];     % WORK ARRAY
LABEL ERR, MORECBL, FINAL;
DEFINE  COMPDAY = 62169 #,
        % ALSO CHANGE PROJECT OR ACCOUNT IN 12000
        SYS = 2 #,            % 1 FOR 1, 2 FOR 2
        SYSTEM = TWO #,     % ONE FOR 1, TWO FOR 2
        SYSTEM2 = INVSYS2USER #,  % 1=FALSE, 2=INVSYS2USER
        HEADERBLK = 2 #,
        HDRARRY = L1ARRY #,
        VISTAII = 15 #,            % 15 + 2(30)
        FORMTWO = 16 #,
        L2COUNT = 17 #,
        TAGCOUNT = 40:8 #,
        RELREC = 34:14 #,
        SEQNBR = 11:23 #,
        MAXCOPIES = 6 #,
        FORCMPLE = BOOL #,
        ONEBLK = BOOL #,
        COBL = BOOL #,
        CNTRLCD = 1 #,
        COPYIT  = 2 #,
```

```
        INVALID = 3 #,
        RECD = 4 #,
        QUEST = "?" #,
        GM = "←" #,
        GM3 = "←←←" #,
        NO = NOT #,
        COBOL ="1"#,
        ALGOL ="2"#,
        FORTRAN ="3"#,
        DATA = "4" #,
        GP300 = "5" #,
        BASIC = "6" #;
SAVE FILE INPUT  DISK RANDOM (1,30),
          INPUT1 DISK RANDOM (1,30),
          INPUT2 DISK RANDOM (1,30),
          INPUT3 DISK RANDOM (1,30),
          INPUT4 DISK RANDOM (1,30),
          INPUT5 DISK RANDOM (1,30),
          INPUT6 DISK RANDOM (1,30);
FILE SPO 11 (1,10);
FILE IN SCHED (1,10);
SAVE FILE OUT OUTPUT DISK [20:30] "RIMS" "ZIPFILE" (3,150,SAVE 99);
SAVE FILE LINE DISK SERIAL [20:60] "UNKNOWN" "USER    " (2,10,30,SAVE 9);
FILE ERRORS DISK SERIAL "SCHEDUL" "ERRORS" (2,10,30);


SWITCH FILE SWFLE:=INPUT, INPUT1, INPUT2, INPUT3,INPUT4,INPUT5, INPUT6;
SWITCH FILE SWERRS:=LINE, ERRORS;

SWITCH FORMAT SWFMT :=

        (X10,"ERRORS FOUND PROCESSING RIMS SCHEDULE ",
            "COMMAND, DAY: ",A5),                                          % 00
        (X19,"FILE SCHEDULED: ",A1,A6,"/",A1,A6),                          % 01
        ("THE FILE ",A1,A6,"/",A1,A6," IS NOT IN THE ",
            "DIRECTORY, "),                                                % 02
        ("INVALID USER OF THE FILE ",A1,A6,"/",A1,A6),                % 03
        ("THE FILE ",A1,A6,"/",A1,A6," IS IN USE ",
            "AT THIS TIME. "),                                             % 04
        ("THE FILE ",A1,A6,"/",A1,A6," IS NOT A RIMS FILE."),         % 05
        ("*",I6),        % I6 IS FOR SEQNO                            % 06
        (X10,"*** END OF SCHEDULE ERROR MESSAGES ***"),                    % 07
        ("THE FIRST OUTPUT RECORD IS NOT ",
            "A CONTROL CARD. SCHEDULE CANCELLED.",A1),                     % 08
        ("INVALID REPLACEMENT CHARACTERS FOR COBOL. ",A1),            % 09
        ("INVALID KEY FIELD. ",A1),                                   % 10
        ("EXCESSIVE NUMBER OF RECURSIVE COPIES. LAST FILE: ",
            A1,A6,"/",A1,A6,"."),                                          % 11
        ("THE FILE ",A1,A6,"/",A1,A6," CONTAINS AN INVALID ",
            "STATEMENT: "),                                                % 12
        ("FINAL OUTPUT RECORD IS NOT A CONTOL CARD. ",
            "SCHEDULE CANCELLED.",A1),                                     % 13
        ("NO VALID OUTPUT RECORDS WERE FOUND.",A1),                   % 14
        ("CONTROL CARD DOES NOT CONTAIN A VALID ACCOUNT ",
            "NUMBER.",A1),                                                 % 15
        (/,"** ",A1,A6," IS AN INVALID USER OF ",A1,A6,
          "/ERRORS. PLEASE FREE IT.",/),                                   % 16
        (X80);                                                             % 17


    % FOLLOWING LIST IS FOR THE NAME OF THE CURRENT FILE
LIST CURNTFLE (CPREFX.[6:6],CPREFX,CSUFFX.[6:6],CSUFFX);
    % FOLLOWING LIST IS FOR NAMES REFERENCED IN A KOPY STATEMENT
LIST NEXTFLE (NPREFX.[6:6],NPREFX,NSUFFX.[6:6],NSUFFX);
    % FOLLOWING LIST IS FOR PRINTING NAME OF THE MAIN FILE
```

```
LIST MAINFLE (MPREFX.[6:6],MPREFX,MSUFFX.[6:6],MSUFFX);
LIST DUMMY (D);
SWITCH LIST SWLST:=CURNTFLE, MAINFLE, DUMMY, NEXTFLE;


BOOLEAN STREAM PROCEDURE ATSIGN (RECORD);

    % THIS PROCEDURE IS TRUE IF THERE IS AN @ IN COL 7 FOR COBOL
    % FORMAT OR IN COL 1 FOR OTHER FORMATS

    BEGIN
      SI:=RECORD;
      IF SC="@"
        THEN TALLY:=1
        ELSE TALLY:=0;
      ATSIGN:=TALLY;
    END OF NOATSIGN;


STREAM PROCEDURE BLANKIT (RECD,NBRRECDS);

    VALUE NBRRECDS;
    BEGIN
      DI:=RECD;   NBRRECDS (DS:=40 LIT " ";   DS:=40 LIT " ");
    END OF BLANKIT;


STREAM PROCEDURE CHANGRECL (TOPIOD,RECCOUNT);

    VALUE RECCOUNT;
    BEGIN
      LOCAL ADDR;
      SI:=TOPIOD;   SI:=SI-24;   % PT AT FIB ADDRESS
      DI:=LOC ADDR;   DS:=1 WDS;
      DI:=DI-3;   DS:=3 RESET;   % BACK UP 18 BITS & ZERO 3
      SI:=ADDR;   % NEXT ADVANCE 14 WDS
      SI:=SI+56;   SI:=SI+56;
      DI:=LOC ADDR;   DS:=1 WDS;
      DI:=DI-3;   DS:=3 RESET;
      DI:=ADDR;   % NOW PTING AT FLE HDR, NEXT SET REC LENGTH
      DS:=11 RESET;
      DS:=1 SET;   DS:=1RESET;   DS:=1 SET;   DS:=1 RESET;
           % NEXT SET RECORDS/BLOCK TO 15
      SKIP 15 DB;   DS:=8 RESET;   DS:=4 SET;
      DS:=0 WDS;     % NOW PTING AT WD 1
      DI:=DI+48;     % NOW PTING AT WD 7
      SI:=LOC RECCOUNT;   DS:=1 WDS;
    END OF CHANGRECL;


INTEGER STREAM PROCEDURE CCSCAN (RECORD,ADDR,STOP,PRCSS,BOOL);

    COMMENT THIS PROCEDURE DETERMINES THE TYPE OF CONTROL CARD;
    VALUE ADDR;
    BEGIN
      LOCAL SISAVE, DISAVE;
      LABEL LP1, LP2, LP3, PROSS, EXIT;
      DI:=RECORD;    DI:=DI+36;   DI:=DI+36;   DS:=1 LIT GM;
      SI:=ADDR; SI:=SI+1;
      TALLY:=6;            % DEFAULT FOR GARBAGE
LP1:  IF SC=" " THEN BEGIN SI:=SI+1; GO TO LP1; END
                ELSE IF SC=";" THEN GO TO EXIT
                                 ELSE IF SC=GM THEN GO TO EXIT;
      SISAVE:=SI;   TALLY:=5;       % DEFAULT FOR OTHER CC
      DI:=BOOL;   DS:=8 LIT "00000000";
```

```
IF SC="C"
  THEN
    BEGIN
       SI:=SI+3;
       IF SC="P"            % COMPILE
         THEN
           BEGIN
             TALLY:=0;   SI:=SI+8;   DI:=LOC DISAVE;
             DS:=7 LIT " COBOL ";
             63(DI:=DI-7;
                IF SC=";"
                  THEN JUMP OUT TO EXIT
                  ELSE IF SC=GM
                         THEN JUMP OUT TO EXIT
                         ELSE IF 7 SC=DC
                                THEN
                                  BEGIN
                                    DI:=BOOL;
                                    DS:=8 LIT "00000001";
                                    JUMP OUT TO EXIT;
                                  END
                                ELSE SI:=SI-6 );
           END
         ELSE IF SC="O"             % COBOL
                THEN
                  BEGIN
                    SI:=SI+2;
      LP2:          IF SC NEQ " " THEN GO TO EXIT;
                    63(SI:=SI+1;
                       IF SC=ALPHA
                         THEN JUMP OUT
                         ELSE IF SC=";"
                                THEN JUMP OUT TO EXIT
                                ELSE IF SC=GM THEN
                                       JUMP OUT TO EXIT );
                    DI:=BOOL;   DS:=8 LIT "00000001";
                    GO TO LP3;
                  END
                ELSE IF SC="E" THEN TALLY:=3;     % CORE
    END
  ELSE IF SC="E"          % EXECUTE
         THEN
           BEGIN
             SI:=SI+1;
             IF SC="X" THEN TALLY:=1;
           END
         ELSE IF SC="D"        % DUMP
                THEN
                  BEGIN
                    SI:=SI+1;
                    IF SC="U" THEN TALLY:=1;
                  END
                ELSE IF SC="A"      % ALGOL
                       THEN BEGIN SI:=SI+5; GO TO LP2; END
                       ELSE IF SC="F"      % FORTRAN
                              THEN
                                BEGIN
                                  SI:=SI+3;
                                  IF SC="T" THEN
                                             BEGIN
                                               SI:=SI+4;
                                               GO TO LP2;
                                             END;
                                END
                              ELSE
```

```
                LP3:                    IF SC="P"
                                          THEN
                                            BEGIN
                                              SI:=SI+3;
                                              IF SC="O"  % PRIORITY
                                                THEN TALLY:=2
                                                ELSE IF SC="C" THEN
                                                       GO TO PROSS;
                                            END
                                          ELSE IF SC="C" THEN  % CORE
                                                   TALLY:=3;
      GO TO EXIT;
PROSS:  SI:=SI+5;   % POINT NEAR THE NUMBERS
      63(IF SC GTR "Z" THEN JUMP OUT
                  ELSE IF SC=";"
                         THEN JUMP OUT TO EXIT
                         ELSE IF SC=GM THEN JUMP OUT TO EXIT
                                ELSE SI:=SI+1 ));
      TALLY:=0;
      63(IF SC GTR "Z" THEN BEGIN TALLY:=TALLY+1; SI:=SI+1 END
                  ELSE JUMP OUT ));
      DISAVE:=TALLY;   SI:=SI-DISAVE;
      DI:=PRCSS;   DS:=DISAVE OCT;
      TALLY:=4;
EXIT: IF SC=";"
        THEN
          BEGIN
            SISAVE:=SI;   SI:=LOC SISAVE;
            DI:=STOP;   DS:=1 WDS;
          END
        ELSE IF SC NEQ GM THEN BEGIN SI:=SI+1; GO TO EXIT; END;
      CCSCAN:=TALLY;
    END OF CCSCAN;


STREAM PROCEDURE DOCTORIT (REPCHRS,FRMAT,RECORD);

    COMMENT THIS PROCEDURE INSERTS THE REPLACEMENT CHARACTERS FROM THE
      COPY STATEMENT INTO THE COPIED RECORD. ALSO IF THE FORMAT IS
      COBOL AND IF THE REPLACEMENT CHARACTERS ARE 3 BLANKS, THE HYPHEN
      FOLLOWING THE 3 AMPERSANDS IS BLANKED;
    BEGIN
      LABEL LAST;
      LOCAL BLANKS, AMPSNDS, TEMP;
      DI:=LOC BLANKS;   DS:=4 LIT "   -";
      DI:=LOC AMPSNDS;  DS:=3 LIT "&&&";  DI:=DI-3;
      SI:=RECORD;   % BEGIN SCAN
      2(40(IF SC="&"
             THEN
               IF 3 SC=DC
                 THEN
                   BEGIN
                     SI:=SI-3;   TEMP:=SI;
                     SI:=REPCHRS;   SI:=SI+5;
                     DI:=TEMP;
                     DS:=3 CHR;    % INSERT REPLACEMENT CHARACTERS
                     DI:=DI-3;
                     SI:=FRMAT;    SI:=SI+7;   % CHECK IF ITS COBOL
                     IF SC=COBOL THEN
                       BEGIN
                         SI:=LOC BLANKS;
                         IF 4 SC=DC THEN
                           BEGIN
                             DI:=DI-1;  DS:=1 LIT " ";
                           END;
```

```
                    END;
                  SI:=TEMP;    SI:=SI+3;    DI:=LOC AMPSNDS;
                END
              ELSE SI:=SI-2
          ELSE IF SC=GM THEN JUMP OUT 2 TO LAST
                         ELSE SI:=SI+1  )));
LAST:
    END OF DOCTORIT;


STREAM PROCEDURE FILLBUFF (OUTPUT,INPUT,FORMT,SEQNO));

    % THIS PROCEDURE MOVES 9 WDS + 2 CHRS FROM INPUT TO OUTPUT AND
    % INSERTS THE 6 CHR SEQNO IN THE PROPER POSITION ACCORDING TO THE
    % FORMAT
    VALUE FORMT, SEQNO;
    BEGIN
      LABEL ALGL;
      LOCAL BLNKSQ;
      SI:=LOC SEQNO;   DI:=LOC BLNKSQ;
      DS:=8 DEC;   DI:=DI-8;   DS:=7 FILL;   DI:=OUTPUT;
      SI:=LOC FORMT;   SI:=SI+7;
      IF SC=COBOL
        THEN
          BEGIN
            SI:=LOC BLNKSQ;   SI:=SI+2;
            DS:=6 CHR;
            SI:=INPUT;
            DS:=37 CHR;   DS:=37 CHR;
          END
        ELSE
          IF SC=ALGOL THEN GO TO ALGL ELSE
            IF SC=BASIC THEN GO TO ALGL ELSE
              IF SC=FORTRAN
                THEN
                  BEGIN
       ALGL:        SI:=INPUT;
                    DS:=9 WDS;
                    SI:=LOC BLNKSQ;   DS:=1 WDS;
                  END
                ELSE
                  IF SC=DATA
                    THEN BEGIN SI:=INPUT;  DS:=10 WDS; END
                    ELSE
                      IF SC=GP300 THEN
                        BEGIN
                          SI:=INPUT;
                        - IF SC="$"
                            THEN DS:=10 WDS
                            ELSE
                              BEGIN
                                DI:=DI+15;   DS:=62 CHR;
                                DI:=DI-60;   DI:=DI-7;
                                DS:=7 LIT "       ";
                                SI:=LOC BLNKSQ;   DS:=8 CHR;
                              END;
                        END;
    END OF FILLBUFF;


BOOLEAN STREAM PROCEDURE FOUNDKEY  (KEY,LASTCOL,RECORD));

    COMMENT THIS PROCEDURE IS TRUE IF THE KEY IS FOUND BETWEEN COL 1
      AND LASTCOL. THE LENGTH OF KEY IS THE FIRST WORD IN KEY. LASTCOL
      IS 73 - KEY[0] AND IT IS THE LAST COLUMN SCANNED FOR THE KEY;
```

```
  VALUE LASTCOL;
 BEGIN
     % THE 7TH CHR IN LASTCOL IS LASTCOL DIV 64.
     % THE 8TH CHR IS LASTCOL MOD 64.
   LOCAL LNGTH,LASTCOLDIV64;
   LABEL EXIT;
   SI:=KEY;   DI:=LOC LNGTH;   DS:=1 WDS;   % MAX LENGTH IS 26 CHRS.
   SI:=LOC LASTCOL;   SI:=SI+6;
   DI:=LOC LASTCOLDIV64;   DI:=DI+7;   DS:=1 CHR;
   SI:=RECORD;
   DI:=KEY;  DI:=DI+8;  % POINT AT 2ND WORD
   TALLY:=0;
   LASTCOLDIV64(2(32(IF LNGTH SC=DC THEN
                                    BEGIN
                                      TALLY:=1;
                                      JUMP OUT 3 TO EXIT;
                                    END
                                  ELSE
                                    BEGIN
                                      SI:=SI-LNGTH;
                                      SI:=SI+1;
                                      DI:=DI-LNGTH;
                                    END ))));
   LASTCOL(IF LNGTH SC=DC THEN
                          BEGIN
                            TALLY:=1;
                            JUMP OUT TO EXIT;
                          END
                        ELSE
                          BEGIN
                            SI:=SI-LNGTH;
                            SI:=SI+1;
                            DI:=DI-LNGTH;
                          END );
   EXIT:  FOUNDKEY:=TALLY;
 END OF FOUNDKEY;


BOOLEAN STREAM PROCEDURE HYPHENINCOL1 (RECORD,RESTART);

   COMMENT THIS PROCEDURE IS CALLED AFTER COPY STATEMENTS TO CHECK
     FOR A CONTINUATION OF THE COPY STATEMENT. A CONTINUATION IS
     INDICATED BY A HYPHEN IN VISTA COL 1 IN THE RECORD IMMEDIATELY
     FOLLOWING THE COPY STATEMENT;
   BEGIN
     LABEL TALLY1, ERR;
     LOCAL HOLDER;
     SI:=RECORD;
     IF SC="-"
       THEN      % ELSE TALLY REMAINS ZERO.
         BEGIN
           DI:=RECORD;  DI:=DI+36;  DI:=DI+36;  DS:=1 LIT GM;
           SI:=SI+1;    DI:=RESTART;
           2(34(IF SC=" " THEN SI:=SI+1
                       ELSE IF SC="""
                              THEN
                                BEGIN
                                  HOLDER:=SI;
                                  SI:=LOC HOLDER;
                                  DS:=1 WDS;
                                  JUMP OUT 2 TO TALLY1;
                                END
                              ELSE JUMP OUT 2 TO ERR  ));
  ERR:      DS:=8 LIT "00000000";
  TALLY1:   TALLY:=1;
```

```
        END
      ELSE TALLY:=0;
    HYPHENINCOL1:=TALLY;
  END OF HYPHENINCOL1;


BOOLEAN PROCEDURE INVSYS2USER;

  INVSYS2USER:=
    IF USER.[6:12] NEQ WKARRY[0].[12:12] THEN TRUE ELSE FALSE;


STREAM PROCEDURE MOVECC (FROM,OUTPUT);

  % THIS PROCEDURE MOVES A CONTROL CARD INTO THE OUTPUT BUFFER;
  VALUE FROM;
  BEGIN
    LABEL LOOP;
    DI:=OUTPUT;   DS:=3 LIT "CC ";
    SI:=FROM;   SI:=SI+1;
LOOP: IF SC=";" THEN DS:=1 LIT ","
                ELSE IF SC=GM THEN DS:=1 LIT ","
                               ELSE
                                 BEGIN
                                   DS:=1 CHR;
                                   GO TO LOOP;
                                 END;
  END OF MOVECC;


STREAM PROCEDURE MOVECHRS (SKPFM,FROM,SKPTO,TOO,NBR);

  VALUE SKPFM,SKPTO,NBR;
  BEGIN
    SI:=FROM;     SI:=SI+SKPFM;
    DI:=TOO;     DI:=DI+SKPTO;
    DS:=NBR CHR;
  END OF MOVECHRS;


STREAM PROCEDURE MOVEWDS (NBR,FROM,TOO);

  VALUE NBR;
  BEGIN
    SI:=FROM;
    DI:=TOO;
    DS:=NBR WDS;
  END OF MOVEWDS;


BOOLEAN STREAM PROCEDURE NOACCTNBR (CCADDR,ACNTARRY);

  COMMENT THIS PROCEDURE IS TRUE IF THERE IS NOT A VALID 8 CHR
  ACCOUNT NUMBER BETWEEN COLS 15-72. IT ALSO INSERTS A USER
  CODE INTO COLS 65-72;
  VALUE CCADDR;
  BEGIN
    LOCAL SVPTR,SVTALLY;
    LABEL LOOP,TALY,ONE,TWO,CNTN,BAD,FINALE;
    SI:=CCADDR;   SI:=SI+12;  % POINT AT LEAST AT COL 15
    51 (IF SC=","
        THEN
          BEGIN
            SVPTR:=SI;
  LOOP:       SI:=SI+1;
```

```
IF SC=GM
  THEN JUMP OUT
  ELSE IF SC=" "
          THEN GO TO LOOP
          ELSE
            BEGIN
              GO TO SYSTEM;
  ONE:        IF SC NEQ "P" THEN JUMP OUT
                                  ELSE SI:=SI+1;
              GO TO TALY;
  TWO:        2 (IF SC GTR "Z"
                        THEN JUMP OUT 2 TO BAD
                        ELSE IF SC LSS "A"
                                THEN JUMP OUT 2 TO BAD
                                ELSE SI:=SI+1);
  TALY:       TALLY:=0;
              4 (IF SC GEQ "0"
                    THEN
                      BEGIN
                        SI:=SI+1;   TALLY:=TALLY+1;
                      END
                    ELSE JUMP OUT );
              IF SC NEQ " " THEN JUMP OUT TO BAD;
              SVTALLY:=TALLY; SI:=SI-SVTALLY; SI:=SI-SYS;
              DI:=ACNTARRY;   DS:=3 LIT "0  ";
              DI:=DI-SYS;   DS:=1 LIT ",";
              DS:=SYS CHR;   DI:=DI+4;
              DI:=DI-SVTALLY;   DS:=SVTALLY CHR;
              JUMP OUT TO CNTN;
            END;
      END
    ELSE IF SC=GM THEN JUMP OUT
                  ELSE SI:=SI+1   );
BAD:  TALLY:=1;   GO TO FINALE;
CNTN:   SI:=SVPTR;   TALLY:=0;
     63 (IF SC=GM
           THEN JUMP OUT
           ELSE BEGIN TALLY:=TALLY+1; SI:=SI+1; END );
     SVTALLY:=TALLY;   DI:=SVPTR;   SVTALLY (DS:=1 LIT " ");
     SI:=ACNTARRY;  SI:=SI+1;  DI:=DI-15;
     DS:=7 CHR;  DS:=1 LIT " ";
     SI:=SI+1;  DS:=7 CHR;  TALLY:=0;
FINALE:   NOACCTNBR:=TALLY;
    END OF NOACCTNBR;


BOOLEAN STREAM PROCEDURE NOTRIMSINDEXED (L2WORD);

    COMMENT THIS PROCEDURE IS TRUE IF THE FILE IS NOT A
      RIMS-INDEXED FILE;
    BEGIN
      LOCAL LITERAL;
      DI:=LOC LITERAL;     DS:=8 LIT "OVISTAII";
      SI:=L2WORD;     DI:=LOC LITERAL;
      IF 8 SC=DC
        THEN TALLY:=0
        ELSE TALLY:=1;
      NOTRIMSINDEXED:=TALLY;
    END OF NOTRIMSINDEXED;


INTEGER STREAM PROCEDURE SCAN (RECORD,PRE,SUFX,DOC,REPCHR,RESTART);

    BEGIN
      LABEL NAME,SFX,SETADDR,
```

```
          SLASH,BLNK1,BLNK2,DOCMNT,
          CHRS,REPLACE,ERR,EXIT;
     LOCAL TEMP,ADDRSS;
     SI:=RECORD;
     DI:=LOC TEMP;  DS:=3 LIT "CC ";  DI:=DI-3;
     IF 3 SC=DC THEN
       BEGIN              %  IT IS A CONTROL CARD
         SI:=SI-1;
         TALLY:=CNTRLCD;
         GO TO SETADDR;
       END;
     SI:=SI-3;
     5(IF SC=" " THEN SI:=SI+1 ELSE JUMP OUT);
     IF SC=QUEST THEN
       BEGIN
         TALLY:=CNTRLCD;
         GO TO SETADDR;
       END;
     DI:=LOC TEMP;  DS:=5 LIT "KOPY ";  DI:=DI-5;
     IF 5 SC=DC
       THEN
         BEGIN    % IT IS A COPY.
           DI:=RESTART;   DS:=8 LIT "00000000";
           DI:=REPCHR;    DS:=5 LIT "00000";    DS:=3 LIT GM3;
           DI:=RECORD;    DI:=DI+60;   DI:=DI+12;   DS:=1 LIT GM;
                  % NEXT SCAN FOR PREFIX/SUFFIX (SKIP OVER BLANKS).
           63(IF SC=" " THEN SI:=SI+1
                        ELSE JUMP OUT TO NAME);
           GO TO ERR;
NAME:      DI:=PRE;   DS:=8 LIT"0        ";   DI:=DI-7;
           IF SC=""" THEN
             BEGIN
               SI:=SI+1;
               7(IF SC=""" THEN BEGIN SI:=SI+1; JUMP OUT TO SLASH; END
                           ELSE IF SC=GM THEN JUMP OUT TO ERR
                                         ELSE DS:=1 CHR);
               63(IF SC=""" THEN BEGIN SI:=SI+1; JUMP OUT TO SLASH; END
                            ELSE IF SC=GM THEN JUMP OUT TO ERR
                                          ELSE SI:=SI+1);
             END;
           IF SC=ALPHA THEN ELSE GO TO ERR;
           7(IF SC=ALPHA THEN DS:=1 CHR
                         ELSE JUMP OUT TO SLASH);
           63(IF SC=ALPHA THEN SI:=SI+1 ELSE JUMP OUT.TO SLASH);
SLASH:     63(IF SC=" " THEN SI:=SI+1
                        ELSE IF SC="/" THEN JUMP OUT TO SFX
                                       ELSE JUMP OUT);
           % NO SUFFIX SO MAKE PREFIX DICTNRY
           TEMP:=SI;   SI:=PRE;   DI:=SUFX;   DS:=1 WDS;
           DI:=PRE;   DS:=8 LIT "ODICTNRY";   SI:=TEMP;
           GO TO BLNK2;
SFX:       DI:=SUFX;   DS:=8 LIT "0        ";   DI:=DI-7;   SI:=SI+1;
           63(IF SC=" " THEN SI:=SI+1 ELSE JUMP OUT);
           IF SC=""" THEN
             BEGIN
               SI:=SI+1;
               7(IF SC=""" THEN BEGIN SI:=SI+1; JUMP OUT TO BLNK2; END
                           ELSE IF SC=GM THEN JUMP OUT TO ERR
                                         ELSE DS:=1 CHR);
               63(IF SC=""" THEN BEGIN SI:=SI+1; JUMP OUT TO BLNK2; END
                            ELSE IF SC=GM THEN JUMP OUT TO ERR
                                          ELSE SI:=SI+1);
             END;
           IF SC=ALPHA THEN ELSE GO TO ERR;
           7(IF SC=ALPHA THEN DS:=1 CHR
```

```
                      ELSE JUMP OUT TO BLNK1));
          63(IF SC=ALPHA THEN SI:=SI+1 ELSE JUMP OUT TO BLNK1);
BLNK1:    IF SC NEQ " " THEN GO TO ERR;
BLNK2:    TALLY:=COPYIT;
            % NEXT MAKE 2 SCANS FOR DOC & REPCHRS
          2(63(IF SC=" " THEN SI:=SI+1
                      ELSE IF SC="""
                              THEN JUMP OUT 2 TO SETADDR
                              ELSE IF SC=GM
                                      THEN JUMP OUT
                                      ELSE JUMP OUT TO DOCMNT));
            JUMP OUT TO EXIT;
  DOCMNT:   DI:=LOC TEMP;  DS:=4 LIT "DOC ";  DI:=DI-4;
            IF 4 SC=DC
              THEN BEGIN DI:=DOC;  DS:=8 LIT "00000001"; END
              ELSE
                BEGIN
                  SI:=SI-4;
                  IF SC="R"
                    THEN
                      BEGIN
                        SI:=SI+1;
                        IF SC="C"
                          THEN
                            BEGIN
                              SI:=SI+1;
                              63(IF SC=" "
                                   THEN SI:=SI+1
                                   ELSE IF SC=GM
                                          THEN JUMP OUT
                                          ELSE JUMP OUT TO CHRS));
                              JUMP OUT TO ERR;
                    CHRS:     TALLY:=1;    SI:=SI+1;
                              3(IF SC=" "
                                  THEN JUMP OUT TO REPLACE
                                  ELSE
                                    IF SC=GM
                                      THEN JUMP OUT TO REPLACE
                                      ELSE
                                        BEGIN
                                          TALLY:=TALLY+1;
                                          SI:=SI+1;
                                        END );
                              JUMP OUT TO ERR;
                 REPLACE:   TEMP:=TALLY;    SI:=SI-TEMP;
                            DI:=REPCHR;     DS:=8 LIT "00000   ";
                            DI:=DI-TEMP;    DS:=TEMP CHR;
                            TALLY:=COPYIT;
                            END
                          ELSE
                            BEGIN
                              DI:=LOC TEMP;  DS:=2 LIT "R ";
                              DI:=DI-2;
                              IF 2 SC=DC
                                THEN
                                  BEGIN
                                    DI:=REPCHR;
                                    DS:=8 LIT "00000   ";
                                  END
                                ELSE JUMP OUT TO ERR;
                            END;
                      END
                    ELSE
                      BEGIN
                        DI:=LOC TEMP;  DS:=3 LIT "NR ";  DI:=DI-3;
```

```
                     IF 3 SC=DC
                       THEN  % NOTHING. DEFAULT IS NR.
                       ELSE JUMP OUT TO ERR;
                   END;
               END ));      % END OF 2 PASSES FOR DOC & REP CHRS
            SI:=SI+1;
            63(IF SC=" " THEN SI:=SI+1
                         ELSE IF SC=GM
                                THEN JUMP OUT TO EXIT
                                ELSE IF SC=""" THEN JUMP OUT
                                               ELSE JUMP OUT TO ERR);
  SETADDR:  ADDRSS:=SI;  SI:=LOC ADDRSS;
            DI:=RESTART;  DS:=1 WDS;
            GO TO EXIT;
          END
        ELSE
          BEGIN
            TALLY:=RECD;
            GO TO EXIT;
          END;
 ERR:  TALLY:=INVALID;
 EXIT: SCAN:=TALLY;
     END OF SCAN;


 PROCEDURE SETCBLPRTY;

     BEGIN
       CBLPRTY[CBLCOUNT]:=
         IF I:=RECCOUNT-CBLREC1 LSS 1500
           THEN 5
           ELSE IF J:=I DIV 500 + 3 LSS 9
                  THEN J
                  ELSE "1000";
     END OF SETCBLPRTY;


 PROCEDURE SETPNTRS (HIGH,LOW);

     COMMENT THIS PROCEDURE INSERTS BINARY POINTERS IN CONTROL CARDS. IT
       ALSO PROVIDES A WAY TO STOP ON A COBOL PRIORITY CARD SO IT CAN BE
       CHANGED;
     VALUE HIGH,LOW;
     INTEGER HIGH,LOW;
     BEGIN
       INTEGER CRNTBLK,NXTBLK,CRNTPTR,NXTREC;

       CRNTBLK:=(CRNTPTR:=CCARRY[HIGH DIV 10, HIGH MOD 10]) DIV 15;
         FOR J:=HIGH - 1 STEP -1 UNTIL LOW DO
         BEGIN
           IF NXTBLK:=(NXTREC:=CCARRY[J DIV 10, J MOD 10]) DIV 15
             NEQ CRNTBLK THEN
               BEGIN
                 WRITE (OUTPUT[CRNTBLK]);
                 READ (OUTPUT[CRNTBLK:=NXTBLK]);
               END;
           K:=NXTREC MOD 15 × 10 + 9;
           MOVEWDS (1,CRNTPTR,OUTPUT(K));
           CRNTPTR:=NXTREC;
         END;
     END OF INSRTPNTRS;


BOOLEAN STREAM PROCEDURE VALIDKEYS (RESTART,KEY1,KEY2);
```

```
COMMENT THIS PROCEDURE IS TRUE IF A VALID KEY FIELD IS FOUND. IT
  STARTS SCANNING AT RESTART AND SCANS UNTIL IT FINDS ANOTHER KEY
  FIELD OR A GM. IF IT FINDS A 2ND KEY FIELD, RESTART IS SET TO THE
  ADDRESS OF THE FIELD, OTHERWISE RESTART IS SET TO ZERO. THE FIRST
  WORD OF KEY1 AND KEY2 CONTAIN THE LENGTH OF THE KEYS;
BEGIN
  LABEL ERR,L1,L2,RSTRT,TOKEY,EXIT;
  LOCAL ADDR,HOLD;
  SI:=RESTART;              % RESTART CANNOT BE CALLED BY VALUE
  DI:=LOC ADDR;             % BECAUSE IT WILL BE CHANGED
  DS:=1 WDS;
  SI:=ADDR;                     % SI NOW HAS THE VALUE OF RESTART
  IF SC NEQ """ THEN GO TO ERR;
  TALLY:=0;   SI:=SI+1;   ADDR:=SI;    %POINT PAST QUOTES
  27(IF SC=""" THEN JUMP OUT TO L1
              ELSE IF SC=GM THEN JUMP OUT
                             ELSE
                              BEGIN
                                TALLY:=TALLY+1;
                                SI:=SI+1;
                              END));
  GO TO ERR;
L1: HOLD:=TALLY;                 % TALLY CONTAINS LENGTH OF KEY
  SI:=LOC HOLD;  DI:=KEY1;   DS:=1 WDS;    % 1ST WORD IS LENGTH
  SI:=ADDR;    DS:=HOLD CHR;
  SI:=SI+1;    % POINT PAST 2ND QUOTES OF FROMKEY
  63(IF SC=" " THEN SI:=SI+1
              ELSE IF SC=""" THEN JUMP OUT TO TOKEY
                             ELSE JUMP OUT TO ERR));
  GO TO ERR;
TOKEY:   SI:=SI+1;   % POINT PAST QUOTE MARKS
  TALLY:=0;    ADDR:=SI;
  27(IF SC=""" THEN JUMP OUT TO L2
              ELSE IF SC=GM
                       THEN JUMP OUT TO ERR
                       ELSE
                         BEGIN
                           TALLY:=TALLY+1;
                           SI:=SI+1;
                         END;));
  GO TO ERR;
L2: HOLD:=TALLY;
  SI:=LOC HOLD;   DI:=KEY2;   DS:=1 WDS;
  SI:=ADDR;   DS:=HOLD CHR;   SI:=SI+1;
  63(IF SC=" " THEN SI:=SI+1
              ELSE
                IF SC=GM
                  THEN JUMP OUT
                  ELSE
                    IF SC="""
                      THEN
                        BEGIN
                          HOLD:=SI;    SI:=LOC HOLD;
                          DI:=RESTART;    DS:=1 WDS;
                          JUMP OUT TO RSTRT;
                        END
                      ELSE JUMP OUT TO ERR));
  DI:=RESTART;  DS:=8 LIT "00000000";
RSTRT:  TALLY:=1;  GO TO EXIT;
ERR:  TALLY:=0;
EXIT: VALIDKEYS:=TALLY;
   END OF VALIDKEYS;
```

```
PROCEDURE WRITECC (RECORD,ADRSS,ONERECD);

    COMMENT THIS PROCEDURE WRITES A CONTROL CARD IN THE
      OUTPUT FILE AND DOES SOME HOUSEKEEPING;
    VALUE ADRSS,ONERECD;
    INTEGER ADRSS;
    BOOLEAN ONERECD;
    REAL RECORD;
    BEGIN
      CCOUNT:=CCOUNT+1;
      CCARRY[CCOUNT DIV 10, CCOUNT MOD 10]:=RECCOUNT:=RECCOUNT+1;
      BUFREC:=RECCOUNT MOD 15 × 10;
      IF ONERECD
        THEN MOVEWDS (9,RECORD,OUTPUT(BUFREC))
        ELSE MOVECC (ADRSS,OUTPUT(BUFREC));
      IF BUFREC GEQ 140 THEN
          WRITE (OUTPUT[RECCOUNT DIV 15]);
    END OF WRITECC;


PROCEDURE WRITEMSG (FMTNBR,LSTNBR,RECORD);

   % THIS PROCEDURE WRITES OUT ALL THE MESSAGES TO LINE
    VALUE FMTNBR, LSTNBR;
    INTEGER FMTNBR, LSTNBR;
    REAL RECORD;            % REALLY AN ARRAY WHICH IS PASSED TO WRITEINV
    BEGIN
    ARRAY ERRARRY[0:9];     % FOR PRINTING INVALID STATEMENTS

    LABEL WRTITL, EOF;
      IF NO PREVERRORS  THEN
        BEGIN
          SEARCH (LINE,SRCHARRY[*]);
          IF SRCHARRY[0]=0 THEN      % INVALID USER
            BEGIN
              FILL ERRORS WITH "HUBLOU","440GRND",*,*,*,15;
              WRITE (ERRORS,SWFMT[16],USER.[6:6],USER,
                                      USER.[6:6],USER);
              WRITE (SPO,SWFMT[16],USER.[6:6],USER,USER.[6:6],USER);
              FILL LINE WITH *,*,*,*,*,15;
              ERRFLE:=0;   GO TO WRTITL;
            END;
          IF SRCHARRY[0] GTR 0
            THEN                       % THE FILE EXISTS
              BEGIN
                FILL ERRORS WITH USER;
                IF SRCHARRY[5] GEQ 115
                  THEN
                    BEGIN
                      FILL LINE WITH *,*,*,*,*,15;
                      WHILE TRUE DO
                        BEGIN
                          READ (ERRORS,10,ERRARRY[*]) [EOF];
                          WRITE (LINE,10,ERRARRY[*]);
                        END;
        EOF:          CLOSE (LINE,SAVE);
                      CLOSE (ERRORS,PURGE);
                      FILL LINE WITH *,*,*,*,*,12;
                      ERRFLE:=0;   NEWFLE:=TRUE;
                    END
                  ELSE
                    BEGIN
                      ERRFLE:=1;
                      WRITE (ERRORS[SRCHARRY[5]+1],SWFMT[17]);
                    END;
```

```
                END
              ELSE BEGIN ERRFLE:=0; NEWFLE:=TRUE; END;  % DID NOT EXIST
WRTITL:   WRITE (SWERRS[ERRFLE],SWFMT[0],D);
          WRITE (SWERRS[ERRFLE],SWFMT[1],MAINFLE);
          PREVERRORS:=TRUE;
          D:=" ";              % SO SAME WRITE CAN ALWAYS BE USED.
        END;
      IF FMTNBR=6
        THEN
          BEGIN
            WRITE (ERRARRY[*],SWFMT[6],SEQNO);        % INSERTS THE SEQNO
            MOVEWDS (9,RECORD,ERRARRY[1]);
            WRITE (SWERRS[ERRFLE],10,ERRARRY[*]);
          END
        ELSE WRITE (SWERRS[ERRFLE],SWFMT[FMTNBR],SWLST[LSTNBR]);
    END OF WRITEMSG;



PROCEDURE READVISTAFILE (COPY,DOC,REPCHRS,RESTART);

    COMMENT THIS PROCEDURE IS THE MAIN PART OF THE PROGRAM.
            IT IS RECURSIVELY CALLED BY KOPY STATEMENTS. A BLOCK
            MEANS 3 RIMS RECORDS TO THIS PROCEDURE AND THEREFORE
            IS 30 WORDS LONG. THE LABEL ENDL1TAG IS THE END OF PROCESS-
            ING ONE RECORD. THE LABEL ENDL1BLK IS THE END OF PROCESSING
            A LEVEL 1 TAG BLOCK (120 TO 150 RECORDS);

    VALUE COPY,DOC,REPCHRS,RESTART;
    BOOLEAN COPY,DOC;
    ALPHA REPCHRS;
    INTEGER RESTART;
    BEGIN
      INTEGER LISTNBR,SWNBR,

              ABSADDR,FORMT,
              NBRL2TAGS,NBRL2BLKS,
              DATABLK,L2TAG,TYPE,
              NBRL1TAGS,NBRL1BLKS,
              L1BLK,L1TAG,DATAREC,
              DATAWD,PREVDATABLK;
      REAL    KPREFX,KSUFFX;
      BOOLEAN LKNGFOR1OR2, LKNGFORKEY1,
              NOPREVKEYS,
              FOUNDLASTKEY,
              CKCNTNUE;
      SAVE ARRAY DATARRY[0:30];
      ARRAY L1ARRY, L2ARRY [0:149],
            SVKOPY [0:8],
            KEY1, KEY2 [0:4];    % FIRST WORD OF KEY IS LENGTH OF THE K
      LABEL IFCOPY, IFREP, CONTINUE,
            WRITEIT, ERRS, NOTRIMS,
            MORECC, CORE, PROCSS,
            LKFOR2, SETSEQNO,
            FINDKEY1, ENDL1TAG,
            ENDL2TAG, EXIT;


      SWNBR:=NBROFCOPIES:=NBROFCOPIES+1;        % MAINFILE IS ZERO
      IF COPY THEN FILL SWFLE[SWNBR] WITH NPREFX,NSUFFX;
      SEARCH (SWFLE[SWNBR],SRCHARRY[*]);
      IF COPY
        THEN BEGIN CPREFX:=KPREFX:=NPREFX; CSUFFX:=KSUFFX:=NSUFFX; END
        ELSE
          BEGIN
```

```
          CPREFX:=KPREFX:=MPREFX:=SRCHARRY[1];
          CSUFFX:=KSUFFX:=MSUFFX:=SRCHARRY[2];
        END;
      IF SRCHARRY[0]=-1 THEN
        BEGIN
          IF COPY THEN NODIR:=TRUE ELSE WRITEMSG (2,1,D);
          GO TO EXIT;
        END;
      IF SRCHARRY[0]=0 THEN
        BEGIN
          IF COPY THEN INVUSR:=TRUE ELSE WRITEMSG (3,1,D);
          GO TO EXIT;
        END;
      IF SRCHARRY[6] NEQ 0 THEN
       IF SRCHARRY[1] NEQ "DICTNRY" AND
          SRCHARRY[1] NEQ "UTILITY" AND
          SRCHARRY[1] NEQ "ROUTINE" THEN
             BEGIN
               IF COPY THEN INUSE:=TRUE ELSE WRITEMSG (4,1,D);
               GO TO EXIT;
             END;
      READ (SWFLE[SWNBR][HEADERBLK],30,HDRARRY[*]) [NOTRIMS];
      IF NOTRIMSINDEXED (HDRARRY[VISTAII]) THEN
        BEGIN
NOTRIMS:  IF COPY THEN NOTRMS:=TRUE ELSE WRITEMSG (5,1,D);
          GO TO EXIT;
        END;
      FORMT:=HDRARRY[FORMTWD];
      IF COPY THEN ELSE
        BEGIN
          BLANKIT (OUTPUT(0),15);
          BLANKIT (WKARRY[0],1);
        END;
      L1BLK:=-40;     % SO L1BLK+45 BEGINS WITH 5
      NBRL2TAGS:=HDRARRY[L2COUNT];
      NBRL2BLKS:=(NBRL2TAGS - 1) DIV 30;
      FOR I:=0 STEP 1 UNTIL NBRL2BLKS DO
        BEGIN
          READ (SWFLE[SWNBR][I],30,DATARRY[*]);
          MOVEWDS (30,DATARRY[*],L2ARRY[I×30]);
        END;
      % NEXT START THE OUTERMOST LOOP BASED ON THE NUMBER OF LEVEL2 TAGS
      FOR L2TAG:=0 STEP 1 UNTIL NBRL2TAGS - 1 DO
           BEGIN
             L1BLK:=L1BLK+45;       % OR L1BLK:=(L2TAG×45)+5
             NBRL1TAGS:=L2ARRY[L2TAG].[TAGCOUNT];
             IF NBRL1TAGS=0 THEN GO TO ENDL2TAG;
             NBRL1BLKS:=(NBRL1TAGS - 1) DIV 30;
             FOR I:=0 STEP 1 UNTIL NBRL1BLKS DO
               BEGIN
                 READ (SWFLE[SWNBR][L1BLK+I],30,DATARRY[*]);
                 MOVEWDS (30,DATARRY[*],L1ARRY[I×30]);
               END;
             PREVDATABLK:=-1;
             % NEXT LOOP ON A GROUP OF LEVEL 1 TAGS
             FOR L1TAG:=0 STEP 1 UNTIL NBRL1TAGS-1 DO
               BEGIN
                 DATABLK:= L1ARRY[L1TAG].[RELREC] DIV 3;
                 DATAWD:=L1ARRY[L1TAG].[RELREC] MOD 3 × 10;
                 IF DATABLK NEQ PREVDATABLK THEN
                   % DONT READ IF THE BLOCK ALREADY IS IN CORE
                   BEGIN
                     READ (SWFLE[SWNBR][DATABLK],30,DATARRY[*]);
                     DATARRY[30]:=GM;
                   END;
```

```
PREVDATABLK:=DATABLK;
IF CKCNTNUE THEN       % CHECK FOR KOPY CONTINUATION
  BEGIN
    CKCNTNUE:=FALSE;
    IF HYPHENINCOL1 (DATARRY[DATAWD],ABSADDR)
      THEN
        BEGIN
          SEQNO:=L1ARRY[L1TAG].[SEQNBR];
          IF ABSADDR= 0     % NO VALID KEYS FOUND
            THEN
              BEGIN
                BADKEY:=TRUE;
                GO TO ERRS:
              END
            ELSE GO TO CONTINUE;
              % KEY FIELD MIGHT BE VALID
        END
      ELSE    % NOT A CONTINUATION OF A KOPY
        IF NOPREVKEYS THEN   % ORIG KOPY HAD NO KEYS
          BEGIN
            NOPREVKEYS:=FALSE;
            L1TAG:=L1TAG-1;     % GO BACK TO ORIG KOPY
            GO TO CONTINUE:
          END;
  END;
IF COPY THEN
  % FOLLOWING IS VERY TRICKY - SEE FLOWCHART
  BEGIN
    IF DOC THEN      % CONTINUE
           ELSE IF ATSIGN (DATARRY[DATAWD])
                 THEN GO TO ENDL1TAG;
    IF LKNGFOR1OR2      % INITIALLY FALSE
      THEN  % LOOKING FOR KEY1 (FROM) OR KEY2 (THRU)
        IF LKNGFORKEY1         % INITIALLY FALSE
          THEN GO TO FINDKEY1
          ELSE GO TO IFREP        % CHECK FOR REP CHRS
                                  % INTIALLY GO THERE
      ELSE       % COPYING ENTIRE FILE
        IF RESTART=0      % THERE ARE NO KEYS
          THEN
            IF FOUNDLASTKEY
              THEN GO TO EXIT
              ELSE BEGIN KEY2[0]:=0; GO TO IFREP END
          ELSE
            IF VALIDKEYS (RESTART,KEY1,KEY2)
              THEN       % VALIDKEYS RESETS RESTART
                BEGIN    % IF MORE KEYS FOLLOW
                  LKNGFOR1OR2:=LKNGFORKEY1:=TRUE;
   FINDKEY1:       IF KEY1[0] LEQ 0 THEN GO TO LKFOR2;
                  IF FOUNDKEY (KEY1[*],73-KEY1[0],
                               DATARRY[DATAWD])
                    THEN
                      BEGIN
              LKFOR2:    LKNGFORKEY1:=FALSE;
               IFREP:    IF REPCHRS=GM3
                           THEN %NO REPCHRS SO CONTINUE
                           ELSE
                             DOCTORIT (REPCHRS,FORMT,
                                  DATARRY[DATAWD]);
                         IF KEY2[0] LEQ 0 THEN
                                GO TO SETSEQNO;
                         IF FOUNDKEY (KEY2[*],
                                73-KEY2[0],
                                DATARRY[DATAWD])
                          THEN
```

```
                                      BEGIN
                                        LKNGFOR1OR2:=FALSE;
                                        IF RESTART=0 THEN
                                             FOUNDLASTKEY:=TRUE;
                                      END
                                    ELSE GO TO SETSEQNO;
                                END
                              ELSE GO TO ENDL1TAG;
                          END
                        ELSE
                          BEGIN
                            BADKEY:=TRUE;
                            GO TO EXIT;
                          END;
                 END;
SETSEQNO:        SEQNO:=L1ARRY[L1TAG].[SEQNBR];
                 TYPE:=SCAN (DATARRY[DATAWD],NPREFX,NSUFFX,
                                  DOC,REPCHRS,ABSADDR);
                 IF PREVERRORS THEN GO TO IFCOPY;
                 % THE FOLLOWING RESOLVES THE VARIOUS TYPES:
                       IF TYPE=RECD THEN
                         BEGIN
                           RECCOUNT:=RECCOUNT + 1;
                           BUFREC:=RECCOUNT MOD 15 × 10;
                           FILLBUFF (OUTPUT(BUFREC),
                                     DATARRY[DATAWD],FORMT,SEQNO);
                           IF BUFREC GEQ 140 THEN
                              WRITE (OUTPUT[RECCOUNT DIV 15]);
                           GO TO ENDL1TAG;
                         END;
                       IF TYPE=CNTRLCD THEN
                         BEGIN
                           START:=ABSADDR;
                           IF COMON.[42:3]=7 THEN GO TO WRITEIT;
        MORECC:            IF STOP NEQ 0 THEN
                              BEGIN
                                ABSADDR:=STOP;
                                STOP:=0;
                              END;
                           CASE CCSCAN (DATARRY[DATAWD],ABSADDR,
                                                      STOP,PRCSS,BOOL) OF
                             BEGIN
                               CMPL:=TRUE;
                               CMPL:=FALSE;
                               IF STOP=0 THEN GO TO ENDL1TAG
                                              ELSE GO TO MORECC;
                                 % ABOVE HAS A PRIORITY CARD (SKIPPED)
                               GO TO CORE;
                               GO TO PROCSS:
                               GO TO WRITEIT;  % NONE OF ABOVE
                               IF STOP=0 THEN GO TO ENDL1TAG
                                              ELSE GO TO MORECC; % GARBAGE
                             END;


                           STOP:=0;   WKARRY[0]:=0;   WKARRY[1]:=USER;
                           IF NOACCTNBR (ABSADDR,WKARRY[0])
                             OR SYSTEM2 THEN
                               BEGIN
                                 WRITEMSG (12,0,0);
                                 WRITEMSG (6,0,DATARRY[DATAWD]);
                                 WRITEMSG (15,2,0);
                                 GO TO ENDL1TAG;
                               END;
                           IF PREVCBL THEN SETCBLPRTY;
```

```
                IF CMPL
                  THEN IF COBL
                         THEN
                           BEGIN
                             PREVCBL:=TRUE;
                             CBLREC1:=RECCOUNT + 1;
                             FILL WKARRY[*] WITH "CC COBOL",

                               "  PRIORI","TY  =   ",5,
                               ".        ";

                             CCINWKARRY:=TRUE;
                             CBLCC[CBLCOUNT:=CBLCOUNT + 1]
                               :=CCOUNT + 2;
                           END
                         ELSE PREVCBL:=FALSE
                  ELSE
                    BEGIN
                      PREVCBL:=FALSE;
                      FILL WKARRY[*] WITH
                        "CC PROCE","SS=3.   ","        ",

                        "        ","        ","        ";

                      CCINWKARRY:=TRUE;
                    END;
                CORESW:=NOT PREVCMEX:=TRUE;
                GO TO WRITEIT;
CORE:           IF CMPL
                  THEN IF STOP=0 THEN GO TO ENDL1TAG
                                 ELSE GO TO MORECC
                  ELSE CORESW:=TRUE;
                FILL WKARRY[*] WITH "CC PRIOR",

                    "ITY=1000",".        ","        ",
                    "        ","        ","        ";

                CCINWKARRY:=TRUE;
                GO TO WRITEIT;
PROCSS:         IF CMPL
                  THEN IF FORCMPLE
                         THEN GO TO WRITEIT   % FOR COMPILE
                         ELSE IF STOP=0 THEN GO TO ENDL1TAG
                                        ELSE GO TO MORECC
                  ELSE IF CORESW
                         THEN GO TO WRITEIT
                         ELSE
                           BEGIN
                             FILL WKARRY[*] WITH
                              "CC PRIOR","ITY  =  ",0,

                              ".       ","        ",
                              "        ","        ";

                             WKARRY[2]:=
                               IF PRCSS LEQ 3
                                 THEN 5
                                 ELSE IF PRCSS LEQ 6
                                        THEN PRCSS + 2
                                        ELSE "1000";
                             CCINWKARRY:=TRUE;
                           END;
WRITEIT:        WRITECC (DATARRY[DATAWD],ABSADDR,
                         IF START=ABSADDR AND STOP=0
                           THEN TRUE ELSE FALSE);
```

```
                    IF CCINWKARRY THEN
                      BEGIN
                        WRITECC (WKARRY[0],0,TRUE);
                        CCINWKARRY:=FALSE;
                      END;
                    IF STOP=0
                      THEN GO TO ENDL1TAG
                      ELSE GO TO MORECC;
                  END;
IFCOPY:         IF TYPE=COPYIT THEN
                  BEGIN
                    IF NBROFCOPIES GEQ MAXCOPIES THEN
                      % ALREADY EQUALS MAXCOPIES
                      BEGIN
                        WRITEMSG (11,0,D);
                        WRITEMSG (6,0,DATARRY[DATAWD]);
                        GO TO ENDL1TAG;
                      END;
                    MOVEWDS (9,DATARRY[DATAWD],SVKOPY[0]);
                    IF ABSADDR=0 THEN  % NO KEYS FOUND IN KOPY
                      BEGIN  % SO SEE IF ANY IN A CONTINUATON
                        NOPREVKEYS:=CKCNTNUE:=TRUE;
                        GO TO ENDL1TAG;
                      END;
  CONTINUE:         READVISTAFILE (TRUE,DOC,REPCHRS,ABSADDR);
      ERRS:         CPREFX:=KPREFX;    CSUFFX:=KSUFFX;
                    IF NODIR OR INVUSR OR INUSE
                           OR BADKEY OR NOTRMS THEN
                      BEGIN
                        WRITEMSG (12,0,D);
                        IF BADKEY
                          THEN WRITEMSG (6,0,DATARRY[DATAWD])
                          ELSE WRITEMSG (6,0,SVKOPY[0]);
                        IF NODIR
                          THEN WRITEMSG (2,3,D)
                          ELSE IF INVUSR
                                 THEN WRITEMSG (3,3,D)
                                 ELSE IF NOTRMS THEN
                                        WRITEMSG (5,3,D);
                        IF INUSE THEN WRITEMSG (4,3,D);
                        IF BADKEY THEN WRITEMSG (10,2,D);
                        NODIR:=INVUSR:=INUSE
                              :=BADKEY:=NOTRMS:=FALSE;
                      END;
                    CKCNTNUE:=TRUE;    NOPREVKEYS:=FALSE;
                    GO TO ENDL1TAG;
                  END;
                IF TYPE=INVALID THEN
                  BEGIN
                    WRITEMSG (12,0,D);
                    WRITEMSG (6,0,DATARRY[DATAWD]);
                  END;
  ENDL1TAG:     END OF PROCESSING A LEVEL 1 TAG;
            % THE ABOVE COMPOUND STATEMENT IS REPEATED NBRL1TAG TIMES.
            % AFTER THIS POINT A COMPLETE BLOCK OF 150
            % LEVEL 1 TAGS HAS BEEN PROCESSED.
ENDL2TAG:   END OF PROCESSING A LEVEL 2 TAG;
      %  AFTER THIS POINT ALL RECORDS HAVE BEEN PROCESSED
EXIT: CLOSE (SWFLE[SWNBR]);
      NBROFCOPIES:=NBROFCOPIES-1;
    END OF READVISTAFILE;

%    * * *  START OF OUTER BLOCK  * * *    %
```

```
    VERSION:=COMPDAY;
    SPACE (SCHED,+1);
    SEARCH (LINE,SRCHARRY[*]);
    USER:=SRCHARRY[1];   D:=TIME(0);    % FOR DAY MESSAGE
    CCOUNT:=CCARRY[0,0]:=CBLCOUNT:=RECCOUNT:=NBROFCOPIES:=-1;
    READVISTAFILE (FALSE,FALSE,0,0);
    IF PREVERRORS THEN GO TO ERR;
    IF RECCOUNT LSS 0 THEN
      BEGIN
        WRITEMSG (14,2,D);
ERR:    IF COMON.[45:3] NEQ 7 THEN CLOSE (OUTPUT,PURGE);
        WRITE (SWERRS[ERRFLE],SWFMT[7]);
        IF NEWFLE THEN
          BEGIN
            LOCK (LINE);
            FILL WKARRY[*] WITH "CC FREE ","0000000/","ERRORS; ",

                                                      "END,    ";

            MOVECHRS (1,USER,0,WKARRY[1],7);
            ZIP WITH WKARRY[*];
          END;
        GO TO FINAL;
      END;
    IF CCARRY[0,0]=0        % FIRST RECD MUST BE A CC
      THEN
        BEGIN
          RECCOUNT:=RECCOUNT+1;
          BUFREC:=RECCOUNT MOD 15 × 10;
          FILL WKARRY[*] WITH "CC END, ","        ","        ",

                                   "        ","        ","        ";

          WKARRY[9]:=RECCOUNT;
          MOVEWDS (10,WKARRY[0],OUTPUT(BUFREC));
          CCOUNT:=CCOUNT+1;
          CCARRY[CCOUNT DIV 10, CCOUNT MOD 10]:=RECCOUNT;
        END
      ELSE
        BEGIN
          WRITEMSG (8,2,D);
          GO TO ERR;
        END;
    IF PREVCBL THEN SETCBLPRTY;
 MORECBL:   SETPNTRS (CCOUNT,IF CBLCOUNT LSS 0 THEN 0
                                                       ELSE L:=CBLCC[CBLCOUNT]);
    IF CBLCOUNT GTR -1 THEN
      BEGIN
        K:=K - 6;
        MOVEWDS (1,CBLPRTY[CBLCOUNT],OUTPUT(K));
        CBLCOUNT:=CBLCOUNT-1;   CCOUNT:=L;
        GO TO MORECBL;
      END;
    WRITE (OUTPUT[0]);
    CHANGRECL (OUTPUT,RECCOUNT);     % CHANGE THE RECORD LENGTH
    IF COMON.[45:3] NEQ 7 THEN ZIP WITH OUTPUT;
FINAL:   CLOSE (SCHED,PURGE);
END OF SCHEDULE.
```

VIII. TO RIMS PROGRAM

1. Function of Program

As discussed in connection with the To RIMS command in Section IV-5 herein, the command causes the To RIMS program to be scheduled for execution. The purpose of the To RIMS program is to translate a sequentially formatted file to a RIMS Indexed file. The To RIMS program creates the proper index tags and sequence numbers for data records found in the sequential file.

If any of the program requirements are not satisfied during program execution, the conversion is terminated and an error message written in the user's error file. In order to schedule the program for execution, the user must provide a common card containing two digits. The first digit indicates whether or not the RIMS-Indexed file should be resequenced. Resequence starts at a beginning sequence number of 100 with successive increments of 100. To command a resequence, the first digit of the common card is one; for no resequence, it is zero.

The second digit of the common card indicates the format of the file to be created according to the program as written, one is inserted for a COBOL format, two for ALGOL, three for FORTRAN, and four for DATA.

The control cards necessary to convert a sequential file on disc to a RIMS-Indexed file are as follow:

? USER This card is required from the card reader only.
CC EXECUTE RIMS/TO RIMS.
CC FILE INPUT This card contains the prefix/suffix of the sequential file.
CC FILE OUTPUT This card contains a prefix/suffix for the RIMS file.
CC FILE LINE Prefix/suffix for error listing.
CC COMMON This card contains the appropriate two digits discussed above.
CC END.

The control cards necessary to create a RIMS Indexed file directly from cards or tapes are as follow:

? USER User code.
EXECUTE RIMS/TO RIMS.
? FILE INPUT Contains the label of the card or tape on file.
? FILE OUTPUT Prefix/suffix for RIMS file.
? FILE LINE Prefix/suffix for error listing.
? COMMON Appropriate two digits discussed above.
? DATA This to be omitted if the input is from tape.
(Place cards here.)
? END.

Prerequisites for use of the program are as follows. The input file must exist and not be in use by any other user at the time the program is to be executed. For formats other than data, the input file sequence numbers must range consecutively between zero and 999,999. The input file must not contain more than 9,000 records with a record length of more than 10 words. The user must be a valid user of the input file. Finally, the output file must not already exist.

2. To RIMS Program

The To RIMS program is written, as are the other programs herein, in extended ALGOL. The program will be compiled by any compiler adapted to accept this well-known language. The source listing for the To RIMS program is as follows.

```
BEGIN

                COMMENT
 RIMS/TORIMS THIS UTILITY PROGRAM TRANSFORMS A BURROUGHS SEQUENTIAL
                FILE INTO A RIMS INDEX SEQUENTIAL DISK FILE.
                THE RIMS FILE WILL CONSIST OF DATA RECORDS AND 2 LEVELS
                OF INDEXES.
                THE USER INDICATES THRU USE OF A COMMON CARD THE FORMAT
                OF THE FILE HE WISHES TO CONVERT AND WHETHER OR NOT THE
                FILE IS TO BE RESEQUENCED.
                FORMAT CODES:
                          1 = COBOL
                          2 = ALGOL
                          3 = FORTRAN
                          4 = DATA (80 POSITIONS USED)
                          5 = GP300
                ERRORS:
                    INVALID FILE LAYOUT
                    INVALID SEQ NUMBER
                    SEQ ERROR
                    INVALID USER
                    NONEXISTENT FILE SPECIFIED
                    FILE TO LARGE
                    FILE IN USE
                    INPUT FILE CARD NOT USED
                    OUTPUT FILE CARD NOT USED
                    LINE FILE CONTROL CARD NOT USED
                    SEQ NUMBER TOO LARGE
                    OUTPUT WOULD CREATE A DUPLICATE FILE
                    PROGRAM SHOULD BE EXECUTED, NOT RUN ;
 INTEGER        COMMON;
 INTEGER        GPMK,
                DEVICE,
                INRECLN,
                INBLKLN;
 REAL           INMFID,
                INID,
                OUTMFID;
 INTEGER
                DATEX;              % THIS MUST BE PRT 35 (OCTAL)
 REAL           OUTID,
                USER;
 BOOLEAN        ERRM,
                RESEQ;
 LABEL          PROGEXIT;
 DEFINE
          CMPLDATE   = 062769                 # , % COMPILE DATE
          SETDATE    = DATEX := CMPLDATE      # ,
          WDSPEREC   = 10                     # ,
          RECPERBLK  =  3                     # ,
          L2ACT      = 75                     # ,
          L2MAX      = L2ACT-1                # ,
          L2ID       = L2MAX+1                # ,
          L2TYPE     = L2ID+1                 # ,
          L2CNT      = L2TYPE+1               # ,
          L1ACT      = 120                    # ,
          L1MAX      = L1ACT-1                # ,
          L1L2WRDS   = 150                    # ,
          L1L2RCDS   = L1L2WRDS/WDSPEREC      # ,
          L1L2BLKS   = L1L2RCDS/RECPERBLK     # ,
          COBOL      = 1                      # ,
          ALGOL      = 2                      # ,
          FORTRAN    = 3                      # ,
```

```
        DATA        = 4                              # ,
        GP300       = 5                              # ,
        BASIC       = 6                              # ,
        CSEQLN      = 6                              # ,
        AFSEQLN     = 8                              # ,
        GASEQLN     = 5                              # ,
        CASEQADJST= 0                                # ,
        GPSEQADJST= 10                               # ,
        AFSEQADJST= 72                               # ,
        VALRLN      = 10                             # ,
        MAXFILE     = 9000                           # ,
        BLKSZ       = 30                             # ,
        INVALUSER = 0                                # ,
        NOTOPEN     = 0                              # ,
        MAXSEQNO    = 999999                         # ,
        INC         = 100                            # ;
REAL ARRAY STATARY [0:7];
FILE OUT SPO 11 (1,10);
FILE ERRORS DISK SERIAL "1234567" "ERRORS" (2,10,30);
SAVE FILE LINE DISK SERIAL [20:6] "UNKNOWN" "USER" (1,10,30,SAVE 9);
REAL ARRAY SRCHARY [0:9];
INTEGER    IX,
           TRMUSE;
DEFINE     SRCHUSER  = SRCHARY[0] # ,
           SRCHMFID  = SRCHARY[1] # ,
           SRCHID    = SRCHARY[2] # ,
           SRCHRLN   = SRCHARY[3] # ,
           SRCHBLN   = SRCHARY[4] # ,
           SRCHEOF   = SRCHARY[5] # ,
           SRCHOPN   = SRCHARY[6] # ;
PROCEDURE ERRITE(ERRNO);
    INTEGER  ERRNO;
    BEGIN
        LABEL  EREOF,

               WTLINE;
        INTEGER  IPFX,ISFX;
        SWITCH FORMAT OUT ERRSPO:=

               ("INVALID FILE LAYOUT.",X3,
                 A1,A6,"/",A1,A6,X1,":",X1,"RIMS/TORIMS",A1),       %0
               ("INVALID SEQ NUMBER.",X3,
                 A1,A6,"/",A1,A6,X1,":",X1,"RIMS/TORIMS",A1),       %1
               ("SEQ ERR.",X3,
                 A1,A6,"/",A1,A6,X1,":",X1,"RIMS/TORIMS",A1),       %2
               ("INVALID USER.",X3,
                 A1,A6,"/",A1,A6,X1,":",X1,"RIMS/TORIMS",A1),       %3
               ("NONEXISTENT FILE SPECIFIED.",X3,
                 A1,A6,"/",A1,A6,X1,":",X1,"RIMS/TORIMS",A1),       %4
               ("FILE TOO LARGE.",X3,
                 A1,A6,"/",A1,A6,X1,":",X1,"RIMS/TORIMS",A1),       %5
               ("FILE IN USE.",X3,
                 A1,A6,"/",A1,A6,X1,":",X1,"RIMS/TORIMS",A1),       %6
               ("INPUT FILE CONTROL CARD NOT USED.",X3,
                 A1,A6,"/",A1,A6,X1,":",X1,"RIMS/TORIMS",A1),       %7
               ("INVALID COMMON PARAMETER.",X3,
                 A1,A6,"/",A1,A6,X1,":",X1,"RIMS/TORIMS",A1),       %8
               ("OUTPUT FILE CONTROL CARD NOT USED.",X3,
                 A1,A6,"/",A1,A6,X1,":",X1,"RIMS/TORIMS",A1),       %9
               ("OUTPUT WOULD CREATE DUP FILE.",X3,
                 A1,A6,"/",A1,A6,X1,":",X1,"RIMS/TORIMS",A1),       %10
               ("SEQ NUMBER TOO LARGE.",X3,
                 A1,A6,"/",A1,A6,X1,":",X1,"RIMS/TORIMS",A1),       %11
               ("USE EXECUTE, NOT RUN.",X3,
                 A1,A6,"/",A1,A6,X1,":",X1,"RIMS/TORIMS",A1),       %12
```

```
        ("LINE FILE CONTROL CARD NOT USED.",X3,
          A1,A6,"/",A1,A6,X1,":",X1,"RIMS/TORIMS",A1);       %13

    IPFX := INMFID.[6:6];
    ISFX := INID.[6:6];
    WRITE (SPO,ERRSPO[ERRNO],IPFX,INMFID,ISFX,INID,"+");
    IF DEVICE = 12
    THEN
    BEGIN
        SEARCH (LINE,SRCHARY[*]);
        IF SRCHMFID = "UNKNOWN" OR SRCHUSER = INVALUSER
        THEN
        BEGIN                              % JUST WRITE PBD
            IF SRCHMFID = "UNKNOWN" THEN FILL LINE WITH OUTMFID,
                                                          OUTID;
            FILL LINE WITH *,*,*,*,*,15;
            GO TO WTLINE;
        END
        ELSE
        BEGIN                              % UPDATE USER/ERRORS
            IF SRCHARY[0] > 0
            THEN
            BEGIN                          % FILE EXISTS
                FILL ERRORS WITH SRCHMFID;
                IF SRCHEOF ≥ 115
                THEN
                BEGIN
                    FILL LINE WITH *,*,*,*,*,15;
                    WHILE TRUE DO
                    BEGIN   % COPY USER/ERRORS TO PBD
                        READ (ERRORS,10,SRCHARY[*])[EREOF];
                        WRITE (LINE,10,SRCHARY[*]);
                    END;
                  EREOF:
                    CLOSE (LINE);
                    SRCHEOF := -1;
                END;
                WRITE (ERRORS[SRCHEOF + 1],ERRSPO[ERRNO],
                                    IPFX,INMFID,ISFX,INID);
            END
            ELSE
          WTLINE:
            WRITE (LINE,ERRSPO[ERRNO],IPFX,INMFID,ISFX,INID);
        END;
    END;
  END ERRITE;

PROCEDURE ZIPRM;
  BEGIN
    INTEGER  SLASH,

             BLANK;
    STREAM PROCEDURE PLUGCHAR (WHAT,WHERE);
      BEGIN
        SI := WHAT;  SI := SI + 7;
        DI := WHERE;
        DS := CHR;
      END PLUGCHAR;
    SLASH := "/";
    BLANK := " ";
    FILL STATARY[*] WITH "CC      ",

                         "REMOVE  ",
                         "XX",
                         "YY".
```

```
                          " ; END, ";

    STATARY[2] := OUTMFID;
    STATARY[3] := OUTID;
    PLUGCHAR (BLANK,STATARY[2]);
    PLUGCHAR (SLASH,STATARY[3]);
    ZIP WITH STATARY[*];
END ZIPRM;

PROCEDURE GTYPE (FYLE,TOFPB);
    FILE    FYLE;
    BOOLEAN TOFPB;
    BEGIN
        INTEGER I,J;

        INTEGER STREAM PROCEDURE GFPB (GFILE);
            BEGIN
                SI := GFILE;  SI := SI - 24;
                DI := LOC GFPB;  DS := 1 WDS;
                SI := GFPB;  SI := SI + 34;
                DI := LOC GFPB;  DS := 6 LIT "0";
                DS := 2 CHR;
            END OF GFPB;
        STREAM PROCEDURE GDVCE (COMMON,GSKP,DTYPE,TOFPB);
            VALUE GSKP,TOFPB;
            BEGIN
                LOCAL G1,G2;
                SI := COMMON;  3(SI := SI - 48);
                DI := LOC G1;  DS := 1 WDS;
                SI := LOC GSKP;  DI := LOC G2;
                DI := DI + 1;  DS := 7 CHR;
                SI := G1;  GSKP (SI := SI + 8);  % DEVICE TYPE IS
                G2(16(SI := SI + 32));           % IN WORD 4, CHR 7
                3(SI := SI + 8);  SI := SI + 7;  % OF FPB
                G1 := SI;                        % SAVE LOC OF FPB
                DI := DTYPE;  DI := DI + 7;
                G2 := DI;                        % SAVE LOC OF DEVI
                SI := LOC TOFPB;  SI := SI + 7;
                IF SC = "1"                      % TST IF CHG FPB
                THEN
                BEGIN                            % TRANS TO FPB
                    SI := G2;
                    DI := G1;
                END
                ELSE
                BEGIN                            % TRANS FR FPB
                    SI := G1;
                    DI := G2;
                END;
                DS := 1 CHR;
            END OF GDVCE;
        GDVCE (COMMON,
               IF BOOLEAN ((I := GFPB (FYLE)).[36:1])
               THEN I.[37:11] ELSE 5 × (I.[37:11] - 1),
               DEVICE,TOFPB);
    END OF GTYPE;

%
%  OUTER BLOCK
%
BEGIN
    FILE INPUT  DISK SERIAL "XY      " "XZ      " (1,1);

    FILE OUTPUT DISK RANDOM [20:170] "XX      " "YY      "
                                        (1,30,SAVE 99);
```

```
SETDATE;
IF TRMUSE := STATUS(STATARY[*]) ≥ 2
THEN
BEGIN
     IF TRMUSE > 2
     THEN
     BEGIN
          ERRITE (11);
          ERRM := TRUE;
          GO TO PROGEXIT;
     END;
END;
SEARCH (INPUT,SRCHARY[*]);
INMFID := SRCHMFID;
INID := SRCHID;
GTYPE (INPUT,FALSE);                 % RETRIEVE DEVICE FROM FPB
IF DEVICE = 12
THEN
BEGIN                                % INPUT FROM DISK
     IF (SRCHMFID = "0000000" AND SRCHID = "CARDS  ")
     THEN
     BEGIN
          ERRITE (7);                % NO INPUT FILE CARD USED
          GO TO PROGEXIT;
     END;
     IF SRCHARY[0] = -1
     THEN
     BEGIN
          ERRITE (4);                % IP FILE NOT FOUND
          GO TO PROGEXIT;
     END;
     IF SRCHUSER = INVALUSER
     THEN
     BEGIN
          ERRITE (3);                % INVALID USER
          GO TO PROGEXIT;
     END;
     IF SRCHOPN ≠ NOTOPEN
     THEN
     BEGIN
          ERRITE (7);                % FILE IN USE
          GO TO PROGEXIT;
     END;
     IF SRCHEOF < 0 THEN SRCHEOF := 0;
     IF (SRCHRLN MOD VALRLN) ≠ 0
     THEN
     BEGIN
          ERRITE (0);                % INVALID FILE LAYOUT
          GO TO PROGEXIT;
     END;
     IF ((SRCHRLN DIV VALRLN) × SRCHEOF) > MAXFILE
     THEN
     BEGIN
          ERRITE (5);                % FILE TOO LARGE
          GO TO PROGEXIT;
     END;
     INBLKLN := SRCHBLN;
END
ELSE
INBLKLN := VALRLN;
SEARCH (OUTPUT,SRCHARY[*]);
IF (SRCHMFID = "XX     " AND SRCHID = "YY     ")
THEN
BEGIN
     ERRITE (9);                     % NO OUTPUT FILE CARD USED
```

```
        GO TO PROGEXIT;
    END;
    IF SRCHARY[0] ≠ -1
    THEN
    BEGIN
        ERRITE (10);                    % OUTPUT FILE ALREADY EXISTS
        GO TO PROGEXIT;
    END;
    OUTMFID := SRCHMFID;  OUTID := SRCHID;
    IF COMMON > 10
    THEN
    BEGIN
        RESEQ := TRUE;                  % INDICATE RESEQUENCING WANTED
        COMMON := COMMON - 10;          % ELIMINATE RESEQ IND FROM COMMON
    END;
    IF (COMMON < COBOL OR COMMON > BASIC)
    THEN
    BEGIN
        ERRITE (8);                     % COMMON PARAMETER INVALID
        GO TO PROGEXIT;
    END;
    WRITE (OUTPUT[0]);
    LOCK (OUTPUT);
END;

BEGIN
    INTEGER   IX,

              L1,
              L2,
              DATAIDY,
              TAGNO,
              CURRSEQ,
              PREVSEQ,
              ADJUST,
              LENGTH,
              SHIFT,
              RELREC,
              ADDR;
    BOOLEAN   NOTFIRST;
    LABEL     EOFLBL;
    FILE OPFYLE DISK RANDOM (1,BLKSZ);
    FILE IN INFYLE DISK SERIAL (2,VALRLN,INBLKLN);
    REAL ARRAY  L1INDEX  [0:L1L2WRDS - 1];
    REAL ARRAY  L2INDEX  [0:L1L2WRDS - 1];
    REAL ARRAY  DATAREC  [0:VALRLN - 1];
    STREAM PROCEDURE CMOVE (CMF,CMT,CMSKS,CMSKD,CML,CMHLD);
        VALUE  CMSKS,CMSKD,CML,CMHLD;
        BEGIN
            LOCAL CMWS,CMWD,CMW;
            SI := LOC CMSKS;  DI := LOC CMWS;
            DI := DI + 1;  DS := 7 CHR;
            SI := LOC CMSKD;  DI := LOC CMWD;
            DI := DI + 1;  DS := 7 CHR;
            SI := LOC CML;  DI := LOC CMW;
            DI := DI + 1;  DS := 7 CHR;
            SI := CMF;  SI := SI + CMSKS;
            CMWS (2(SI := SI + 32));
            DI := CMT;  DI := DI + CMSKD;
            CMWD (2(DI := DI + 32));
            CMW (2(32(DS := 1 CHR;  SI := SI - CMHLD;))));
            CML (DS := 1 CHR;  SI := SI - CMHLD;));
        END OF CMOVE;
    PROCEDURE TAGRITE (LXINDEX);
        ARRAY LXINDEX[0];
```

```
    BEGIN
        INTEGER  I;

        FOR I := 0 STEP 1 UNTIL 4 DO
        BEGIN
            WRITE (OPFYLE [ADDR],BLKSZ,LXINDEX[*]);
            IF I < 4                    % SHIFT ONLY 4 TIMES
            THEN
            BEGIN
                ADDR := ADDR + 1;
                CMOVE (LXINDEX[*],LXINDEX[*],BLKSZ × 8,0,
                                    ((L1L2WRDS - BLKSZ) × 8),0);
            END;
        END;
    END OF TAGRITE;

PROCEDURE RITEL1TAGS;
    BEGIN
        L2INDEX[L2] :=
                0 & L1INDEX[L1 - 1][11:11:20] & L1[40:40:8];
        ADDR:=(1 + L2 + L2 × ((L1ACT × VALRLN) DIV L1L2WRDS)) × 5;
        L2 := L2 + 1;                  % UPDATE L2INDEX SUBSCRIPT
        IF L2 > L2MAX
        THEN
        BEGIN
            ERRITE (5);                % FILE TOO LARGE
            ERRM := TRUE;
            GO TO PROGEXIT;
        END;
        TAGRITE (L1INDEX[*]);
        L1 := 0;                       % RESET L1INDEX SUBSCRIPT
    END RITEL1TAGS;
BOOLEAN STREAM PROCEDURE INSEQ (SORC,ADJST,LNGTH,CVTSEQ);
    VALUE  ADJST,LNGTH;
    BEGIN
        LOCAL  DIV64;
        LABEL  INSEQX;
        SI := LOC ADJST;               % TAKE DIV 64 OF ADJST
        DI := LOC DIV64;  DI := DI + 1;
        DS := 7 CHR;
        SI := SORC;
        DIV64(2(SI := SI + 32));       % MAKE ADJUSTMENT TO CHAR IN
        SI := SI + ADJST;              % SOURCE STRING
        LNGTH(IF SC = ALPHA
        THEN
        BEGIN
            IF SC < "0" THEN JUMP OUT TO INSEQX;
            SI := SI + 1;
        END
        ELSE
        JUMP OUT TO INSEQX);
        SI := SI - LNGTH;              % RESET BACK TO BEGINNING OF FLD
        DI := CVTSEQ;                  % POINT TO CURR SEQ WORD
        DS := LNGTH OCT;               % CONVERT DECIMAL TO BINARY
        TALLY := 1;                    % INDICATE FUNCTION TRUE
      INSEQX:
        INSEQ := TALLY;                % SET FUNCTION TO TRUE OR FALSE
    END INSEQ;
FILL INFYLE WITH INMFID,               % FILL FIB WITH PREFIX AND SUFFIX
                 INID;                 % OF INPUT AND TAG FILE
FILL OPFYLE  WITH OUTMFID,
                  OUTID;
IF COMMON = DATA
THEN
ELSE
```

```
BEGIN
    IF (COMMON = COBOL OR COMMON = GP300)
    THEN
    BEGIN
        ADJUST:= IF COMMON = COBOL THEN CASEQADJST ELSE GPSEQADJST;
        LENGTH := IF COMMON = COBOL THEN CSEQLN ELSE GASEQLN;
        SHIFT := IF COMMON = COBOL
        THEN
        LENGTH
        ELSE
        ADJUST + LENGTH;
    END
    ELSE
    BEGIN
        ADJUST := AFSEQADJST;
        LENGTH := AFSEQLN;
    END;
END;
TAGNO := 0;                             % RESET TAGNO
GTYPE (INFYLE,TRUE);                    % TRANS DEVICE TO FPB
WHILE TRUE DO                           % READ INPUT FILE TO EOF
BEGIN
    READ (INFYLE.VALRLN.DATAREC[*])[EOFLBL];
    IF COMMON = DATA THEN CURRSEQ := CURRSEQ + INC
    ELSE
    BEGIN
        IF RESEQ THEN CURRSEQ := CURRSEQ + INC
        ELSE
        BEGIN
            IF NOT INSEQ (DATAREC[*],ADJUST,LENGTH,CURRSEQ)
            THEN
            BEGIN
                ERRITE (1);         % INVALID SEQ NUMBER
                ERRM := TRUE;
                GO TO PROGEXIT;
            END;
            IF NOT NOTFIRST THEN NOTFIRST := TRUE
            ELSE
            BEGIN
                IF CURRSEQ ≤ PREVSEQ
                THEN
                BEGIN
                    ERRITE (2);     % OUT OF SEQ
                    ERRM := TRUE;
                    GO TO PROGEXIT;
                END;
            END;
            IF CURRSEQ > MAXSEQNO
            THEN
            BEGIN
                ERRITE (11);    % SEQ NO TOO LARGE
                ERRM := TRUE;
                GO TO PROGEXIT;
            END;
            PREVSEQ := CURRSEQ;
        END;
        IF COMMON = COBOL OR COMMON = GP300
        THEN
        BEGIN
            CMOVE (DATAREC[*],DATAREC[*],SHIFT,0,
                                            (80 - SHIFT),0);
                                    % BLANK OUT RESIDUE
            IX := " ";
            CMOVE (IX,DATAREC[*],7,(80 - SHIFT),SHIFT,1);
        END;
```

```
        END;
        RELREC := L1L2RCDS + (L1L2RCDS × (L2 + 1)) + TAGNO;
        CMOVE (DATAREC[*],OPFYLE(0),0,
                                (IX := (RELREC MOD 3) × 80),80,0);
        L1INDEX[L1] := 0 & CURRSEQ[11:28:20] & RELREC[34:34:14];
        TAGNO := TAGNO + 1;
        L1 := L1 + 1;
        IF ((RELREC + 1) MOD 3) = 0
        THEN
        WRITE (OPFYLE[RELREC DIV 3]);
        IF L1 = L1ACT THEN RITEL1TAGS;
    END;
   EOFLBL:
    IF ((RELREC + 1) MOD 3) ≠ 0
    THEN
    WRITE (OPFYLE[RELREC DIV 3]);
    IF L1 ≠ 0
    THEN
    RITEL1TAGS;                          % WRITE REMAINING L1INDEX  BLOCK
    L2INDEX[L2CNT] := L2;                % RECORD NUMBER OF L2 TAGS
    L2INDEX[L2ID] := "VISTATI";          % SET UP VISTA FILE ID
    L2INDEX[L2TYPE] := COMMON;           % RECORD FORMAT TYPE
    L2INDEX[87] := RELREC;               % RECORD EOF POINTER
    ADDR := 0;
    TAGRITE (L2INDEX[*]);
    LOCK (INFYLE);
    LOCK (OPFYLE);
 END;

PROGEXIT:
 IF ERRM THEN IF NOT (OUTMFID = 0 AND OUTID = 0) THEN ZIPRM;
 WHEN (1);
END OF TORIMS.
```

IX. TO SEQUENTIAL PROGRAM

1. Function of Program

As discussed herein in Section IV-5, entry of a To Sequential command at a remote terminal causes the utility program To Sequential to be scheduled for execution. If the program To Sequential finds an error in the file, that is, a requirement of the program which has not been satisfied, the program terminates and prints an appropriate error message in the user's error file.

The purpose of the utility program To Sequential is to create a sequential file from a RIMS Indexed file.

The control cards necessary to execute the To Sequential program are as follows.

? USER Contains the User Code. Required from the card reader only.

CC EXECUTE RIMS/TO SEQ.

CC FILE INPUT This is the prefix/suffix of the RIMS file.

CC FILE OUTPUT This is the prefix/suffix for the sequential file.

CC FILE LINE This is the prefix/suffix for the error listing.

CC END.

The requirements for use of the program are as follows. The input file must exist and not be in use by any user. The user must be a valid user of the input file and the output file must not already exist.

2. Program Listing

As are all other programs of this invention, the To Sequential program is written in extended ALGOL. The source program listing is as follows. The program may be compiled by any compiler adapted to accept the language.

```
BEGIN

                COMMENT:
RIMS/TOSEQ      THIS UTILITY PROGRAM TRANSFORMS A RIMS INDEX SEQUENTIAL
                DISK FILE INTO A BURROUGHS SERIAL DISK FILE.
                ERRORS:
                    INVALID USER
                    NONEXISTENT FILE SPECIFIED
                    INPUT NOT A RIMS FILE
                    FILE IN USE
                    INPUT FILE CARD NOT USED
                    OUTPUT FILE CARD NOT USED
                    LINE FILE CONTROL CARD NOT USED
                    OUTPUT WOULD CREATE A DUPLICATE FILE
                    PROGRAM SHOULD BE EXECUTED, NOT RUN ;
 INTEGER        COMMONCODE;
 INTEGER        GPMK,
                TRMUSE;
 REAL           INMFID,
                INID,
                OUTMFID,
                DUMMY,
                OUTID;
 INTEGER        DATEX;          % THIS MUST BE PRT 35 (OCTAL)
 BOOLEAN        NOTSPO,
                RESEQ;
 LABEL          PROGEXIT;
 DEFINE
        CMPLDATE    = 062769                 # , % DATE COMPILED
        SETDATE     = DATEX := CMPLDATE      # ,
        WDSPEREC    = 10                     # ,
        RECPERBLK   =  3                     # ,
        L2ACT       = 75                     # ,
        L2MAX       = L2ACT-1                # ,
        L2ID        = L2MAX+1                # ,
        L2TYP       = L2ID+1                 # ,
        L2CNT       = L2TYP+1                # ,
        L1ACT       = 150                    # ,
        L1MAX       = L1ACT-1                # ,
        L1NRM       = 120                    # ,
        L1L2WRDS    = 150                    # ,
        COBOL       = 1                      # ,
        ALGOL       = 2                      # ,
        FORTRAN     = 3                      # ,
        DATA        = 4                      # ,
        GP300       = 5                      # ,
        BASIC       = 6                      # ,
        CSEQLN      = 6                      # ,
        AFSEQLN     = 8                      # ,
        GASEQLN     = 5                      # ,
        CASEQADJST  = 0                      # ,
        GPSEQADJST  = 10                     # ,
        AFSEQADJST  = 72                     # ,
        VALRLN      = 80/8                   # ,
        BLKSZ       = 30                     # ,
        INVALUSER   = 0                      # ,
        NOTOPEN     = 0                      # ,
        INC         = 100                    # ;
REAL ARRAY SRCHARY [0:61];
DEFINE    SRCHUSER   = SRCHARY[0] # ,
          SRCHMFID   = SRCHARY[1] # ,
          SRCHID     = SRCHARY[2] # ,
          SRCHRLN    = SRCHARY[3] # ,
```

```
          SRCHBLN    = SRCHARY[4] # ,
          SRCHEOF    = SRCHARY[5] # ,
          SRCHOPN    = SRCHARY[6] # ;
REAL ARRAY STATARY [0:7];
FILE OUT SPO 11 (1,10);
FILE ERRORS DISK SERIAL "1234567" "ERRORS" (2,10,30);
SAVE FILE LINE DISK SERIAL [20:6] "UNKNOWN" "USER" (1,10,30,SAVE 9);
FILE IN INPUT     DISK RANDOM "XY      " "XZ      " (1,BLKSZ);
FILE OUT OUTPUT DISK SERIAL "XX      " "YY      " (1,1);
PROCEDURE ERRITE(ERRNO);
    INTEGER  ERRNO;
    BEGIN
        LABEL  EREOF,

               WTLINE;
        INTEGER  IPFX,ISFX;
        SWITCH FORMAT OUT ERRSPO:=

            ("INVALID USER.",X3,
              A1,A6,"/",A1,A6,X1,":",X1,"RIMS/TOSEQ",A1),             %0
            ("NONEXISTENT FILE SPECIFIED.",X3,
              A1,A6,"/",A1,A6,X1,":",X1,"RIMS/TOSEQ",A1),             %1
            ("FILE IN USE.",X3,
              A1,A6,"/",A1,A6,X1,":",X1,"RIMS/TOSEQ",A1),             %2
            ("INPUT FILE CONTROL CARD NOT USED.",X3,
              A1,A6,"/",A1,A6,X1,":",X1,"RIMS/TOSEQ",A1),             %3
            ("INPUT NOT A RIMS FILE.",X3,
              A1,A6,"/",A1,A6,X1,":",X1,"RIMS/TOSEQ",A1),             %4
            ("OUTPUT FILE CONTROL CARD NOT USED.",X3,
              A1,A6,"/",A1,A6,X1,":",X1,"RIMS/TOSEQ",A1),             %5
            ("OUTPUT WOULD CREATE A DUP FILE.",X3,
              A1,A6,"/",A1,A6,X1,":",X1,"RIMS/TOSEQ",A1),             %6
            ("LINE FILE CONTROL CARD NOT USED.",X3,
              A1,A6,"/",A1,A6,X1,":",X1,"RIMS/TOSEQ",A1),             %7
            ("USE EXECUTE NOT RUN.",X3,
              A1,A6,"/",A1,A6,X1,":",X1,"RIMS/TOSEQ",A1);             %8

        IPFX := INMFID.[6:6];
        ISFX := INID.[6:6];
        WRITE (SPO,ERRSPO[ERRNO],IPFX,INMFID,ISFX,INID,"←");
        SEARCH (LINE,SRCHARY[*]);
        IF SRCHMFID = "UNKNOWN" OR SRCHUSER = INVALUSER
        THEN
        BEGIN                                 % JUST WRITE PBD
            IF SRCHMFID = "UNKNOWN" THEN FILL LINE WITH OUTMFID,
                                                          OUTID;
            FILL LINE WITH *,*,*,*,*,15;
            GO TO WTLINE;
        END
        ELSE
        BEGIN                               % UPDATE USER/ERRORS
            IF SRCHARY[0] > 0
            THEN
            BEGIN                           % FILE EXISTS
                FILL ERRORS WITH SRCHMFID;
                IF SRCHEOF > 115
                THEN
                BEGIN
                    FILL LINE WITH *,*,*,*,*,15;
                    WHILE TRUE DO
                    BEGIN   % COPY USER/ERRORS TO PBD
                        READ (ERRORS,10,SRCHARY[*])[EREOF];
                        WRITE (LINE,10,SRCHARY[*]);
                    END;
                  EREOF:
```

```
                CLOSE (LINE);
                SRCHEOF := -1;
            END;
            WRITE (ERRORS[SRCHEOF + 1],ERRSPO[ERRNO],
                                    IPFX,INMFID,ISFX,INID);
        END
        ELSE
      WTLINE:
        WRITE (LINE,ERRSPO[ERRNO],IPFX,INMFID,ISFX,INID);
    END;
  END OF ERRITE;

% ------------------
% --- OUTER BLOCK ---
% ------------------
BEGIN
    INTEGER   IX;

    SETDATE:
    IF TRMUSE := STATUS(STATARY[*]) ≥ 2
    THEN
    BEGIN
        IF TRMUSE > 2
        THEN
        BEGIN
            ERRITE (8);
            GO TO PROGEXIT;
        END;
    END;
    SEARCH (INPUT,SRCHARY[*]);
    IF (SRCHMFID = "XY      " AND SRCHID = "XZ      ")
    THEN
    BEGIN
        ERRITE (3);                         % NO INPUT FILE CARD USED
        GO TO PROGEXIT;
    END;
    INMFID := SRCHMFID;
    INID := SRCHID;
    IF SRCHARY[0] = -1
    THEN
    BEGIN
        ERRITE (1);                         % IP FILE NOT FOUND
        GO TO PROGEXIT;
    END;
    IF SRCHUSER = INVALUSER
    THEN
    BEGIN
        ERRITE (0);                         % INVALID USER
        GO TO PROGEXIT;
    END;
    IF SRCHOPN ≠ NOTOPEN
    THEN
    BEGIN
        ERRITE (2);                         % IP FILE IN USE
        GO TO PROGEXIT;
    END;
    SEARCH (OUTPUT,SRCHARY[*]);
    IF (SRCHMFID = "XX      " AND SRCHID = "YY      ")
    THEN
    BEGIN
        ERRITE (5);                         % NO OP FILE CARD USED
        GO TO PROGEXIT;
    END;
    IF SRCHARY[0] ≠ -1
    THEN
```

```
        BEGIN
            ERRITE (6);                                  % OP FILE ALREADY EXISTS
            GO TO PROGEXIT;
        END;
        OUTMFID := SRCHMFID;
        OUTID := SRCHID;
    END;

    BEGIN
        INTEGER  ADDR,

                 PREVBLK,
                 L1,
                 L2,
                 ADJUST,
                 LENGTH,
                 SHIFT,
                 IX,
                 RECS;
        DEFINE   LITCNT    = 40:8    # ,
                 SEQNO     = 11:20   # ,
                 RELREC    = 34:14   # ;
        BOOLEAN STREAM PROCEDURE ARIMSFILE (TAGS,ID,VISTAII);
            VALUE  ID,VISTAII;
            BEGIN
                LOCAL I;
                SI := LOC ID;  DI := LOC I;
                DI := DI + 1;  DS := 7 CHR;
                SI := TAGS;
                ID(SI := SI + 8);
                I(2(8(SI := SI + 32)));  SI := SI + 1;
                DI := LOC VISTAII;  DI := DI + 1;
                IF 7 SC = DC THEN TALLY := 1;
                ARIMSFILE := TALLY;
            END OF RIMS;
        STREAM PROCEDURE BLANKOUT (BOARY,BOLGTH);
            VALUE BOLGTH;
            BEGIN
                DI := BOARY;  DS := 8 LIT "        ";
                SI := BOARY;  DS := BOLGTH WDS;
            END OF BLANKOUT;
        STREAM PROCEDURE SEQPLUG (SRCSEQ,DSTSEQ,ADJST,LNGTH);
            VALUE  SRCSEQ,ADJST,LNGTH;
            BEGIN
                LOCAL  DIV64;
                SI := LOC ADJST;
                DI := LOC DIV64;  DI := DI + 1;
                DS := 7 CHR;
                SI := LOC SRCSEQ;
                DI := DSTSEQ;
                DIV64(2(DI := DI + 32));   % MAKE SKIP CHAR ADJUSTMENT TO
                DI := DI + ADJST;          % DESTINATION STRING ADDRESS
                DS := LNGTH DEC;           % CONVERT AND MOVE SEQ TO OUTPUT
            END SEQPLUG;
        STREAM PROCEDURE CMOVE (CMF,CMT,CMSKS,CMSKD,CML);
            VALUE CMSKS,CMSKD,CML;
            BEGIN
                LOCAL CMWS,CMWD,CMW;
                SI := LOC CMSKS;  DI := LOC CMWS;
                DI := DI + 1;  DS := 7 CHR;
                SI := LOC CMSKD;  DI := LOC CMWD;
                DI := DI + 1;  DS := 7 CHR;
                SI := LOC CML;  DI := LOC CMW;
                DI := DI + 1;  DS := 7 CHR;
                SI := CMF;  SI := SI + CMSKS;
```

```
            CMWS(2(SI := SI + 32));
            DI := CMT;  DI := DI + CMSKD;
            CMWD(2(DI := DI + 32));
            CMW(2(DS := 32 CHR));
            DS := CML CHR;
        END CMOVE;
PROCEDURE TAGREAD (LXINDEX);
        ARRAY LXINDEX[0];
        BEGIN
            INTEGER I,J;

            ARRAY INTBLK [0:BLKSZ - 1];
            FOR I := 0 STEP 1 UNTIL 4 DO
            BEGIN
                READ (INPUT[ADDR + I],BLKSZ,INTBLK[*]);
                CMOVE (INTBLK[*],LXINDEX[*],0,(I × 240),240);
            END;
            PREVBLK := 0;          % FORCE DATA BLOCK READ
        END OF TAGREAD;

REAL ARRAY  L1INDEX  [0:L1L2WRDS - 1];
REAL ARRAY  L2INDEX  [0:L1L2WRDS - 1];
REAL ARRAY  DATAREC  [0:VALRLN - 1];
REAL ARRAY  WORKREC  [0:VALRLN - 1];
ADDR := 0;
TAGREAD (L2INDEX[*]);
IF NOT ARIMSFILE (L2INDEX[*],L2ID,"VISTAII")
THEN
BEGIN
        ERRITE (4);               % NOT A RIMS FILE
        GO TO PROGEXIT;
END;
IF L2INDEX[L2TYP] ≠ DATA
THEN
BEGIN
        IF (L2INDEX[L2TYP] = COBOL OR L2INDEX[L2TYP] = GP300)
        THEN
        BEGIN
            IF L2INDEX[L2TYP] = COBOL
            THEN
            BEGIN
                ADJUST := CASEQADJST;
                SHIFT := LENGTH := CSEQLN;
            END
            ELSE
            BEGIN
                ADJUST := GPSEQADJST;
                SHIFT := ADJUST + LENGTH := GASEQLN;
            END
        END
        ELSE
        BEGIN
            ADJUST := AFSEQADJST;
            LENGTH := AFSEQLN;
        END;
END;
FOR L2 := 0 STEP 1 WHILE L2 LSS L2INDEX[L2CNT] DO
 RECS := RECS + L2INDEX[L2].[L1TCNT];  % COUNT DATA RECORDS IN
RECS := RECS DIV 15;
RECS := (RECS × 15) + 15;
PREVBLK := 0;
BEGIN
        FILE OUTFYLE DISK SERIAL [20:RECS] (1,VALRLN,150,SAVE 99);

        FILL OUTFYLE WITH OUTMFID,
```

```
                    OUTID;
    FOR L2 := 0 STEP 1 WHILE L2 LSS L2INDEX[L2CNT] DO
    BEGIN
        ADDR:=(1 + L2 + L2 × ((L1NRM × VALRLN) DIV L1L2WRDS)) × 5;
        TAGREAD (L1INDEX[*]);
        FOR L1 := 0 STEP 1 WHILE L1 LSS L2INDEX[L2].[L1TCNT] DO
        BEGIN
            IF ADDR:=((IX:=L1INDEX[L1].[RELREC]) DIV 3) ≠ PREVBLK
            THEN
            BEGIN
                READ (INPUT[ADDR]);
                PREVBLK := ADDR;
            END;
            CMOVE (INPUT(0),DATAREC[*],
                                   (IX := (IX MOD 3) × 80),0,80);
            IF L2INDEX[L2TYP] ≠ DATA
            THEN
            BEGIN
                IF L2INDEX[L2TYP]=COBOL OR L2INDEX[L2TYP]=GP300
                THEN
                BEGIN
                    IF L2INDEX[L2TYP] = GP300
                    THEN
                    BLANKOUT (WORKREC[*],1);
                    CMOVE (DATAREC[*],WORKREC[*],
                                             0,SHIFT,(80 - SHIFT));
                    CMOVE (WORKREC[*],DATAREC[*],0,0,80);
                END;
                SEQPLUG (L1INDEX[L1].[SEQNO],DATAREC[*],
                                                   ADJUST,LENGTH);
            END;
            WRITE (OUTFYLE,VALRLN,DATAREC[*]);
        END;
    END;
    LOCK (OUTFYLE);
  END;

END;

PROGEXIT:
 WHEN (1);
END OF TOSEQ.
```

X. CLEANUP PROGRAM

1. Function of Program

This file is executed to remove deleted records from a RIMS Indexed file. In order to conserve computer time, the program should only be executed when an error message FILE FULL is displayed by RIMS or when the user knows the file contains an extraordinary number of deleted records.

The control cards necessary to execute the Cleanup program are as follow:

? USER This contains the user code and is required from the card reader only.

CC EXECUTE RIMS/CLEANUP

CC FILE INPUT This contains the prefix/suffix of the RIMS file.

CC END.

The requirements for execution of the program are that the input file must exist and not be in use by any user. Finally, the user must be a valid user of the input file.

2. Program Listing

The Clean-up program, written in extended ALGOL, is as follows. The program may be compiled at any compiler adapted to receive the language.

```
                    BEGIN

                    ARRAY     SRCH[0:6];
                    FILE INPUT DISK RANDOM "#/,-:+%" "+/@][<+" (1,30);
DEFINE          RECSIZ = 10 #,  % RIMS REC. SIZE (NOT ACTUAL)
                BLKSIZ = 30 #,  %ACTUAL REC. & BLK. SIZE
                BIGNDX = 149#,  %(NO. OF LEVEL 1,2 TAGS)-1
                MAXDREC= 3  #,  %BLKSIZ/RECSIZ
                NUMEXT = 20 #,  %NO. OF EXTENTS IN OUTPUT FILE
                SIZEXT = 170#,  %SIZE OF EXTENTS IN OUTPUT FILE
                TRECPBL= 14 #,  % (NO. OF RIMS REC./LEVEL 1,2 INDEX)-1
                LITNDX = 9  #,  % RECSIZ - 1
                MAXLIT = 120#;  %MAX. NO. OF LEVEL 1,2 TAGS/INDEX
FILE OUTPUT DISK RANDOM [NUMEXT:SIZEXT] "X       " "Y       " (1,BLKSIZ,
                SAVE 30);
FILE OUT LINE DISK SERIAL [20:60] "CLEANUP" "ERRORS " (1,10,30,SAVE 30);
FILE OUT PRINT 15 "CLEANUP" "ERRORS " (1,10);
SWITCH FILE ERRORFILE := PRINT, LINE;
                    LABEL      TRY;
TRY:    SEARCH(INPUT,SRCH[*]);
        IF SRCH[6] GTR 0 THEN
             BEGIN
             WHEN(30);
             GO TRY;
             END;
            BEGIN
COMMENT
UTILITY     RIMS/CLEANUP
          CLEANUP MAY BE USED TO RE-ORGANIZE A USED RIMS-INDEXED FILE.
     THE RE-ORGANIZATION INVOLVES
       (1) OMITTING ALL DATA RECORDS THAT ARE NO LONGER IN USE
       (2) PLACING 120 LEVEL 1 TAGS IN EACH LEVEL 1 TAG INDEX
       (3) UPDATING THE LEVEL 2 TAG INDEX AND COUNT
       (4) ARRANGING THE DATA RECORDS TO FOLLOW THEIR CORRESPONDING
          LEVEL 1 TAG INDEX
     IN ORDER TO USE THE PROGRAM, THE FOLLOWING CARDS MUST BE USED -
            EXECUTE RIMS/CLEANUP
            FILE INPUT=MULTIFID/FID
            END
     USES:    RIMS-INDEXED DATA FILE
     CHANGES: ORGANIZATION OF RIMS-INDEXED FILE
     CALLS:   NONE
     ERRORS: NOT A RIMS FILE
             NO FILE CARD FOUND FOR INPUT
             INVALID USER -- CANNOT ACCESS INPUT FILE
             INPUT FILE NOT IN DIRECTORY        ;
REAL            MFID,FID;

INTEGER         OUTCT,L1PTR,CNT2,L1PTRI,UTILREC,WHRWSI,CASGO,ERFIL;
FORMAT OUT MESS("FILE ",A1,A6,"/",A1,A6," CONTAINS IRRECOVERABLE ERRORS

 -- PLEASE RE CREATE"),
  FMTSEP(80"-"/),
  FMTHEAD("ERRORS FOUND IN RIMS/CLEANUP:");

BOOLEAN         ERRIND, NEWNAME;
LABEL           ENDALL,  FLGBIT;
ARRAY      L2TAG[0:BIGNDX],STAT[0:7],RWRK,WWRK[0:BLKSIZ-1],
                OSRCH[0:6];
MONITOR         FLAG;
%
%
STREAM PROCEDURE WMOVE(WMF,WMT,WML);
```

```
      COMMENT
          WMOVE MOVES WML (LENGTH) WORDS FROM WMF (FROM ADDRESS TO
      WMT (TO ADDRESS).  IT FIRST SETS LOCAL VARIABLE WMW (WORDS) TO
      WML DIV 64 AND MOVES WMW x 64 WORDS.  THEN IT MOVES MWL MOD 64
      WORDS.
      USES: NONE
      CHANGES: *WMT
      CALLS: NONE
      ERRORS: NONE;
      VALUE WML;
      BEGIN
          LOCAL WMW;
          SI := LOC WML;  DI := LOC WMW;
          DI := DI + 1;  DS := 7 CHR;
          SI := WMF;  DI := WMT;
          WMW ( 2 ( DS:= 32 WDS ));  DS := WML WDS;
      END OF WMOVE;
PROCEDURE VREAD(VREC,STOR,WHERE);
    COMMENT
       "VREAD" IS USED FOR ALL READING OF THE FILE "INPUT".
    IT CONVERTS THE RIMS RECORD REQUESTED TO THE ACTUAL REC.
    CONTAINING IT.  IF THE NEEDED ACTUAL REC. WAS THE LAST
    ONE READ, THEN THERE IS NO NEED TO RE-READ IT.  IF THE
    REQUESTED RIMS REC. IS NOT IN "RWRK", THEN IT IS READ-IN.
    SINCE A RIMS REC. IS 10 WDS. LONG, AND AN ACTUAL REC.
    IS 30 WDS. LONG, THE REQUESTED 10 WDS. BEGINS AT POS. 0,
    10, OR 20 IN "RWRK" - THE BEGINNING POS. IS "INREC".
    THE STARTING POINT FOR THE STORE IS STOR[WHERE].  PROCEDURE
    "WMOVE" (TAKEN FROM RIMS MPP) IS USED TO TRANSFER THE
    DATA -- FLAG BITS ARE ALLOWED.    ;
   VALUE          VREC,     WHERE;
   INTEGER         VREC,     WHERE;
   ARRAY                STOR[*];
          BEGIN
   INTEGER        I,INREC;

   LABEL          ERR,NOERR;
          IF (VREC DIV MAXDREC) NEQ UTILREC THEN
              BEGIN
              UTILREC := VREC DIV MAXDREC ;
              READ(INPUT[UTILREC],BLKSIZ,RWRK[*])[ERR:ERR];
              END;
          INREC := (VREC MOD MAXDREC) x RECSIZ ;
        WMOVE( RWRK[INREC], STOR[WHERE], RECSIZ );
          GO TO NOERR;
   ERR:   ERRIND := TRUE ;
   NOERR: END OF VREAD;


%
%
%
%
PROCEDURE VWRITE(VREC,SORC,WHERE);
    COMMENT
       "VWRITE" IS USED FOR ALL WRITING ON THE FILE "OUTPUT".
    IT FIRST CONVERTS THE RIMS REC. TO-BE-WRITTEN TO THE
    CORRESPONDING ACTUAL REC.   SINCE RIMS RECS. ARE
    10 WDS. LONG, & ACTUAL RECS. ARE 30 WDS LONG, AN IMPLICIT
    READ-BEFORE-WRITE IS REQUIRED (IF THE ACTUAL REC. WASNT
    THE LAST ONE WRITTEN).  IF THE EXISTING ACTUAL REC.
    CONTAINING THE RIMS REC. TO-BE-REPLACED WAS NOT THE
    LAST ONE READ. THEN THAT REC. IS READ INTO "WWRK".
    AS IN "VREAD", THE STARTING POINTS ARE "INREC" & "WHERE".
    PROCEDURE "WMOVE" IS USED TO REPLACE 10 WDS. AT
    WWRK[INREC] BY 10 WDS. AT SORC[WHERE].  FINALLY, "WWRK"
```

```
 IS WRITTEN ON "OUTPUT",    ;
VALUE            VREC,     WHERE;
INTEGER          VREC,     WHERE;
ARRAY                  SORC[*];
        BEGIN
LABEL       EOFLBL,NOEOF;

INTEGER          I,INREC;
        IF (VREC DIV MAXDREC) NEQ WHRWSI THEN
            BEGIN
            WHRWSI := VREC DIV MAXDREC ;
            READ(OUTPUT[WHRWSI],BLKSIZ,WWRK[*])[EOFLBL];
            GO TO NOEOF;
 EOFLBL:    FOR I:=0 STEP 1 UNTIL BLKSIZ-1 DO
                WWRK[I]:=0;
NOEOF:      END;
        INREC := (VREC MOD MAXDREC ) × RECSIZ ;
      WMOVE ( SORC[WHERE], WWRK[INREC], RECSIZ );
        WRITE(OUTPUT[WHRWSI],BLKSIZ,WWRK[*]);
        END OF VWRITE;

%
%    FIRST EXECUTABLE STATEMENT OF CLEANUP
  ERRIND := FALSE;
  UTILREC := WHRWSI := -100;
  FLAG := FLGBIT;
%-----------------------------
  BEGIN   %    BIG BLOCK I
LABEL           ENDBI,ERR;

INTEGER         I,GROUP,NUSR;
%
PROCEDURE ERROR(ER);
  COMMENT
     "ERROR" IS USED TO TYPE ERROR MESSAGES TO THE USER.
  BLOCK I HAS ALREADY DECIDED WHETHER "NOTSPO" IS TRUE
  (USER AT REMOTE TERMINAL) OR FALSE (USER AT SPO).  THE
  ARGUMENT "USR" POINTS TO THE BUFFER ADDRESS (IN STATUS
  ARRAY) OF THE REMOTE TERMINAL USER.  ARG. "ER" INDICATES
  WHICH ERROR WAS MADE (SEE SWITCH FORMATS FOR CORRESPONDENCE).
  THE ERROR INDICATOR "ERRIND" IS TURNED-ON (TRUE) TO SIGNIFY
  THE ERROR OCCURRENCE.     ;
 VALUE      ER;
 INTEGER      ER;
       BEGIN
 SWITCH FORMAT FMTER:=


                ("NO FILE CARD FOUND FOR INPUT"),
                ("NOT A RIMS FILE"),
                ("INVALID USER -- CANNOT ACCESS INPUT FILE"),
                ("INPUT FILE NOT IN DIRECTORY");

SEARCH(LINE,STAT[*]);
IF STAT[1] EQL "CLEANUP" AND STAT[2] EQL "ERRORS " THEN
     ERFIL := 0
ELSE
     BEGIN
     IF STAT[0] NEQ -1 THEN
         BEGIN
         WRITE(LINE[STAT[5]+1],FMTSEP);
         WRITE(LINE,FMTHEAD);
         END;
     ERFIL := 1;
     END;
```

```
                WRITE(ERRORFILE[ERFIL],FMTER[ER]);
          ERRIND:=TRUE;
          END OF ERROR;

REAL STREAM PROCEDURE ALPH(T);
   VALUE        T;
        BEGIN
        SI := LOC T;
        DI := LOC ALPH;      DI := DI + 1;
        DS := 7 DEC;
        END ALPH;
%
%       START EXECUTION IN BIG BLOCK I
        SEARCH(OUTPUT,OSRCH[*]);
        IF OSRCH[1] NEQ "X       " OR OSRCH[2] NEQ "Y       " THEN
            NEWNAME := TRUE
        ELSE
        FILL OUTPUT WITH *, OSRCH[2]:=ALPH(TIME(1));
        GROUP:=31;
        OUTCT:=0;
        CNT2:=-1;
        L1PTR:=15;
        L1PTRI:=15;
        MFID:=SRCH[1];
        FID:=SRCH[2];
        IF MFID = "≠/,-:+%" AND FID = "+/#][<+" THEN
            %  NO FILE INPUT CARD
            BEGIN
            ERROR(0);
            GO TO ENDALL;
            END;
        IF SRCH[0] EQL -1 THEN
            % INPUT FILE NOT IN DIRECTORY
            BEGIN
            ERROR(3);
            GO ENDALL;
            END;
        IF SRCH[0] ≠ 7 AND (NOT NEWNAME) THEN
            % INVALID USER
            BEGIN
            ERROR(2);
            GO ENDALL;
            END;
        NUSR := STATUS(0,3);
        SEARCH(INPUT,SRCH[*]);
        CASGO ← (IF SRCH[0] ≠ 0 THEN
                    IF SRCH[0] ≠ 7 THEN
                        (SRCH[0]-1)
                    ELSE
                        (3)
                ELSE
                    (0));
        NUSR:=STATUS(0,4);
        FOR I:=0 STEP 1 UNTIL TRECPBL DO
            VREAD(I,L2TAG,I×RECSIZ);
        IF ERRIND THEN GO TO ERR;
        IF L2TAG[75] ≠ "VISTAII" THEN
            %  NOT A RIMS-INDEXED FILE
            BEGIN
ERR:        ERROR(1);
            GO TO ENDALL;
            END;
ENDBI:  END          BIG BLOCK I;

%---------------------------
```

```
   BEGIN        %   BIG BLOCK II;
REAL            QU,SL;

INTEGER         I,J,L2CTIN,INCT,OUTDPTR;
ARRAY           L2TAGO,L1TIN,L1TOUT[0:BIGNDX];
LABEL           OK,ENDBII,CAST,SE0,SE1,SE2;
PROCEDURE TWRITE(CNT,L1T);
   COMMENT
      "TWRITE" IS USED TO WRITE A LEVEL 1 TAG INDEX ALONG
   WITH ITS CORRESPONDING DATA RECS.  EACH LEVEL 1 TAG
   CONTAINS THE RIMS REC. AT WHICH ITS DATA MAY BE FOUND
   (FILE "INPUT").  PROCEDURE "VREAD" IS USED TO FETCH THE
   REC.   THE LEVEL 1 TAG IS THEN UPDATED TO CONTAIN THE
   RIMS REC. LOCATION ON FILE "OUTPUT".  THE LEVEL 1 TAGS
   IMMEDIATELY PRECEDE THEIR CORRESPONDING DATA RECS. &
   SEQUENCE CORRESPONDENCE IS FORCED (I.E. THE FIRST LEVEL 1
   TAG POINTS TO THE FIRST DATA REC.,  ETC.).   ;
   VALUE        CNT;
   INTEGER      CNT;
   ARRAY        L1T[0];
      BEGIN
   DEFINE       PTR  =  L1PTR  #;

   ARRAY        WORK[0:L1TNDX];
   INTEGER      DPTR,I,J;
           OUTDPTR:= PTR + 15;
           FOR I:=0 STEP 1 UNTIL CNT-1 DO
               BEGIN
               DPTR := L1T[I].[34:14];             % DATA REC. POINTER
               VREAD(DPTR,WORK,0);
               L1T[I].[34:14] := OUTDPTR;
               VWRITE(OUTDPTR,WORK,0);
               OUTDPTR := OUTDPTR + 1;
               END;
           FOR I:=CNT STEP 1 UNTIL BIGNDX DO L1T[I]:=0;
           FOR I:=0 STEP 1 UNTIL TRECPBL DO
               VWRITE(PTR + I, L1T, I × RECSIZ);
           PTR:= PTR + 15 + MAXL1T
       END OF PROCEDURE TWRITE;

%
STREAM PROCEDURE PLACE(CHARAC,POS);
        BEGIN
          SI:=CHARAC;      SI:=SI+7;
          DI:=POS;
          DS:=CHR;
       END OF STREAM PROCEDURE PLACE;
%
%        START EXECUTION IN BIG BLOCK II
        L2CTIN := L2TAG[77];
        FOR I:=0 STEP 1 UNTIL L2CTIN-1 DO
            BEGIN
            INCT := L2TAG[I].[40:8];               % L1 TAG COUNT
            FOR J:=0 STEP 1 UNTIL TRECPBL DO
                VREAD(L1PTRI + J, L1TIN, J × RECSIZ);
            L1PTRI := L1PTRI + 15 + MAXL1T;        % INP L1 TAG PTR
            FOR J:=0 STEP 1 UNTIL INCT-1 DO
                BEGIN
                L1TOUT[OUTCT] := L1TIN[J];         % L1 TAG STORE
                OUTCT := OUTCT + 1;
                IF OUTCT LSS MAXL1T THEN GO TO OK;
                TWRITE(OUTCT,L1TOUT);              % DUMP FULL BLK
                OUTCT := 0;
                CNT2 := CNT2 + 1;                  % BUMP L2 TAG COUNTER
                L2TAGO[CNT2] := 0 & L1TOUT[MAXL1T-1][11:11:20]
```

```
                                    & MAXL1T[40:40:8];
           OK: END;
           END;
        IF OUTCT EQL 0 THEN GO TO ENDBII;
        CNT2 := CNT2 + 1;
        L2TAGO[CNT2]:= 0 & L1TOUT[OUTCT-1][11:11:20]
                          & OUTCT[40:40:8];
        TWRITE(OUTCT,L1TOUT);
ENDBII: WMOVE(L2TAG[76],L2TAGO[76],(BIGNDX-75));
        L2TAGO[75] := "VISTAII";
        L2TAGO[87]:=OUTDPTR - 1;
        L2TAGO[77] := CNT2 + 1;          % RESET L2 TAG COUNT
        FOR I:=0 STEP 1 UNTIL TRECPBL DO
            VWRITE(I,L2TAGO,I × RECSIZ);
        QU := """;
        SL := "/";
        LOCK(OUTPUT);
SEO:    SEARCH(OUTPUT,L1TIN[*]);
        IF L1TIN[0] EQL -1 THEN
            BEGIN
            WHEN(2);
            GO SEO;
            END;
        IF NEWNAME THEN
            BEGIN
            MFID := OSRCH[1];
            FID := OSRCH[2];
            GO CAST;
            END;
        CLOSE(INPUT,PURGE);
        FILL L1TIN[*] WITH "CC  CHAN","GE      ",0,"   /    ",

                0,"   TO   ",0,"   /    ",0,"  ;END. ";

        L1TIN[2] ← OSRCH[1];
        L1TIN[4] ← OSRCH[2];
        L1TIN[6] ← MFID;
        L1TIN[8] ← FID;
        FOR I←2 STEP 1 UNTIL 9 DO PLACE(QU,L1TIN[I]);
SE1:    SEARCH(INPUT,OSRCH[*]);
        IF OSRCH[0] NEQ -1 THEN
            BEGIN
            WHEN(2);
            GO SE1;
            END;
         ZIP WITH L1TIN[*];
CAST:    CASE CASGO OF
            BEGIN
            GO ENDALL;
            SL ← "C INFO ";
            SL ← "CPUBLIC";
            SL ← "C FREE ";
            END;


         FILL STAT[*] WITH 0,0,"   /    ",0,"  ;END. ";


         STAT[0] ← SL;
         STAT[1] ← MFID;
         STAT[3] ← FID;
         FOR I←1 STEP 1 UNTIL 4 DO PLACE(QU,STAT[I]);
         QU := "C";
         PLACE(QU,STAT[0]);
         I ← 0;
```

```
SE2:     SEARCH(OUTPUT,OSRCH[*]);
         IF OSRCH[6] NEQ 0 THEN
             BEGIN
             WHEN(2);
             GO (IF (I ← I+1) GTR 30 THEN ENDALL ELSE SE2);
             END;
         ZIP WITH STAT[*];;
  END                   BIG BLOCK II;

%----------------------------------
   GO ENDALL;
FLGBIT:    LOCK(INPUT);
   CLOSE(OUTPUT,PURGE);
   SEARCH(LINE,STAT[*]);
   IF STAT[1] EQL "CLEANUP" AND STAT[2] EQL "ERRORS " THEN
          ERFIL := 0
   ELSE
          BEGIN
          IF STAT[0] NEQ -1 THEN
              BEGIN
              WRITE(LINE[STAT[5]+1],FMTSEP);
              WRITE(LINE,FMTHEAD);
              END;
          ERFIL := 1;
          END;
   WRITE(ERRORFILE[ERFIL],MESS,MFID,[6:6],MFID,FID,[6:6],FID);
ENDALL:
                           END;

END OF CLEANUP.
```

As readily appreciated by those skilled in the art, a given computer program can be written in any one of a plurality of languages. The invention claimed herein, though directed to programs written to ALGOL, is not restricted to programs in that language. Rather, the only limitations of this invention are found in the claims.

What we claim is:

1. In a method of operating a digital computer connected in a network with one or more user's remote terminals, the steps of controlling
   a determination of whether any user is prepared to communicate with the computer,
   a wait period of predetermined duration if no user is found so prepared,
   a determination of which user is so prepared if some user is previously determined to be prepared,
   an analysis of the communication from the user so prepared, and,
   processing of the communication according to parameters established by the prior analysis.

2. The method of claim 1, further comprising the step of controlling
   a termination of the program if no users are determined to be prepared to use the system during the predetermined wait period.

3. The method of claim 2, wherein said step of controlling a program termination includes the step of controlling
   updating of all program logs,
   and, updating and closing of data files, where appropriate.

4. The method of claim 1, wherein the step of controlling an analysis of the communication from the user includes the step of controlling
   a determination of the class of prior communication from the same user.

5. The method of claim 1, further comprising the step of controlling
   a determination of whether another user is prepared to communicate with the computer following the end of said processing step.

6. The method of claim 1, wherein said step of controlling processing includes the step of controlling
   processing of said communication by a subprogram identified by the content of said communication.

7. The method of claim 1, wherein said step of controlling processing includes the step of controlling
   a determination of whether the format of said communication is correct or incorrect.

8. The method of claim 7, further comprising the step of controlling
   transmission of an appropriate error message to the user communicating with the computer if it is determined that the format of said communication is incorrect.

9. The method of claim 1, wherein said step of controlling processing includes the step of controlling
   a determination of whether the user communicating with the computer previously satisfied conditions precedent to further communication.

10. The method of claim 1, wherein,
   the step of controlling an analysis of the communication from the user includes the step of controlling a determination of the class of prior communication from the same user,
   the step of controlling processing includes the steps of controlling
   processing of said communication by a subprogram identified by the content of said communication, and
   a determination of whether the format of said communication is correct or incorrect, and, further comprising the steps of controlling a termination of the program if no users are determined to be prepared to use the system during the predetermined wait period, and controlling a determination of whether another user is prepared to communicate with the computer following the end of said processing step.

11. The method of claim 1, further comprising the step of initially controlling the setting of values and switches and determining the existence of an allocated storage area.

12. The method of claim 11, further comprising the step of controlling a determination of whether the steps of the method of controlling the digital computer are to be continued.

13. The method of claim 1, wherein said step of controlling a determination of whether any user is prepared to communicate with the computer comprises the steps of controlling an examination of a computer-generated binary word in which the value of each bit is set by whether a predetermined user is ready to communicate with said computer, and, a first determination of whether all of said bits are in a first binary state or whether one or more is in a second binary state.

14. The method of claim 13, wherein said step of controlling a wait period comprises the steps of controlling a halt in the operation of said computer in accordance with said method following a determination that said bits are all in a state indicative of no user being prepared to communicate with said computer, and, a determination of the length of time of said halt.

15. The method of claim 14, further comprising the step of controlling an ending of said wait period where the length of said period is determined to have reached said predetermined duration.

16. The method of claim 15, wherein said step of controlling a determination of the length of time of said halt further comprises the step of controlling a second determination of whether all of said bits are in a first state or whether one or more is in a second state.

17. The method of claim 16, wherein said step of controlling a determination of which user is so prepared comprises the steps of controlling an examination of the state of one of said bits in said computer-generated binary word, a determination of whether all of said bits have been so examined, and, a determination of the state of the examined bit.

18. The method of claim 17, further comprising the step of controlling a time determination following either the step of controlling an ending of said wait period or the step of controlling a determination of whether all of said bits have been so examined when the answer is in the affirmative, said time determination being a computation of the elapsed time since the prior such determination.

19. The method of claim 17, further comprising the step of controlling an examination the state of a further one of said bits in said computer-generated binary word if it was determined after the prior such examination that not all of said bits had been so examined and if the state of the bit so previously examined had been found to indicate that the corresponding user was not prepared to communicate with the computer.

20. The method of claim 18, further comprising the step of controlling a determination of whether said computation of the elapsed time since the prior such determination found a time difference of more or less than a predetermined amount.

21. The method of claim 20, further comprising the step of controlling an entry in storage of the current date and time if said determination of said time difference finds a difference of more than said predetermined amount.

22. The method of claim 21, further comprising the step of controlling a further of said determinations of whether any user is prepared to communicate with the computer following either the entry in storage of the current date and time or the determination that said time difference is less than said predetermined amount.

23. The method claim 1, wherein said step of controlling an analysis of the communication from the user so prepared comprises the steps of controlling an assignment of an identity code in storage relating to the user found so prepared to the method currently operating said computer, and, a determination of the content of a binary program word which indicates the class of prior communication from the same user.

24. The method of claim 1, wherein said step of controlling an analysis of the communication from the user so prepared comprises the steps of controlling a determination of the class of prior communication from the same user, and, an analysis of said communication to ensure that it is stated in accordance with a predetermined format.

25. The method of claim 24, further comprising the step of controlling a determination of whether said communication contains data to be entered into storage by said digital computer or a command for execution by said digital computer.

26. The method of claim 24, wherein said step of controlling an analysis of said communication to ensure that it is stated in accordance with a predetermined format comprises the steps of controlling reading of individual portions of said communication, and, comparing each of the portions so read with previously entered and stored lists of acceptable communication portions.

27. The method of claim 26, further comprising the step of controlling the transmission of a proper message to the user entering said communication if it is determined by said comparing step that any one of the portions entered is not found in the previously entered and stored lists of acceptable communication portions.

28. The method of claim 1, further comprising the steps of controlling a determination of whether the entered communication is correctly formatted, a determination of whether the entered communication is data or a command if it is found to be properly formatted, and, storage of the communication if it s found to be data, or, processing of the communication if it is found to be a command.

29. The method of claim 28, further comprising the steps of controlling transmission of an error message to the terminal from where the communication was entered if the format is determined to be incorrect, and termination of the program following transmission of said message.

30. The method of claim 28, wherein the step of controlling processing includes the step of controlling an analysis of the command to establish parameters based upon the type of command.

31. The method of claim 30, further comprising the step of controlling execution of subprogram selected by parameters established by said analysis.

32. The method of claim 31, wherein execution of the subprogram selected by said parameters controls execution by said computer of a further program.

33. The method of claim 1, wherein said step of controlling processing of the communication according to parameters established by the prior analysis comprises the step of controlling the storage of data contained in said communication in a predetermined location.

34. The method of claim 33, wherein said communication consists of data to be stored in a file of predetermined size with associated index tags, wherein said step of controlling the storage of data comprises the steps of controlling a determination of whether the entered data is in a correct or an incorrect format, a determination of whether the file in which the data is to be entered has sufficient space to accept the data, if it is determined that the file is in a correct format, creation of the proper index tags according to a predetermined indexing scheme if it is determined that the file has sufficient space to accept the data, and, placing the data and created tags in appropriate storage locations.

35. The method of claim 34, further comprising the step of controlling transmission of an appropriate response to the terminal having entered the data to indicate successful completion of the entry following placing of the data and created tags in said appropriate storage locations.

36. The method of claim 34, further comprising the step of controlling a determination of whether the user who entered the data at the remote terminal is an authorized user of the terminal.

37. The method of claim 36, further comprising the step of controlling transmission of an appropriate error response to the terminal from which the data was entered if it is determined that the entered data is in an incorrect format, or the file in which the data is to be entered has insufficient space to accept the data, or the user who entered the data is not an authorized user of the file.

38. The method of claim 1, wherein said step of controlling a processing of the communication according to parameters established by the prior analysis comprises the step of controlling a validation of the right of the user to use the terminal from which the communication was entered.

39. The method of claim 38, wherein said step of controlling a validation comprises the steps of controlling a determination of whether the communication is in a correct or an incorrect format, a determination of whether the user who entered the command is authorized to use the program, a determination of whether the entry follows a restart for the user, and, transmission of the appropriate error message to the terminal at which the entry was made at the conclusion of each of the above determinations.

40. The method of claim 1, wherein said step of controlling processing of the communication according to parameters established by the prior analysis comprises the step of controlling the release of storage areas which a terminal user had previously reserved for storage of entered data.

41. The method of claim 1, wherein said step of controlling processing of the communication according to parameters established by the prior analysis comprises the step of controlling the execution of a previously stored program by said computer.

42. The method of claim 41, wherein said step of controlling the execution of a previously stored program comprises the steps of controlling a determination of whether the communication entered is in a correct or an incorrect format.

creation of control cards for communicating with the operating system program if it is determined that the entered communication is in the correct format, and, transmission of the control cards to the operating system program to control the beginning of execution of the stored program.

43. The method of claim 42, further comprising the step of controlling a determination of whether the file named in the entered communication exists.

44. The method of claim 43, further comprising the steps of controlling transmission of an error message if the file named in the entered communication is found not to exist, and, termination of the program following transmission of said message.

45. The method of claim 42, further comprising the step of controlling a determination of whether the user who entered the communication in a valid user of the program.

46. The method of claim 45, further comprising the step of controlling transmission of an error message to the terminal where the communication was entered if the user who entered the communication is determined not to be an authorized user of the program.

47. The method of claim 42, further comprising the steps of controlling a determination of whether the file named in the entered communication to be copied is in use by another user, and, if it is determined to be in use, a determination of whether the file is in the class of files which may be used by only one user at a time.

48. The method of claim 47, further comprising the step of controlling transmission of an error signal to the terminal from where the communication was entered if it is determined that the file is in use and is in the class of files which may be used by only one user at a time.

49. The method of claim 42, further comprising the step of controlling storage of data corresponding to said created control cards so that the control cards will not be lost in the event of a malfunction of the computer.

50. The method of claim 42, further comprising the steps of controlling transmission of a message to the terminal from which the communication was previously entered at the successful completion of the communication, said message indicating the successful completion to the user, and, termination of the program upon transmission of said message.

51. The method of claim 42, further comprising the steps of controlling a determination of whether the file named in the entered communication to be executed exists, transmission of an error message to the terminal from which the communication was entered if the file named in the entered communication is found not to exist, a determination of whether the file named in the entered communication to be copied is in use by another user, if it is found to be in use, a determination of whether the file is in the class of files which may be used by only one user at a time, storage of data corresponding to said created control cards so that the control cards will not be lost in the event of a malfunction of the computer, and, termination of the program upon transmission of said message.

52. The method of claim 1, wherein said step of controlling processing of the communication according to parameters established by the prior analysis comprises the steps of controlling an assignment of changed sequence reference numbers to previously stored units of data, and, storage of said changed sequence reference numbers in association with said previously stored units of data.

53. The method of claim 52, further comprising the steps of controlling a determination as to whether the communication entered at the remote terminal is in a correct or an incorrect format, and, a determination of whether parameters entered with the communication satisfy the criteria defining said parameters.

54. The method of claim 53, further comprising the step of controlling an initial determination as to whether the named file is available to have its sequence reference numbers changed.

55. The method of claim 54, further comprising the step of controlling transmission to the terminal from which the communication was entered on appropriate error message if it is determined that the named file is not available to have its sequence reference numbers changed.

56. The method of claim 52, further comprising the steps of controlling a determination of whether the command entered at the remote terminal is in a correct or an incorrect format, and, a determination of whether parameters entered with the command satisfy the criteria defining said parameters.

57. The method of claim 56, further comprising the step of controlling an initial determination as to whether the named file is available to have its sequence reference numbers changed.

58. The method of claim 1, wherein the step of controlling processing of the communication according to parameters established by the prior analysis comprises the step of controlling a predetermined number of units of previously stored data to be transmitted for display to the terminal from which the communication was entered.

59. The method of claim 1, wherein the step of controlling processing of the communication according to parameters established by the prior analysis comprises the step of controlling the copying of all indexing information and sequence reference numbers from the file of data named by the communication into a new storage location.

60. In a method of operating a digital computer connected in a network with one or more user's remote terminals, wherein a user enters a communication from a terminal, the steps of controlling a determination of whether the entered communication is correctly formatted, a determination of whether the entered communication is data or a command if it is found to be correctly formatted, storage of the communication if it is found to be data, or processing of the communication if it is found to be a command.

61. The method of claim 60, further comprising the steps of controlling transmission of an error message to the terminal from where the communication was entered if the format is determined to be incorrect, and termination of the program following transmission of said message.

62. The method of claim 60, further comprising the step of controlling termination of the program following completion of the step in response to the determination of whether the entered communication is data or a command.

63. The method of claim 60, wherein the step of controlling processing includes, controlling an analysis of the command to establish parameters based upon the type of command.

64. The method of claim 63 further comprising the step of controlling execution of a subprogram selected by parameters established by said analysis.

65. The method of claim 64, wherein execution of the subprogram selected by said parameters controls execution by said computer of a further program.

66. A method of claim 60, wherein said step of controlling processing includes the initial step of controlling a determination of whether the user communicating with the computer previously satisfied conditions precedent to further communication.

67. The method of claim 66, further comprising the step of controlling transmission of an error message to the terminal from which the command was entered if it is determined the conditions precedent were not satisfied.

68. The method of claim 60, wherein, the step of controlling processing includes controlling an analysis of the command to establish parameters based upon the type of command, and further comprising the step of controlling transmission of an error message to the terminal from where the communication was entered if the format is determined to be incorrect, the step of execution of a subprogram selected by parameters established by said analysis.

69. The method of claim 60, wherein the step of controlling a determination of whether the entered communication is correctly formatted includes the step of controlling reading of portions of said communication, and, comparing each of said portions with previously stored tables of acceptable communication portions.

70. The method of claim 69, further comprising the step of controlling a determination of the class of terminal from which the communication was entered.

71. The method of claim 70, further comprising the step of controlling transmission of an error message to the terminal if it is determined by said comparing step that the portion of said communication read does not match any of the previously stored portions.

72. The method of claim 60, wherein said step of controlling processing of the communication if it is found to be a command comprises the steps of controlling a determination of whether the user who entered the command had previously satisfied predetermined conditions precedent to entry of the communication, and, a determination of whether the communication itself constitutes the conditions precedent.

73. The method of claim 72, further comprising the step of controlling transmission of an error signal to the terminal from which the communication was entered if it is determined that the user had not previously satisfied conditions precedent and that the communication does not itself constitute the conditions precedent.

74. The method of claim 60, wherein said step of controlling processing of the communication if it is found to be a command comprises the step of controlling a validation of the right of the user to use the terminal from which the communication was entered.

75. The method of claim 74, wherein said step of controlling a validation comprises the steps of controlling a determination of whether the communication is in a correct or an incorrect format, a determination of whether the user who entered the command is authorized to use the program, a determination of whether the entry follows a restart for the user, and, transmission of the appropriate error message to the terminal at which the entry was made at the conclusion of each of the above determinations.

76. The method of claim 60, wherein said step of controlling processing of the communication if it is found to be a command comprises the step of controlling the release of storage areas which a terminal user had previously reserved for storage of entered data.

77. The method of claim 60, wherein said step of controlling processing of the communication if it is found to be a command comprises the step of controlling the execution of a previously stored program by said computer.

78. The method of claim 77, wherein said step of controlling the execution of a previously stored program comprises the steps of controlling a determination of whether the command entered is in a correct or an incorrect format, creation of control cards for communicating with the operating system program if it is determined that the entered command is in the correct format, and, transmission of the control cards to the operating system program to control the beginning of execution of the stored program.

79. The method of claim 78, further comprising the step of controlling a determination of whether the file named in the entered communication exists.

80. The method of claim 79, further comprising the step of controlling transmission of an error message if the file named in the entered communication is found not to exist, and, termination of the program following transmission of said message.

81. The method of claim 60, wherein said step of controlling processing of the communication if it is found to be a command comprises the steps of controlling an assignment of changed sequence reference numbers to previously stored units of data, and, storage of said changed sequence reference numbers in association with said previously stored units of data.

82. The method of claim 60, wherein said step of controlling processing of the communication if it is found to be a command comprises the step of controlling a predetermined number of units of previously stored data to be transmitted for display to the terminal from which the communication was entered.

83. The method of claim 60, wherein said step of controlling processing of the communication if it is found to be a command comprises the step of controlling the copying of all indexing numbers from the file of data named by the communication into a new storage location.

84. In a method of operating a digital computer connected in a network with one or more user's remote terminals, wherein the user enters a communication from a terminal consisting of data to be stored in a file of predetermined size with associated index tags, the steps of controlling a determination of whether the entered data is in a correct or incorrect format, a determination of whether the file in which the data is to be entered has sufficient space to accept the data, if it is determined that the file is in a correct format, creation of the proper index tags according to a predetermined indexing scheme if it is determined that the file has sufficient space to accept the data, placing the data and created tags in appropriate storage locations.

85. The method of claim 84, further comprising the step of controlling transmission of an appropriate response to the terminal having entered the data to indicate successful completion of the entry following placing of the data and created tags in storage locations.

86. The method of claim 84, further comprising the step of controlling a determination whether the user who entered the data at the remote terminal is an authorized user of the terminal.

87. The method of claim 86, further comprising the step of controlling transmission of an appropriate error response to the terminal from which the data was entered if it is determined that the entered data is in an incorrect format, or the file in which the data is to be entered has insufficient space to accept the data, or the user who entered the data is not an authorized user of the file.

89. The method of claim 84, further comprising the step of controlling a determination as to whether conditions precedent to the entry of the data from the remote terminal were properly satisfied.

88. The method of claim 87, further comprising the step of controlling termination of the program following transmission of any error message or following successful placing of data and created tags in appropriate storage locations.

90. The method of claim 84, wherein said step of controlling a determination of whether the entered data is in a correct or incorrect format comprises the steps of controlling a determination of whether the user had previously satisfied a condition precedent to his entry of said data, a determination of whether the user is allowed to enter data in a file previously named, in accordance with a predetermined criteria, and, a determination of whether the data is accompanied by special indicia required by the program language used.

91. The method of claim 84, wherein said step of controlling a determination of whether the file into which the data is to be entered has sufficient space comprises the step of controlling a determination of the number of said index tags stored in association with said file.

92. In a method of operating a digital computer connected in a network with one or more user's remote terminals, wherein the user enters a Log-In command for a terminal, the steps of controlling a determination of whether the input command is in a correct or an incorrect format, a determination of whether the user who entered the command is authorized to use the program, a determination of whether the entry follows a restart for the user, and transmission of the appropriate message to the terminal at which the entry was made at the conclusion of each of the above determinations.

93. The method of claim 92, further comprising the step of controlling termination of the program following said transmission step.

94. The method of claim 92, wherein said step of controlling a determination of whether the input command is in a correct or an incorrect format comprises the steps of controlling reading of a selected portion of said command, comparing said portion with a table of previously entered acceptable portions, and, a determination of whether the portion read, if said comparing step located a match in said table, was a code which had been predetermined to be required in the read portion for to be proper.

95. In a method of operating a digital computer connected in a network with one or more user's remote terminals, wherein a command requiring execution of a stored program by the computer is entered, the steps of controlling a determination of whether the command entered is in a correct or an incorrect format, creation of control cards for communicating with the operating system program if it is determined that the entered command is in a correct format, and transmission of the control cards to the operating system program to control the beginning of execution of the stored program.

96. The method of claim 95, further comprising the step of controlling a determination of whether the file named in the entered command to be executed exists.

97. The method of claim 96 further comprising the steps of controlling transmission of an error message if the file named in the entered command is found not to exist, and termination of the program following transmission of said message.

98. The method of claim 95, further comprising the step of controlling a determination of whether the user who entered the command is a valid user of the program.

99. The method of claim 98, further comprising the steps of controlling transmission of an error message to the terminal where the command was entered if the user who entered the command is determined not to be an authorized user of the program, and termination of the program following transmission of said message.

100. The method of claim 95, further comprising the steps of controlling a determination of whether the file named in the entered command to be copied is in use by another user, and if it is determined to be in use, a determination of whether the file is in the class of files which may be used by only one user at a time.

101. The method of claim 100 further comprising the steps of controlling transmission of an error signal to the terminal from where the command was entered if it is determined that the file is in use and is in the class of files which may be used by only one user at a time, and termination of the program following transmission of said error message.

102. The method of claim 95, further comprising the step of controlling storage of data corresponding to said created control cards so that the control cards will not be lost in the event of a malfunction of the computer.

103. The method of claim 95, further comprising the steps of controlling transmission of a message to the terminal from which the command was previously entered at the successful completion of the command, said message indicating the successful completion to the user, and termination of the program upon transmission of said message.

104. The method of claim 95, further comprising the steps of controlling a determination of whether the file named in the entered command to be executed exists, transmission of an error message to the terminal from which the command was entered if the file named in the entered command is found not to exist, a determination of whether the file named in the entered command to be copied is in use by another user, if it is found to be in use, a determination of whether the file is in the class of files which may be used by only one user at a time, storage of data corresponding to said created control cards so that the e control cards will not be lost in the event of a malfunction of the computer, and termination of the program upon transmission of said message.

105. In a method of operating a digital computer connected in a network with one or more user's remote terminals, wherein a command requiring resequencing of data records and reassigning sequence numbers to said data records in a stored data file having associated index tags is entered, the steps of controlling a determination as to whether the command entered at the remote terminal is in a correct or an incorrect format, a determination as to whether parameters entered with the command fixing the resequencing satisfy the criteria defining said parameters, creation of index tags referencing said data records and containing resequenced sequence numbers, writing of new index tags in appropriate storage locations.

106. The method of claim 105, further comprising the step of controlling an initial determination as to whether a file is available to the program to be resequenced.

107. The method of claim 106, further comprising the steps of controlling transmission to the terminal from which the command was entered or an appropriate error message if it is determined no file is available to be resequenced, and termination of the program following said transmission.

108. The method of claim 105, further comprising the step of controlling a determination as to whether the user who entered the command is a valid user of the program.

109. The method of claim 108, further comprising the steps of controlling transmission of an error message to the terminal from which the input was entered if it is determined that the user is not a valid user of the program, and termination of the program following said transmission.

110. The method of claim 105, further comprising the steps of controlling a reading of an index block of the file named in the command to be resequenced, and a determination from said reading whether there are data records within said named file to be resequenced,

111. The method of claim 110, further comprising the steps of controlling transmission of an error message to the terminal from which the command was entered if the file is found to have no data records, and termination of the program following said transmission.

112. The method of claim 105, further comprising the step of controlling a determination as to whether said created index tags satisfy the criteria defining such tags.

113. The method of claim 105, further comprising the steps of controlling a determination as to whether a file is available to the program to be resequenced, a determination as to whether the user who entered the command is a valid user of the program, a reading of an index block of the file named in the command to be resequenced, a determination from said reading whether there are data records within said named file to be resequenced, and transmission of an error message to the terminal from which the command was entered if any of the above determinations are answered in the negative.

114. The method of claim 113, further comprising the step of controlling transmission of a message to the terminal having entered the command indicating successful completion of the command upon such completion.

115. In a method of operating a digital computer connected in a network with one or more user's remote terminals from which entries to the computer may be made and to which data may be selectively sent by the computer, the steps of controlling execution of a program for processing entries from remote terminals and outputs to said terminals, a determination as to whether the programs are to continue operating the computer or whether all programs are to terminate, transfer of data from control of said processing program to said terminals, and transfer of data from said terminals to the control of said processing programs.